Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 1

CLAIRE L. JAMES
ROBERT W. BROOKS
ROBERT L. MASSARD
INVENTORS

BY
ATTORNEY & AGENT

Nov. 17, 1964 C. L. JAMES ETAL 3,157,284
DEVICE FOR SELECTING AND SORTING DISCRETE DATA BEARING ELEMENTS
Filed Aug. 17, 1961 56 Sheets-Sheet 2
*Fig. 2*
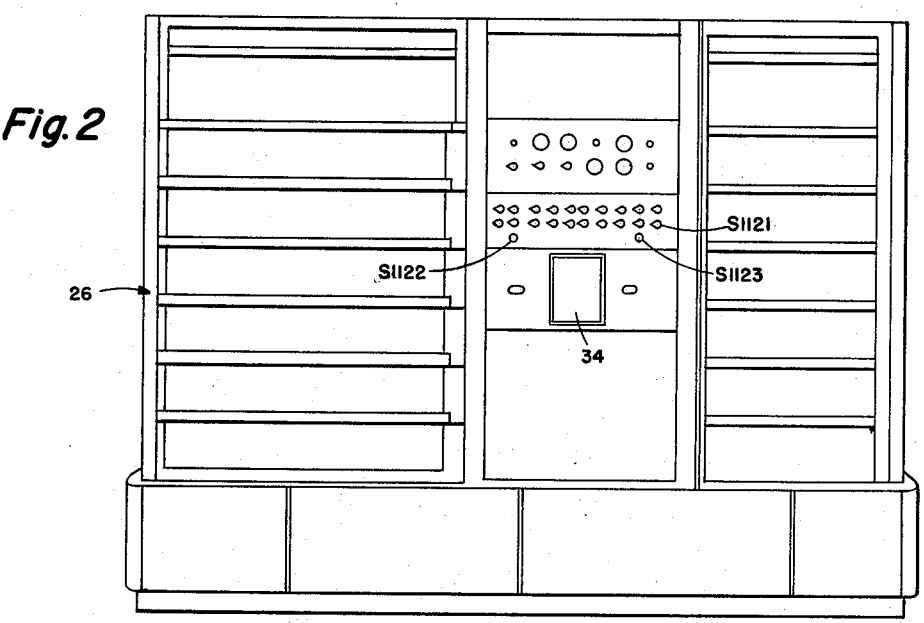
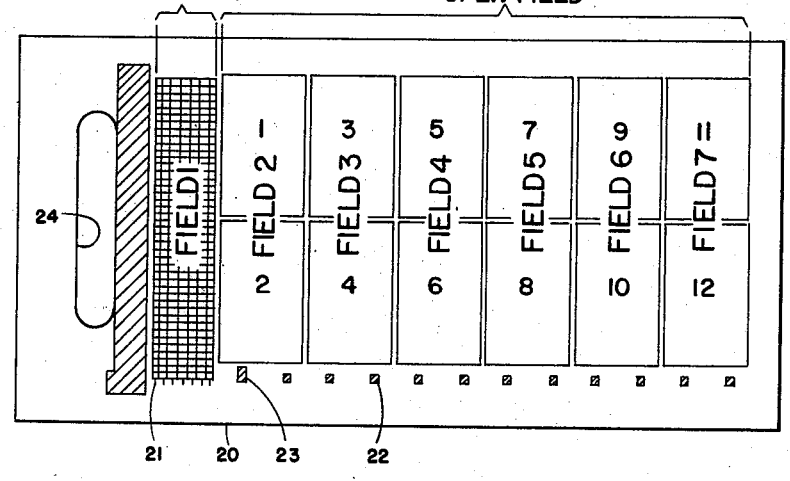
*Fig. 3*
CLAIRE L. JAMES
ROBERT W. BROOKS
ROBERT L. MASSARD
INVENTORS
BY
ATTORNEY & AGENT

CLAIRE L. JAMES
ROBERT W. BROOKS
ROBERT L. MASSARD
INVENTORS

ATTORNEY & AGENT

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 6
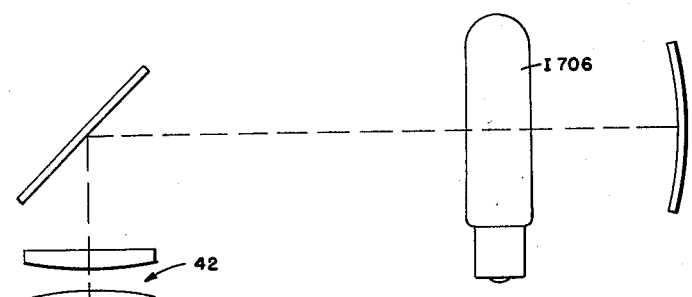
Fig. 8
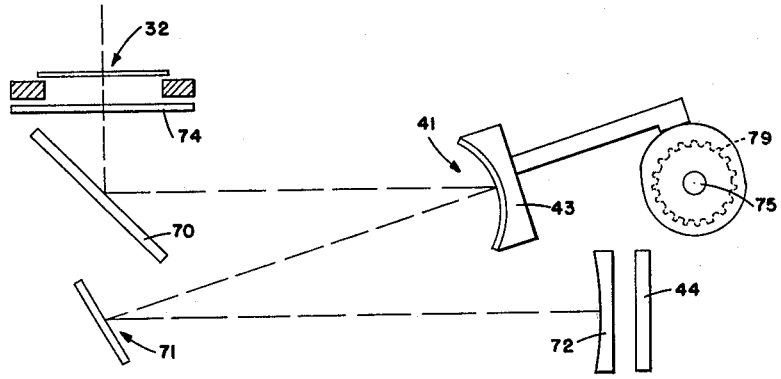
Fig. 9
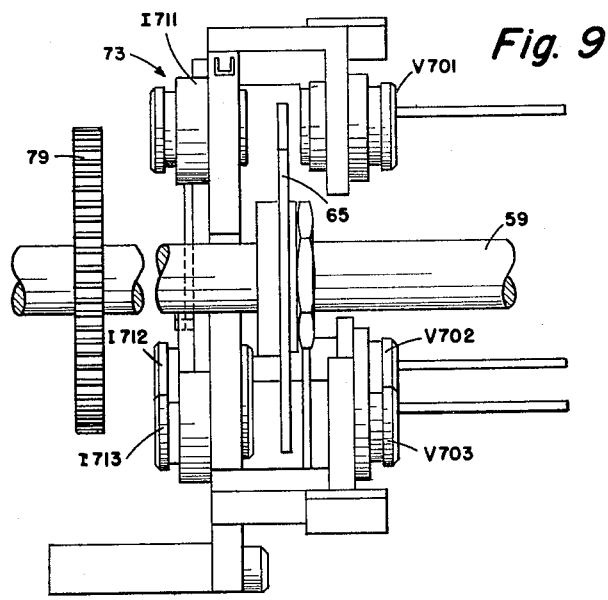
CLAIRE L. JAMES
ROBERT W. BROOKS
ROBERT L. MASSARD
INVENTORS
ATTORNEY & AGENT

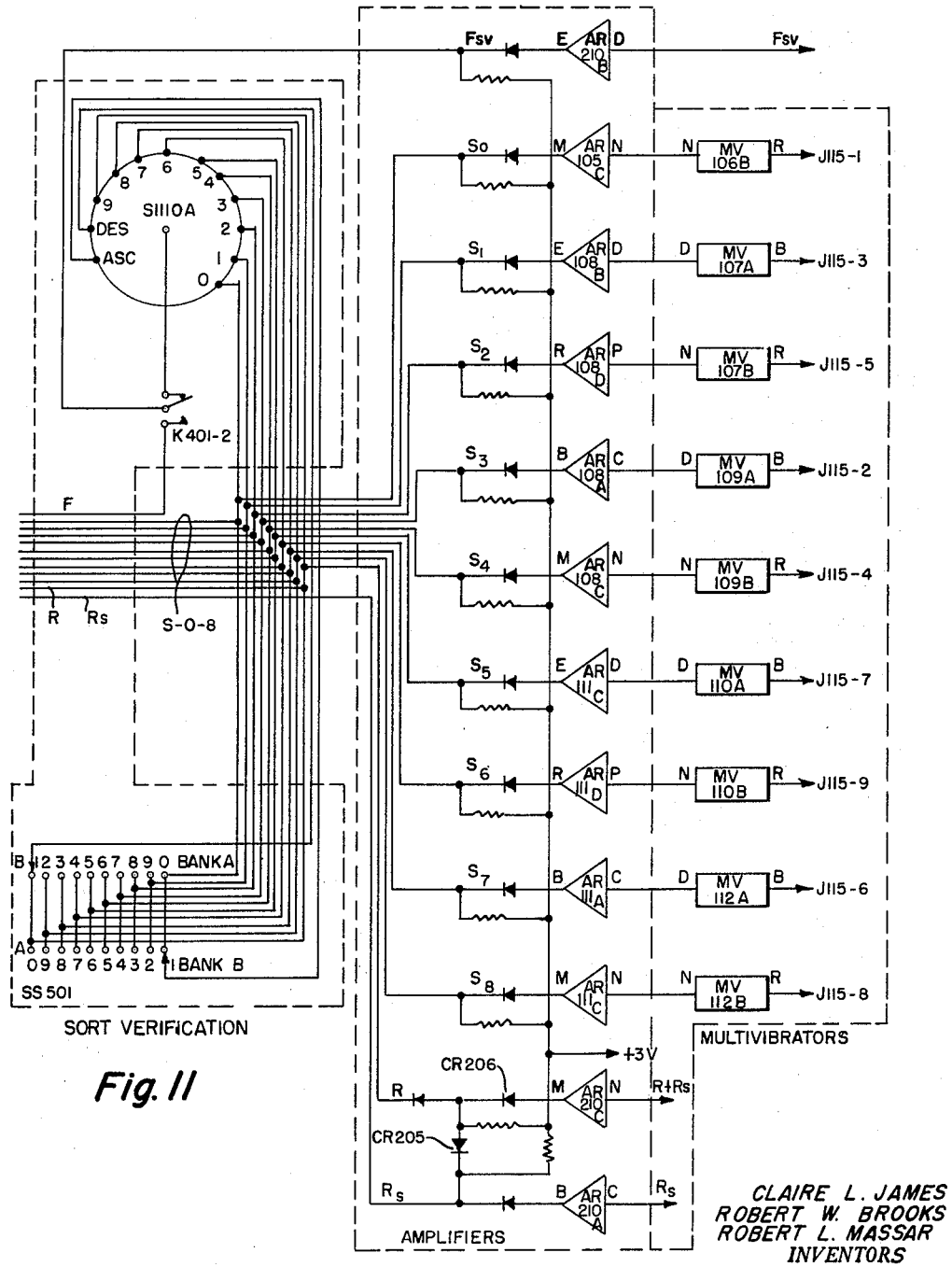
Fig. II

CLAIRE L. JAMES
ROBERT W. BROOKS
ROBERT L. MASSARD
INVENTORS

BY

ATTORNEY & AGENT

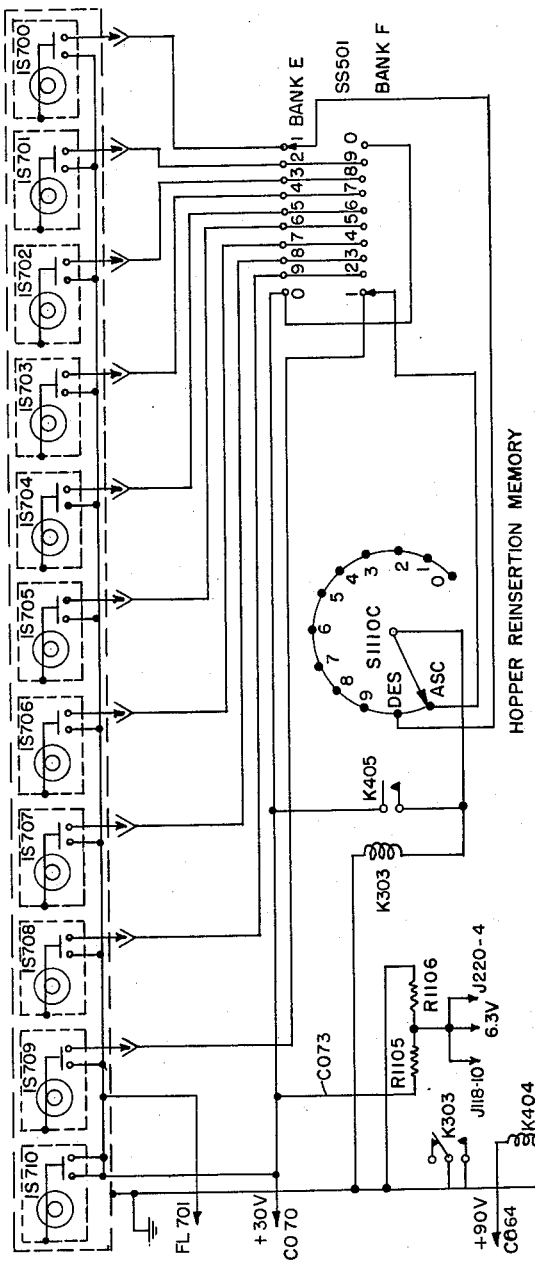
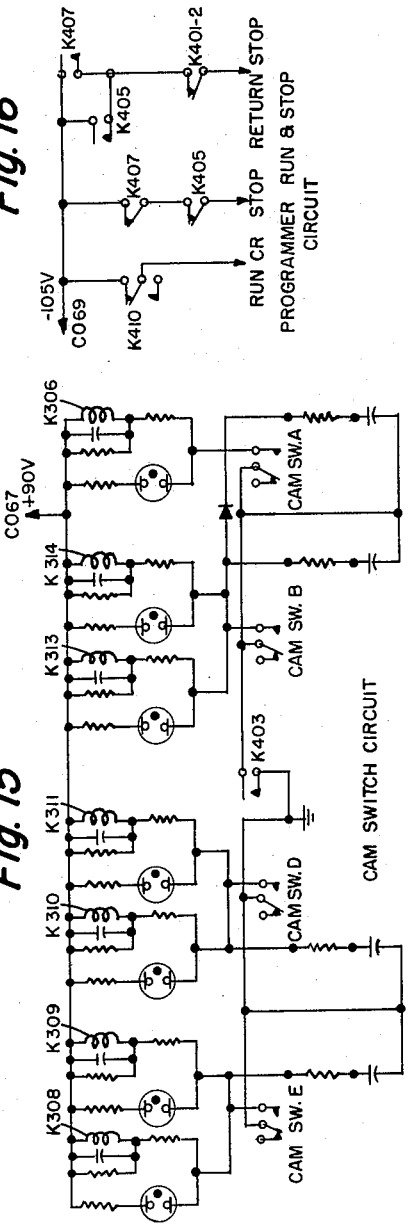
Fig. 15
Fig. 16
Fig. 17

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 12
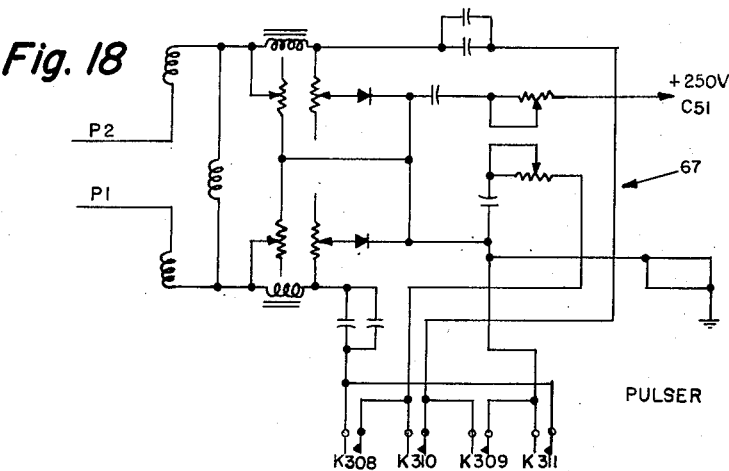
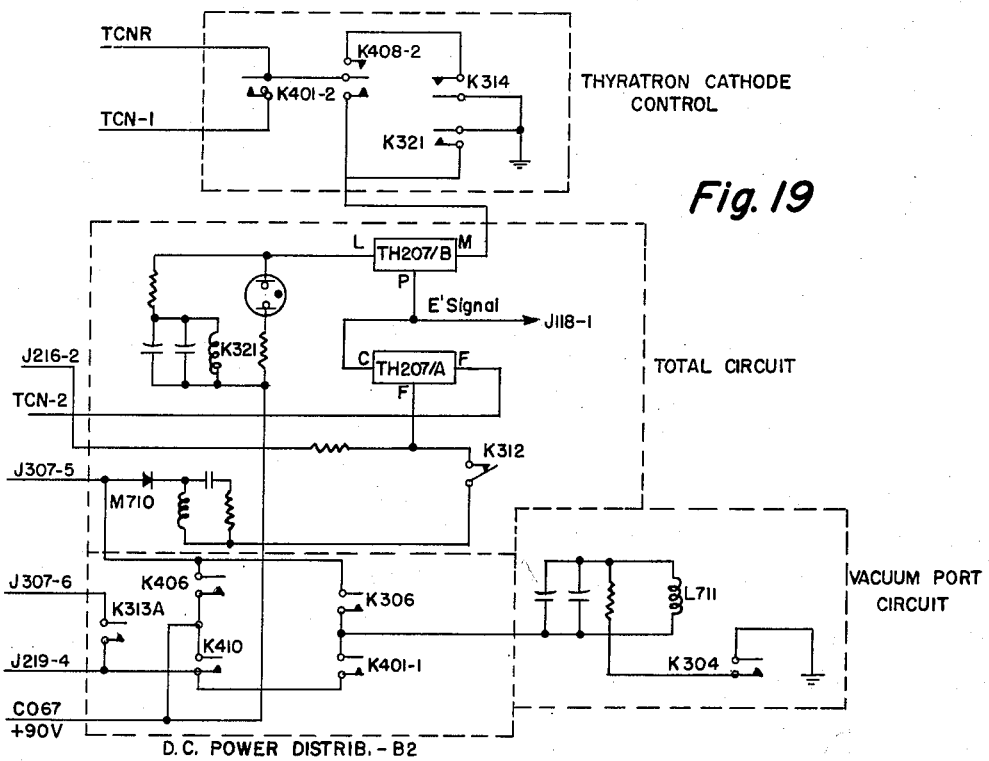
CLAIRE L. JAMES
ROBERT W. BROOKS
ROBERT L. MASSARD
INVENTORS
BY R. Frank Smith
Lloyd F. Seebach
ATTORNEY & AGENT

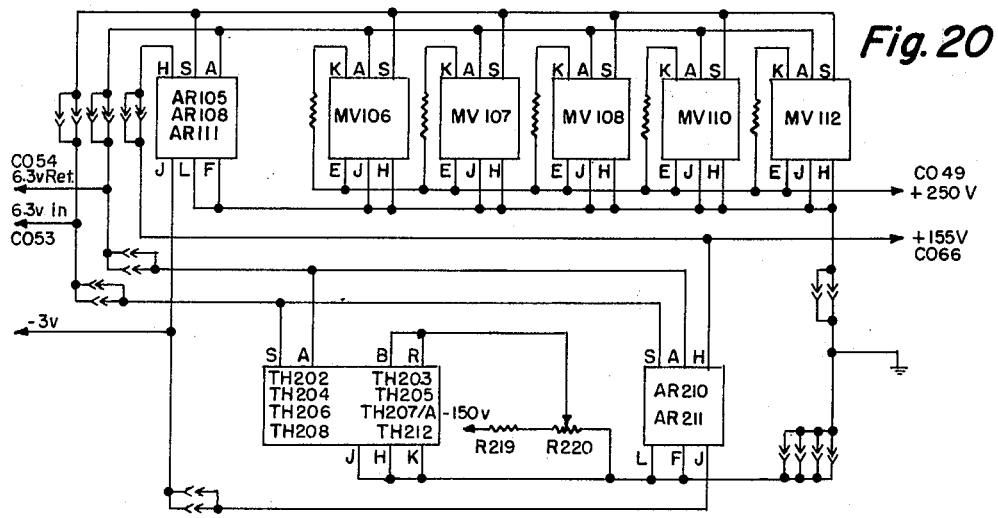
6.3v LAMP CIRCUIT
Fig. 21
SORT & TEST RELAY CIRCUIT
Fig. 22
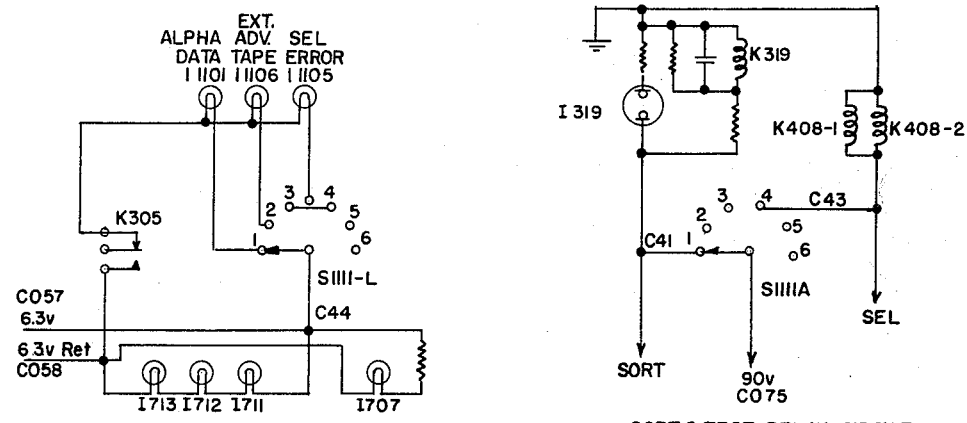
CLAIRE L. JAMES
ROBERT W. BROOKS
ROBERT L. MASSARD
INVENTORS
BY *R. Frank Smith*
*Lloyd F. Seebach*
ATTORNEY & AGENT

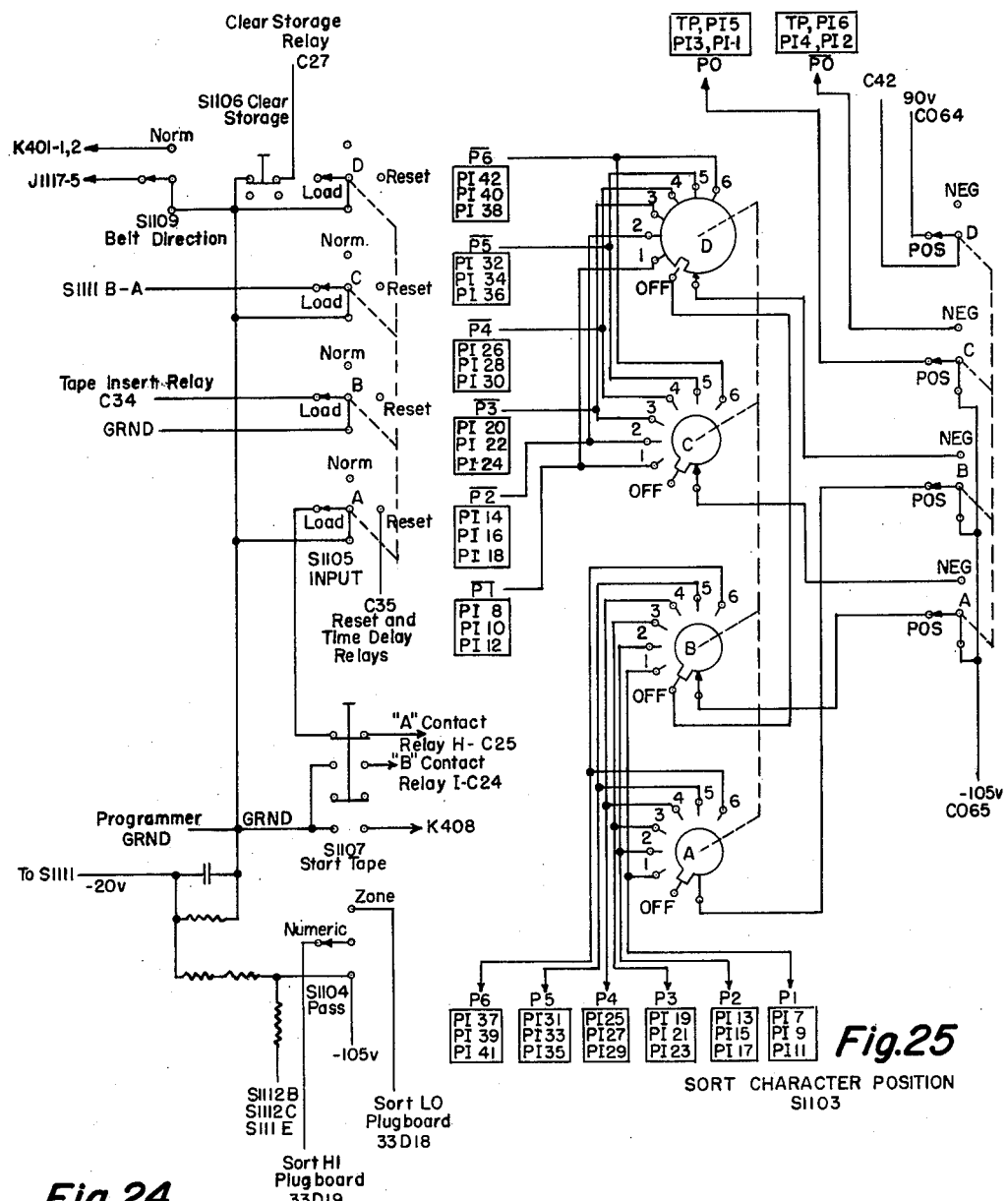
Fig. 24 — CONSOLE CONTROL SWITCHES
Fig. 25 — SORT CHARACTER POSITION S1103

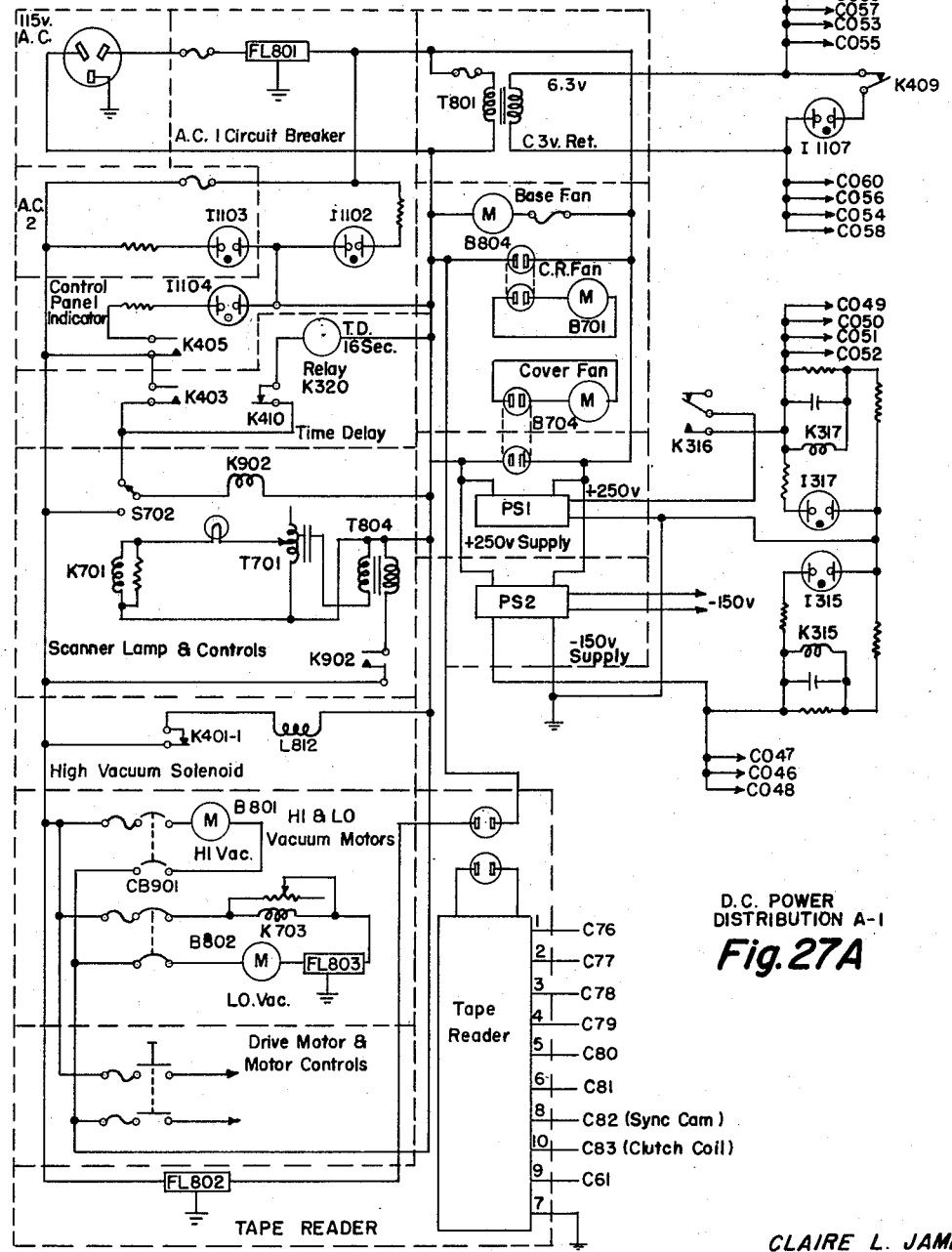

D.C. DISTRIBUTION
POWER A-2

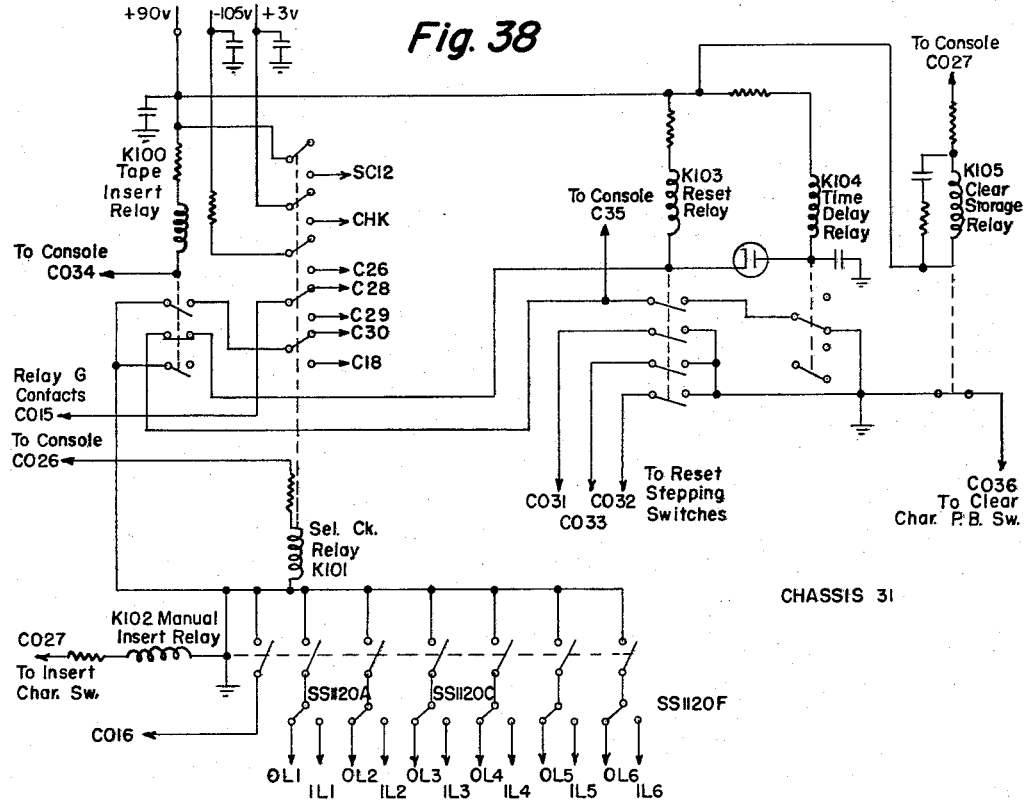
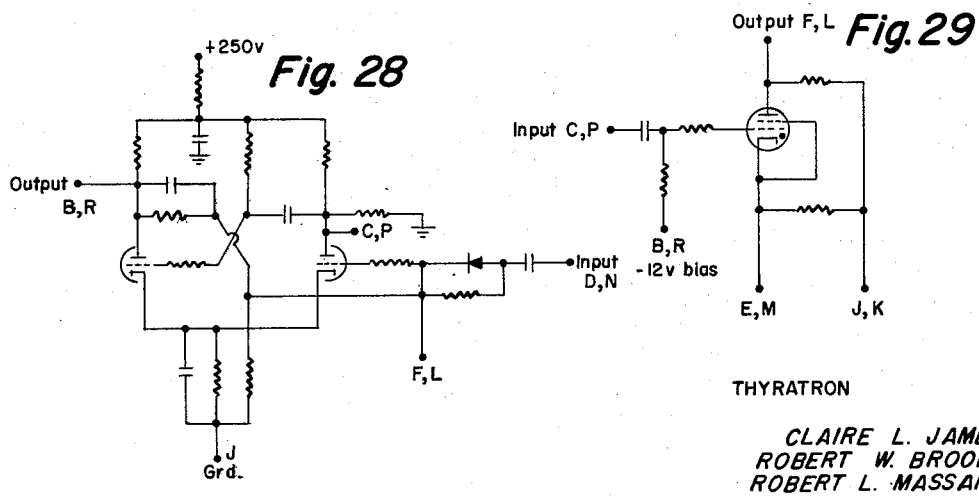
MULTIVIBRATOR
THYRATRON
CLAIRE L. JAMES
ROBERT W. BROOKS
ROBERT L. MASSARD
INVENTORS
ATTORNEY & AGENT

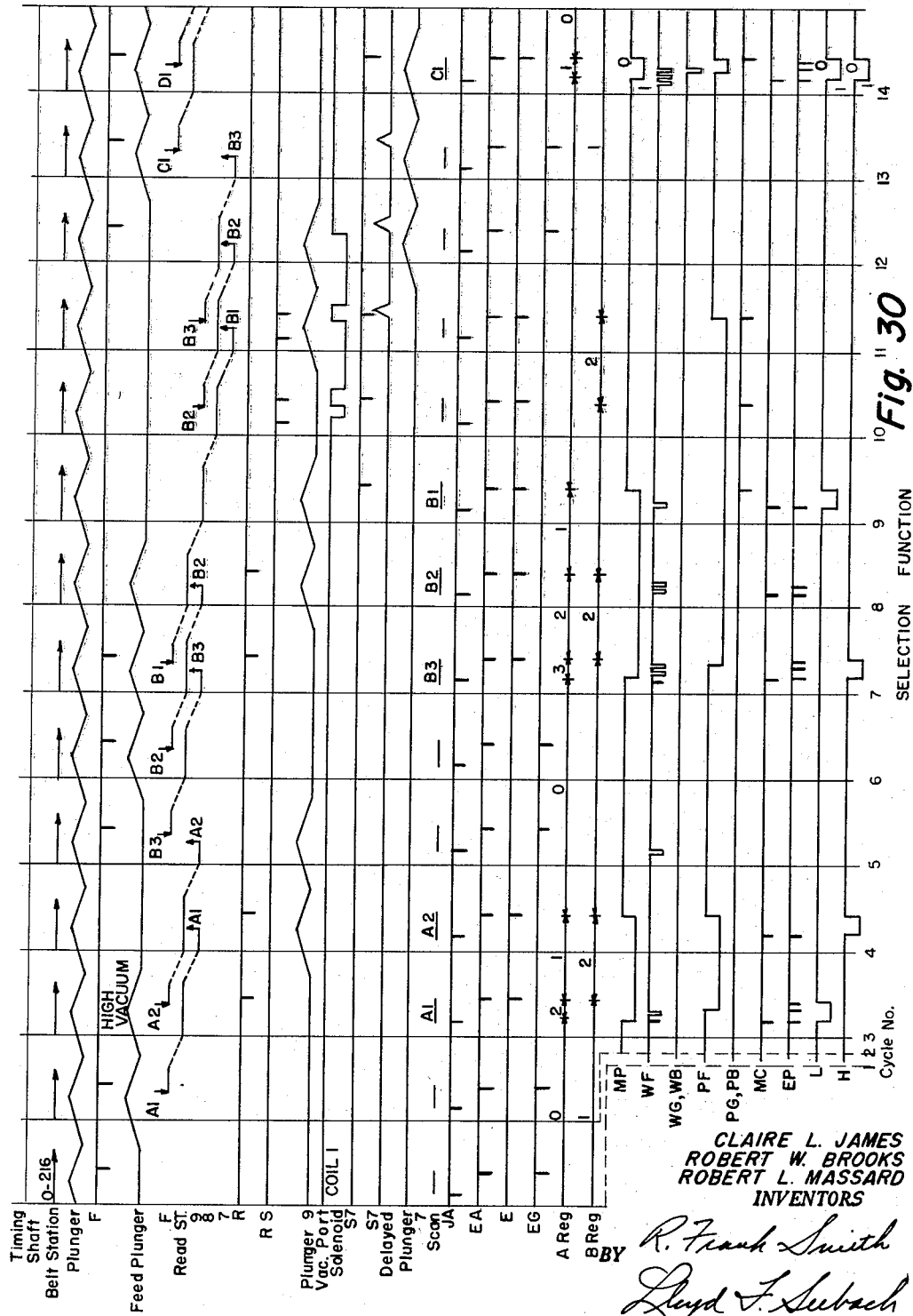

SORT FUNCTION

DUPLICATE PREPARATION FUNCTION

DUPLICATE PREPARATION FUNCTION

DUPLICATE PREPARATION FUNCTION

CLAIRE L. JAMES
ROBERT W. BROOKS
ROBERT L. MASSARD
INVENTORS

CLAIRE L. JAMES
ROBERT W. BROOKS
ROBERT L. MASSARD
INVENTORS

ATTORNEY & AGENT

CHASSIS

Nov. 17, 1964 C. L. JAMES ET AL 3,157,284
DEVICE FOR SELECTING AND SORTING DISCRETE DATA BEARING ELEMENTS
Filed Aug. 17, 1961 56 Sheets-Sheet 30
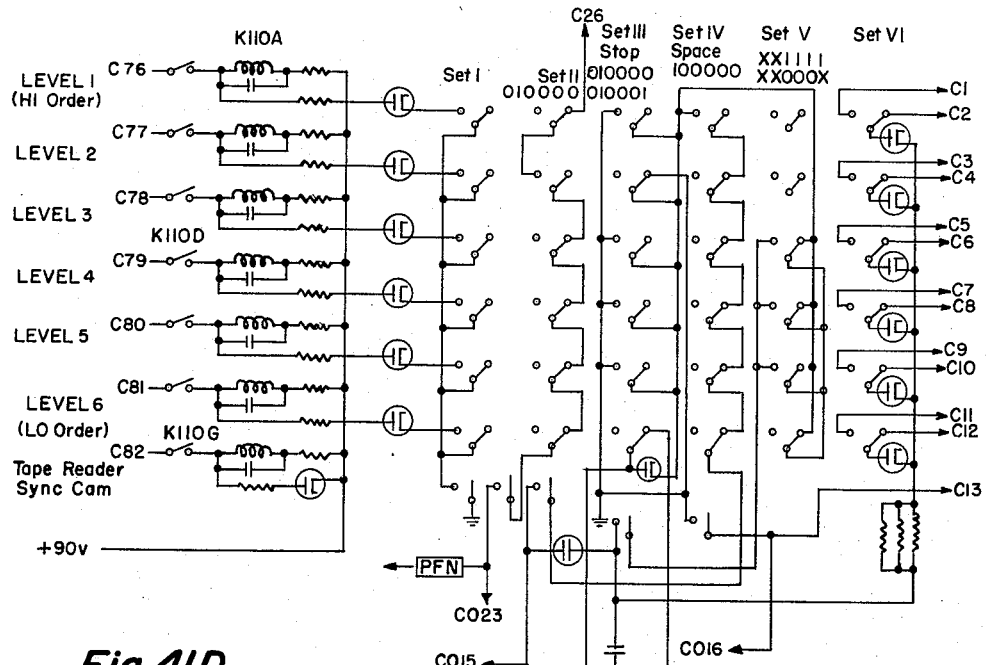
Fig. 40
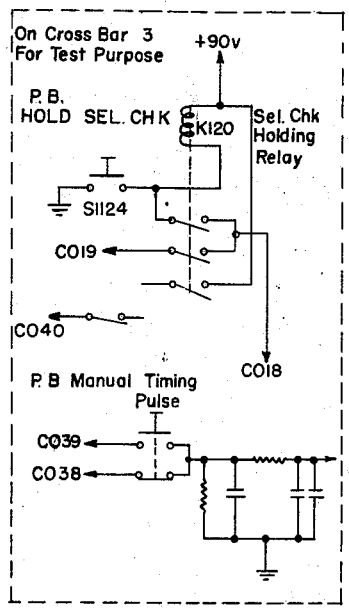
Fig. 41D
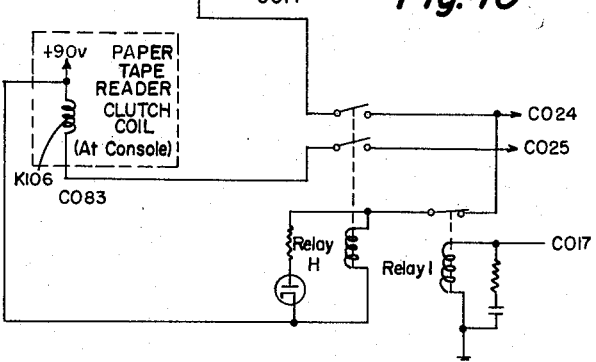
TAPE READER
CLAIRE L. JAMES
ROBERT W. BROOKS
ROBERT L. MASSARD
INVENTORS
BY R. Frank Smith
ATTORNEY & AGENT

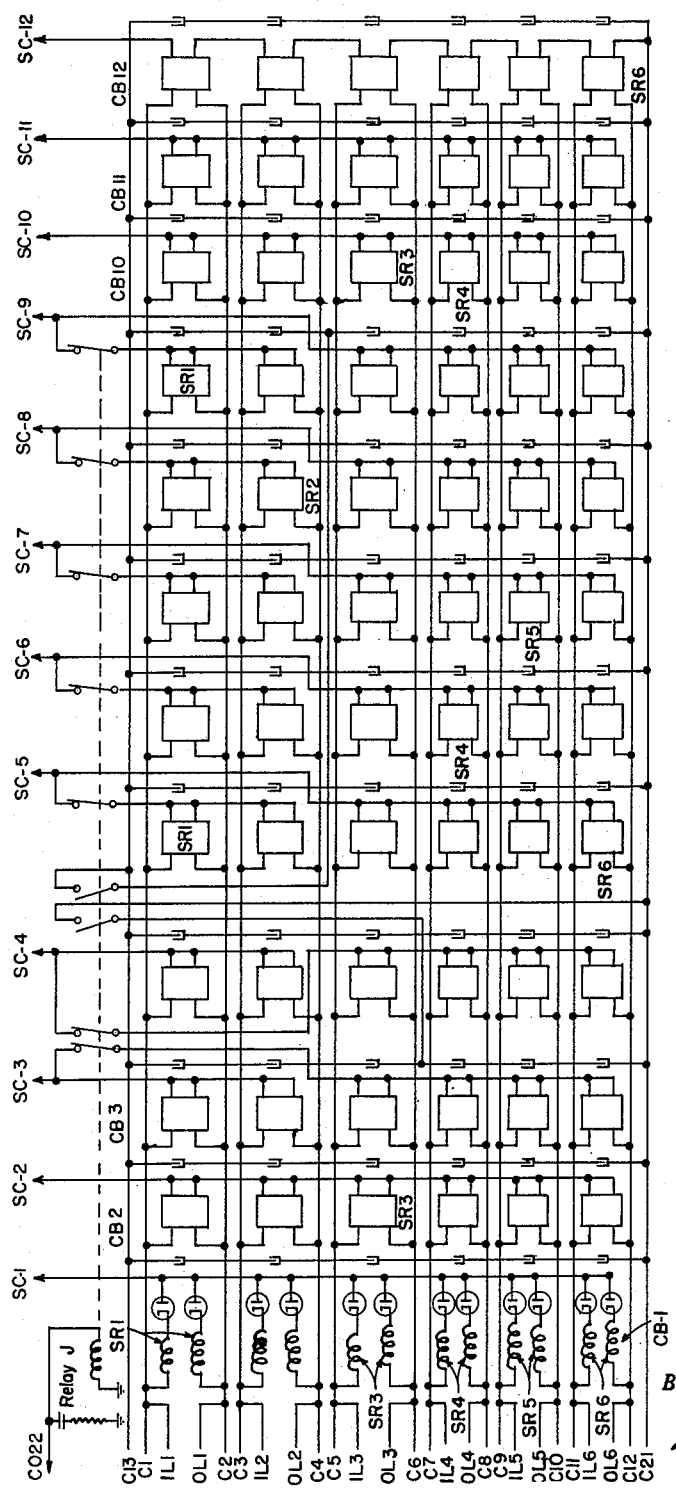
Fig. 41A  CROSS BAR STORAGE

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 32

CLAIRE L. JAMES
ROBERT W. BROOKS
ROBERT L. MASSARD
INVENTORS

BY

ATTORNEY & AGENT

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 34
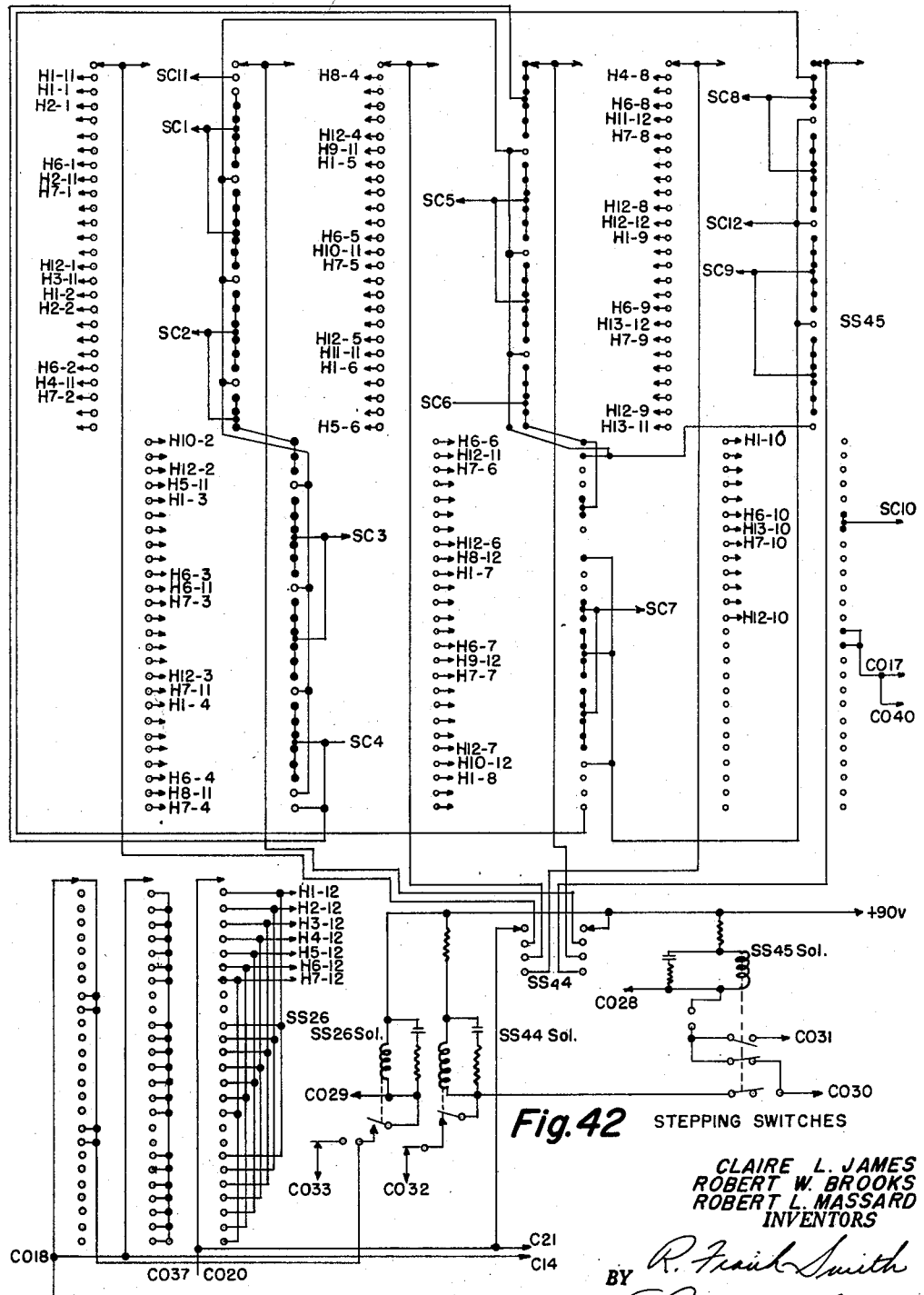
Fig.42  STEPPING SWITCHES
CLAIRE L. JAMES
ROBERT W. BROOKS
ROBERT L. MASSARD
INVENTORS
BY
ATTORNEY & AGENT Nov. 17, 1964  C. L. JAMES ET AL  3,157,284
DEVICE FOR SELECTING AND SORTING DISCRETE DATA BEARING ELEMENTS
Filed Aug. 17, 1961  56 Sheets-Sheet 35

CLAIRE L. JAMES
ROBERT W. BROOKS
ROBERT L. MASSARD
INVENTORS

BY

ATTORNEY & AGENT

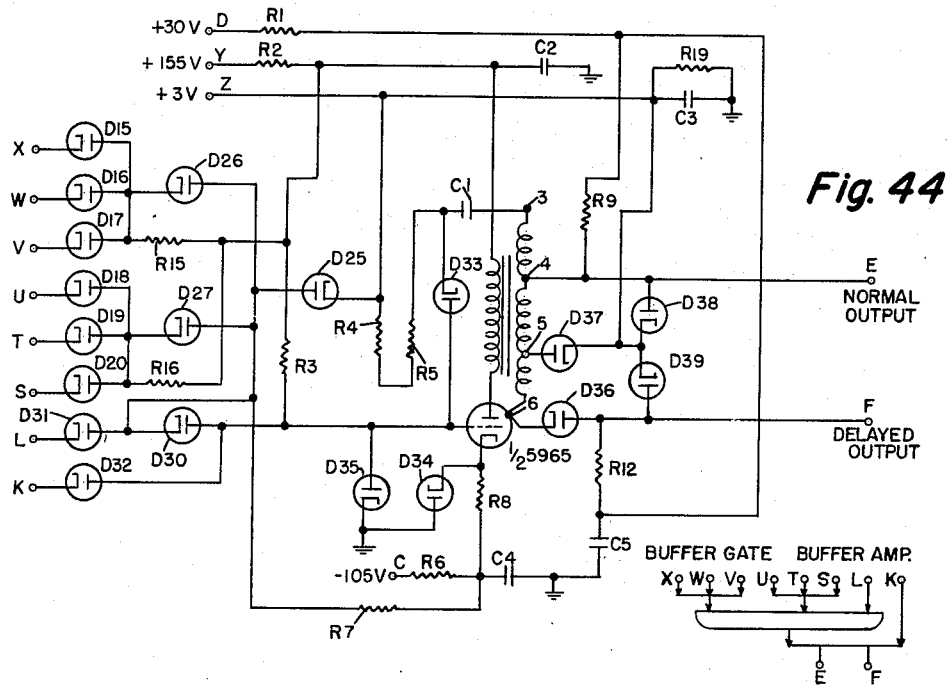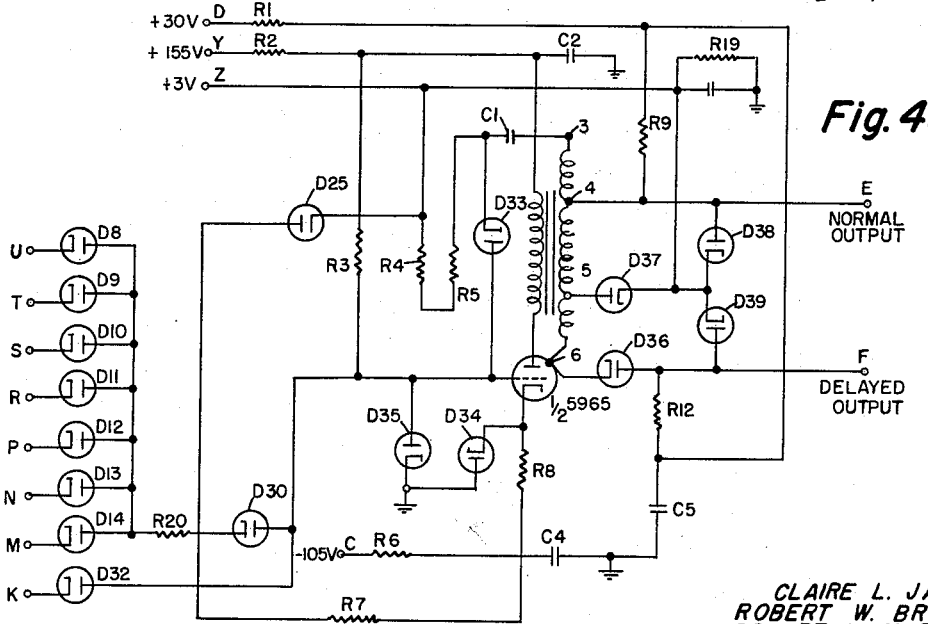

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 37

CLAIRE L. JAMES
ROBERT W. BROOKS
ROBERT L. MASSARD
INVENTORS

ATTORNEY & AGENT

Nov. 17, 1964  C. L. JAMES ETAL  3,157,284
DEVICE FOR SELECTING AND SORTING DISCRETE DATA BEARING ELEMENTS
Filed Aug. 17, 1961  56 Sheets-Sheet 38
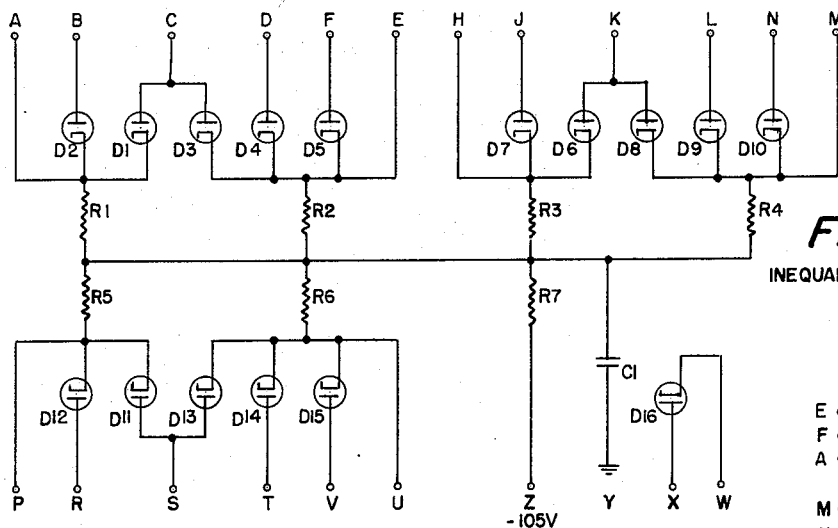
Fig. 48
INEQUALITY SENSING
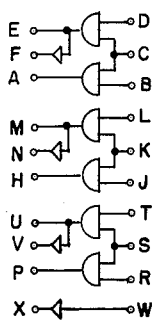
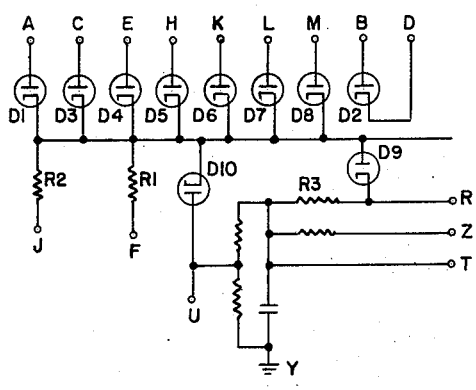
Fig. 49
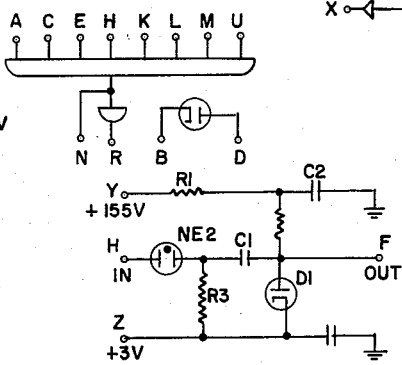
Fig. 53
NEON PULSER
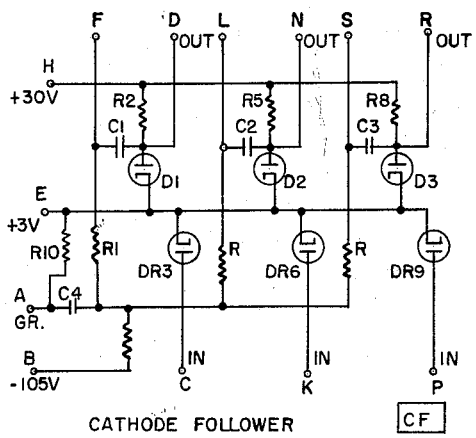
Fig. 52
CATHODE FOLLOWER
CLAIRE L. JAMES
ROBERT W. BROOKS
ROBERT L. MASSARD
INVENTORS
BY R. Frank Smith
Lloyd F. Leubach
ATTORNEY & AGENT

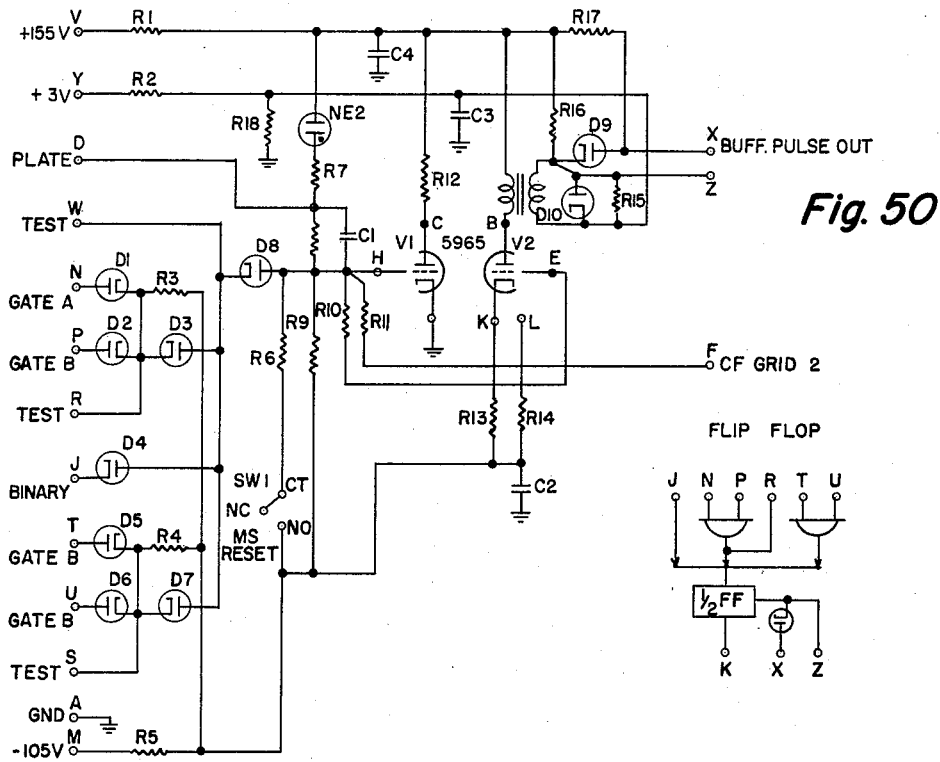
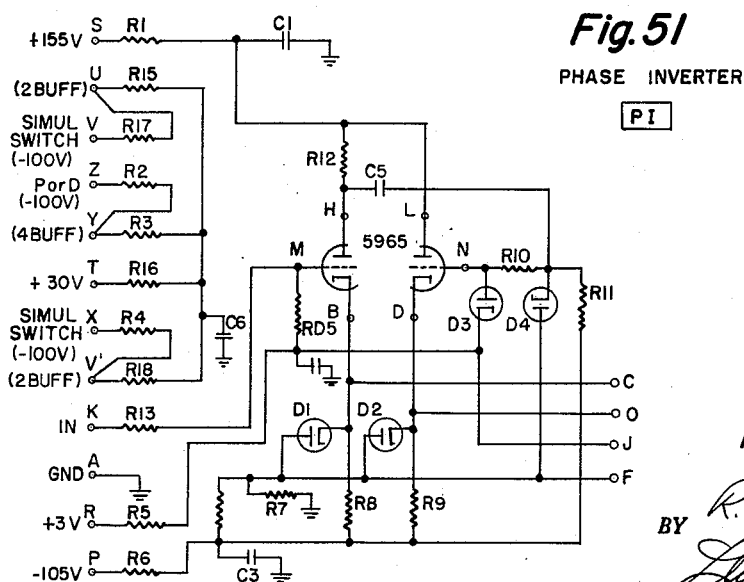

INEQUALITY SENSING CIRCUIT
1 OF 4

CLAIRE L. JAMES
ROBERT W. BROOKS
ROBERT L. MASSARD
INVENTORS

ATTORNEY & AGENT

EQUALITY SENSING CIRCUIT

CLAIRE L. JAMES
ROBERT W. BROOKS
ROBERT L. MASSARD
INVENTORS

ATTORNEY & AGENT

CLAIRE L. JAMES
ROBERT W. BROOKS
ROBERT L. MASSARD
INVENTORS

BY
ATTORNEY & AGENT

Nov. 17, 1964 C. L. JAMES ETAL 3,157,284
DEVICE FOR SELECTING AND SORTING DISCRETE DATA BEARING ELEMENTS
Filed Aug. 17, 1961 56 Sheets-Sheet 49
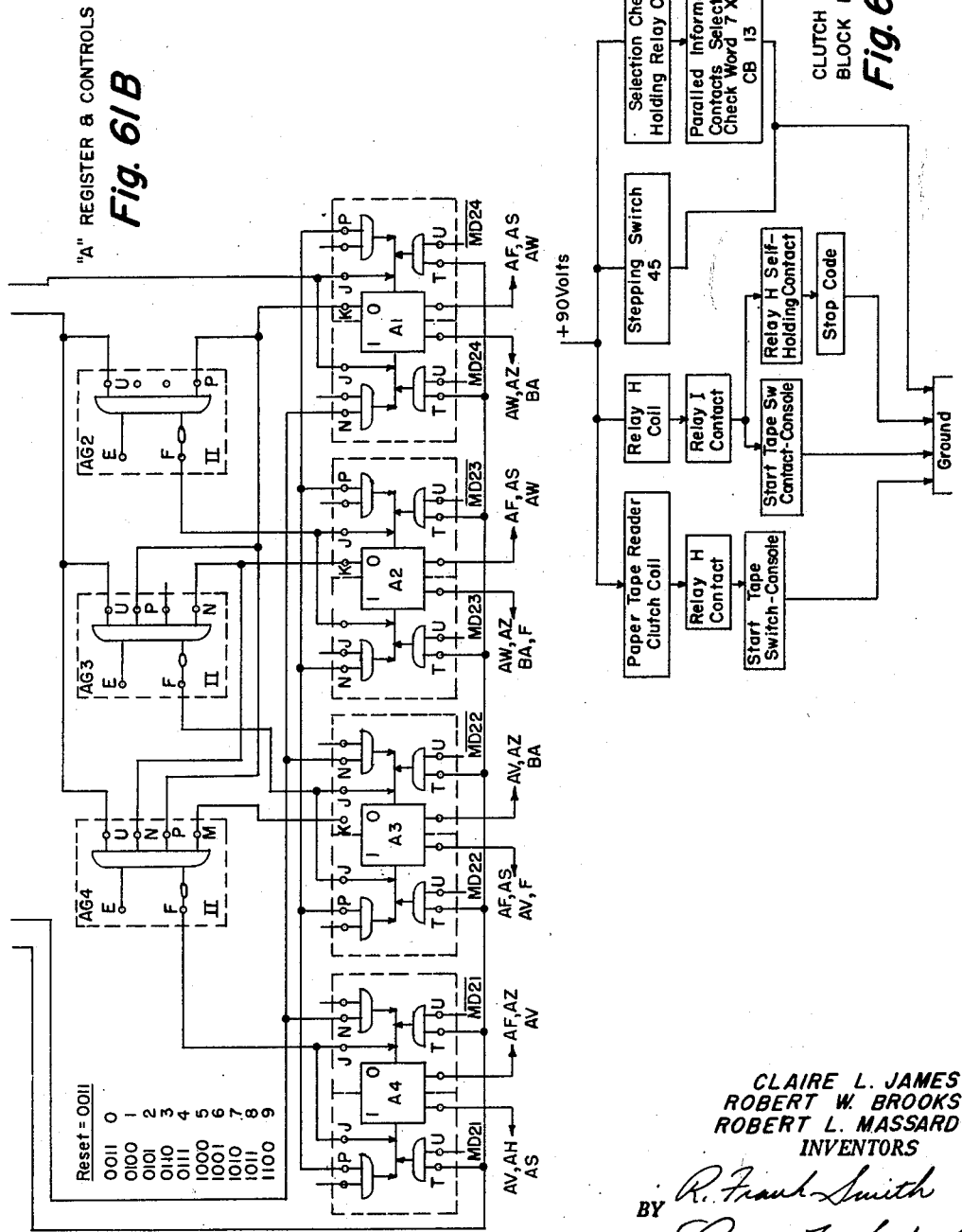
CLAIRE L. JAMES
ROBERT W. BROOKS
ROBERT L. MASSARD
INVENTORS
BY R. Frank Smith
Lloyd F. Seebach
ATTORNEY & AGENT

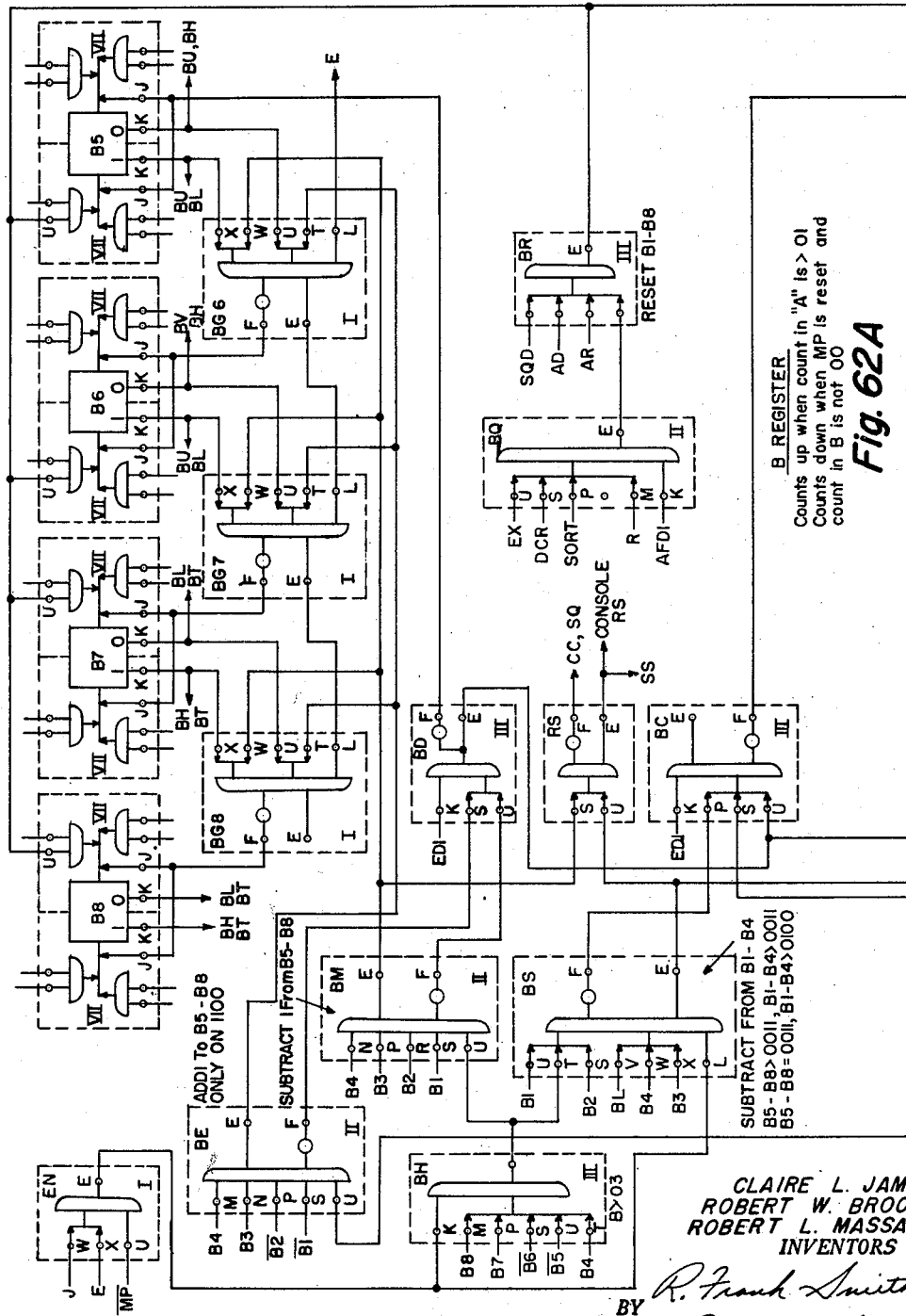

Nov. 17, 1964 C. L. JAMES ETAL 3,157,284
DEVICE FOR SELECTING AND SORTING DISCRETE DATA BEARING ELEMENTS
Filed Aug. 17, 1961 56 Sheets-Sheet 52

CLAIRE L. JAMES
ROBERT W. BROOKS
ROBERT L. MASSARD
INVENTORS

BY

ATTORNEY & AGENT

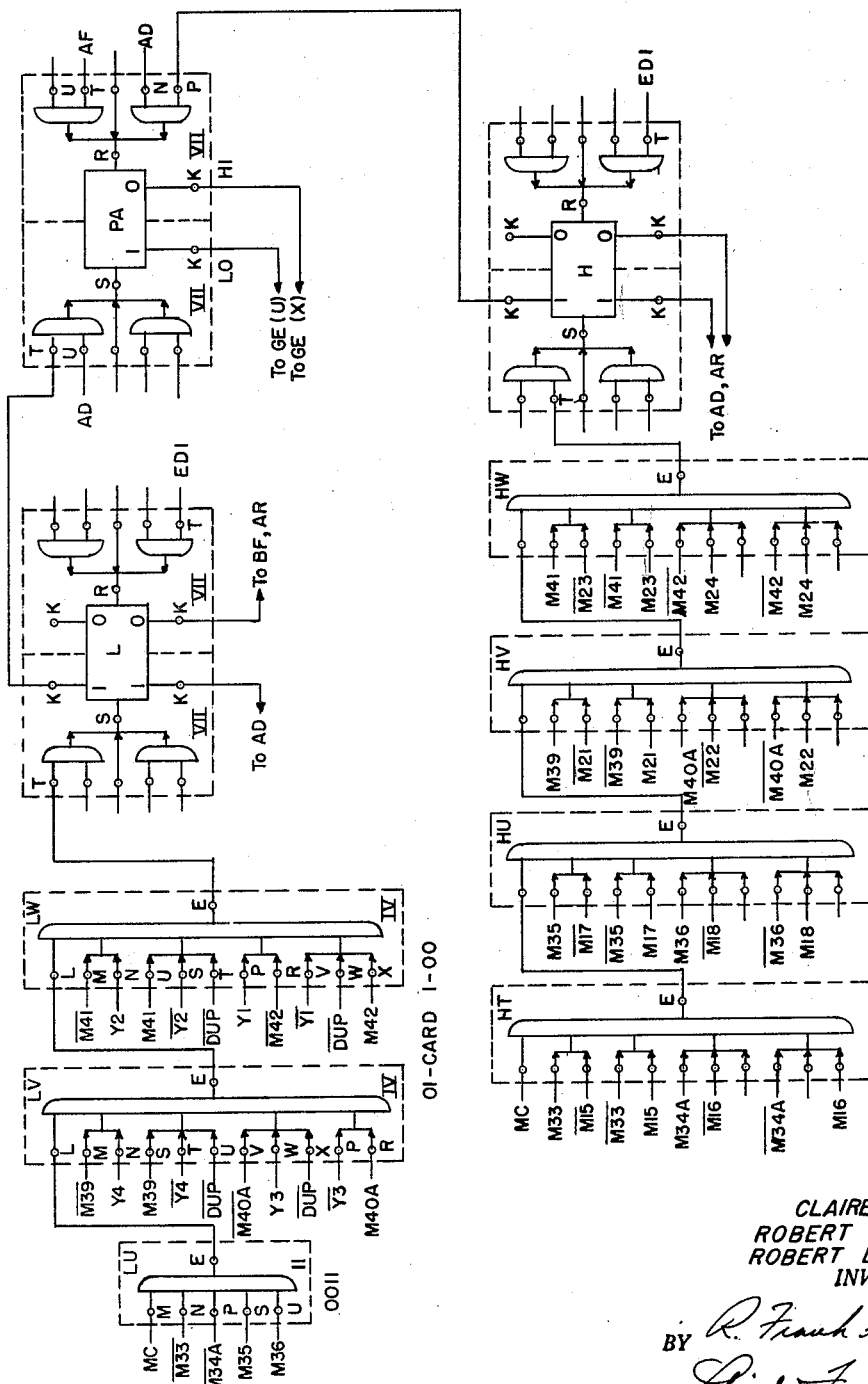

Nov. 17, 1964   C. L. JAMES ETAL   3,157,284
DEVICE FOR SELECTING AND SORTING DISCRETE DATA BEARING ELEMENTS
Filed Aug. 17, 1961   56 Sheets—Sheet 54
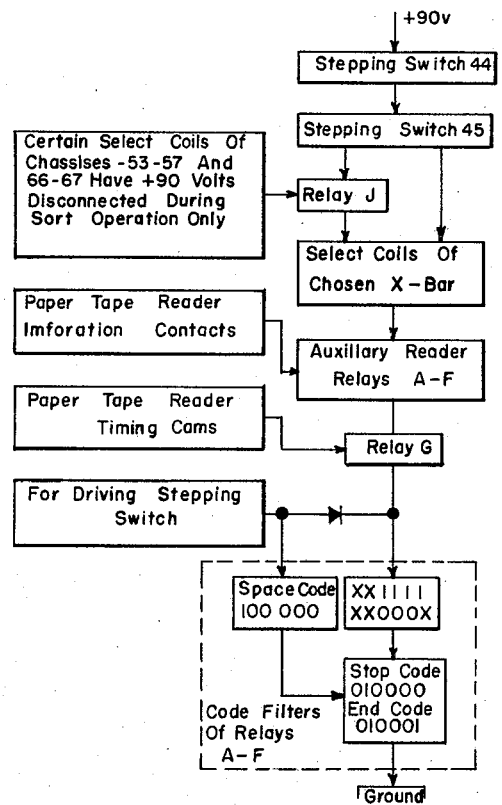
Fig. 65
SELECT COIL BLOCK DIAGRAM
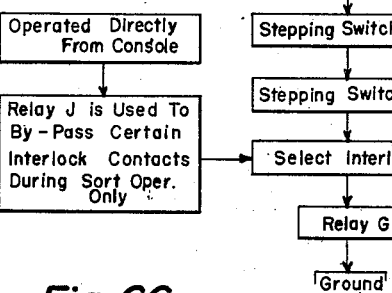
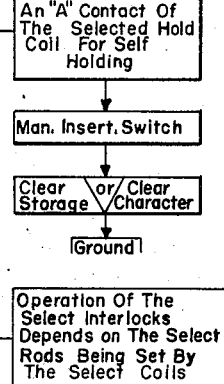
Fig. 66
HOLD COIL BLOCK DIAGRAM
CLAIRE L. JAMES
ROBERT W. BROOKS
ROBERT L. MASSARD
INVENTORS
BY
ATTORNEY & AGENT Nov. 17, 1964     C. L. JAMES ETAL     3,157,284
DEVICE FOR SELECTING AND SORTING DISCRETE DATA BEARING ELEMENTS
Filed Aug. 17, 1961     56 Sheets-Sheet 55

MANUAL INSERT BLOCK DIAGRAM

STEPPING SWITCH BLOCK DIAGRAM

CLAIRE L. JAMES
ROBERT W. BROOKS
ROBERT L. MASSARD
INVENTORS

BY
ATTORNEY & AGENT

Nov. 17, 1964   C. L. JAMES ETAL   3,157,284
DEVICE FOR SELECTING AND SORTING DISCRETE DATA BEARING ELEMENTS
Filed Aug. 17, 1961   56 Sheets-Sheet 56

STEPPING SWITCH
BLOCK DIAGRAM

SELECTION CHECK
BLOCK DIAGRAM

CLAIRE L. JAMES
ROBERT W. BROOKS
ROBERT L. MASSARD
INVENTORS

BY
ATTORNEY & AGENT

United States Patent Office 3,157,284
Patented Nov. 17, 1964

3,157,284
DEVICE FOR SELECTING AND SORTING DISCRETE DATA BEARING ELEMENTS
Claire L. James, Rochester, N.Y., and Robert W. Brooks, Sherborn, and Robert L. Massard, Wellesley Hills, Mass., assignors, by direct and mesne assignments, to Eastman Kodak Company, Rochester, N.Y., a corporation of New Jersey
Filed Aug. 17, 1961, Ser. No. 132,023
30 Claims. (Cl. 209—72)

The present invention relates to a device for manipulating and handling photographic elements bearing coded information to select and sort such elements on the basis of the coded information. More particularly, the invention is concerned with handling a plurality of cards in a single pass without restarting, handling multiple card groups of a single document wherein a group comprises up to 99 cards per document, selecting on the basis of nine different sets of requested information in a single pass, selecting on the basis of requested information which may involve as many as 20 words which may be grouped into as many as 16 phrases, and requesting information in which four of the 20 words may be requested in a "greater than," "equal to" or "less than" sense with respect to the binary code.

It is well known in the prior art to utilize punched cards for coded information and to pass these cards individually and successively through a reading station to locate a particular card based on a preset condition of the card aperture sensing means. With this type of apparatus, however, the sensing means can be set for only one condition based upon one or more characters and this is the only basis on which a selection can be made. As a result, for each character or any group of characters, the cards must be fed through the sensing station a number of times in accordance with the number of conditions to be sensed to retrieve the desired information. In addition, with each different character or condition that is to be selected or sensed as the cards move through the sensing station, the sensing means must be adjusted to accommodate the sensing fingers to the positions on the card in which the desired coded information is located. In the case of an IBM or Hollerith type of card, the number of characters which can be encoded on a card is limited to 80 characters. As is well known, these cards are usually divided into fields in which a group of characters are utilized to provide a word or other information such as a date, number, etc.

The present invention has many advantages over the prior art and the functional operation of the apparatus to be described hereinafter becomes quite evident once an understanding of the basic problem has been gained. Having once established an extensive file of cards, the user is faced with the problem of selecting from the file all documents which contain certain information which he desires to utilize. Actually, the first step in selection is provided by the arrangement of the cards in the file according to file words. Having obtained all the cards with the desired file words, the problem remains to select the ones which have the exact information of interest. A plurality of cards is placed in the card handler and the requested information is given to the machine in the forms of paper tape and plugboard connections. The words which make up the requested information are punched on paper tape which is inserted into a paper tape reader. The desired logical relations between these words is indicated by making connections on a plugboard. The card handler then reads the digital data on each card and transmits this data to the programmer which simply compares the card data to the requested data and instructs the card handler as to whether or not the requested data appears on that particular card. With this information the card handler deposits the card either with those having the requested data or with those not having the requested data. In this way the entire group of cards may be separated into two categories; those which have the desired information and those which do not. The operation described hereinabove may be generally referred to as the Selection operation and the apparatus has the added abilities to perform other functions besides Selection, all of which are within the capabilities of the apparatus.

One of the other operations is to sort the cards. This may be performed simply by selecting on the basis of a single character of a certain word and arranging the documents according to this character in the receiving hoppers. The requested data is thus that cards having a certain character equal to zero go to hopper No. 0; those having a 1 go to hopper No. 1; those having a 2 go to hopper No. 2 and so on up to 9. The additional feature is included that the documents may be returned to the feed hopper in ascending or descending order once they have been sorted into the 10 receiving hoppers. Thus by making multiple passes, without removing the cards from the apparatus, the documents of one group can be arranged in sequential order with respect to any character of characters. This mode of operation is referred to herein as Sort.

Another mode of operation is Duplicating Rejection. If card documents have been selected from different categories of file words, duplicates of the same document may occur. These can be eliminated by the selector wherein the programmer, instead of comparing the data of the document with requested data, compares it with the data of the previous document. This change in operation of the programmer is brought about by the control unit and represents a slight modification from the operation in Selection. The card documents fed into the machine must be in such an order according to document number so that duplicate documents will be adjacent. This is necessary in order for Duplicate Rejection to be effected.

The Extraction mode of operation is simply a selection process in which, instead of selecting on the basis of words or groups of words, a single document number is selected. The requested information is therefore the document number and because of the capacity of the receiving hoppers, nine different documents can be extracted in a single run.

In the Duplication Preparation mode of operation, the programmer is used to detect numeric identification codes which indicate file words. No requested information is used and the programmer senses the presence of one or more such numeric identification codes on one card of each document and on the basis of this numeric identification code deposits this card into one hopper and all other documents are deposited in another hopper. In this way the selector is used to separate documents from which additional duplicates should be made for the working files.

The Test mode of operation enables the operator to test the machine without cards. When the controls are set for Test, the programmer receives data from a paper tape which, in effect, replaces the card data as well as supplying the words of the requested data. The programmer directs the card handler as if the data were actually received from the cards. The card handler in turn actuates electromechanical counters which count the number of cards that would have been deposited in each hopper and this can be checked with the paper tape data to see if operation of the machine was correct and functioning properly.

The primary object of the invention, therefore, is to provide an apparatus which is capable of providing a plurality of modes of operation with respect to elements carrying coded information.

Another object of the invention is to provide an apparatus in which any one of a number of modes of operation can be set up merely by manipulation of a group of switches and installation of a proper plugboard.

Another object of the invention is to provide an apparatus which is capable of selecting on the basis of different sets of requested information in a single pass, the requested information involving as many as 20 words which may be grouped into as many as 16 phrases.

Yet another object of the invention is to provide an apparatus which is capable of sorting a plurality of cards on the basis of information encoded on such cards wherein the cards are fed successively past a reading station and deposited in the proper receptacle and returned to the feed hopper in ascending or descending order by making multiple passes to arrange the cards in sequential order with respect to any character or characters.

A yet further object of the invention is to provide an apparatus in which cards have been selected from different categories of file words and duplicates of the same document can be eliminated, the cards fed into the machine being in such an order according to document number so that duplicate documents will be adjacent.

Yet another object of the invention is to provide an apparatus whereby a selection process is obtained in which extraction of a document is made on the basis of a single word or document number and in which a number of different documents can be extracted in a single run.

Still another object of the invention is to provide an apparatus in which numeric identification codes can be detected on one card of each document whereby these cards are deposited in one hopper and all other cards are deposited in another hopper to separate those cards from which duplicates are to be made for the working files.

And a still further object of the invention is to provide an apparatus in which the operation of the apparatus can be tested for correctness and function by means of a paper tape which replaces data supplied by the cards which are normally fed successively and sequentially through the apparatus.

These and other objects and advantages will be apparent to those skilled in the art by the detailed description which follows.

Reference is now made to the accompanying drawings wherein numerals and/or alphabetic characters are used to designate the various elements and parts and wherein:

FIG. 2 is a perspective view of the programmer console;

FIG. 3 is a detail plan view of a photographic element showing the arrangement of the digital and graphical information;

FIG. 8 is a diagrammatic view of the principal elements comprising the scanning or code reading station;

FIG. 9 is a side elevation of the code scanner pulse generator;

FIGS. 11–13 are electrical schematic views of the channel circuitry;

FIGS. 15–22 are electrical schematic views of various control circuits;

FIGS. 24, 25 and 26 are electrical schematic views of the various console control switches;

FIGS. 27A and 27B are electrical schematic views of the power distribution circuits;

FIGS. 28 and 29 are electrical schematic views of a multivibrator and thyratron circuit, respectively;

FIGS. 30–35 are diagrammatic views showing the timing relationships and movement of the cards for several modes of operation;

FIG. 38 is an electrical schematic view of a part of the programmer switch circuitry;

FIGS. 39–42 are electrical schematic views of the programmer insertion switches, crossbar storage and stepping switch circuits;

FIGS. 44–53 are detail electrical schematic views of the circuits used in programmer logic circuitry;

FIGS. 61A and 61B are electrical schematic views of the A register and its controls;

FIGS. 62A and 62B are electrical schematic views of the B register and its controls;

FIGS. 63A and 63B are electrical schematic views of the comparison and error circuits; and FIGS. 64–70 are block diagrams showing the relation and condition for holding various relays in an energized state.

Figure 1:
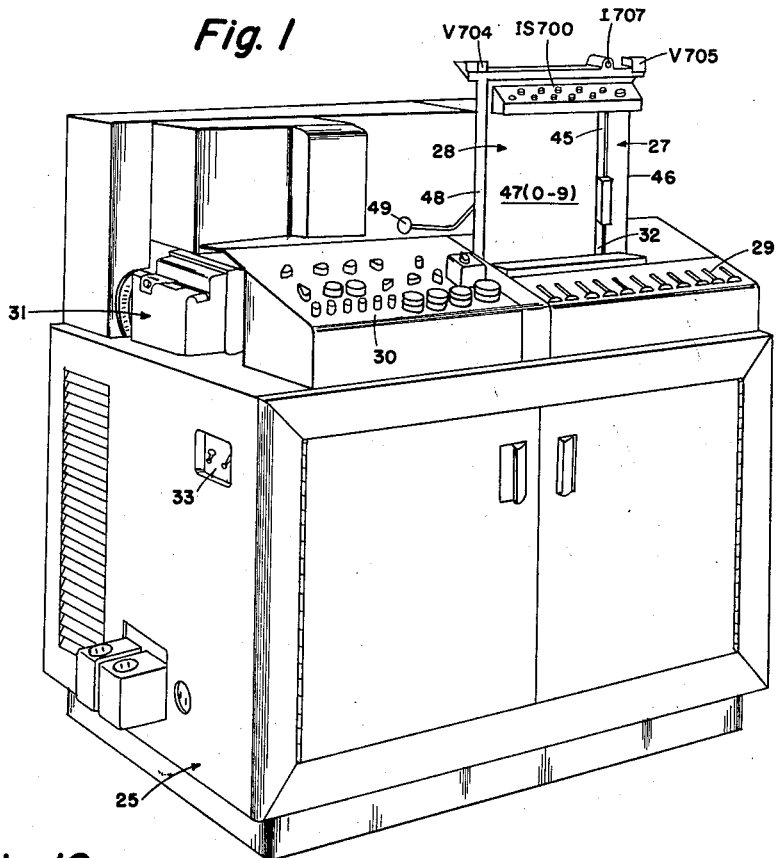
FIG. 1 is a perspective view of the card-handling console.

Before proceeding with any description of the apparatus comprising the invention, it is believed that a better understanding will be obtained if a detailed description is given of the format of card 20. Throughout the following description reference will be made to a card which, in effect, is a small piece of film approximately 16 x 32 mm. which contains only coded information (digital data) or both coded information and micro images of original documents (graphical data). Some cards will be negative while others will be positive, and negativeness or positiveness does not necessarily bear any relation to the appearance of graphical images on the film because a negative of a negative would show up as a positive image on the negative card. Therefore, a negative card is identified as one with opaque timing marks on a clear background and a positive card as one with clear timing marks on an opaque background.

The amounts of digital and graphical data can be varied in relation to each other from card to card. If desired, a card can be totally devoted to the storage of digital data although it is not possible to do the same with graphical data inasmuch as some digital information is always necessary. Storage of some documents may require more than one card which then results in a multiple card group describing the document.

The arrangement of digital and graphical data is shown in FIG. 3 and it is convenient to think of the card 20 as being divided into seven areas called fields. Each field is capable of carrying two legal-size pages of graphical data or 70 characters of digital data. A field cannot be divided between both types of data. If there is insufficient data to fill a field, the remainder of it is left blank. A total of 12 pages of graphical data can be put on a single card, one field area being left open for digital data. Each card 20 is provided with an elongated aperture 24 through which a stick is inserted for handling the cards as a group for insertion into and withdrawal from the hoppers.

Digital information is in the form of tiny opaque or transparent rectangles called "bits." This is known as a binary code and a total of six bits is required to designate any given character. In a binary code of this sort, the total number of entirely different arrangements of a group of six bits is $2^6$ or 64. Thus, the code is capable of handling all the letters of the alphabet and numbers with combinations to spare for other symbols. These bits are arranged on the card in columns, each column in a code field being 42 bits long (plus a timing mark 21) meaning that seven characters of coded information can be handled by each column. Each column comprises what is known as a card "word." The character adjacent to the timing mark is called a Tag character and is used to classify the card word. If the card is filled to capacity with digital data, it is capable of 455 characters or 65 words.

The first field must be distinguished from the others in that its first column has been set aside for a special function. This column (shown by cross-sectioning) is automatically left blank on the original card but is filled in with transfer code during the duplication process described in a U.S. Patent No. 3,099,199.

The first column, plus the succeeding six columns, constitutes the fixed field. It is in this area that certain digital data common to all cards will be located. Columns 2 through 8 of the fixed field are assigned the Tag characters, for example, S. T. U. V, X and Z. These Tag characters identify the columns in which they appear and play an important part in sorting operations and are particularly important in the uniformity of their appearance in these positions in all cards. Tag character Z of column 8 is used for the multiple card digital information. With reference to the digital code scheme outlined hereinbelow, it will be noted that any of four zones can be used with a particular field. Taking advantage of this possibility in a particular character, one of the four zones is substituted depending on whether the card is a single card; first card of a group; last card of a group; or a card within a group. The timing marks 21 shown in FIG. 3 always appear under digital information and there is one timing mark for each column of digital information. These marks are used by the programmer in sensing the 42 amplifier outputs of the code reader. The presence of document control marks 22 indicates that there is a document image in the field under which they appear. A control mark 22 on the left signifies a document image in the upper part of a field; a mark 22 at the right indicates the presence of a document image in the lower half of the field. A special document mark 23 is used to indicate a table of contents; index, etc. Document marks 22 and 23 are ignored by the selector. There are six fields following the first one. They are used for detail, classifying information and graphical data.

Certain digital data common to all cards is contained in the fixed field extension which is contained and designated by the area field 2 in FIG. 3. This fixed field extension occupies uniformly the first four columns of that field, the first column being a system symbol designated by a W tag, the second column being an accession date designated by a Y tag, the third column being the work batch designated by a CF tag and the fourth column being a field boundary, designated by a Q tag. The fifth through the tenth columns of the fixed field extension are blank on all cards carrying only fixed field digital data. This area, of course, constitutes a reserve area in which further fixed field extension or other digital data may be entered according to specific system plans.

The system described herein uses a binary code which is represented digitally as a series of transparent or opaque rectangles on the card 20 called bits. Since it is easier to designate these with numbers rather than with reference to them as rectangles, let a "0" represent a transparent bit and a "1" represent an opaque bit. This will be on the assumption that these designations are representative of a negative card and a positive card would, of course, be just the opposite. If there were only two bits to be put into code on the card, "1" could be represented by a transparent bit and the other by an opaque bit. However, an alphabet of 26 characters and a system of numbers based on 10 require that at least 36 different binary bit combinations be available. It is possible to generate these variations by requiring that any given character be represented by more than just a single bit. This can be expressed mathematically as a power of 2 (the number of different kinds of bits). If 2 is raised to the fifth power there are 32 possible combinations to work with. However, this is not enough and the next step, which is $2^6$ or 64 possibilities, provides more combinations than are necessary but some of the extra possibilities can be put to use in machine control functions, etc. The table below shows each one of the 64 possible different combinations of "0" and "1" when they occur in groups of six. Each binary character has been divided into a zone and a field, the zone consisting of the two most significant bits while the field is comprised of the four remaining least significant bits. In this way the binary character 010100 would be broken down into its zone (01) and its field (0100). The fields for least significant bits which are common to the numerical and alphabetical characters are in a column at the right of the table. Each of these fields with the exceptions of those combinations not being used represents any one of the four characters in the columns to the left. The zone combinations are arranged at the top over each column of characters. The zone combination over a column represents all the characters in the column. Obviously, to select any particular character, it is necessary to combine the proper zone and field and the few examples of this are shown below the table which follows.

| Zone Binary Bits 1 and 2 | | | | Binary Bits 3-6 |
|---|---|---|---|---|
| 00 Blank BS | 01 EC ST | 10 CS TAB | 11 CF CR | 0000 0001 0010 |
| | (Not used) | | | 0011 |
| 0 | Ø | / | . | 0100  F |
| 1 | A | J | , | 0101  I |
| 2 | B | K | S | 0110  E |
| 3 | C | L | T | 0111  L |
| 4 | D | M | U | 1000  D |
| 5 | E | N | V | 1001 |
| 6 | F | O | W | 1010 |
| 7 | G | P | X | 1011 |
| 8 | H | Q | Y | 1100 |
| 9 | I | R | Z | 1101 |
| | (Not used) | | | 1110 |
| | (Not used) | | | 1111 |
| UC | LC | Type Space | Tape Delete | |

Legend:
 BS—Back space pulse
 EC—End-of-code pulse
 ST—Shop pulse
 CS—Character space pulse
 TAB—Tabulate pulse
 CF—Character fill in pulse
 CR—Carriage return pulse
 UC—Upper case pulse
 LC—Lower case pulse
 A is 010100
 5 is 001000
 CR is 110001

The selector consists of two consoles—the card handling console 25 and the programmer console 26, see FIGS. 1 and 2. All the physical labor involved in the various card handling operations is performed by console 25. The programmer 26 contains the electronic equipment necessary for the control of the card handling console. Together, these two consoles comprise the selector and are connected by a pair of cables which can be disconnected from either console.

The card handling console 25 has four general groups of controls: The card handling items dominated by the feeding magazine 27 and the receiving magazines 28, the battery of card counters 29, the main operator control panel 30, and the paper tape reading station 31. To these should also be added the card reading station 32 and the power control panel 33 located on the left side of the console 25. The operator controls on the programmer center around the plugboard 34, see FIG. 2.

Figure 4:
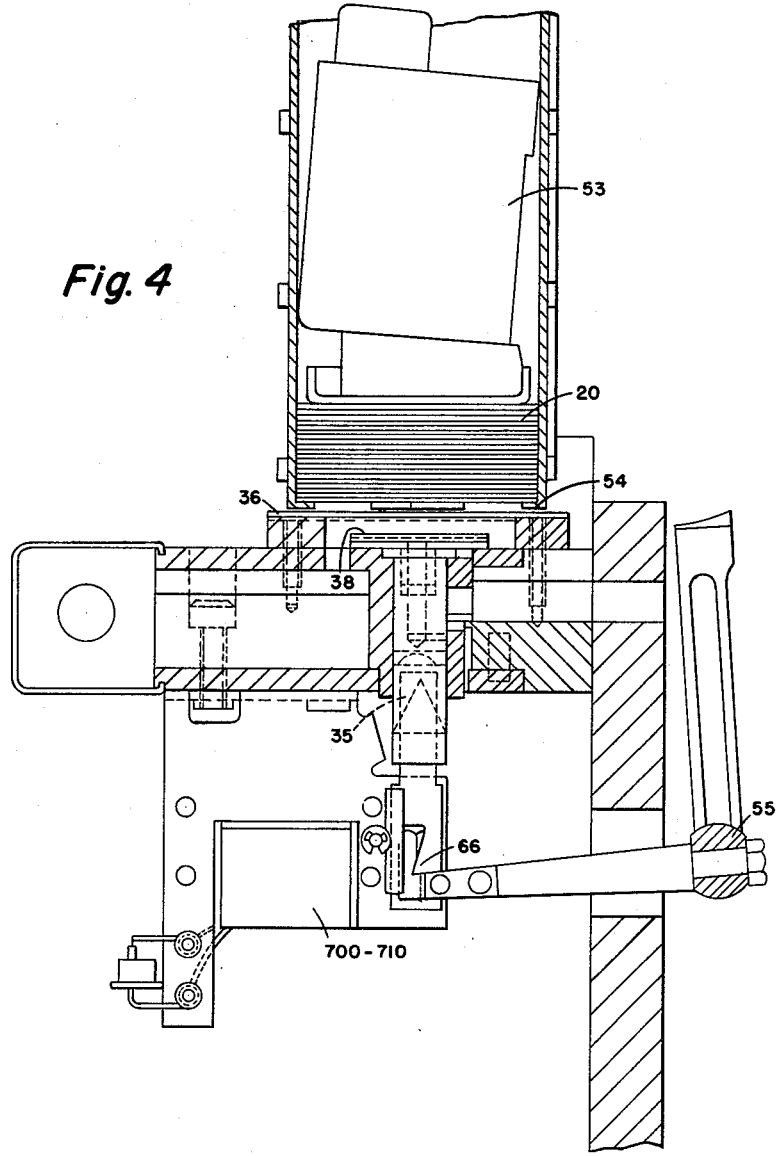
FIG. 4 is a vertical section through a hopper showing the relation of the hopper to the transporting means and the transfer means.
Figure 5:
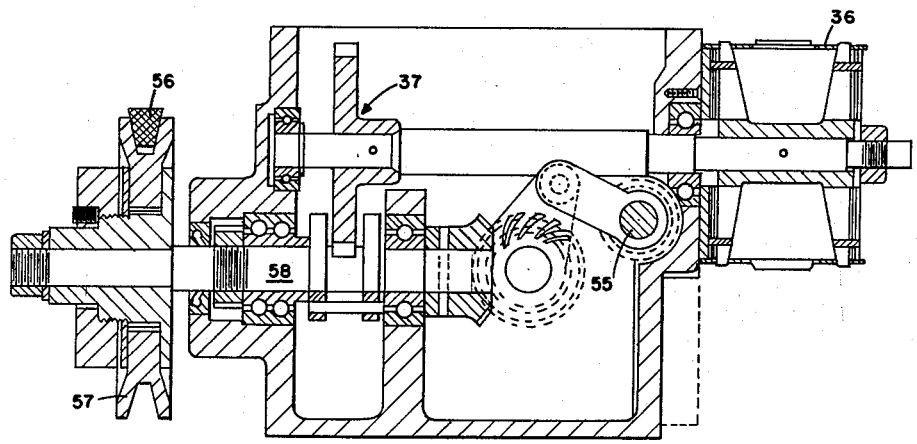
FIGS. 5 and 6 are vertical sections through the mechanism for intermittently driving the transport means and the central or timing shaft.
Figure 6:
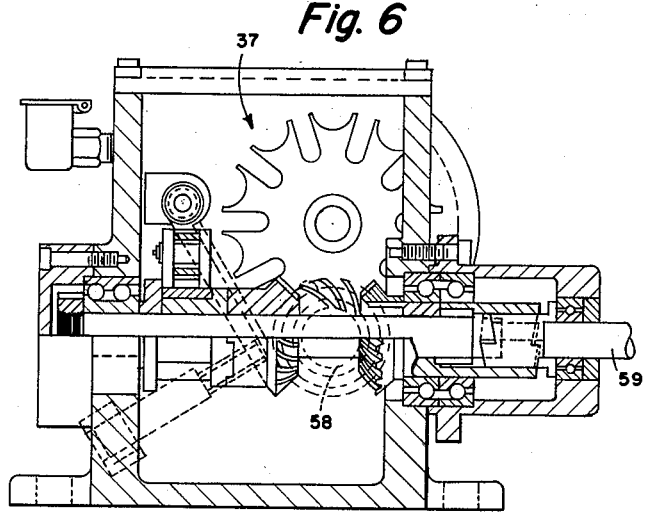
Figure 7:
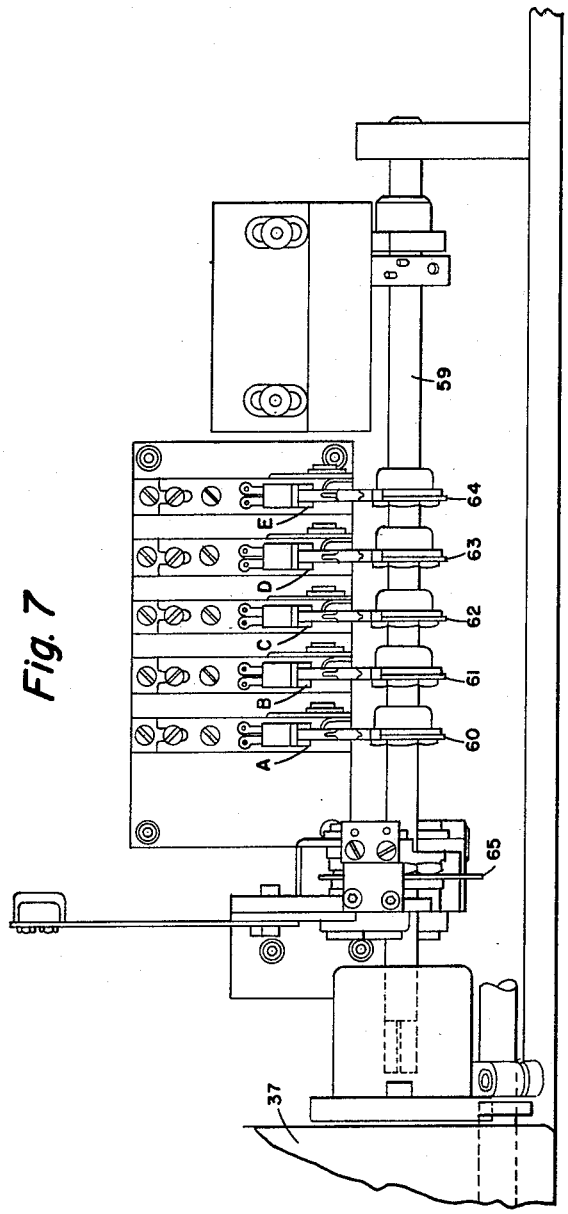
FIG. 7 is a side elevation of the timing shaft and the switch operating cams associated therewith.

The actual manipulation of cards during the various modes of operation is accomplished by the mechanism shown in Figs. 4–6. During a typical movement of cards, the cards are extracted one by one from the feed hopper 45 by a plunger 35–0–10 which rises from below the steel belt 36. The intermittent movement imparted to the belt 36 by the Geneva mechanism 37 allows the plungers to pass through the belt itself because the belt actually comes to a halt for a fraction of a second. During this interval the rising plunger's rubber lips 38 contact the bottom card in the hopper 45. The high vacuum channeled through the plunger draws the card firmly against the plunger's lips causing the card to be extracted from the hopper and deposited on the belt 36 as the plunger retreats below the belt. A low vacuum from below the belt keeps the card in place on the belt while it is being transported and all cards on the belt pass through the reading station 32. During the interval a card is stationary over the reading station 32, light from the scanner lamp I706 illuminates the card so that its digital data can be read on the other side of the belt by the code reader 41 consisting of an optical system 42 which focuses this light upon photosensitive cells 44. An oscillating mirror 43 in the optical system causes the light falling on the photosensitive cells to scan the card from top to bottom. The data on the card is now transformed into electrical signals which are amplified and sent to the programmer. The electronic circuits select the correct hopper for each card by decoding this data through the circuits programmed on the plugboard. The information is stored until the belt has moved the card under the correct hopper, at which time a plunger 35 (without vacuum) rises from below the belt, engages the card on the belt, and moves this card past the retaining lips 54 at the bottom of the hopper and into the hopper. The plunger then returns to its normal position below the belt.

The console 25 has two permanently attached magazine sections 27 and 28, the magazine 27 comprising the feed hopper 45 and a reject hopper 46 and the magazine 28 comprising a number of hoppers 47 (0–9) which store the cards during the card handling operations and at its outside end a reject hopper 48 which will collect any cards that get past the other hoppers. The plungers for the reject hoppers 46 and 48 are operated directly from the rocker shaft 55 so that they are actuated each time the Geneva movement 37 advances the belt 36. Therefore, any card which succeeds in reaching a position under one of the reject hoppers will be deposited therein and cannot be carried beyond. The feed hopper 45 is where cards are normally inserted for handling and, as previously described, cards feeding from the feed hopper are transported by the belt 36 to the reading station 32 and to the hoppers 47 of the receiving magazine 28. In reverse belt direction, cards may be returned to the feed hopper 45 from the receiving hoppers 47 (0–9). This is done primarily in the Sort operation. The receiving hoppers are numbered 47–0–9 from left to right and receive cards in normal belt direction. In Selection and in Duplication Preparation, hopper No. 9 is used as a transitory hopper to store the initial cards of a multicard document until all the cards of that document have been read. Once the whole document has been read, these cards may either be left in hopper 47–9 or transferred to any of the other hoppers further to the left. In reverse belt direction, cards may be returned from the receiving hoppers 47 (0–9) to the feed hopper 45.

Frequently, it is necessary to raise the magazines 27 and 28 away from the belt 36 and this can be accomplished by pulling up on the magazine elevating lever 49. Both magazines will raise at the same time as they are both mounted on the same movable plate. When the magazines are raised away from the belt even slightly, a microswitch S701 causes the belt to stop or will prevent its starting until the magazines are again lowered all the way.

During some operations it may become necessary to feed more than one group of cards which may cause one or more of the receiving hoppers to overflow. Similarly, cards returning to the feed magazine 28 could cause an overflow in the feed hopper 45. To guard against a hopper overflowing, a photoelectric detector has been provided which automatically stops the selector when it detects the full hopper and notifies the operator of this condition by turning on the hopper-full lamp I1104 on the control panel 30. This detector consists of a lamp I707 which projects a beam of light to the photocells V704–705. When a hopper becomes full, the card weight 53 on the top of the cards in the hopper interrupts the beam of light to the photocell causing the hopper-full relay K405 to actuate. The beam of light which controls the relay is determined by the direction of the belt through the return controls. Thus, in normal (left) belt direction, detection covers the receiving hoppers 47 (0–9) and left-hand reject hopper 48. In reverse (right) belt direction, the feed hopper 45 and right-hand reject hopper 46 are covered.

Once a full hopper has been detected, the cards are removed from the hopper by the operator. In order that any cards so removed can be reinstated into the same hopper as it empties during the return of the cards to the feed hopper, a memory has been built into the selector which "remembers" that some cards were removed from one or more of the hoppers during the preceding pass. To activate this memory, the memory switch IS700–710 located in the front of the hopper just emptied is pulled out. There are 11 of these switches, one being located in front of each hopper with the exception of the reject hoppers, see Fig. 1.

The belt 36 is driven via motor B803, belt 56, pulley 57, shaft 58 and Geneva movement 37. Belt 36 transports the cards from hopper to hopper and can move from right to left (normal) or left to right (reverse) as determined by the direction of rotation of the drive motor. Each advancement of the Geneva movement moves a card from a position exactly under one hopper to a position exactly under the next hopper. The card reading station 32 is exactly one unit of distance from both the feed hopper 45 and receiving hopper 47–9. The drive motor and control includes the drive motor, its starting and reversing relays, the timing shaft 59 and Geneva mechanism 37. The Geneva mechanism controls the motion of the belt and through the timing shaft 59 actuates the timing controls. The timing shaft 59 has five cams 60–64 and a rotating disk 65, the cams operating the cam switches of the timing controls and the disk interrupting light beams which control the synchronization of the code reader. One revolution of the timing shaft is exactly equal to a belt progression of one unit of distance. A more detailed description of this structure is fully disclosed in U.S. Patent No. 2,996,184.

The high vacuum control determines which of the solenoid-actuated plungers 35–0–10 will receive the high vacuum and thus be able to extract cards from the hoppers instead of depositing them. The high vacuum can be connected either to only the plunger of feed hopper 45 or to all the plungers of hoppers 47–0–9. In normal belt direction, it is connected either to the feed plunger 35–10 or hopper No. 9 plunger 35–9, as designated by the programmer. In reverse belt direction, the high vacuum is always connected to all ten of the receiving hopper plungers. The plungers must, of course, be actuated in addition to having the high vacuum connected before a card can be extracted. The plungers are actuated by solenoids L700–L709 (hoppers 0–9) and L710 (feed hopper) through a mechanical latching device 66 and thus may be controlled electrically. Each plunger may act in either of two capacities. If high vacuum is connected as described in the above-mentioned application, it will remove a card from the hopper and deposit it on the belt. If the high vacuum is not connected, it will remove a card from the belt and deposit it in the corresponding hopper. The high vacuum may be connected in one of three possible ways: Only to the feed plunger, only to the feed plunger and to the transitory (hopper 47–9) plunger 35–9, or to all the receiving hoppers (plungers 35–0–9). The plunger solenoids L700–L710 are timed by the timing control and the plungers by the rocker shaft 55 so that they operate during the space of time in which the belt is held stationary by the Geneva mechanism 37. The actuating signals for the solenoids can come from either one or two sources. When the belt is traveling in the normal direction, these signals come from the programmer by way of the core memory and memory thyratrons. When the belt is traveling in the reverse direction, the signals come from the return controls where they are originated.

The code reader 41 comprises the mechanism which reads the data on the cards as they pass the reading station 32 between the feed hopper 45 and hopper No. 9. The code reader includes amplifiers which amplify the signals from the detectors, and the synchronizing circuits control the timing of the electrical outputs of the amplifiers with respect to the mechanical motion of the optical elements and the cards themselves. The amplifier outputs make up the 42 bits of a word and are sent to the phase inverters of the programmer. The timing marks are also read and a pulse is sent to the programmer for each mark. In order for the timing marks to be read properly, the code reader must know whether positive or negative cards are being handled and this information is supplied by the film control. A complete description of the code reader circuitry is disclosed in the above-mentioned application, Serial No. 722,342.

The timing control is operated by switches A–E and cams 60–64 on the timing shaft 59. Its cycle is, therefore, synchronized with the motion of the belt 36. The timing control regulates the timing of the plunger solenoids L700–L710, resets the memory thyratrons TH202–208 so that they can be re-fired in the next cycle, and actuates the pulser 67 for the core memory 68. Each of these functions is, therefore, also synchronized with the motion of the belt 36.

The pulser 67 supplies shift pulses to the core memory 68 and these pulses cause each bit of the input information in the core memory to progress one pair of cores on its way to the memory thyratrons. One set of pulses is generated for each progression of the belt as determined by the timing control.

The core memory 68 receives from the programmer the information designating the hopper into which a particular card should be deposited. This information is received while the card is still at the reading station 32 so that it must be stored the proper amount of time before the designated solenoid plunger 35–0–9 is actuated. This storage is different for each of the ten inputs since each receiving hopper is a different distance from the reading station. Each input, therefore, has its own shift register of correct length and is shifted one position along this shaft register each time a pulse is received from the pulser.

The progression of information through the core memory 68 is, therefore, also synchronized with the motion of the belt 36 and each input will be transmitted to its memory thyratron and plunger solenoid at the same time that the card reaches the position underneath the correct hopper. The memory thyratrons TH202–208 serve to actuate the plunger solenoids L700–L710 and the electromechanical counters 29 from the outputs of the core memory 68. They are released during each cycle by the timing control. Four of these thyratrons serve to actuate solenoids or counter for which no delay is needed and these four signals, therefore, do not pass through the core memory.

The electromechanical card counters 29 normally indicate the number of cards which have been deposited in each hopper. They also function in Test operation when they indicate the number of hopper signals received from the programmer. Thus, comparison of the counters and the known data given the machine provides an operational check on the programmer. Since they are actuated by the memory thyratrons TH202–208 but cannot be actuated by the return control, they only function when the belt 36 is moving in the normal (left) direction. The 11th counter counts the number of cards which have passed the reading station. Under normal operation, the count in this counter should agree with the sum of the counts in the remaining counters unless the 9th hopper is being used as a transitory hopper for multiple card documents. The counters must be manually reset to zero prior to each time they are used.

Most of the console controls are grouped on the main operator control panel 30. The functional description of each of the controls follows, the actual use of the controls being outlined step by step in the sections pertaining to each mode of operations which follows.

Through the function control, the operator selects by means of switch S1111 one of the six possible modes of operation to be performed by the selector. The elements controlled are primarily those in the programmer although various other control units are also affected, particularly those which have features peculiar to certain operations such as the sort and duplication preparation controls.

The sort control supplies directions to the programmer which are unique to the Sort operation. The sort column switch S1102 determines on which column of data sorting will be performed. The choices are columns 1, 2 or 3–10. If one of the columns 3–10 is chosen, the particular word within this range is determined by the paper tape used. A second switch, the sort character position switch S1103, determines which of the six characters in the column will be sorted on. The pass switch S1104 determines whether the sort will be according to the last four (numeric or field bits of the character) or according to the first two (zone) bits. The outputs of all three of these switches are used in the programmer. In any sort pass, the alphabetic data light I1101 will be energized whenever some of the cards contain sort characters which are not pure numerics.

The direction controls are used when cards are being returned from the receiving hoppers back to the feed hopper. This is done primarily in sort operation where several passes are usually made with the same group of cards. There are two manual switches in the return controls. The belt direction switch S1109 controls the direction of rotation of the drive motor, controls the location of the high vacuum through the high vacuum control and determines which hoppers are scanned by the hopper-full detector. The return switch S1110 determines the hopper from which cards will be returned. When the return switch is turned to one of positions 0 through 9, the plunger solenoid of the hopper designated is operated directly. When in the ascend or descend position, the return switch actuates a stepping switch SS501 which in turn actuates the plunger solenoids in sequential order. When a hopper is emptied (as indicated by the stop signal) the stepping switch advances so that the one hopper is empty. When the last hopper has been emptied, the stop signal is sent on to the start-stop controls through which the machine is stopped. If one of the hopper switches of the hopper-full detector has been pulled, indicating that cards have been manually removed from that hopper, the stepping switch SS501 will not progress beyond that hopper until the cards have been replaced and the hopper switch depressed.

When cards are being returned in Sort operation, the sort check data is handled by the return switch S1110 and stepping switch SS501 in such a way that only those cards which have been properly sorted are deposited in the feed hopper. Incorrectly sorted cards will be deposited in the right-hand reject hopper 46. The sort check data simply designates the hopper to which a card should have been sorted. If that agrees with the number of the hopper being emptied, then the feed plunger is actuated, depositing the card in the feed hopper. If it does not agree, the feed plunger is not actuated so that the card passes on and is automatically deposited in the reject hopper 46.

The duplicate preparation control consists of a duplicate preparation pass switch S1101 which is an 8-position switch. It performs several control functions for the programmer which depends upon which pass is being performed in duplicate preparation.

The film control consists of a single 2-position film switch S1108 by which the operator designates whether positive or negative cards are being handled. Mixed groups cannot be treated. This information is supplied to the code reader 41 so that the timing marks 21 can be sensed properly. It is also transmitted to the programmer which performs the proper inversion of the card data from the code reader so that the binary bits transmitted to the remainder of the programmer are in the intended sense.

The input control is associated with loading the paper tape data into the cross-bar storage of the programmer. There are two push buttons and a three-position switch on the control panel. The clear storage button S1106 simply removes any data which may be stored in the cross-bar storage. The start tape button S1107 causes the tape reader to begin feeding the paper tape and reading its data into the cross-bar storage. The actual starting and stopping of the tape reader is controlled by the programmer and the start tape button output is transmitted to this section of the programmer. The input switch S1105 prepares the cross-bar storage so that data can be read into it and this is done by controlling the storage stepping switches. When the input switch S1105 is turned to the reset position, these stepping switches are reset to their home positions. When in the load position, the input switch S1105 allows the paper tape to be read into the storage. The storage stepping switch is then advanced as the data is read and channels each character of data to the proper location in the cross-bar storage. When in the normal position, the input switch S1105 prevents the storage stepping switches from moving so that no further change in the stored data can take place except by the manual word insertion switches of the programmer. The input switch S1105 and start tape button S1107 are also used in identical fashion to control the paper tape in the test mode of operation.

The start-stop control is used in starting and stopping the motion of the belt 36 and the feeding of cards on the belt. Once the start button S1113 is depressed, the drive motor B803 starts and after an automatic time delay of approximately 15 seconds, feeding of cards begins. The belt stops automatically after all the cards have been handled. The stop button S1114 stops the machine as soon as the last card of the document has been treated. The emergency stop button S1115 de-energizes the drive motor and all the plunger solenoids immediately whether multiple card documents are intact or not. The reset button S1112 performs various functions in the programmer as well as on the console. It resets various console relays, extinguishes various indicators on the console control panel and removes any comparison data which may be in the programmer except in the cross-bar storage.

The indicators of the start-stop control perform various services for the operator. The mains I1102 and motors I1103 lamps indicate that power is connected to the console power supplies and motors. The hopper-full lamp I1104 indicates when one of the hoppers receiving cards has become full as detected by the hopper-full detector. The selection error I1105, alphabetic data I1101, and extraction advance tape I1106 lamps are operated by signals from the programmer. The selection error lamp I1105 indicates (in Selection or Test) that the cards within a multiple card document are not in sequential order. The extraction advance tape lamp I1106 indicates (in Extraction) that documents have been extracted for all the 10 document numbers which have been stored in the cross-bar storage. The tape can thus be advanced and 10 more documents extracted. The alphabetic data lamp I1101 is described hereinafter. The service lamp I1107 indicates (by being extinguished) that either the scanner lamp or the polarization voltage of the code reader has failed and needs repair before the machine can be operated.

The paper tape reader 69 is controlled by the programmer and simply reads the characters as they appear on the paper tape. The six binary bits of each character are converted to electrical signals and transmit it to the cross-bar storage of the programmer. To load the paper tape into the reader, it is merely placed in engagement with the sprocket teeth of the drive wheel and then by lowering the bracket is held by the bracket thereagainst. The tape will automatically advance on orders from the programmer after the start tape button S1107 has been depressed. The paper tape reader 69 is the same as the tape reader which is a part of the commercially available Flexowriter and a complete disclosure thereof is found in U.S. Patents 2,700,445; 2,700,446 and 2,700,477.

*Card Handling Console Electrical Description*

The electrical functions of the card handling console 25 can best be described in terms of the over-all functions of the selector; namely, the mechanical operations of transporting and depositing cards, the optical-electrical function of reading card data and the electrical function of performing logical operations, data comparisons, and making decisions. The console 25 is responsible for carrying out the first two of these functions and the programmer 26 is responsible for the third. The transporting and depositing of cards while performed by the console 25 is, in most operations, done at the direction of the programmer. That is, the programmer 26 originates signals which tell the console 25 when to extract cards and where to deposit them. Therefore, the first electrical task of the console 25 is to amplify the signals so that they are strong enough to actually energize plungers and effect the extracting and depositing of the cards. The programmer signals which affect the depositing of each card in one of the magazines are sent by the programmer at the time the card passes the reading station 32. The second electrical function of the console 25 is to delay these select signals until the card has reached the magazine for which it has been designated. As described hereinbefore, other functions provided for in the console 25 are the electrical counters, the return control, detection of a full magazine, automatically stopping the machine, the control panel containing switches, and operating and controlling the belt drive motor, vacuum motors and supplying power for various other services.

The reading of cards is accomplished by 43 cells, designated by 44 in FIG. 8, and associated optics and electronics. One cell scans the timing marks and the remainder scan the 42 rows of code. The cards are scanned in their longitudinal direction beginning from the end with the aperture 24. Thus, the timing mark 21 and 42 bits of one word are read simultaneously, amplified and then transmitted to the programmer. Reading is synchronized to the mechanical cycle of the belt 36 and the code reader 41 reads every card which passes the reading station during a run. A detailed description and disclosure of the code reader optical system as well as the circuitry therefor is disclosed in the above-mentioned U.S. Patent No. 3,099,199.

Figure 12:
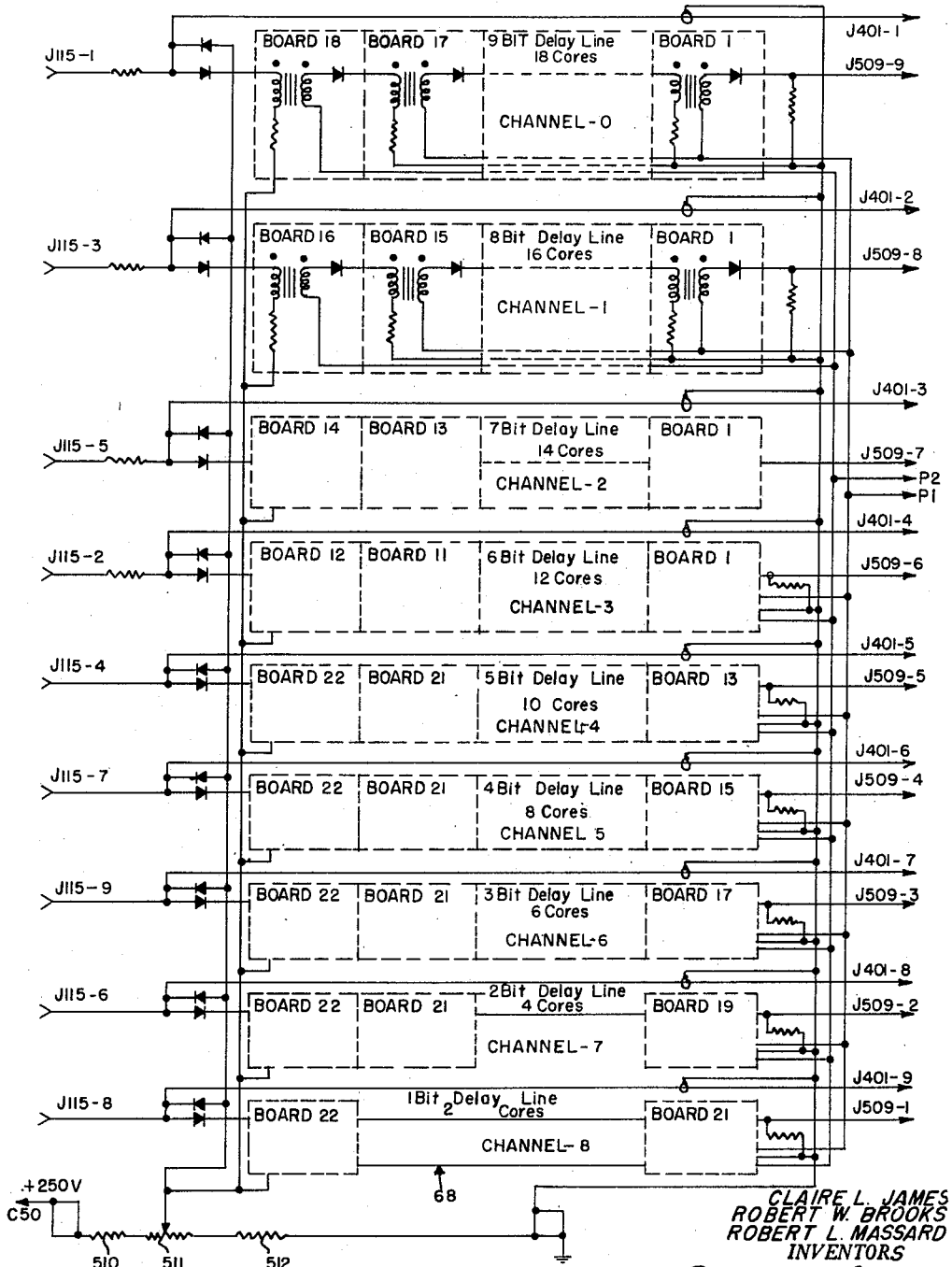

The logical operation of comparing card data with stored data and making selections on the basis of these comparisons is performed by the programmer. A detailed description of the programmer circuits is provided hereinafter. A feed signal F, signifying the desire to extract a card from the feed hopper 45, is transmitted to the sort verification circuit, see FIG. 11, where it is passed unchanged to amplifier AR210B as Fsv. From there it is transmitted to a thyratron TH208B in FIG. 13 which, in turn, actuates the feed plunger 35 controlled by the plunger solenoid L710. After a card is placed on the belt, it is transported to the read station 32 where it is read by the code reader 41. At this time a select signal is generated by the programmer. Select signals are labeled S–0 to S–8 and R. S–0 indicates that the card is to be deposited in hopper 47–0, S–1 in hopper 47–1, and so on, S–8 in hopper 47–8, R in hopper 47–9. These select signals are transmitted to the amplifiers AR105, 108, 111 and 210 in FIG. 11 where they are amplified and sent to the multivibrators MV106, 107, 109, 110 and 112. At the multivibrators their pulse width is increased to be sufficient for the core memory 68 in FIG. 12. The core memory 68 provides the delay necessary for the card to reach the proper magazine, no delay being necessary for hopper 47–9. Therefore, the signal R for hopper 47–9 bypasses the multivibrators and core memory. Given the proper amount of delay, these signals are sent to the thyratrons TH202–206 and 208 in FIG. 13 which provide the necessary power to actuate the plunger solenoids L700-710. The outputs of the thyratrons drive both the plunger solenoids and the electromechanical counter 29 so that upon each actuation of the solenoid, the associated electromechanical counter advances one count. When a multiple card document is selected for one of the magazines 0-8, the first cards which have been temporarily stored in hopper 47–9 must be retrieved and moved to the proper magazine. This is done by generating in the programmer an Rs signal in conjunction with a select signal corresponding to the hopper for which the document is designated. A pair of such signals is generated from each card to be retrieved. The Rs signal is amplified by AR210A and sent to the thyratron TH208A as Rs and to TH202A as R+Rs. The R+Rs signal serves to actuate plunger No. 9 and the Rs signal serves to port the vacuum from the feed plunger 35-10 to hopper No. 9 plunger 35-9. Thus, the card is retracted from hopper 47–9, is placed on the belt 36 and begins its travel down the row of hoppers. At the same time, the select signal for the proper magazine passes through the multivibrators to the core memory and the proper thyratron is fired so that this card is deposited in the desired magazine.

The amplifiers AR105, 108, 111 and 210 serve to amplify the programmer signals so that they are suitable for the multivibrators or thyratrons. There are 12 amplifiers, their inputs being the feed signal Fsv and the select signals S–0 through S–8, R and Rs. Their outputs are fed through either the multivibrators or the thyratrons and are logically the same as the inputs with the exception of R which becomes R+Rs. Each of the 12 inputs is fed through a noise limiter before being amplified. The inputs to the amplifiers are returned through 10K resistors to a 3-volt bias. This bias is essential in obtaining the six volts of noise rejection and the programmer pulse drives the grid negative from −3 volts and therefore the plate undergoes a positive excursion. There are four amplifiers on each plug-in unit and the R and Rs signals are coupled together in an OR gate comprising diodes CR205 and 206, see FIG. 11, and make up the input to amplifier AR210C thereby forming the signal R+Rs.

The belt direction circuit controls the many operations of the console 25 which depend on the direction of rotation of the belt. The belt direction switch S1109 on the main control panel 30 operates the belt direction relays K401–1 and K401–2 in normal belt direction, see FIG. 14. The contacts of these relays are also used to operate the feed plunger in the plunger solenoids circuit (FIG. 13), to enable the return signals in the return circuit (FIG. 13), to supply power to the electromechanical counters and vacuum port solenoids L711 in the D.C. power distribution B circuit (FIG. 19), to enable the stepping switch in the stepping switch circuit (FIG. 14), to provide the return stop signal to the programmer run and stop circuit (FIG. 16), in the start circuit (FIG. 14), to determine which magazines are scanned for being full in the hopper-full circuit (FIG. 14), in producing TCN in the thyratron cathode control circuit (FIG. 19), in producing Fsv in the sort verification circuit (FIG. 11), and in the high vacuum solenoid (FIG. 27A).

The selector console is largely a synchronous device and its proper operation depends upon the time that certain events occur. Many of these events are controlled by timing shaft 59 which is geared to the Geneva mechanism 37. The timing shaft actuates cam switches A, B, D and E, C not being used, a sync pulse generator composed of three photoelectric cells and their accompanying circuitry, and also drives the oscillating mirror 44 of the code reader 41. The motion of the timing shaft is continuous; the motion of the belt intermittent, the belt being stationary from 0° to 216° and being moved from 216°–360°. During this stationary period the card at the reading station 32 must be scanned and three pulses from the sync generator in the code reader occur at 60° (start read), 165° (end read) and 345° (positive polarization pulse). Detailed descriptions of these pulses and their function can be found in the copending application referred to hereinabove.

The four cam switches operate relays K306, 308–311, 313 and 314 which affect other parts of the selector. Cam switches D and E have one side connected to ground and cam switches A and B are connected to grounds through a normally open contact on the K403 start relay, see FIG. 15.

Cam switch A is closed from 110° to 320° and this causes K306 to be operated from 146° to 356°. The normally open contact from this relay provides +90 volts to the electromechanical counter common buss through this period, provided that the belt direction switch S1109 is on normal. Firing of an individual select signal thyratron grounds the other side of the electromechanical counter causing it to advance one count.

Cam switch B is connected to cam switch A through a diode to take advantage of the full time that both cam switches A and B are closed. Cam switch B is closed from approximately 260° through 0 to 60°. Thus relays K313 and 314 are operated from 146° through 0 to 96°. K313A contact provides +90 volts to all plunger solenoids L700–L710 during this closed period. K314 returns to ground the cathodes of all of the thyratrons in the select channels provided that the belt direction is normal and the function switch S1111 is on test. During the period of the cycle that K314 is not operated, these thyratron cathodes are lifted off ground to reset them to their non-firing condition. Cam switch C is not used.

Cam switch D is closed from 134° to 260° energizing relays K310 and K311 which are operated from 170° to 296°. During this energized period, the contacts of these relays in the core memory pulser 67 are closed.

Cam switch E is closed from 314° through 0 to 72° energizing relays K308 and K309 from 350° through 0 to 108°. During this energized interval, the contacts of these relays in the pulser circuit 67 are closed. Cam switches D and E thus effect the P1 and P2 pulse outputs of the core memory pulser 67. Reference is again made to the above-mentioned co-pending application for the way in which these pulses are derived.

It should be added that the plungers activated by the plunger solenoids are at the top of their stroke at 108° and at the bottom at 288°. The requirement for a plunger to operate is that its solenoid must be latched at the bottom of the cycle and remain latched through the rising stroke. The solenoid must be completely released by the time the bottom of the plunger stroke is reached (288°) if the plunger is not to be actuated on the following cycle.

While a complete description of the code reader electronics can be obtained from the above-mentioned co-pending application, a short description of the function of these elements will provide an understanding as to how they are used in the present apparatus. The scanner consists of a light source I706, a source projection optics system 42, the card reading station 32, the card imaging optics comprising mirrors 70 and 71 and lens 72, an oscillating mirror 43, the detector array 44, and the pulse generator 73. FIG. 8 is a simplified schematic of the code reader 41 which includes a window 74 arranged between the reading station 32 and the card imaging optics. The window 74 is present to enable the creation of a vacuum at the reading station for the card located in said station. The light source I706 uniformly illuminates the reading station 32 in which the card is positioned for reading. The card code images are projected on the oscillating mirror 43 which, when driven by a gear train 79 connecting its shaft 75 to shaft 59, causes the card image to move across the face of the mirror 71 which, in turn, results in the movement of the card image across the detector array 44. The card is positioned in a gate in reading station 32 in a manner such that the detector scans the card in the long dimension—that is, the direction of scan is at right angles to the code columns. The pulse generator 73, see FIG. 9, consists of disk 65 with an aperture, the disk being mounted on shaft 59, three exciter lamps I711–713 and three phototransistors V701–V703. Each pair of exciter lamp and phototransistor constitutes a normally closed light circuit. With the disk 65 interposed between the pair, the light circuit is normally open until the aperture is brought into position between the pair. At this time, the light circuit is closed and the phototransistor response has a change in resistance. The time duration of the closed light circuit is relatively short compared to the open light circuit. As a result, the phototransistor output is therefore a pulse. For every rotation of the disk, each phototransistor delivers a discreet pulse to the code reader. If the scanner is viewed from the pulse generator side, the direction of rotation is counterclockwise. The time sequence of scanner pulse generator signals is as follows: Y1, positive polarization; Y2, start read; and Y3, negative polarization and end read.

Figure 54:
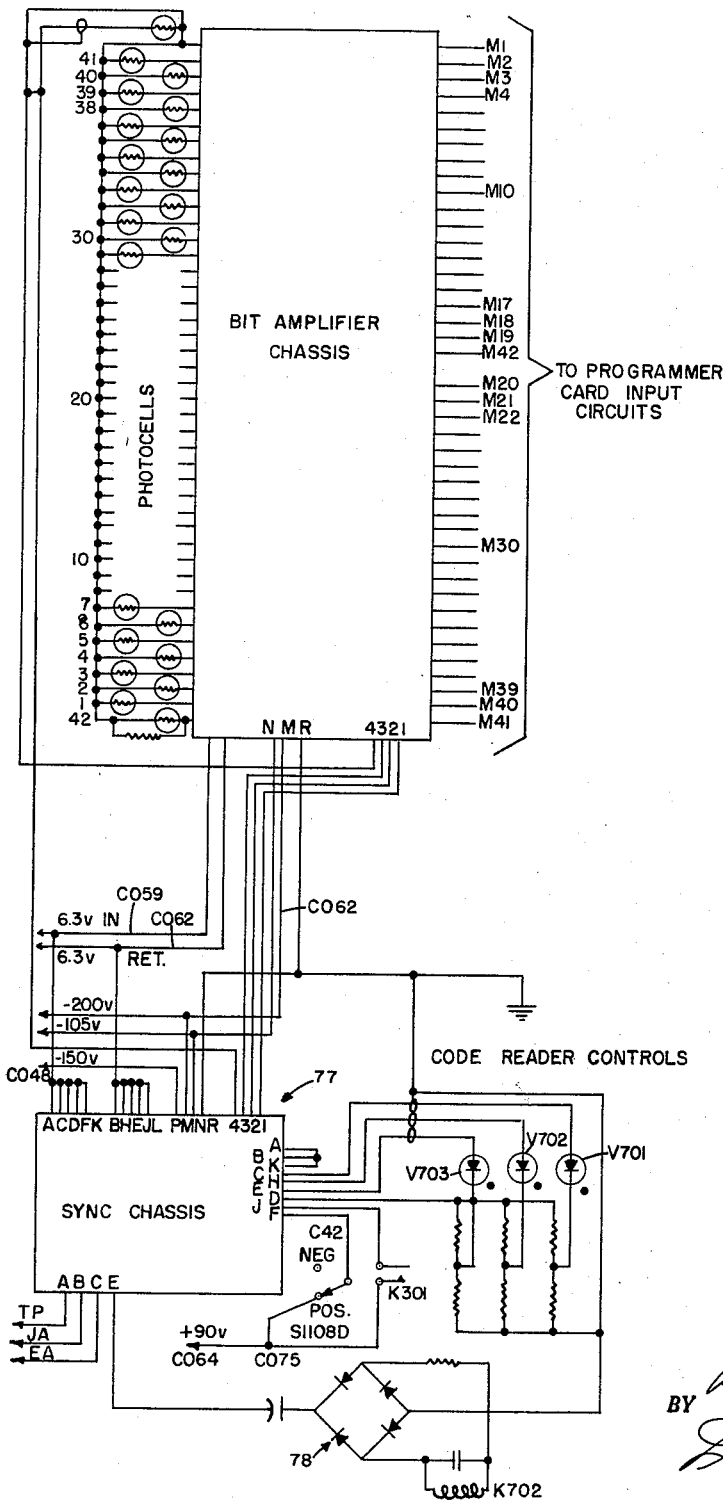
FIG. 54 is an electrical schematic view of the amplifier, synchronization and control circuits for the electrical signals derived from the digital information in each element.

The synchronizer section 77 (FIG. 54) of the code reader receives the three pulses from the pulse generator and shapes these into a polarizing wave and feeds them to a read gate. The polarizing wave is derived from the positive polarization and end-read pulses. The read gate is derived from the start-read and end-read pulses. The polarizing wave is applied to the cell array 44 while the read gate goes to the timing mark channel. In addition to these signals, start and end-read pulse outputs are provided. The timing mark channel receives its signal from the timing mark cell. This signal is amplified, shaped, gated, and can be delayed. The delay being necessary in order to position it in the proper coincidence with the bit signals. The bit amplifiers shape the signals received from the bit cells and there are other circuits which can be classified as accessories to perform the above functions.

The code reader control (FIG. 54) consists of a simple bridge rectifier 78 whose input is connected from the output of the polarization-voltage cathode follower, as described in the above co-pending application, through a capacitor. Relay K702 is connected across the output of the rectifier and is paralleled by a capacitor and in series with a resistor. When K702 is energized, its contact K702 energizes K301 (FIG. 14) which, in turn, applies +90 v. to the polarization relay in the sync chassis. If the polarization voltages does not exist, K702 fails to operate and the "b" contact has the effect of stopping the belt 36 before any cards are fed. This "b" contact of K702 in the service circuit is sampled at the end of the 15-second time delay by the run relay K410. Thus, the polarization voltage must be present at the end of this delay in order to avoid stopping the machine. This is in addition to the fact that the polarization voltage cannot be connected to the cells 44 unless K702 and K301 have operated. The phototransistors V701, V702 and V703 which produce the signals initiating the polarization, start-read and end-read pulses are also included in this circuit.

The hopper-full indicator I1104 is located on the main control panel 30 and indicates, when lit, that the hopper-full detector has been energized. The indicator itself is operated by the "a" contact of the hopper-full relay K405. The service indicator I1107, also on the main control panel 30 is operated by a "b" contact of the service relay K409. It is normally lit and goes out when the service circuit is actuated—that is, when the scanner 1706 is burned out or polarization voltage is lost.

The core memory unit 68 is used while passing cards in the normal direction, and is not used in the Test function. It consists of one shift register for each of the nine select channels 0 through 8. An input to a select channel indicates that the card presently at the reading station 32 should be deposited in the hopper controlled by that channel. This signal is delayed one machine cycle for each hopper that was passed before reaching its destination. The following table shows the amount of delay necessary to transfer a card from the reading station 32 to each hopper. Two cores are required to make one unit of delay.

| Channel | Cycles of delay | No. of cores |
|---|---|---|
| 9 | 0 | 0 |
| 8 | 1 | 2 |
| 7 | 2 | 4 |
| 6 | 3 | 6 |
| 5 | 4 | 8 |
| 4 | 5 | 10 |
| 3 | 6 | 12 |
| 2 | 7 | 14 |
| 1 | 8 | 16 |
| 0 | 9 | 18 |

Three pulses are used to obtain the necessary delayed outputs from the core memory 68. Two of them, P1 and P2, are the outputs of the core memory pulser 67 and serve to shift an input pulse from one pair of cores to the next. The third, the input pulse, is the result of a select signal S–0 through S–8 which has been given the proper amplitude and pulse width by any one of amplifiers AR105, 108, 111 and 210 and multivibrators MV106, 107, 109, 110 and 112.

The positive P1 pulse ocurs at 170° of each machine cycle and the positive P2 pulse occurs at 350° of each cycle. Input pulses normally occur when the positive pulse P2 is occurring. The flux direction of the cores is taken to be positive after a conventional current pulse has passed from terminal 5 to terminal 1 in the input winding of a core. This is shown in channel 1 wherein sixteen cores are utilized to interject eight units of delay. The input to the first core is slightly different from the rest in that it is biased at approximately +110 volts D.C. Diodes are utilized to insure that a negative current can never be passed through the core input (terminals 5–1). The first core of each register also has a higher impedance input winding than the remaining cores. The bias voltage is produced by the resistor divider comprising resistors 510, 511 and 512 and may be adjusted with the potentiometer 511.

Figure 27B:
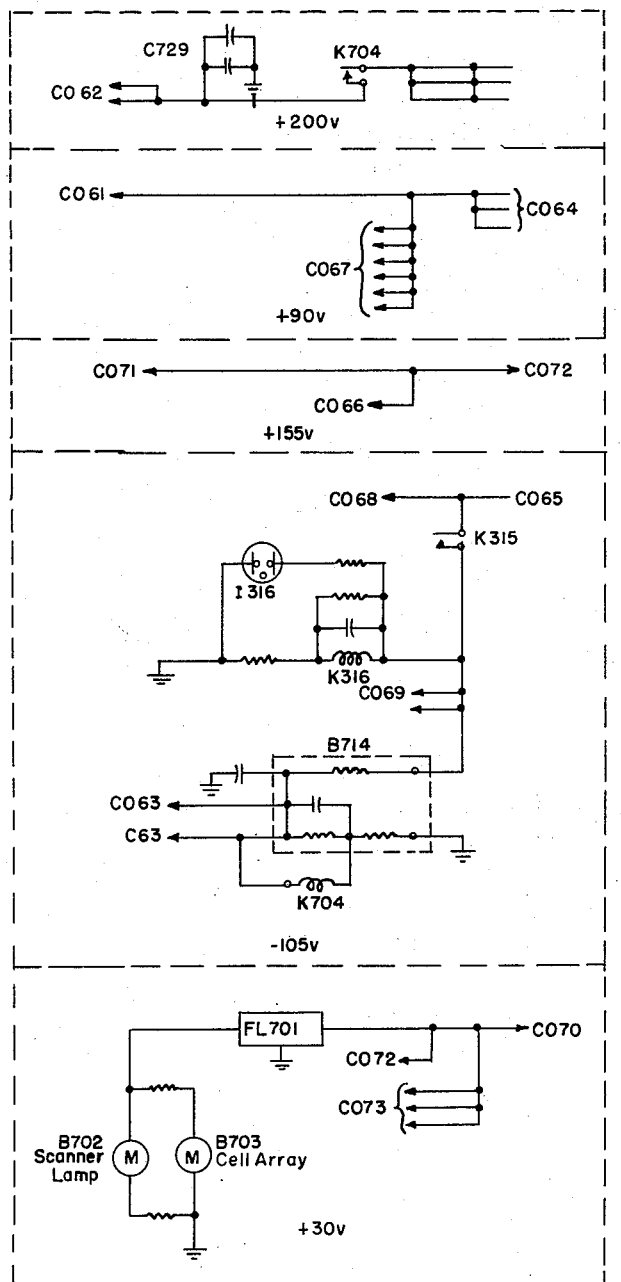

The D.C. power distribution A circuit, see FIGS. 27A and 27B, is shown and will be described in terms of the different voltage levels. The +250 v. supply passes from its source through contacts of relay K316, after which it is delivered to its various loads and operates relay K317 whose contacts are in the start circuit (FIG. 14) and are used to interlock the starting of belt 36. The −150 v. supply is connected directly to its loads and operates the relay K315 which is used to connect the −105 v. in the D.C. power distribution circuits A and E. The +200 v. originates from a regulated supply in the programmer and is connected through the contacts of relay K704 to its load in the code reader. The +90 v. is derived from the programmer and connected directly, the +155 v. also being derived from the programmer. The +30 v. is also produced at the programmer, FIG. 17, showing the derivation of the +3 v. (R1105 and R1106) and the connections for the scanner lamp fan B702 and the cell array blower B703. The −105 v. is received from the programmer and by the contacts of K315 operates relays K316 and K704.

The D.C. power distribution B circuit shows the routing of D.C. power to various parts and circuits and is shown schematically in FIGS. 19 and 20. The B1 portion indactes the routing of D.C. power and filament power to the plug-in units. R219 and R229 make up the bias supply for the thyratrons. The B2 section indicates the connection of 90-volt power to the circuits of this schematic. In many cases the 90-volt power is interrupted by one or more relay contacts before being delivered to the other circuits. Conditions for connecting the 90-volt power to the circuit may be listed as follows:

(1) Thyratrons TH202–206 and 208—90 v.=(K410)= (Run)
(2) Counters 29—90 v.=(K410) (K401–1) (K306)+ (K406)=(Run) (Belt Dir. Normal) (Timing A)+ (test Fn)
(3) Plunger Solenoids L700–710—90 v.=(K410) (K313)=(Run) (Timing—AB)
(4) Return—90 v.=(K410)=(Run)
(5) Total (K321)—No interruption
(6) Total TH207—90 v.=(K410)=(Run)
(7) Vacuum Port Circuit (Relays)—No interruption
(8) Vacuum Port Circuit (Solenoid L711)—90 v.= (K410) (K401–1)=(Run) (Belt Dir. Normal)

Figure 14:
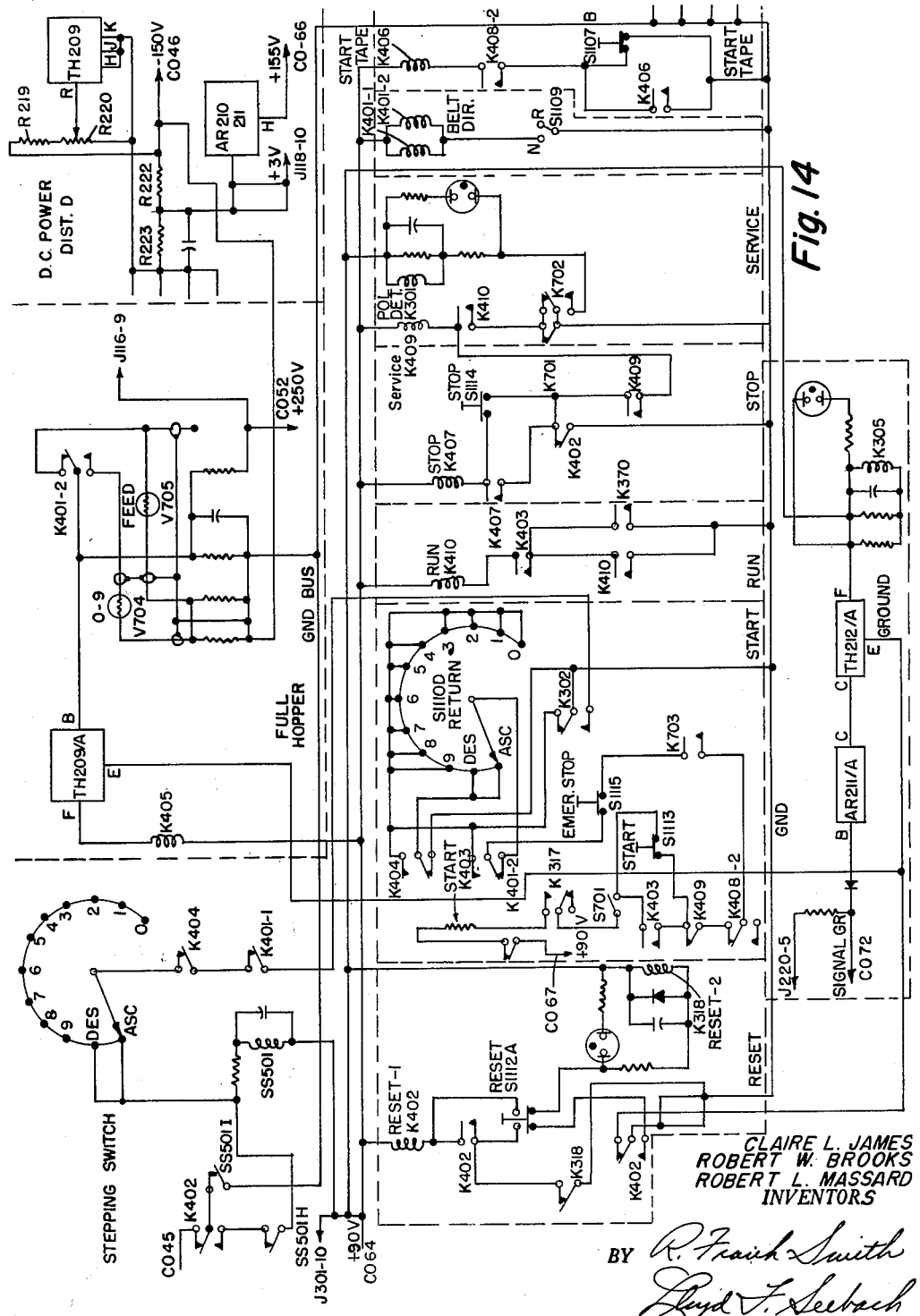
FIG. 14 is an electrical schematic view of various relay circuits.
Figure 23:
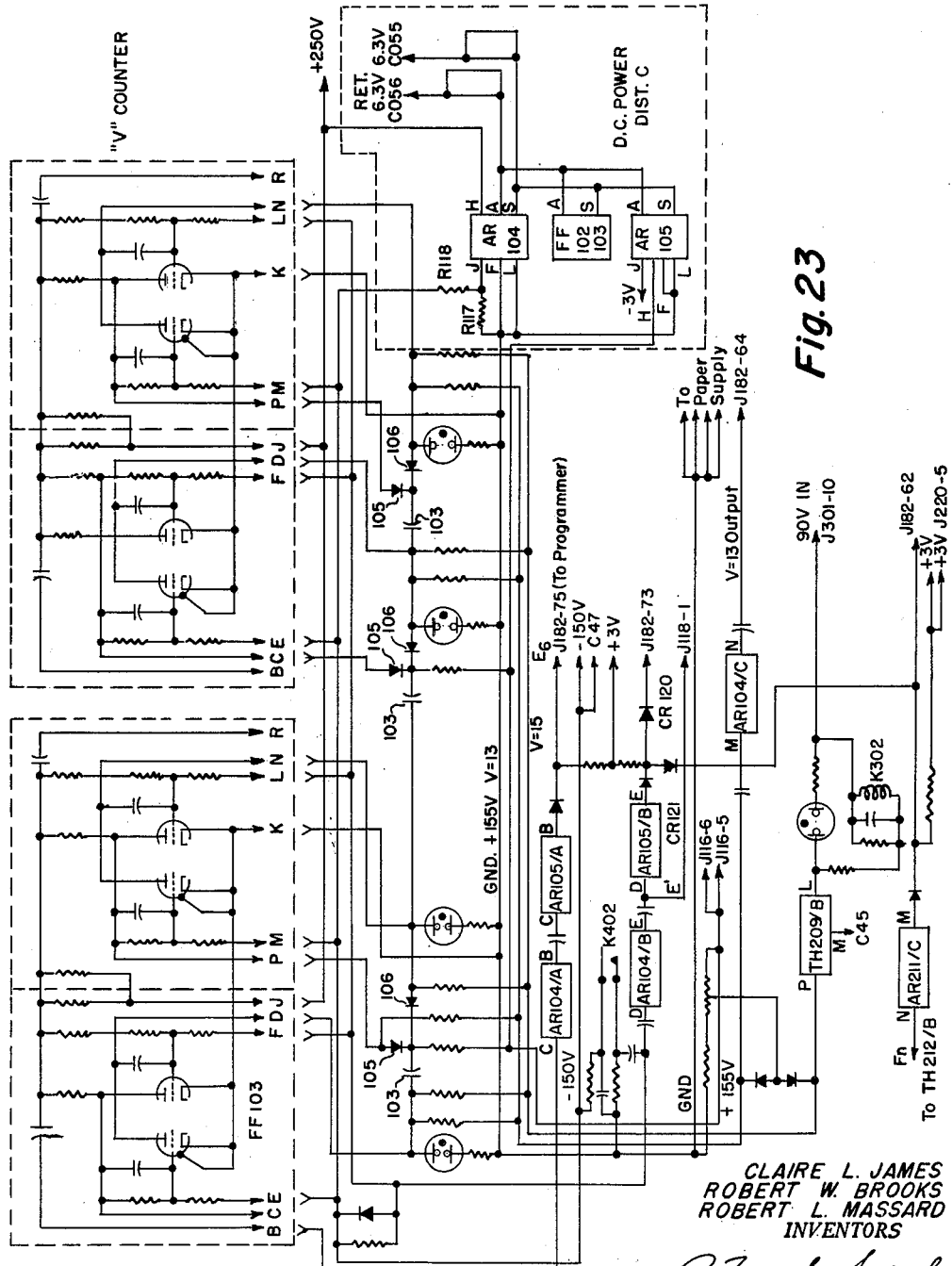
FIG. 23 is an electrical schematic view of the V counter circuit.

The D.C. power distribution C and D circuits transmit the D.C. power for the plug-in units shown in FIGS. 14 and 23. In addition to AR105, FF102 and 103, circuit C indicates the connection for AR104 which is a special amplifier. It is special in that its plate supply is +250 v. instead of +155 v. and its grid bias is −30 v. instead of −3 v. as for all other amplifiers. The resistor divider producing this −30 v. bias is shown in this circuit by R117 and R118. Circuit D includes the resistor divider R219 and 220 which produces the −12 v. bias for the thyratrons as well as the divider R222 and R223 which produces the −3 v. bias for all amplifiers.

Figure 13:
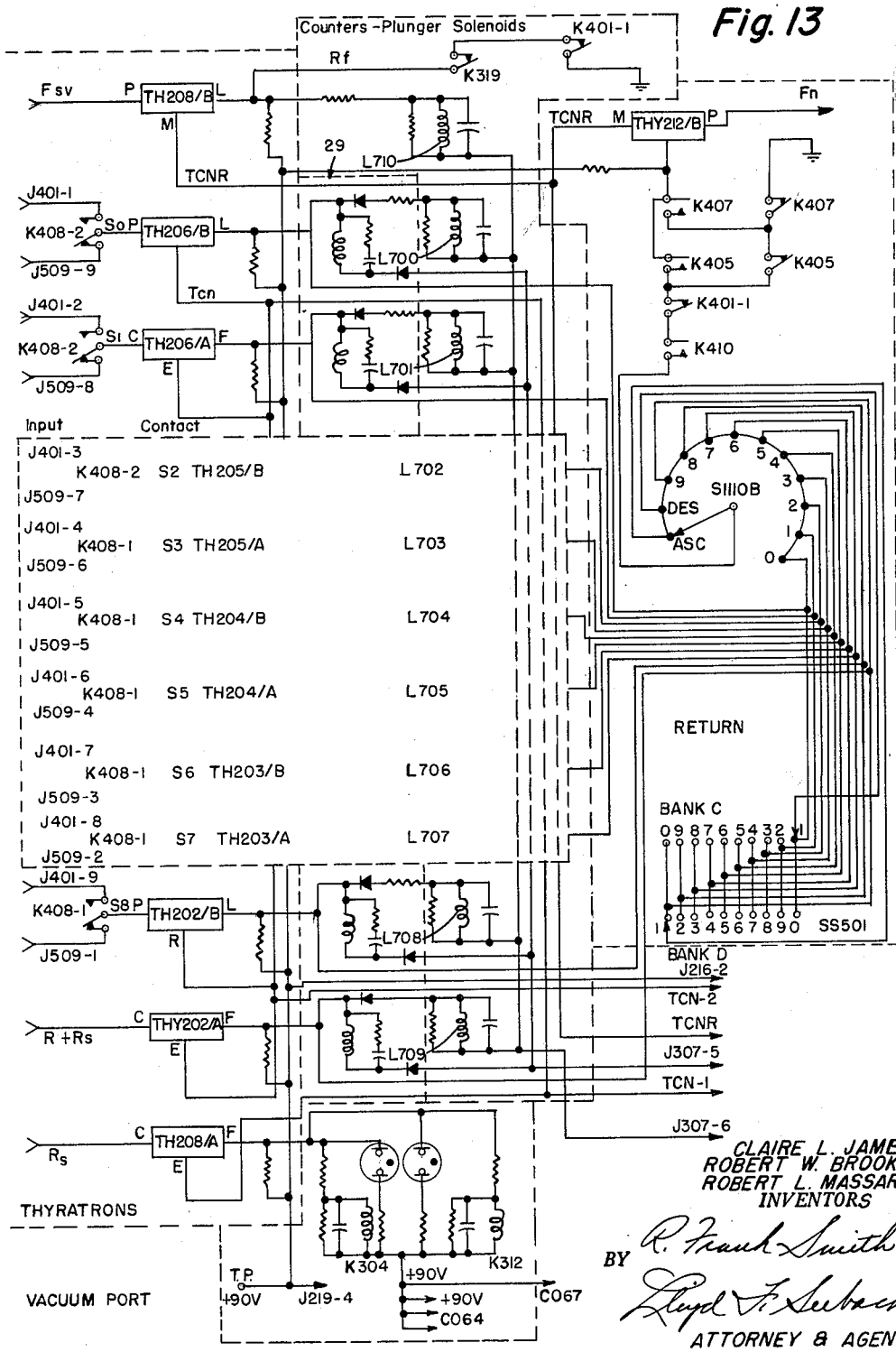

The electromechanical counter circuit 29 includes 10 counters, one for each of the ten receiving hoppers and one included in the total circuit, see FIGS. 13 and 19. Each of the ten counters counts the number of times the corresponding plunger solenoid is energized in normal belt direction. This is done merely by energizing the counters by the same source that energizes the solenoids, namely, the thyratron signals S–0 through S–8 and R+Rs. The count in each of the counters should therefore be equal to the number of cards deposited in that hopper in any particular run. This is true for all except the counter for hopper 47–9 in Selection and Duplication Preparation functions. It is not true in this case because of the possibility of retrieving cards from this hopper as well as putting them in (the plunger and counter are actuated in both instances). If the programmer should direct a card to more than one hopper, which is possible due to the plugboard connections, then the card will be inserted in the hopper nearest the reading station but will be counted as being inserted in each hopper so selected. Hence, some hoppers may have fewer cards than were counted. The circuit of each electromechanical counter includes a series of diodes for isolation from the plunger solenoid power source. Also included is a resistor and capacitor in parallel with each counter for the purpose of preventing large inductive overshoots upon deenergization of the counter. The 90-volt supply to the counters is provided by D.C. power distribution circuit B and it is interrupted in each cycle by timing relay K306 and is energized from 146° to 356° of each cycle. The counters are prevented from operating in return belt direction by a contact of the belt direction relay K401–1. Also in this latter circuit is the contact of the start tape relay K406 which provides power to the counters in test function.

The Gr circuit, see FIG. 14, provides amplification and control panel indication of Gr signals received from the programmer. Upon receipt of a Gr signal from the programmer, the output of AR211A fires the Error thyratron Th212A. The cathode of this thyratron is tied to ground through a normally open contact on K402 reset relay, see Reset circuit, FIG. 14. The thyratron, when fired, energizes K305 (Gr relay). This relay lights either I1101 alphabetic data lamp, or I1105 selection error lamp, or tape lamp I1106 depending on the function switch setting, see FIG. 21. The Gr signal from the programmer is sent through a noise limiting gate and amplified in an identical way to that described under amplifiers for the select signals.

The hopper-full circuit, see FIG. 14, operates the relay K405 when one of the hoppers into which cards are being fed becomes full. It consists of a lamp I707 located on the top of the magazines over the reading station 32 and two photocells V704 and V705, one at each end of the magazines 27 and 28. K405, in turn, produces a sequence of events which take place once a hopper becomes full. The photocells are wired in the circuits so that in the normal belt direction V704, the photocell which is located at the left is used and in the reverse direction V705 which is located at the right is used. The lamp is mounted within a housing having a window on either side so that a beam of light is thrown onto each cell. The hopper-full thyratron TH209A is held in a non-fired state by the voltage level set up by the resistance of the cell in use and its effect in the voltage dividing network between −150 v. and +250 v. The cathode of this thyratron is grounded through a normally closed contact on K402. Once fired, this thyratron remains conducting until the reset push button S1112A is depressed.

Figure 10:
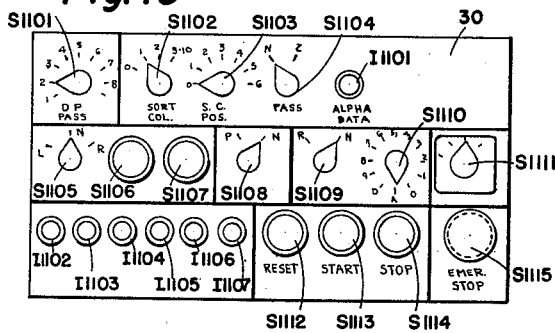
FIG. 10 is a detail plan view of the main control panel on the card-handling console.

While the beam of light shines on the proper photocell, the input of the thyratron rests at (approximately) −25 v. When the beam is interrupted by a weight 53, this level changes rapidly above ground to approximately +90 v. to fire the thyratron TH209A. The output of this thyratron energizes K405 relay and this relay lights the H.F. indicator lamp I1104 on the main control panel 30, see FIG. 10. At the same time, relay K405 interrupts the ground on S1110B rotor allowing no further cards to be fed to the feed hopper in return belt direction except by receipt of an F*n* signal from the programmer. K303 is energized by K405 in the hopper reinsertion memory, see FIG. 17, and in addition, the hopper-full relay K405 is involved in producing the stop signal for the programmer see FIG. 16.

The hopper reinsertion memory circuit, see FIG. 17, is used when returning cards automatically from all ten receiving hoppers. Its purpose is to prevent passing beyond a hopper which has been emptied on the previous forward pass. Its function depends on the manual operation of the indicator switches IS700–710 associated with the hopper concerned. Each indicator switch has a light bulb internal to the switch button which lights when the switch is operated. Indicator switch IS700 is associated with hopper No. 0, IS701 with hopper No. 1 and so on, IS709 with hopper No. 9 and IS710 with the feed hopper. IS–710 serves as a reminder only and does not perform an electrical function. When the indicator switch for one of the hoppers is operated, 30 v. is connected to the position of the stepping switch SS501 (banks E and F) corresponding to the same hopper (in descending and ascending returns, respectively). When the stepping switch SS501 reaches the position corresponding to this hopper, this 30 v. is connected to the arm of the bank C of the return switch S1110C. From there it energizes the coil of relay K303, a contact of K303 also being included in this circuit of relay K404. Relay K404, in turn, serves to stop the machine, see FIGS. 14 and 17, and prevent the stepping switch SS501 from advancing beyond this position. If no indicator switch has been operated, these relays will still be operated but not until the final position of the stepping switch SS501 is reached (position 10). Thus, relay K404 is responsible for stopping the machine whenever cards are returned using the stepping switch. If the feed hopper 45 should be full, relay K405 initiates the same action (energizing K303) in addition to interrupting return signals. A "C" contact of K404 in the start circuit actually stops the machine on the condition $V=15$. Thus, the machine will not stop until the hopper in question has been emptied or return signals interrupt it sufficiently to allow a count of V15. A "B" contact of K404 in the stepping switch circuit inhibits the stepping switch from advancing further. An additional feature is provided in this circuit in that a resistance divider comprising R1105 and 1106 which produces the +3 v. supply used in the noise-limiting circuit of all amplifiers receiving programmer signals is used for all the amplifiers and also by some of the switches on the main control panel.

The purpose of the multivibrators MV106, 107, 109, 110 and 112 is to lengthen the pulse width of the amplifier pulse and make it sufficient for the core memory. There are nine multivibrators, their inputs being the signals S–0 through S–8 from the amplifiers AR105, 108, 111 and 210. The outputs are sent normally to the core memory 68; however, in Test function the core memory is by-passed and the outputs go directly to the thyratrons TH202–206 and 208. The multivibrator circuit is simply a normal, plate-coupled, single-shot multivibrator, as shown in FIG. 28.

The purpose of the plunger solenoids L700–L710, see FIGS. 4 and 13, is to engage the latching device on the ten receiving plungers 35–0–9 and feed plunger 35–10 which can be operated electrically. Reference should be made to the above application, Serial No. 722,342, for a complete description and disclosure of the latching device. The plunger solenoids L700–710 are normally operated by the thyratrons TH202–206 and 208 which are operated by the F*sv* signal and the select signals S–0 through S–8 and R+Rs. In the return belt direction, the receiving plunger solenoids L700–709 are operated by the return signal via signals R–0 through R–9 and the feed plunger 35–10 is operated by F*sv* or R*f*. Each solenoid contains a series resistor, the purpose of which is to limit the power consumption. Also, in the circuit of each is a parallel resistor and capacitor which are included to limit the inductive overshoot when the power is disconnected from the solenoid. A diode is also included in series for isolation from the supply line of the electromechanical counters. The plunger drive stroke is at its lower extreme in motion at 288° of the machine cycle. In order to latch the driving arm, the solenoid must be completely operated by this time. Normally, the solenoids take approximately 10 milliseconds to operate. Therefore, they must be energized at a time of 288°−72° or approximately 216° in the machine cycle. The plungers are normally operated considerably in advance of this time—that is, at 170° when operated by a thyratron and at 146° when operated by the return circuit.

The 90-volt supply to the plunger solenoids is normally interrupted once each cycle by a contact of timing relay K313 in the D.C. power distribution circuit B. This contact connects power to the solenoids from a time in the cycle of 146° to 96° in the following cycle (at 96° the thyratron cathode circuits are also opened). Thus, due to the drop-out time, the solenoids will remain operated until after the top of the drive stroke at 108°. The feed plunger 35–10 is operated by the F*sv* signal in normal belt direction and in return belt direction in sort function only. In returning cards in all other functions, the R*f* signal energizes the feed plunger 35–10 continuously. This signal is produced by contacts of the belt direction relay K401–1 and the sort relay K319, both of which are in the plunger solenoid circuit.

The programmer run and stop circuit, see FIG. 16, produces three signals which are used by the programmer. When present these signals are at −105 volts; when absent they are floating. The three signals are a Run signal which indicates to the programmer that the console is ready to begin feeding cards; the Stop signal (the contacts of K405 and K407) which indicates the desire to stop feeding cards (F signals) at the end of the next document in normal belt direction and which is not used in return direction since F signals do not affect card feeding; and the Return Stop signal which employs "*a*" contacts of K405 and K407 and a "*b*" contact of K401–2 and which indicates the desire to stop at the end of the next document in return direction. The latter signal is not used in normal direction and it is used in the programmer to enable the circuitry which produces the F*n* signal.

The pulser circuit, see FIG. 18, supplies the two shift pulses P1 and P2 which are used in the core memory 68. Timing relays K308–311 are used to drive the pulser. The "*a*" contacts of K308 and K309 are closed from 350° to 108° in the machine cycle. The "*a*" contacts on K310 and K311 are closed from 170° to 296°. Thus, after each closure there is a fair interval of time during which all contacts are open. If that time is not present and the operation of the two sets of relays overlap, very large currents will be drawn from the +250 volt supply causing damage to the supply and/or to the relays. This circuit is disclosed in detail in U.S. Patent 2,838,692.

The reset circuit, see FIG. 14, effects momentary operation of the two reset relays K402 and 318 when the reset button S1112 is depressed. These relays clear various conditions in preparation for a new machine pass. Reset switch S1112 consists of one normally closed and three normally open contacts. Two of the normally open contacts affect the programmer only and will be described under that section. The normally closed contact of this switch is in series with the coil of K318 (reset–2) and K402. The K402 coil is in series with the other normally open contact of S1112, K402 hold contact and a "*b*" contact of K318. When S1112 button is depressed, K402 is energized. When the button is released, the K402 hold contact keeps K402 energized until the capacitor across K318 builds up sufficient charge to energize K318. The K318 "*b*" contact then opens up, de-energizing K402. Finally, the K402 "*a*" contact in series with the K318 coil opens up thus de-energizing K318. Besides performing various reset functions in the programmer, as mentioned above, the reset circuit also accomplishes the following through contacts on K402: resets the V counter to zero; homes the stepper switch SS501; de-energizes the stop relay K407; de-energizes the hopper-full relay K405; and de-energizes the Gr thyratron TH212/A.

The purpose of the return circuit, see FIG. 13, is to operate the plunger solenoids L700–710 in return belt direction. This is done by producing the signals R–0 for plunger solenoid L700, R–1 for plunger solenoid L701, and so on, R–9 for plunger solenoid L709. Each of these signals, when present, consist of a pass to ground and when not present they are in open circuit. The description of this circuit will be divided into two parts, namely, the relay contacts and thyratrons which determine whether or not any return signal is generated and the banks of the return switch S1110 and stepper switch SS501, which determines which return signal will be generated. The relay and thyratron portion of this circuit may be described algebraically with the following equation:

$$R1-9 = (K410)(\overline{K401-1})[(\overline{K405})(\overline{K407}) + (TH212/B)]$$

This equation may be rewritten in explanatory terms as follows:

$$R1-9 = (Run)(Belt\ dir. = Ret.)[(\overline{Hopper\ full})(\overline{Stop}) + Fn]$$

Thus, a return signal is generated whenever the belt is running in return direction and neither a full hopper nor a stop condition exists. If a full hopper or stop condition does exist, a return signal may still be generated upon receipt of a $Fn$ signal as amplified by AR211C of the V counter, see FIG. 23. An $Fn$ signal is generated in the programmer and will be received by TH212B whenever a count of 13 is registered by the V counter and whenever the programmer decides that at least two more cards must be fed in order to prevent separating the cards of a multiple card document. The $Fn$ signal will be generated at the same time in the machine cycle that the V13 gate is energized—that is, at the end-read time. The timing for this thyratron is, therefore, very similar to the thyratrons in the thyratron circuit which are controlled by the signal TCNR.

The remainder of the return circuit decides which plunger solenoid will receive a return signal. If only one hopper is being emptied, the return switch will be in position 0 through 9 and, consequently, the corresponding return signal will be selected by bank B of S1110. In ascending or descending return process, banks D and C respectively of the stepper switch SS501 are used in addition to the ascending and descending position of the return switch. In ascending return, the return signals are generated in the order R9, R8, . . . R0. In descending return, the order is R0, R1, . . . R9. The action of the hopper reinsertion memory in interrupting a sequential return is not reflected directly in the return circuit. Rather, this is done by preventing the advancement of the stepper switch SS501 beyond a particular position, and producing certain conditions in the start circuit.

The run circuit, see FIG. 14, provides for connection of power in various parts of the machine once the 15-second time delay has elapsed after starting the belt 36. Initial operation of the run relay K410 is brought about by the operation of both K403 (start relay) and K320 (time delay relay). Once operated, the hold contact of K410 keeps it operated until K403 is released; that is: K410 Coil = K403(K320 + K410 contact). A "b" contact of K410 in the time delay circuit of K320 disconnects power from K320 so that it can recycle for the next time the belt 36 is started. The run relay K410 also sends a "run signal" to the programmer; applies +90 volts to the plunger solenoids L700–L710 through a contact of relay K313; and allows the plungers and counters to be operated directly by the return S1110 stepper SS501 switches in reverse belt direction.

The scanner lamp I706 is the light source for the code reader 41 and power for the lamp is supplied through a regulating transformer T804 which in turn is controlled by a contact of relay K902, see FIG. 27. Power to the coil of K902 is supplied normally through a contact of K403 (start relay) in the time delay circuit. Thus the scanner lamp will normally be on only when the belt is running. A cheater switch S702 is located on the scanner lamp intensity control chassis to allow turning on the lamp for optical alignment of the scanner when the belt is stationary.

The service circuit, see FIG. 14, samples the scanner lamp voltage and the polarization voltage at the end of the 15-second time delay after starting the belt 36. If these conditions are not present at the end of this delay, the belt is stopped. The service relay K409 is energized when the following is accomplished: Either K410 is energized and K701 is not energized or K702 is not energized or K409 is energized and K402 is not energized. I1107, the serivce lamp, is wired to a normally closed contact of K409, and once operated, a normally open contact of K409 in the stop circuit keeps it energized until the reset button S1112 is depressed. Another normally closed contact is used in the start circuit. The purpose of the service circuit is to sense the presence of scanner lamp voltage K701 and polarization voltage K702 after the end of the 15-second time delay. The absence of either of these two voltages will energize the service relay K409 as soon as the run relay K410 operates and thereby causes the belt to stop by de-energizing the start relay K403. If the belt is stopped by the service relay K409, the service indicator is turned out. Also included in the service circuit is the coil of K301, the polarization detector relay. This relay is operated by the K702 contact and its contacts are used in the code reader controls in connecting the polarizing voltage to the cell array.

The sort and test relay circuit, see FIG. 22, provides for operation of the sort and test relays which are operated whenever the function switch S1111 is tuned to Sort or Test, respectively. Contacts of the sort relay K319 are used in the plunger solenoid circuits to operate the feed plunger 35 in return direction in all but Sort functions. Contacts of the test relay K408–1 and 408–2 are used in the thyratron circuit to by-pass the core memory in Test function; in the start tape circuit to enable the start tape test relay K406; in the start circuit to prevent operation of the belt in Test function; and in the thyratron cathode control circuit to provide a ground path for the thyratrons in Test function.

The sort verification circuit, see FIG. 11, affects the verification of the Sort pass when the cards are returned to the feed hopper 45. This is done by allowing all cards which have not been sorted properly to pass on to the right-hand terminal reject hopper 46. The sort verification circuit produces the signal $Fsv$ which feeds the amplifier AR210B and eventually drives the feed plunger 35–10. In normal belt direction the signal $Fsv$ is equal to the feed signal F which is derived from the programmer. This is determined by the normally closed contact of the belt direction relay K401–2 which is operated in normal belt direction. In return belt direction, signal $Fsv$ is equal to the signal which occurs on the wiper of the return switch S1110A and the signal at this point can be equal to any of the select signals S–0 through S–8 or R depending on the position of the return switch S1110 and the stepper switch SS501. The programmer operates in return direction the same as in normal direction—that is, after a card passes the read station 32, a select signal is produced. The sort verification circuit therefore merely produces a path for the select signal corresponding to the hopper from which a card is being returned to the feed hopper 45. If the select signal does not correspond to the hopper from which the card is being returned, no Fsv signal will be produced and the card will therefore pass on to the right-hand terminal reject hopper 46. In returning card from a single hopper, only bank A of S1110 is used. In returning in ascending or descending order, banks A and B of the stepper switch SS501 are used in conjunction with the ascending and descending positions of the return switch. This circuit only verifies a return pass in sort function since the normally closed contact of K319 grounds the feed plunger solenoid L710 in all return operations other than sort. This contact is in the plunger solenoids circuit (Rf).

The start circuit, see FIG. 14, controls the start relay K403 thereby initiating and maintaining the motion of the belt. Algebraically, the start relay is energized when:

$$K403 = (\overline{K801})(K317)(S701)[(S1113 \\
+ (K403)](\overline{K409})(\overline{K408})(K703)\overline{S1115})(K401) \\
[(S1110\ 0-9)(\overline{K302} + S1110a,d)(K404)(\overline{K302})] \\
+ (K401)(\overline{K302})$$

This equation may be simplified as follows:

$$K403 = (\overline{K801})(K317)(S701)[(S1113) \\
+ (K403)](\overline{K409})(\overline{K408})(K703)(\overline{S1115})(\overline{K302}) \\
+ (S1110a,d)(\overline{K401})(\overline{K404})$$

These conditions for holding in the start relay once energized ($S1113 + K403$) may be listed as follows: The motor speed must not become excessive ($\overline{K801}$); the D.C. supply voltages must be maintained ($K317$); the magazines must not be raised ($S701$); the service relay must not energize ($\overline{K409}$); the function switch must not be in test ($\overline{K408}$); the low vacuum motor must be running ($K703$); the emergency stop button must not be pushed ($\overline{S1115}$); and either an empty hopper must not be reached ($\overline{K302}$) or if it is, the belt may continue to run only if returning cards in sequential order ($S1110a, d$) ($\overline{K401}$) $\overline{K404}$). Contacts of the start relay K403 are used to control the drive motor clutch in the run circuit, to energize the time delay relay K320, and to enable cam switches A and B.

The start tape test circuit, see FIG. 14, initiates some of the various actions which take place in the console once a tape is started in a Test function. The start tape relay K406 is energized when sort and test relay K408 is energized and S1107 is depressed or K406 is energized by its hold contact. The start tape relay K406 connects +90 volts to the electromechanical counters 29 thereby permitting them to be operated in Test function. Other contacts on S1107 are described under the heading programmer and serve to control the tape reader.

The stepping switch circuit operates the stepping switch SS501 which is used to return cards automatically from all receiving hoppers in sequence. The equation for supplying energy to the stepping switch coil is as follows:

$$SS501 = (S1110a,d)(\overline{K404})(\overline{K401-1})(K302) \\
+ (\overline{SS501\text{-home}})(K402)(\overline{SS501\ \text{Int}}) \\
= (\text{Return } a \text{ or } d)(\text{Ret. Stop 2})(\text{Belt Dir.}) \\
(V=15) + (\text{Reset})(\text{Step. Sw. Home Pos.})$$

Also included in these relay contacts is the ground path for thyratron TH209B of the V counter. In the return direction with the return switch S1110 on descending or ascending, when the V counter detects an empty hopper, the $V=15$ thyratron TH209B fires thereby closing K302, see FIG. 23. This allows +90 v. to be applied to the stepping switch coil circuit. When operated in this way, the stepping switch is stopped at the next position by the deenergization of relay K302 and this, in turn, is done by the interrupter contact of the stepping switch which opens the cathode circuit of the V15 thyratron TH209B as the stepping switch advances.

Referring to the conditions for energizing the stepping switch coil, the switch will advance to the home position whenever the reset relay K402 is operated by the reset push button S1112. Also, the stepping switch can be prevented from operating in ascend or descend return operations by energization of return stop–1 relay K303 and hence return stop–2 relay K404, the stop stepping relays. The stepping switch SS501 is inhibited in this way when the feed hopper 45 becomes full, thereby energizing the hopper-full circuit including relay 405; or when the hopper reinsertion switch IS700–710 for the hopper being emptied has been pulled and, when this switch has been pulled, 30v is connected to relay K303 through bank E or F of the stepping switch and bank C of the return switch S1110; or when position 10 of the stepping switch is reached and, when this occurs, banks E and F of the stepping switch and bank C of the return switch S1110 are in their maximum positions. There are six banks lettered A to F on the stepping switch and each bank contains 10 contacts plus one wiper. Banks C and D perform the primary functions of the stepping switch, that is, controlling the feeding of cards in return direction in sequential order. Banks A and B are used in the sort verification circuit and banks E and F are used in the hopper reinsertion memory.

The rotary stepping switch SS501, which is a commercially available item, consists essentially of six wiping springs moved by a pawl and ratchet which are actuated by the electromagnetism set up by its coil in response to momentary pulses of current. At each pulse the pawl engages the ratchet moving the wipers one step forward into contact with stationary terminals. These stationary terminals are assembled ten to one unit in the form of a semicircular bank. The six wiping springs previously mentioned are so assembled as to contact one bank apiece and to contact simultaneously the equivalent contact on each bank. The stepping switch has unidirectional rotation and is so designed that it contacts in sequence pins 1 through 10 and then starts again with pin 1. The wipers are of the non-bridging type providing a momentary open circuit between adjacent contacts. The "home" position, that is, pin 1, is the point where the wipers normally rest. When the stepping switch is not at the home positions, the home contacts are closed and are used to return the stepping switch to the "home" position when the reset switch S1112 is depressed. The interrupter contacts are normally closed and are opened momentarily each time the switch makes one step. These contacts are wired in series with the magnetic coil and when the coil is energized it opens its own circuit thus providing automatic pulsing.

The stop circuit, see FIG. 14, is used in stopping the machine in the middle of a pass. The stop relay K407 is energized when K402 is not energized and either S1114 is depressed or K407 is energized. The purpose of the stop circuit is to deliver the stop signal and its complement to the programmer. This signal has the effect of stopping the machine after the document being handled has been completely disposed of. A "C" contact used in the return circuit transfers the control of the return signals to the Fn thyratron TH212/B.

The thyratron control circuit, see FIG. 19, produces two signals, TCN and TCNR which control the cathodes of the various thyratrons by providing a conducting path to ground. TCN is used in the thyratrons TH207 in the total circuit and TCNR is used in the thyratrons TH212 in the return circuit.

$$TCNR = (K408-2)(K313) + (K408-2)(K321) \\
TCN = (K401-2)(Tcnr); \text{ that is,} \\
TCNR = (\overline{\text{Test}})(\text{Timing } AB) + (\text{Test})(EC \text{ Test}) \\
TCN = (\text{Belt Dir. Normal}) \ Tcnr$$

Reference is made to the description of the total circuit for the operation of the end of card relay K321, and relay K314 is described under the cam switch circuit.

Twelve thyratrons are used to energize the plunger solenoids L700–710, electromechanical counters 29 and the relay which drives the vacuum port solenoid L711 in the vacuum port circuit. The inputs to the thyratrons are the feed signal Fsv and the select signals S–0 through S-8, R+Rs, and Rs, each with its proper amount of delay as interjected by the cord memory 68. Those requiring no delay come directly from the amplifiers. In Test function no delay is needed for the signals S-0 through S-8 and also the core memory does not function. Therefore, the core memory is by-passed in Test function and this is done with the "C" contacts of the test relays K408-1 and K408-2, these relay contacts making up part of the thyratrons circuit. There are two thyratrons in each plug-in unit, the input being coupled through a capacitor to the control grid. This grid is normally biased at approximately −12 v. and the output from the plate is normally connected through a plunger solenoid, counter, or relay to +90 v. The cathodes are brought out so that the thyratrons may be reset externally. Once triggered, the thyratron remains fired until the cathode is disconnected from ground. The resistor in the plate of each thyratron ensures that the tube will remain fired even though the load may be momentarily disconnected. The cathodes of the 12 thyratrons are controlled by the thyratron cathode control circuit via functions Tcnr and Tcn. The input to the thyratrons must come during the time when the cathode control signal is at ground. The thyratron input signal comes either at the time of the end-read pulse, or at the time of the positive pulse of P1 of the core memory, if from the core memory. In normal belt direction, TCN and TCNR are both grounded from 146° to 96° of the next cycle. However, the thyratrons will not be energized, assuming an input occurs, until 165° or 170° as the case may be. It will remain conducting until 96° of the following cycle. TCN controls all the thyratrons except TH208B which is effective only in normal belt direction. These thyratrons cannot be fired in return belt direction. TCNR is effective in both belt directions so that TH208B can be operated in either belt direction by Fsv. The timing of signals for the thyratrons TH208B is the same in reverse belt direction as in normal, and in Test function signals TCN and TCNR are controlled by a contact of the end of card relay K321 in the thyratron cathode control circuit. This relay in turn is controlled by the total circuit to which reference is made for its operation.

The time delay K320, see FIG. 27, provides a delay between the time the belt 36 is started and the time cards begin to feed. A.C. power is applied to it when the start relay K403 operates. After being energized for approximately 15 seconds, it operates thereby energizing the run relay K410. Once K410 has operated, its B contact disconnects power from K320 so that K320 can recycle for the next time the belt is started.

With the belt direction "normal" each time a card passes the reading station 32 or is retracted from the transitory hopper No. 9, the programmer generates an E pulse (at end-read time) which is sent back to the console (J182-73, see FIG. 23). This pulse is amplified by AR105B and this output is called E′ and is connected to the input of end-of-card thyratron TH207B and of total thyratron TH207A, see FIG. 19. The total thyratron cathode is connected to ground through TCN, the common thyratron cathode line which specifies belt direction "normal," not Test function, and the contact of relay K314, said relay being energized from 146° to 356° by cam switches A and B. The plate of the total thyratron is wired in series with a resistor to counters 29 and in series with a "B" contact of K312 which is connected to +90 v. through counter M710 provided K406 is energized or K306 and K401 are energized, K312 being energized by TH208/A. Thus, the total counter M710 issues one count each time an end-of-card (E) pulse is received from the programmer and therefore indicates the total number of cards that have passed the reading station 32. The E pulses representing retraction from the transitory hopper 47-9 are prevented from causing counts in the total counter by the K312 contact which is open whenever TH208/A is operated. The E pulse, as mentioned herein- before, is also connected to the input of the end-of-card thyratron TH207B. The cathode of this thyratron is returned to ground through (the normally closed contact) of K321. The coil of K321 is in the plate circuit of the end-of-card thyratron and automatically opens the cathode of TH207B soon after it fires. In Test function this thyratron and relay reset the common thyratron cathode buss after each E signal.

The V counter, see FIG. 23, is a four-stage counter which advances one count upon receipt of an EG signal from the programmer, signifying the absence of both a card at the reading station 32 and an Rs signal in the programmer. The EG signal passes through a noise limiting gate, is amplified by AR105/A, and again by AR104/A. This is a special amplifier biased at cutoff instead of at 3 v. The output of AR104/A and the resulting negative pulse is inserted into FF103/A, pin B. The four flip-flops in the V counter are in the "zero" state when the left-hand plate of each of the stages is conducting.

Assuming that all flip-flops are initially in their "zero" state, the first EG pulse is applied to the common plate load of the first stage FF103, pin B. The first flip-flop changes state so that the right-hand plate conducts and the first stage is now in a "1" state. All other stages are still in the "zero" state. The next EG pulse is applied as the first one changing the state of the first stage to its original "zero" state. The negative transition of the left-hand plate of the first flip-flop is coupled through a capacitor C103 and appears as a negative pulse on the plates of the succeeding stage. This is accomplished by feeding the capacitor into the cathodes of two diodes C105 and C106, the anodes of which go to the left-hand and right-hand plates, respectively, of the succeeding stage. This causes this stage to be switched to its opposite state, in this case the "1" state. Each succeeding stage is switched by the negative excursion of the left-hand plate of the preceding stage. A matrix using one resistor from each left-hand plate into a common buss biased approximately at +160 v. provided a positive pulse dependent upon the coincidence of the total number of stages in the "1" state. A count of 15 fulfills this requirement and this count is referred to herein as the V=15 count. The signal produced by this matrix triggers thyratron TH209/B which in turn energizes the V=15 relay K302. The V=13 matrix uses one resistor from the left-hand plate of counter stages 1, 3 and 4 and one resistor from the right-hand plate of stage 2 into a common buss also biased approximately at +160 v. Here the requirement of the fifth level is accomplished at the 13th count and this count is referred to herein as the V=13 count. The positive pulse which this gate produces is amplified and inverted by AR104/C and goes from there to the programmer as V=13.

Each of the matrices are biased by a positive voltage to set at roughly +160 volts and this allows only the pulse generated by the coincidence of a high voltage on the proper plate of each of the four stages to pass into the circuits triggered by the counter. At any point during the counting cycle the counters can be reset to their "zero" states by an "E" pulse or a Fn pulse or by depressing the reset switch button S1112.

The E and Fn signal lines are connected to AR105/B through diodes CR120 and CR121 which make up an "OR" gate. After passing through a noise limiter circuit, these signals are amplified by AR105B and AR104B which drives the right-hand grid on each of the four counter stages below ground. This causes all the flip-flops in the V counter to switch to the "zero" state regardless of their previous state. The reset switch S1112 actuates K402 which does essentially the same thing through a RC network from −150 volts. After its first stage of amplification in AR105B the E pulse (designated E′ here) is also used in the total circuit.

On receipt of a V=15 pulse in the V counter, the V=15 thyratron TH209B is fired and the cathode of this thyratron is returned to ground if K402 is not energized. Thus, once energized, the empty hopper thyratron TH209B remains energized until either the reset push button S1112 is depressed or until the stepping switch SS501 is advanced one or more positions. The output of this thyratron energizes K302 and the K302 "C" contact is in the start circuit and is used there as well by the stepping switch circuit. Also included in this section of the V counter circuit is AR211C which is pulsed by the F$n$ signal. This amplifier produces a positive pulse and actuates the F$n$ thyratron TH212B shown in FIG. 13.

The vacuum port circuit, see FIG. 19, actuates the high vacuum port solenoid L711 which ports the high vacuum to the plunger solenoid No. 9 in order to retract a card from the transistory hopper in Selection function, normal belt direction. To accomplish this, the programmer produces an R$s$ signal which is amplified by AR210A which in turn triggers the thyratron TH208A. This thyratron in turn energizes relay K304 which actuates the vacuum port solenoid L711. Relay K312 is also operated by TH208A and is used to prevent the total counter from counting upon receipt of an R$s$ signal. That is, the programmer produces an E pulse along with each R$s$ pulse. E pulses so produced do not indicate total counts since the cards being retracted have already been counted once. Included with the solenoid coil are a series resistor to limit power consumption and two parallel capacitors to limit inductive overshoot. The equation for operation of L711 is as follows:

$$L711 = (K410)(K401-1)(K304)$$
$$= (\text{Run})(\text{Belt Dir. Normal})(Rs)$$

The 6.3 volt lamp circuit, see FIG. 21, contains various lamps which use 6.3 volts as their power source. Included are three main control panel indicators which are operated by the G$r$ signal from the programmer. On receipt of a G$r$ signal, relay K305 is operated, thereby supplying power to one side of these three lamps. The lamp which is ignited will depend upon the position of the function switch S111. In Sort function I1101 is energized; in the Extraction function I1106 is energized; and in the Selection and Test functions I1105 is energized. Also included are three lamps I711, I712 and I713 which are used in the pulse generator which produces pulses for the code reader. These lamps are used in conjunction with the phototransitors and rotating disk 65 on the timing shaft 59 as described hereinabove. Also included is I707 which provides the light source for the photocells V704 and V705 of the hopper-full detector.

While reference has been made herein to the power supplies for the various circuits described herein, it is to be understood that any commercially available power pack unit can be utilized to provide the necessary voltages. The A.C. source of power, of course, can be a standard line voltage whereas the D.C. sources may require special filtering circuits to provide the necessary noise limiting factor.

CYCLE OF OPERATION

Figure 31:
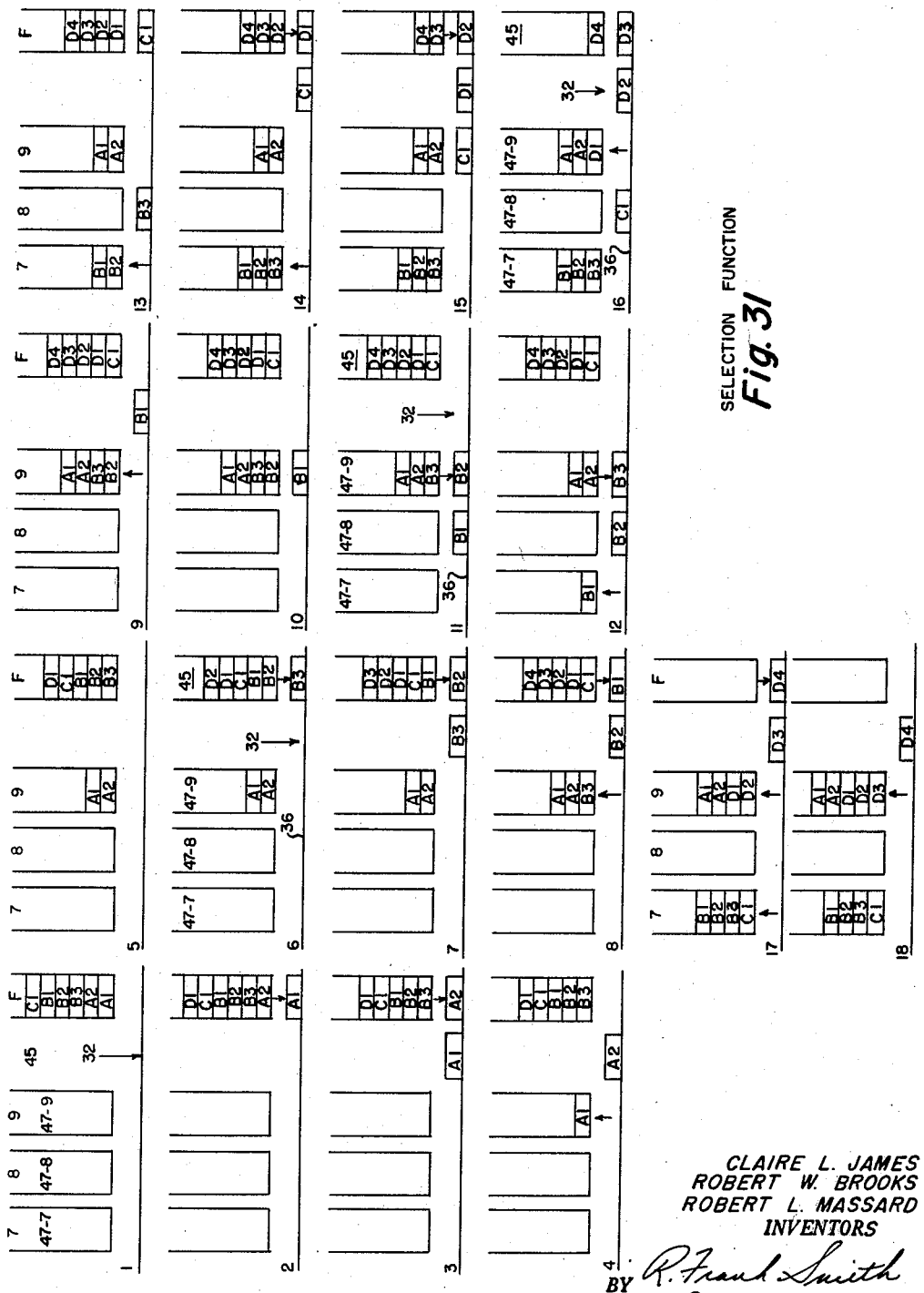
Figure 32:
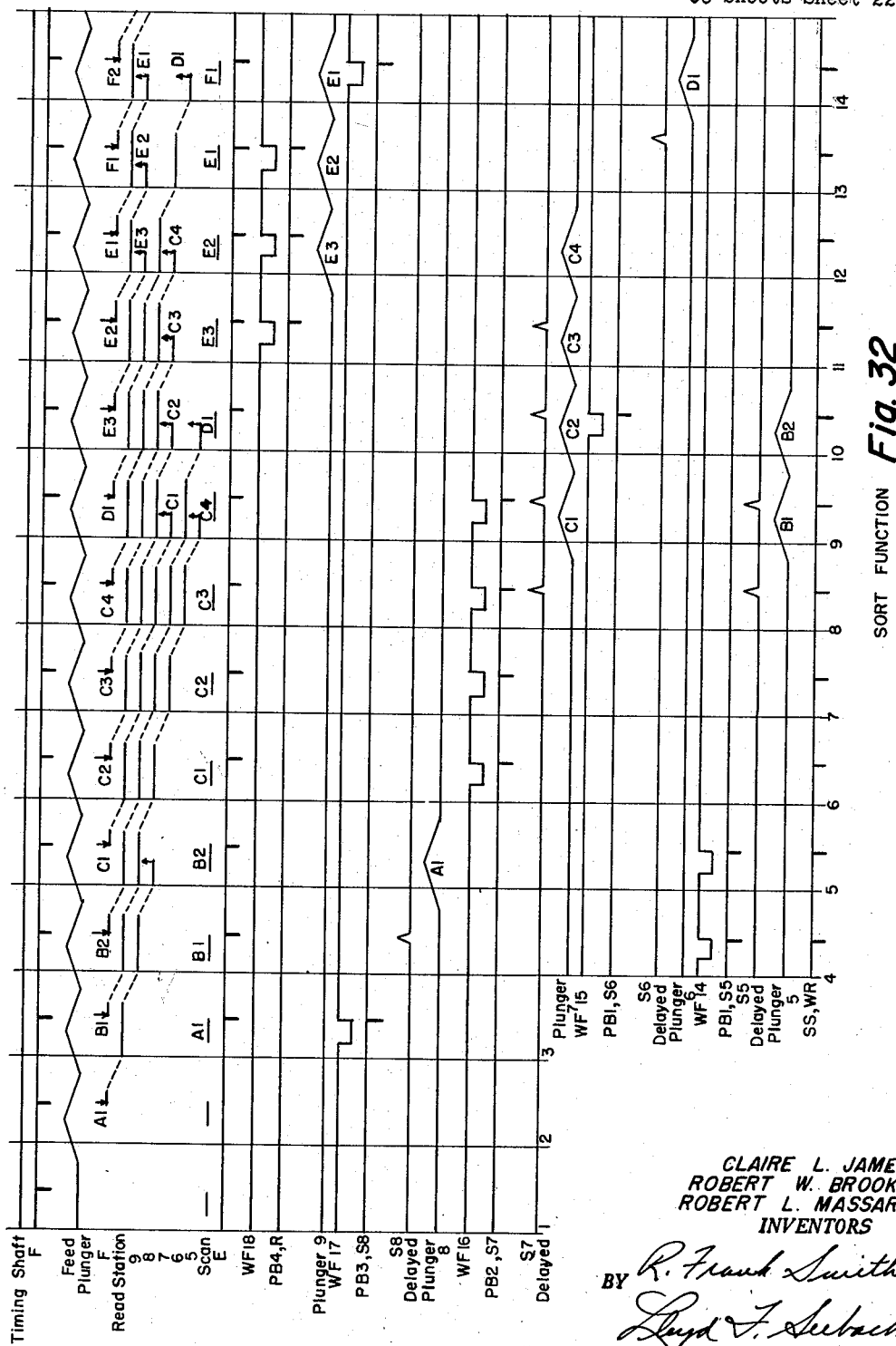
Figure 33:
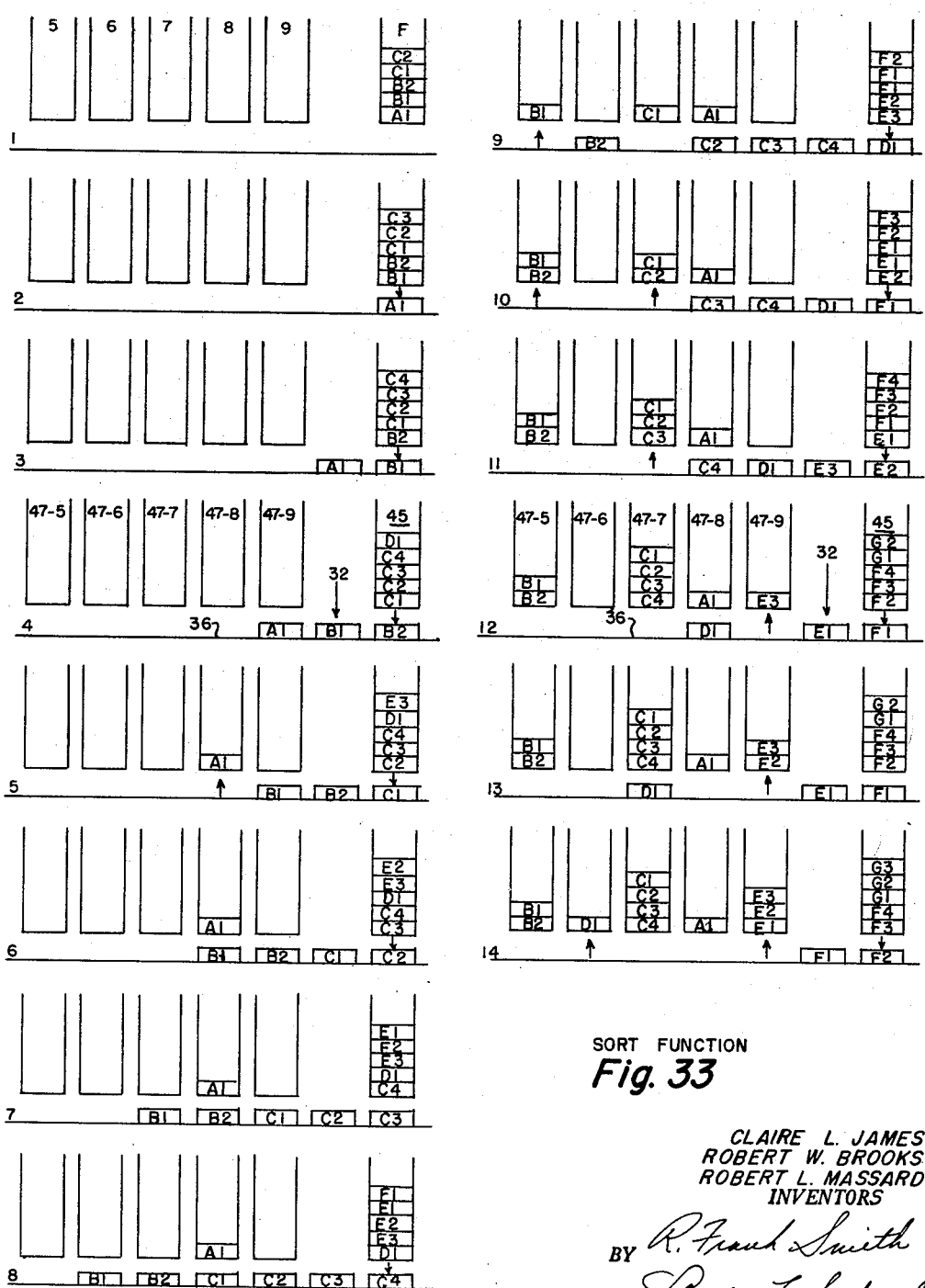
Figure 34A:
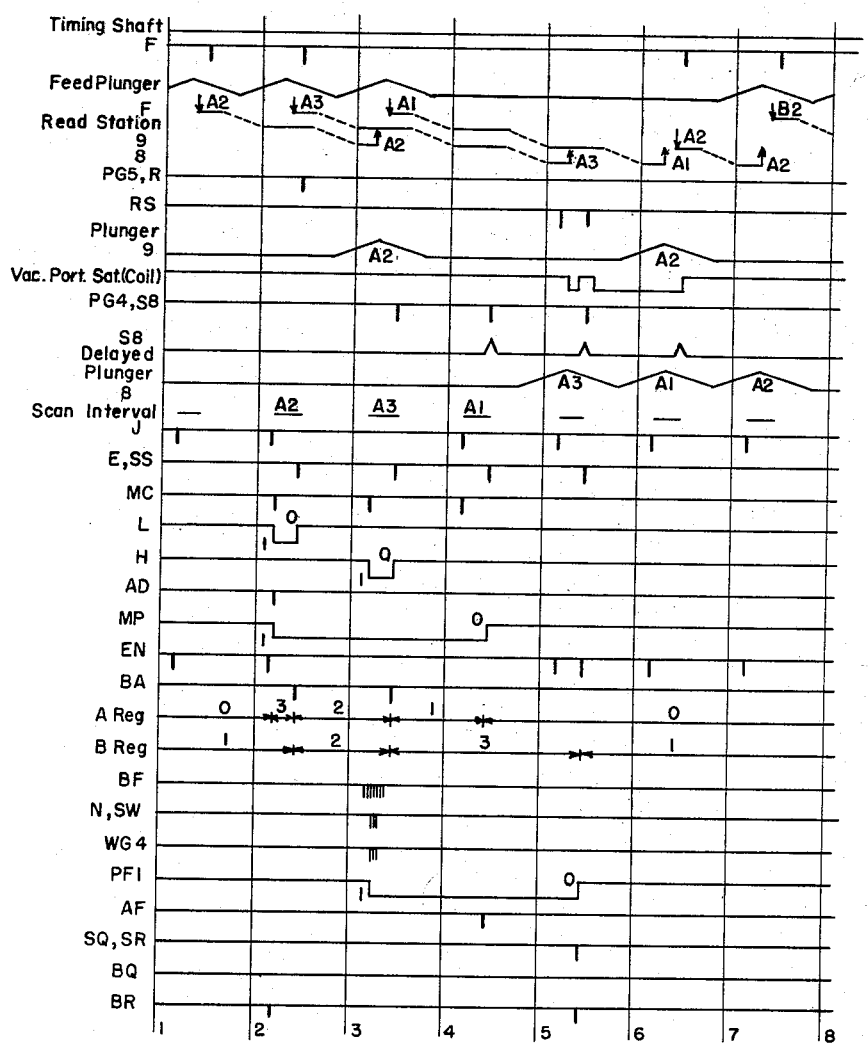
Figure 34B:
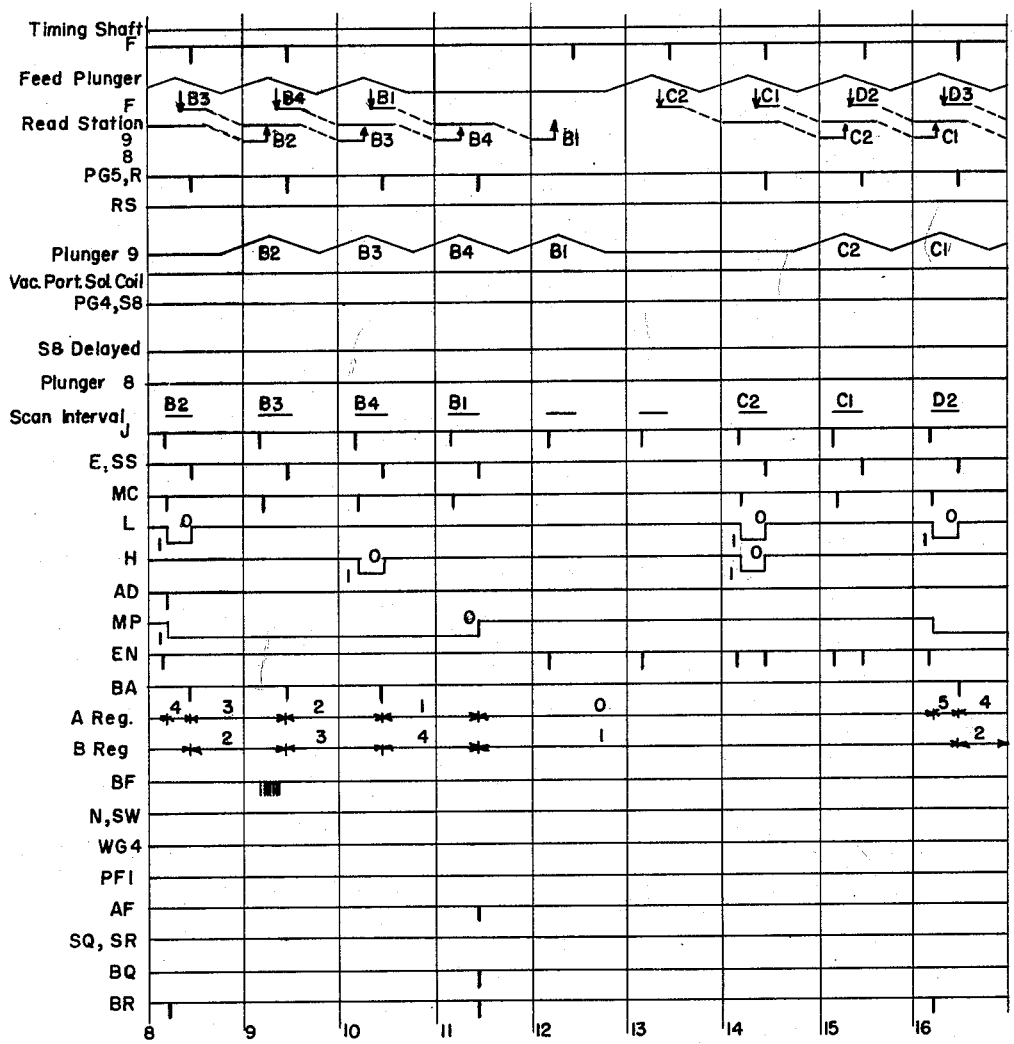
Figure 35:
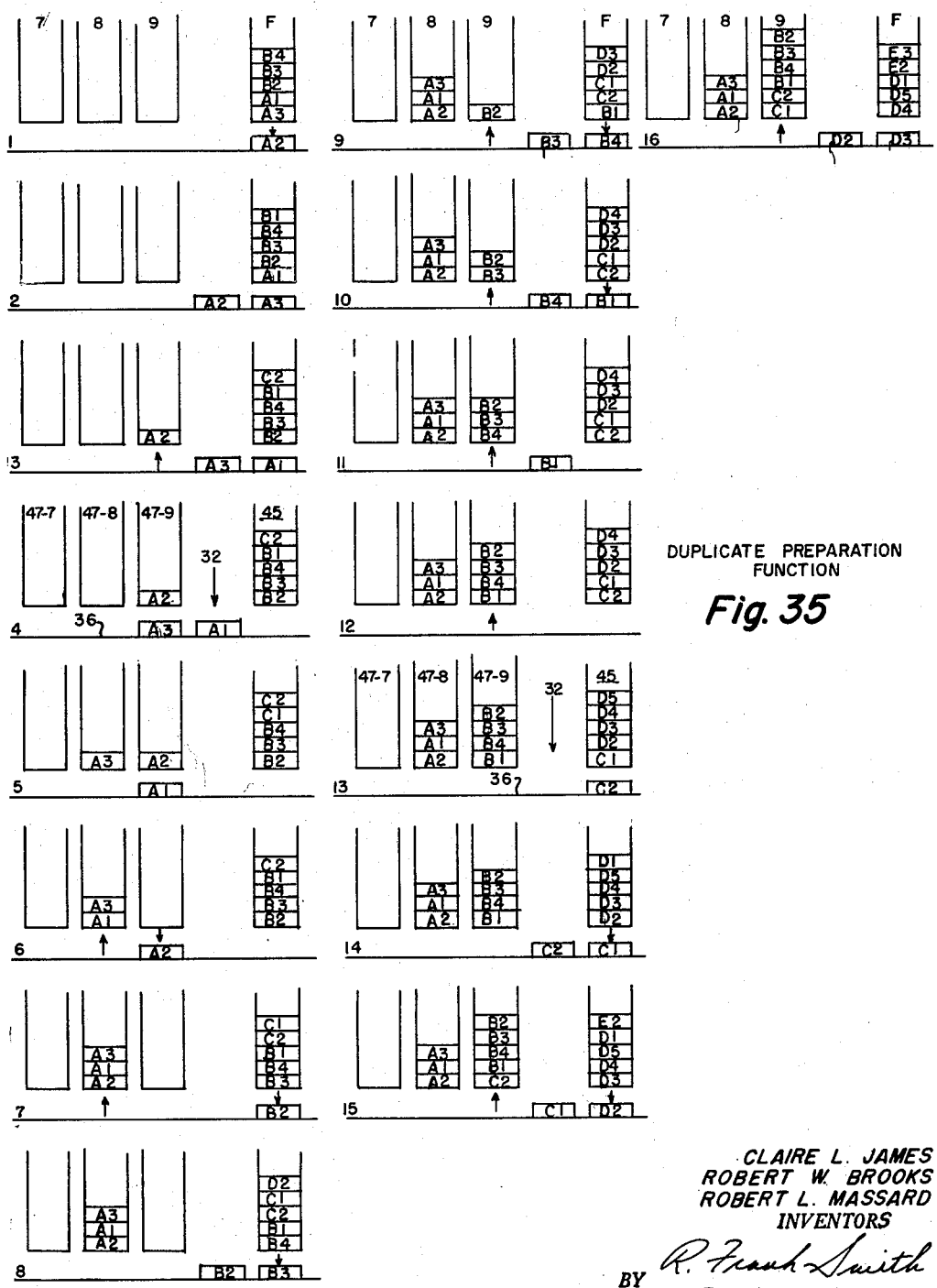

The cyclic operation can be best demonstrated by the use of the sequence charts shown in FIGS. 30–37, which disclose the inter-relation of the various mechanical parts and the electrical signals which perform the logic. These sequence charts are included here largely for reference purposes and will be described only briefly. Reference should be made to the other sections of the description where more detailed information is given. The results of the data comparisons and plugboard logic will be assumed and not demonstrated in detail. For example, in the Selection function chart, FIGS. 30 and 31, it is merely stated that document B satisfies the selection criteria for magazine No. 7, whereas documents A does not. An additional diagram, see FIGS. 31, 33 and 35, is included with each chart for the Selection, Sort, and Duplicate Preparation functions. This additional diagram indicates in more or less pictorial fashion where each of the cards is located at a certain point in every machine cycle. It corresponds to the same situation shown in the sequence chart and does not give any additional information, but only emphasizes how each card reaches its final destination. Five different operations are shown in the sequence charts: Selection function, Sort function, Duplicate Preparation function, Starting Belt and Stopping Belt, Return.

SELECTION FUNCTION

With reference to FIG. 30, this chart shows the operation of the apparatus in the Selection function. Four documents are indicated, namely a two-card document which is rejected to hopper 47–9; a three-card document which is selected to hopper 47–7; a one-card document which is selected to hopper 47–7; and a four-card document whose disposition is not indicated. The handling of cards in this example is also shown in FIG. 31; wherein each step is shown as being taken at the end of the stationary period of each machine cycle.

(1) The timing shaft 59 is used as a time reference for all other mechanical motions and electrical signals and rotates continuously at constant speed and in synchronization with the Geneva drive 37. Zero-degree rotation corresponds to the beginning of the stationary period of belt motion.

(2) The stationary period of the intermittent belt motion occurs from 0 to 216 degrees.

(3) The plunger drive arms are moved as shown here. If latched by a plunger solenoid L700–L710, and plunger 35–0–10 will move up and down with the drive arm and latching can only begin at the bottom of the plunger stroke. The plunger stroke tops at 108 degrees and bottoms at 288 degrees.

(4) The F signal which is generated by the programmer calls for a new card to be extracted from the feed hopper 45 in the next cycle. This causes the feed plunger solenoid L710 to be actuated and it is energized from receipt of the F signal at 165 degrees to 96 degrees of the next cycle.

(5) The feed plunger 35–10 follows the plunger stroke when latched by the feed plunger solenoid L710 and the high vacuum is ported through the feed plunger when it reaches the upper portion of its stroke.

(6–10) The card is on the belt 36 at F, passes through the read station 32 and then with respect to hoppers 47–9, 47–8 and 47–7. The solid lines indicate that a card is on the belt at these points—that is—below the feed hopper 45, at the read station, below hopper 47–9, and so forth. Letters and numbers indicate the document and card of the document, respectively, and the dotted lines indicate the motion of the cards from one position to the next. Arrows pointing downward indicate that the card is placed on the belt at that time, and arrows pointing upward indicate that the card is removed from the belt 36 and is deposited in the hopper at that time.

(11) The R signal (reject) is derived from the programmer at 165° and indicates that the card just read should be deposited in hopper 47–9. This causes the plunger solenoid L709 to be energized from 165° to 96° of the next cycle.

(12) The R$s$ signal is derived from the programmer and occurs at 60° and 165°. This signal indicates that the card should be retracted from hopper 47–9 on the next cycle and actuates plunger solenoid L709 as well as the vacuum port solenoid L711.

(13) Plunger 35–9 follows the plunger stroke when the plunger solenoid L709 is actuated. If the vacuum port solenoid L711 has also been actuated the high vacuum is ported to this plunger so that it will retract a card from hopper 47–9.

(14) The vacuum port solenoid L711 is energized by the R$s$ signal and ports the high vacuum to plunger 35–9 at 96° through 132°, and 201° through 132° of the next cycle.

(15) The S7 signal is derived from the programmer at 165° of a cycle, and indicates that the card just read or the card to be retracted from hopper 47–9 should be deposited in hopper 47–7. This pulse or signal also causes the S7 delayed signal to occur two cycles later.

(16) The S7 delayed pulse occurs at 170° and is produced by S7 after being delayed two cycles in the core memory 68. This signal causes the plunger solenoid L707 to be actuated (170°–96°) and hence to raise plunger 35–7 (below) on the next cycle.

(17) Plunger 35–7 follows the plunger stroke when latched by plunger solenoid L707 and deposits the card on the belt in hopper 47–7.

(18) The scan interval occurs between 60° and 165° of each cycle. This interval begins with the JA signal and ends with the EA signal and represents the time during which the card at the read station 32 is scanned by the code reader 41.

(19) The JA signal is the start-read pulse which occurs at 60° of each cycle. This signal is produced by the sync pulse generator 77 and begins the scan interval during which timing marks are treated as valid.

(20) The EA end-read pulse occurs at 165° and is produced by the sync pulse generator 77 and ends the scan interval during which timing marks are treated as valid. This signal produces either the E or EG signal in the programmer.

(21) The E signal which occurs at 165° is derived from the programmer and is produced by the EA signal mentioned above whenever a card has just been read or when Rs has been produced at 60° in the same cycle. This signal is used extensively in the programmer and indicates to the V counter that cards are being handled.

(22) The EG signal is also derived from the programmer at 165° and is produced by EA whenever the E signal is not produced. This signal indicates to the V counter that no cards are at the reading station or being retracted from hopper 47–9.

(23) The A-Register, which is in the programmer, is a two-decade counter which registers the number of cards in the document yet to be scanned. When the Z tag of the leading card is scanned, it sets to the number of cards in the document and thereafter counts down with every E pulse until it reaches 0 so long as the cards appear in sequential order. If cards are in improper order, the A-Register is reset to 0 and remains there until the next leading card is sensed. If the leading card is a high order card, the card number of each succeeding card is compared to the count in the A-Register to determine whether or not they are in sequential order.

(24) The B-Register is a two-decade counter which registers one plus the number of cards which have been temporarily designated for hopper 47–9. It counts up (from 1) after each card of a document, except the last, is scanned and assumes that the cards are in sequential order. If the document is rejected, that is, left in hopper 47–9 it is reset to 1 by E of the last card scanned. If the document is accepted by one of the hoppers 47–0–8, the B-Register counts down on each E pulse which is accompanied by an Rs pulse. The B-Register is reset to 1 if cards are not in sequential order, and if the leading card is the low order card, then the multiplicity number of each succeeding card is compared to the B-Register to determine if they are in proper order.

(25) The MP signal is derived from the programmer and is used to set a flip-flop in the A- and B-Registers. This signal indicates that the cards are in proper order, so far, and that the scanning of all cards in the document is not yet completed and is set to 1 when this is true.

(26) The WF signal is derived from the programmer and is associated with the word flip-flop WFn for word storage. Each time a card word agrees with one of the storage words, the corresponding word flip-flop is set to 1.

All word flip-flops are reset after the end of each phrase has been recognized and the word gates WGn have been sensed. The outputs of the word flip-flops are available on the plugboard and are used (in Selection) as the inputs to the word gates WGn and word buffers WBn. It should be pointed out that the pattern shown in the chart for WFn has been arbitrarily chosen.

(27) The WG and WB signals also originate in the programmer and are associated with the word gates and word buffers. Twenty diode gates which are used to sense the presence of a group of words within a phrase provide these signals. Their inputs are the word flip-flops WFn and their outputs go to the phrase flip-flops PFn. Their input and output connections are made on the plugboard and they are sensed by EP (in Selection), that is, at the end of each phrase.

(28) The PF signal is derived from the phrase flip-flops PFn in the programmer and this group comprises 16 flip-flops whose inputs are the word gates WGn or word buffers WBn and whose outputs are used in the phrase gates PGn. Connections are made on the plugboard and they are set on the proper WG or WB signal sensed successfully and reset by an E pulse when the B-Register is reset, the B counter and the A counter equal 1 or the B-counter equals 2 and MP equals 0.

(29) The PG and PB signals are derived from the phrase gates PGn and phrase buffers PBn in the programmer and comprise 20 diode gates whose inputs are the phrase flip-flops PFn and whose outputs go to the select signals (S7 in this case) both as determined by the plugboard. The signals are sensed by E pulses whenever A equals 1, or an RS pulse is generated.

(30) The MC signal is derived from a gate package in the programmer which senses the multiplicity column (Z tag) of each card scanned. This package produces an output pulse each time a Z tag is sensed and its output is used in L, H, and various other circuits in the programmer.

(31) The EP signal is the end-of-phrase pulse derived from a gate package in the programmer which produces an output pulse whenever a phrase boundary is sensed; that is, either a Z or Q tag. Its output is used to sense the word gates WGn and word buffers WBn and to reset the word flip-flops WFn.

(32) The L signal is derived from a low order card by the flip-flop circuit in the programmer which is set to 1 when the multiplicity column of a low order card is read; that is, 1 of n. When set to 1 on the leading card, it is used to determine that the card numbers of the remaining cards should be compared to the B-Register.

(33) The H signal which signifies a high order card is also derived from a flip-flop in the programmer, which is set to 1 when the multiplicity column of a high order card is read, that is, n of n. When set to 1 on the leading card of a document, it is used to determine that the card numbers of the remaining cards should be compared to the A-Register.

SORT FUNCTION

The handling of 11 cards making up 5 documents is shown in FIGS. 32 and 33 in connection with the Sort function. A numeric pass is represented in which the column and character being sorted upon are such that document A which comprises one card is sent to hopper 47–8; document B which comprises two cards is sent to hopper 47–5; document C which comprises four cards is sent to hopper 47–7; document D which comprises one card is sent to hopper 47–6; and document E which comprises three cards is sent to hopper 47–9. Document F would be sent to hopper 47–3, although it is not completely shown. As is evident from a study of this chart, each card is read and handled individually. The explanation of the items shown in the chart are as follows:

(1–12) being the same as in the Selection function described hereinabove.

(13) W–18 is associated with the ford flip-flop WF18 in the programmer and this flip-flop is set by word number 18 of the crossbar storage; that is, when the numeric bits of the character being sorted are equal to 1100.

(14) PB4 and R are signals derived from the programmer, the former being a pulse produced at the end-read time whenever WF18 is set. The PB4 output produces the R signal as determined by the sort plugboard and the R signal operates plunger 35–9.

(15) Plunger 35–9 inserts the card on the belt 36 into hopper 47–9.

(16–17) The same as 13 and 14 above, except for the numeric bits which are 1011, word number which is 17, and the hopper which is 47–8.

(18) The S8 delayed pulse is produced after a delay of one machine cycle and actuates plunger 35–8.

(19) Plunger 35–8 inserts the card on the belt in hopper 47–8.

(20–23) These functions are the same as 16–19 above, with the exception that the numeric bits are 1010, the word is No. 16, the PB pulse is No. 2, the delay is two cycles, and the plunger and hopper are 35–7 and 47–7.

(24–27) There functions are the same as 16–19 above, except that the numeric bits are 1001, the word is No. 15, the PB is No. 1, the delay is three cycles, and the plunger and hopper are 35–6 and 47–6.

(28–31) These functions are the same as 16–19 above, except that the numeric bits are 1000, the word number is 14, the PB is No. 1, the delay is four cycles, and the plunger and hopper are 35–5 and 47–5.

(32) The SS and WR signals are derived from the programmer. SS senses the phrase gates PGn and buffers PBn on each E pulse, thereby producing the appropriate select pulse depending on which flip-flop is set. WR resets all the word flip-flops WFn with each E pulse. Actually WR occurs 20 microseconds after SS, so that the word flip-flops are not reset until after they have been sampled.

*Duplicated Preparation Function*

The operation in a pass No. 2 of Duplicate Preparation function is shown in FIGS. 34 and 35. In this case, the leading card of each document is card No. 2 and all one-card documents have been eliminated previously. Card No. 3 of each document is scanned for numeric tags and if numeric tags are present, the document is sent to hopper 47–8 as determined by the plugboard, and if not, to hopper 47–9. All two-card documents are also rejected. Three documents are shown; namely, Document A, which comprises 3 cards, card No. 3 having numeric tags (hopper 47–8); Document B, which comprises 4 cards, card No. 3 having no numeric tags (hopper 47–9); and Document C, which comprises 2 cards (too few) (hopper 47–9).

(1–7) are the same as in Selection function.

(8) PG5 and R are derived from the programmer, the PG5 pulse being produced for each E and SS pulse if PF1 is not set. Each PG5 pulse produces an R pulse which actuates plunger 35–9.

(9–11) Same as in the Selection function. (RS, Plunger 35–9, Vac. Port Solenoid).

(12) PG 4 and S8 are derived from the programmer, the PG4 pulse being produced for each SS during which PG1 is set to 1. It produces an S8 pulse which selects a card to hopper 47–8.

(13–16) Same as in the Selection function. (S8 delayed, Plunger 35–8, Scan interval, and J).

(17) E and SS are produced in the programmer, the E pulse being the same as in the selection function, and an SS pulse being produced for each E pulse to be used to sense the phrase gates PGn.

(18) MC is the same as in the Selection function.

(19) The L signal is the same as described above in the selection function, except that in duplicate preparation the set input is altered so that it is set on the card number which is equal to the pass number. This alternation is effected by the function and duplicate preparation pass

(32) SQ and SR are produced in Duplicate Preparation upon reading the Z tag of card No. 2.

(20) The H signal is the same as in the Selection function.

(21) The AD signal in the programmer sets the A-Register to the number of cards in the document. This signal is produced when L is set except that it is not produced if H is also set. This latter condition effects the rejection of documents having too few cards. In this case—document C. AD also sets MP to 1.

(22) The MP signal is derived from a flop-flop in the programmer used in controlling the A- and B-Registers. These registers are set by AD and reset by AF, that is when A has counted down to 1.

(23) EN is also derived from the programmer and is produced by each J and E pulse when MP is 0. This signal causes the B-Register to count down at each E pulse and produces the RS pulse, both being dependent upon B being greater than 1. In duplicate preperation the counting down of B is over-ridden by its being reset to 1 at the same time.

(24) BA is produced in the programmer by each E pulse for which MP equals 1 and A is greater than 1. It causes the B-Register to count up.

(25) The A-Register functions the same as in the selection function, except that no comparisons are made with card numbers; that is, card order is not sensed.

(26) The B-Register counts up from 1 once for each BA pulse and is reset to 1 by BR. On the count of 2, it enables BF so that numeric tags can be sensed on the card after the leading card. It allows an RS pulse to be produced for each EN if B is greater than 1.

(27) The BF signal produces an output for each timing mark scanned, while B equals 2. When used in N, it senses the numeric tags.

(28) The N and SW signals are derived from the programmer, the N being produced as an output for each BF pulse which is coincident with the reading of the numeric tag. N produces an SW pulse which senses the word gates WGn.

(29) WG4 is derived from the programmer and since there are no inputs to this word gate, it produces an output whenever sensed by SW; that is, whenever a numeric tag is read by N. Its one output is connected on the plugboard to PF1.

(30) The PF1 is derived from a flip-flop in the programmer which is set by WG4 and reset by SR. If PF1 is set, the document is sent to hopped 47–8 and if not to hopper 47–9.

(31) The AF signal is also derived from the programmer and is produced at the E pulse when A equals 1 and is also used in BQ.

(32) SQ and SR are produced in Duplicate Preparation whenever a card is retracted from hopper 47–9 for delivery to hopper 47–8. SR resets the phrase flip-flops PFn to 0.

(33) BQ is derived from the programmer and produces an output whenever an R and an AF pulse are produced at the same time; that is, whenever the last card scanned is sent to hopper 47–9. This signal is also used in BR.

(34) The BR signal is produced whenever a BG, AD, or SG pulse is produced. BR resets the B-Register to 1.

*Starting Belt*

Figure 36:
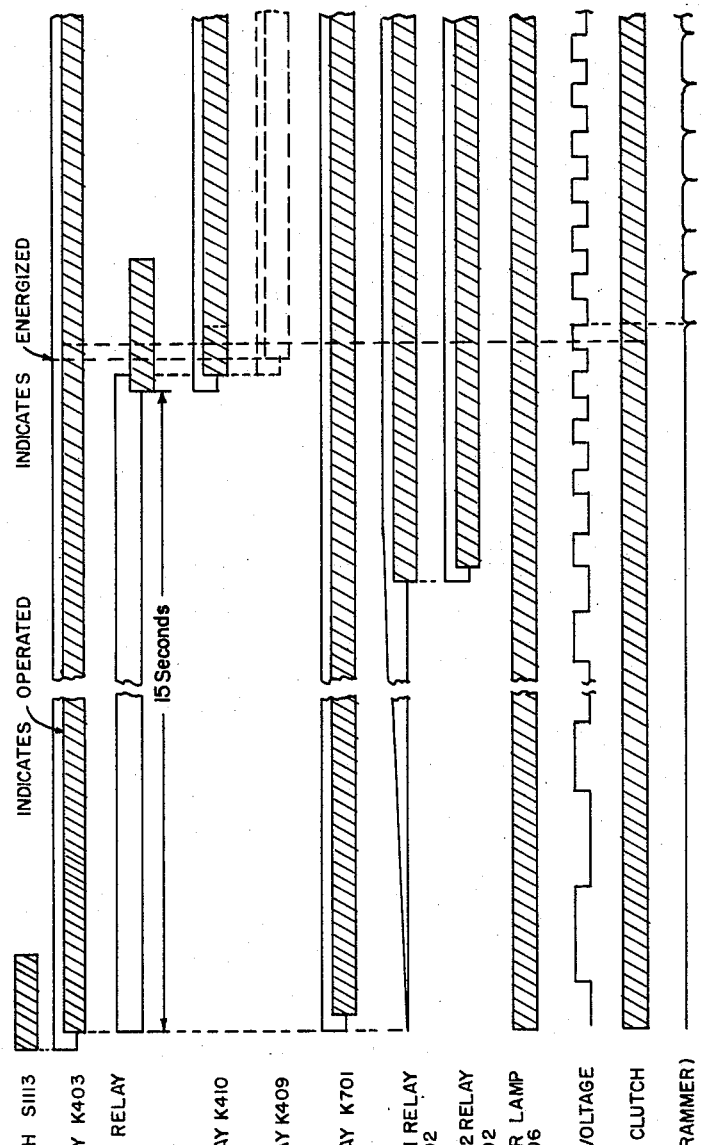
FIGS. 36 and 37 are diagrammatic views showing the timing relationship for starting and reversing the movement of the transporting means.

With reference to FIG. 36, this chart indicates the events which take place upon depressing the start push button S1113 to start movement of the belt 36. It is assumed that the various interlock conditions on the start relay K403 have been satisfied; that is, the +250 v. relay has operated, the magazine interlock S701 is closed, the test relay K408 is not operated, the low vacuum detector K703 has operated, and the emergency stop push button S115 is not depressed. The dotted lines show what would happen if either the polarization voltage or scanner lamp voltage were not present when the run relay K410 operates—that is, the service relay K409 would be energized.

The service relay would then drop out the start relay K403 which, in turn, would de-energize the run relay, the scanner lamp I706 and the drive clutch (not shown).

When the operator depresses the start switch S1113, the sequence is initiated. This energizes the start relay K403 provided the various interlocks are in their proper state. The start relay K403 is operated by the start switch S1113 and is used to energize the time delay relay K320, scanner lamp I706 and drive clutch. Its energization depends upon the service relay K409 being unoperated. Thus, if the service relay operates at the end of the time delay, the start relay will be de-energized, stopping the belt.

The time delay relay K320 is a thermo, time-delay unit which operates approximately 15 seconds after it is energized. At the end of this delay it energizes the run relay. The delay is necessary to provide enough time for the polarization detection relay K702 to operate. The run relay K410 is operated by the time-delay relay K320 and initiates the various functions which are started when the belt is running, for example, the feed signals F. The service relay K409 is sampled at the end of the time delay by the run relay K410 and if either the scanner lamp relay K701 or the polarization detection relay K702 fail to operate at or after this time, the service relay K409 will operate thereby dropping out the start relay K403 and causing the belt to stop. The presence of voltage to the scanner lamp is detected by relay K701. This relay must be operated at all times after the time delay has ended or else it will operate the service relay. The polarization voltage is rectified and used to operate the polarization detection relay K702. It must be operated at all times after the time delay has ended or else it will operate the service relay K409. It also operates the polarization detection-2 relay K302 which effects the application of polarization voltage to the cell array. The scanner lamp I706 provides the illumination for scanning the cards and is turned on and off by the start relay K403 and, hence, is on only when the belt 36 is moving. The polarization voltage is a square wave voltage which is used as a bias voltage for the cell array 44. Its existence requires belt motion since its positive and negative excursions are initiated by the pulse generator 73 on the timing shaft 59. It is connected to the cell array 44 through the bit amplifiers at the end of time delay by a relay in the sync chassis which is operated by the polarization detection-2 relay K302. The drive clutch provides the belt motion when it is energized by the drive clutch control. Operation of the start relay K403 is required to energize the clutch. The feed signal F is utilized for retracting a card from the feed hopper 45 and depositing it onto the belt 36. It is produced at end-read time as soon as the run relay K410 operates.

*Stopping Belt, Return*

Figure 37:
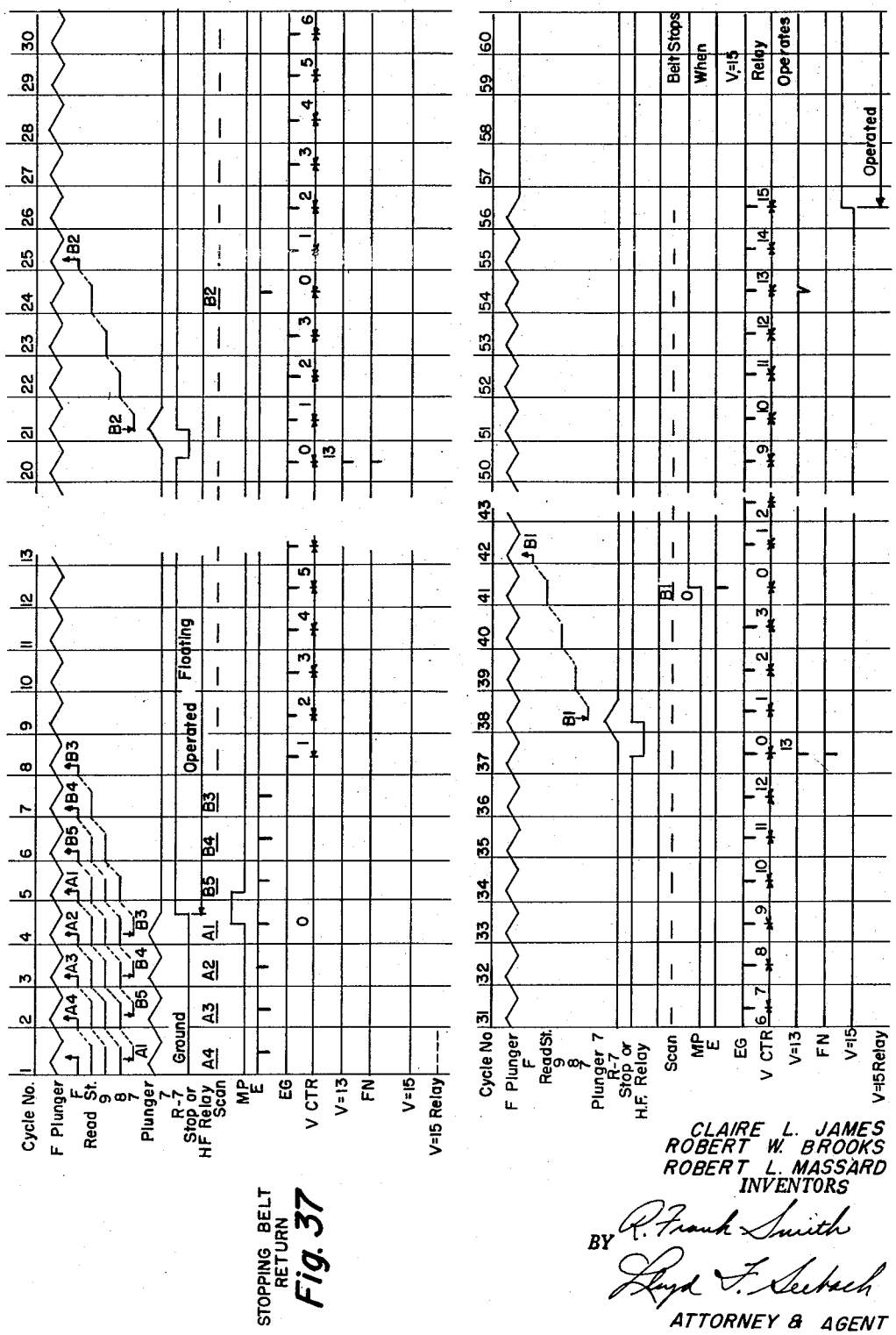

With reference to FIG. 37, this chart shows the method by which the belt 36 is stopped when cards are being returned to the feed hopper 45. It applies to all functions, except Sort and Test, and to cases where the belt is stopped by the stop push button S1114 or the hopper full detecting circuits. It does not apply when the belt is stopped by the emergency stop button S1115. The purpose of the complexity of this operation is to insure that multiple card documents remain intact when the machine stops.

Two documents are shown being returned from hopper 47–7. The stop K407 or hopper full K405 relay, as the case may be, is operated after the third card of document B is placed on the belt. Thus, two or more cards of document B must be returned or it will be divided between hopper 47–7 and the feed hopper 45. MP is used to determine whether the document has been completely handled but it cannot be sampled until it is certain that the scanner has read all the cards that have been placed on the belt. Thus, plunger solenoid L707 is de-energized and the V-counter counts to 13 to insure that all cards on the belt have been scanned. If at $V=13$, MP is still equal to 1, then another card is fed onto the belt by $Fn$. This process is continued until MP is reset indicating that the end of a document has been reached. When MP is zero, nothing prevents the V-counter from counting past 13 to 15. A count of $V=15$ energizes the $V=15$ relay K302 which, in turn, causes the belt to stop. The functions shown are as follows:

(1) The feed plunger 35–10 is actuated by the plunger solenoid L710 which is energized on every cycle in return belt direction, except in Sort function for which this chart does not apply. Thus, all cards on the belt are deposited into the feed hopper 45.

(2–6) The card on the belt at F, read station 32, and hoppers 47–9–8 and –7 are the same as in the Selection function described above.

(7) Plunger 35–7 is latched by plunger solenoid L707 which is driven by R7. The high vacuum is ported to all return hoppers so that, when actuated, plunger 35–7 will retract the card from the hopper and place it on the belt.

(8) R7 drives plunger solenoid L707 and when R7 is at ground the solenoid is energized. R7 is continuous until the stop K407 or hopper full K405 relay is operated. Thereafter, it is produced by $Fn$ and when produced lasts for only one cycle.

(9) When either the stop K407 or hopper full K405 relays are operated, they initiate the stopping cycles by stopping the R7 signal.

(10) The scan interval is the same as in the Selection function.

(11) The MP signal derived from the programmer operates in all functions, as it does in the Selection function; that is, it is set to 1 upon reading the multiplicity code of the leading card and is reset to zero at end-read of the last card of the document.

(12–13) The E and EG signals derived from the programmer are the same as in the Selection function.

(14) The V counter is a four-stage counter which counts EG pulses. Two gate outputs are fed by the counter; $V=13$ EG pulses and $V=15$ after 15 EG pulses.

(15) The $V=13$ signal is obtained by a count of 13 in the V counter and is used to produce $Fn$, if MP is 1.

(16) $Fn$ from the programmer is produced by $V=13$, if MP is equal to 1. This signal produces an R7 signal to drive plunger 35–7; that is, a return signal for whichever hopper is being emptied and resets the V counter to zero.

(17) The $V=15$ signal is obtained by a count of 15 in the V counter and is used to energize the $V=15$ relay K302.

(18) The $V=15$ relay K302 is energized by the $V=15$ signal and it energizes the start relay K403 which, in turn, energizes the stop relay K407, thereby stopping the belt 36.

PROGRAMMER

*General Description*

The programmer 26 contains facilities for reading card question information from a punched paper tape into storage, comparing card coded information with the stored information and controlling movement of the cards on the basis of the results of these comparisons. The programmer comprises the following functional categories: The storage cross bars (20-word capacity) and their associated control relays, the plugboard with its associated comparison and temporary storage circuits, and the control circuits which interpret control information from the card and sequence the specific signals required to control the movement of the cards. The operational features of the programmer can be discussed in relation to the six different operations which it can perform, these operations being Selection, Sorting, Duplicate Card Rejection, Extraction, Duplication Preparation, and Testing.

The programmer circuits can be classified into the following logical groupings: Input Control, Card Inputs, Inequality Sensing, Equality Sensing Plugboard, Selector Controls, A-Register, B-Register, Comparison and Error, and Storage. It should be pointed out that in the description which follows when reference is made to a specific circuit, the circuit designation will be followed by a numeral, for example, word flip-flop for the first word will be designated WF1. On the other hand, when reference is made to the flip-flops generally they will then be designated by WF$n$. This same procedure will be followed with respect to all of the circuits discussed hereinafter.

The Input Control portion of the programmer receives from the console the start-of-card scan signal JA, the end-of-card scan signal EA, the card timing signal TP, and the manual reset signal ZMP. These signals are transmitted throughout the programmer after logical treatment and electrical amplification.

The Card Inputs are received from the card scanner and comprise forty-two bit information lines M1 through M42. The input circuits accept assertion information from either positive or negative cards and deliver both assertions and negations to the rest of the programmer. The input circuits also accept bit information from the test word storage for the Test operation. Provision is made in the input circuits for interpreting numeric identification tags as corresponding alphabetic tags to accommodate file words in the open field of the cards.

The word comparison circuits associated with each of the first four of the 20-word storage positions permits either equality or inequality comparison to be made between incoming card words and a stored word. The Inequality Sensing circuit actually senses for equality between the incoming and stored identification tags. However, in the remaining six characters of each word the circuits sense for equality and for "greater than" inequality. Appropriate plugboard connections result in a final output from an inequality sensing circuit for any of the following desired conditions: $<$, $\leq$, $=$, $\geq$ and $>$. In each case the symbol represents the relationship of the card word to the stored word and the result of a successful comparison is a set word flip-flop.

The word comparison circuit associated with each word of the word storages other than the first four compares each incoming card word for identity of the corresponding stored word. The result of a successful comparison is a set word flip-flop.

The Plugboard consists of 20 word flip-flops WF$n$, 10 word gates WG$n$, 10 word buffers WB$n$, 16 phrase flip-flops PF$n$, 10 phrase gates PG$n$, 10 phrase buffers PB$n$ and 10 select outputs S$n$. All of the logical inputs and outputs of the plugboard functions are available at the plugboard for the aforementioned circuits.

Each word storage position in the 20 word main storage of the progarmmer has a related word flip-flop and successful comparison of a card word with a stored word results in the corresponding word flip-flop being set. The word gates provide the means of gating together the outputs of word flip-flops to effect the grouping of word comparisons into phrase comparisons. Up to six word flip-flop outputs can be gated together in one word gate and larger groupings can be obtained by cascading gates. Alternative choices of word flip-flops or gate outputs are accomplished with word buffers which permit up to five Word flip-flops or word gate outputs to be buffered together. There is also an AND input available for each word buffer.

There are sixteen phrase flip-flops which are used to temporarily store for later use the output of a satisfactory Word gate or Buffer phrase sensing on word flip-flops. The phrase gates and buffers have a function similar to that of the word gates and buffers, except that they sense on phrase rather than word flip-flops to result in selection conditions.

Ten select lines carry signals from the programmer to the console to activate the transitory and nine select hoppers. Any select line can be driven by any phrase gate or buffer output.

The Selector Control includes functions which sequence the sensing and resetting of the plugboard circuits, control release of the cards from the feed hopper on the console and perform other specified control functions.

The A-Register is a 2-decimal-digit, binary-coded-decimal, subtracting counter which accepts an 8-bit parallel input and reduces its count by one each time a count-down signal is applied. The associated controls generate reset, drop-in and count pulses and indicate whether the A-Register contains zero or not. The A-Register is also used to keep track of the number of cards in a multiple card group remaining to be scanned to complete handling of the group.

The B-Register is a 2-decimal-digit, binary-coded-decimal, forward-backward counter and accepts count-up, count-down and reset commands. The associated controls generate these commands for the counter. This register is used for keeping track of the number of cards in temporary storage in the transitory hopper on the console. The count in the B-Register is increased by one each time a card is placed in the hopper and decreased by one each time a card is removed from the hopper. This permits the proper number of cards to be retrieved from the transitory hopper after temporary storage.

The Compaison and Error circuits consist of a group of gates and flip-flops which are used to varify a proper card sequence within each card group handled by the selector.

The programmer storage consists of a set of cross-bar switches which store 20-question words and one test word. This portion of the programmer will be more fully described hereinafter in connection with the cross-bar storage system.

CROSSBAR STORAGE SYSTEM

*Automatic Insertion of Data*

The function of the crossbar storage is to provide a means for storing question information that is to be compared with the information contained in the coded areas of the cards. The question information is inserted into the crossbar from punched paper tape or manually operated switches S1120 and S1121. Reference should be made to FIGS. 40–41 and to FIGS. 65–70.

The input circuitry consists of an array of stepping contacts which distribute the information from the paper tape into the proper columns of the crossbar storage system. The relays K110A–G associated with the paper tape reader, see FIG. 40, contain additional contacts used to recognize specific punched paper tape codes and control the mode of operation of the input circuitry. The transfer of information from the paper tape to the crossbar is a two-step operation because of the characteristics of the crossbar relay system.

The information to be preserved within a given crossbar CB1–12 (FIGS. 41A, B, C and D) is stored by first energizing the six select rods SR1–6 of that crossbar in positions corresponding to the bits of the character to be stored and then operating the desired one of the 13 hold coils HC1–13 of the crossbar to preserve the bit information for future use.

The order in which the various circuits perform their functions will now be described. The input switch S1105 at the console is placed in the reset position to operate the reset relay K103 so that the stepping switches SS26, SS44 and SS45, which are used for distributing the paper tape information, are returned to their "home" position, see FIG. 42. This homing action is accomplished by grounding the stepping switch coils by means of current passing through the "off-normal" contacts of the stepping switch is not at its "home" position. The interrupter contacts serve to interrupt the current so that the stepping switch advances step by step to its "home" position. Upon reaching the "home" position, the "off-normal" contacts open and no further self-stepping action takes place.

The input switch S1105 is then placed in the load position and this action causes the stepping switches SS44 and SS45 to be advanced one position by grounding the stepping switch coils through the contacts of the tape insert relay K100 which is closed when the input switch S1105 is on the load position, the selection check relay K101 which is closed when the function switch S1111 is not on the test position and an "off-normal" contact which is closed when stepping switch SS45 is at the "home" position.

The final step in preparing for crossbar storage is to insure that a prepared paper tape is properly placed on the tape reader. The start tape push button S1107 at the console is then depressed. The relay H is energized by the ground through the push button contacts and normally closed contacts of relay I, see FIG. 40. When the push button is released, the tape reader clutch coil K106 is energized by a ground path through the normally closed contacts of start tape switch S1107, the contacts of input switch SS1105 and the contacts of the energized relay H. The reason for the contact of the start tape push button S1107 in this path to clutch coil is so that the operator cannot inadvertently depress the start tape push button for such a long period that one or more frames of paper tape are read while the switch is down, see FIG. 64. This prevents a manual over-ruling of a "stop" code (010000) or (010001) punched in the paper tape. When the push button is released, the relay H is grounded through relay I contacts, its own contacts, and through the "stop" code filter which is a network of contacts on the tape reader relays K110A–F instead of the push button contacts. In the event a "stop" code should be presented to the tape reader relays, this ground path to the relay H would be broken thereby de-energizing the relay H which, in turn, stops the paper tape drive by de-energizing the tape reader clutch coil. Likewise, when the crossbars are loaded to the maximum, that is, stepping switches SS44 and SS45 have passed through the 20 words, relay H is de-energized by the opening of the contacts on relay I which has been energized by the +90 v. being supplied through the contact of stepping switch SS45.

The tape reader energizes those associated relays that correspond to the holes in the paper tape frame being presented at the reading station. Later in its cycle the tape reader cam-operated switch energizes relay K110G. If the coded character is one to be stored in the crossbar storage, ground is furnished to the proper select coils of the crossbar relays through the path that encompasses the tape reader relay contacts, the contact of relay K110G and the select coils. The proper set of select coils is determined by providing +90 v. to the select coils of only the desired crossbar. The routing of +90 v. is accomplished with level No. 2 of stepping switch SS44 and levels 1, 3 or 5 of stepping switch SS45, see FIG. 65.

At the same time that relay K110G closes the path to ground for the desired select coils, it energizes stepping switch SS45 by grounding the stepping switch coil. This action does not advance the switch but merely cocks the switch for the advance. Relay K110G also places ground on one side of the select interlock contacts of all crossbars. The function of these contacts is to insure that the select rods are moved fully into position before the selected hold coil is energized to preserve the selection.

Figure 57:
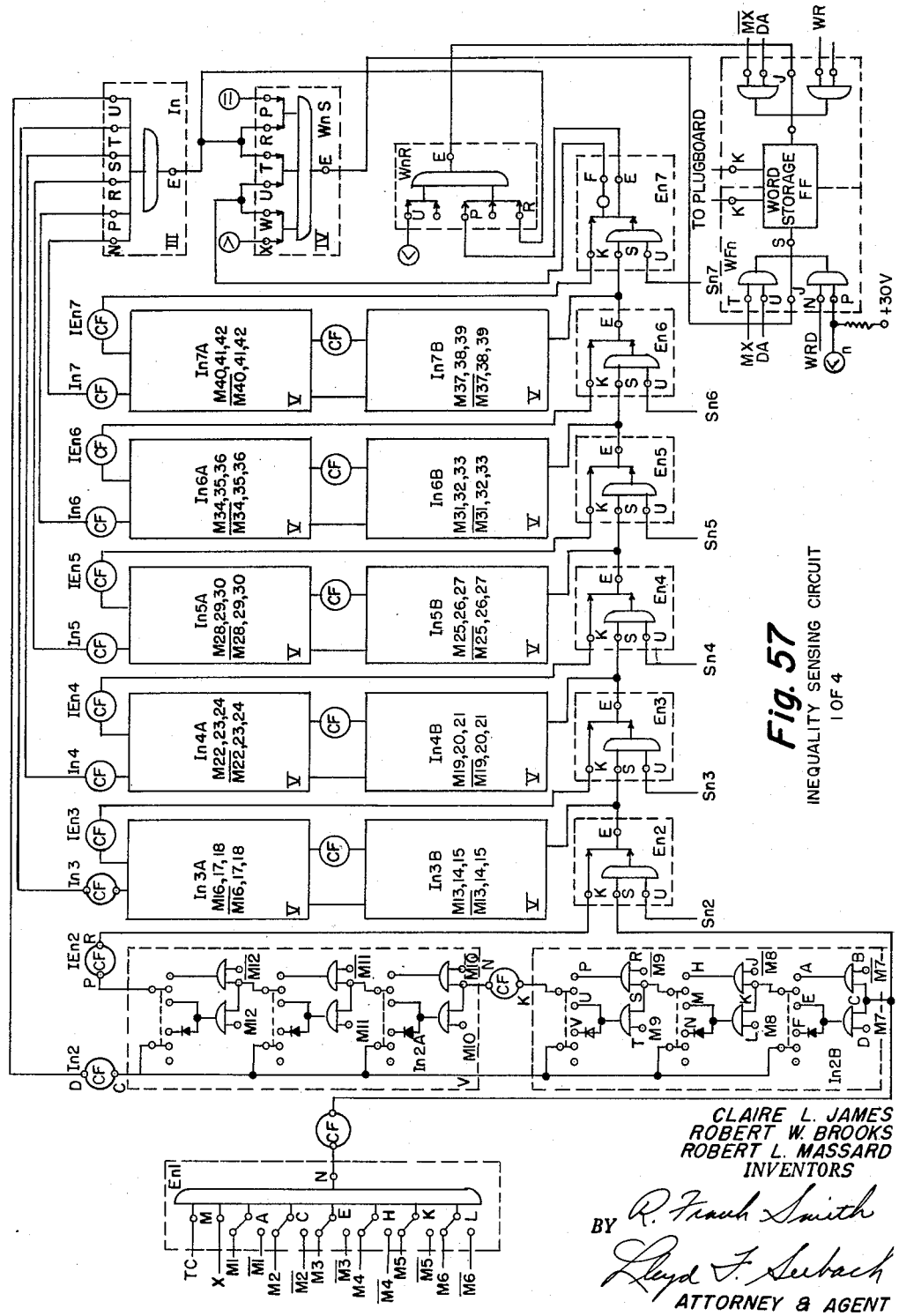
FIGS. 57 and 58 are electrical schematic views of the inequality and equality sensing circuits.
Figure 58:
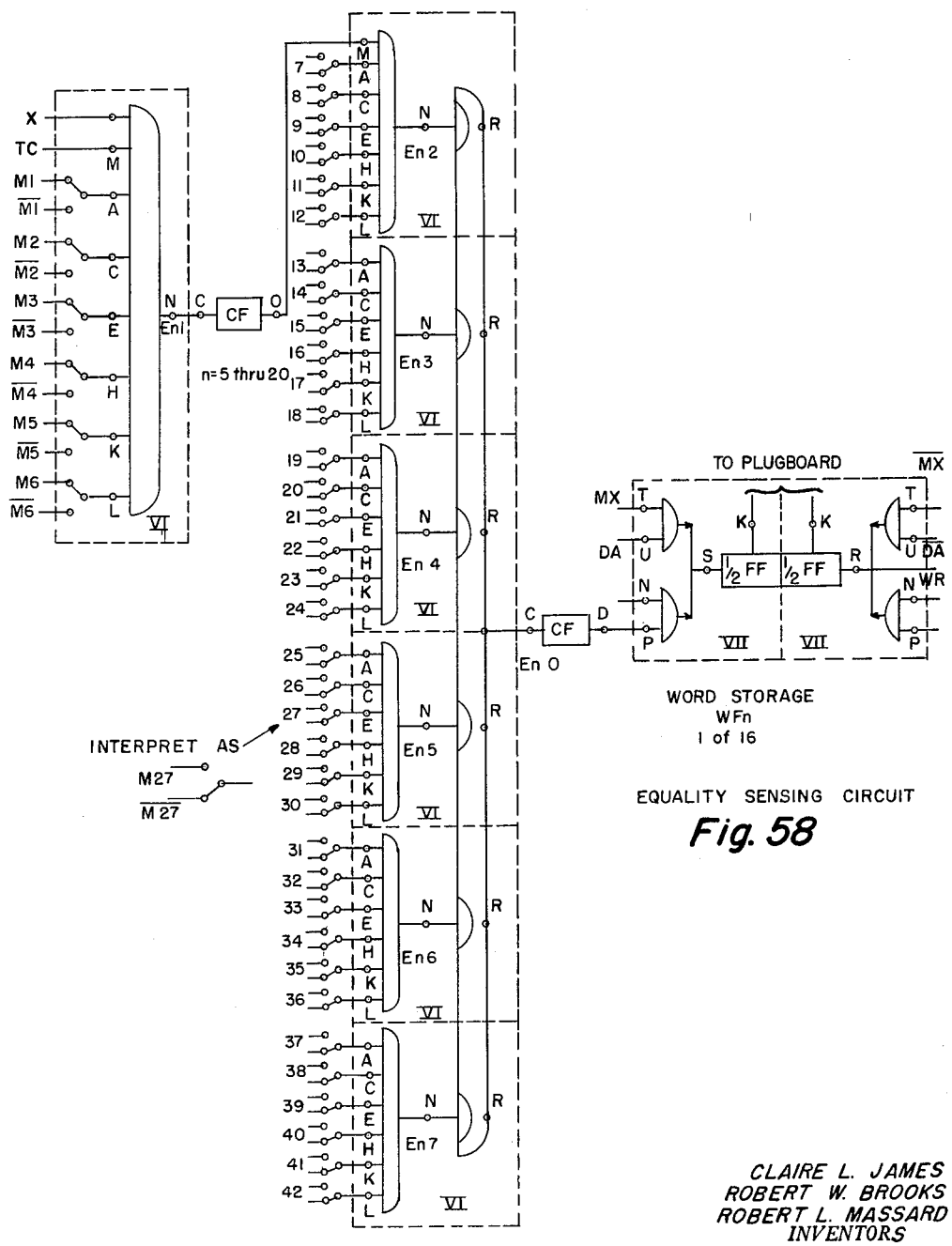
Figure 59:
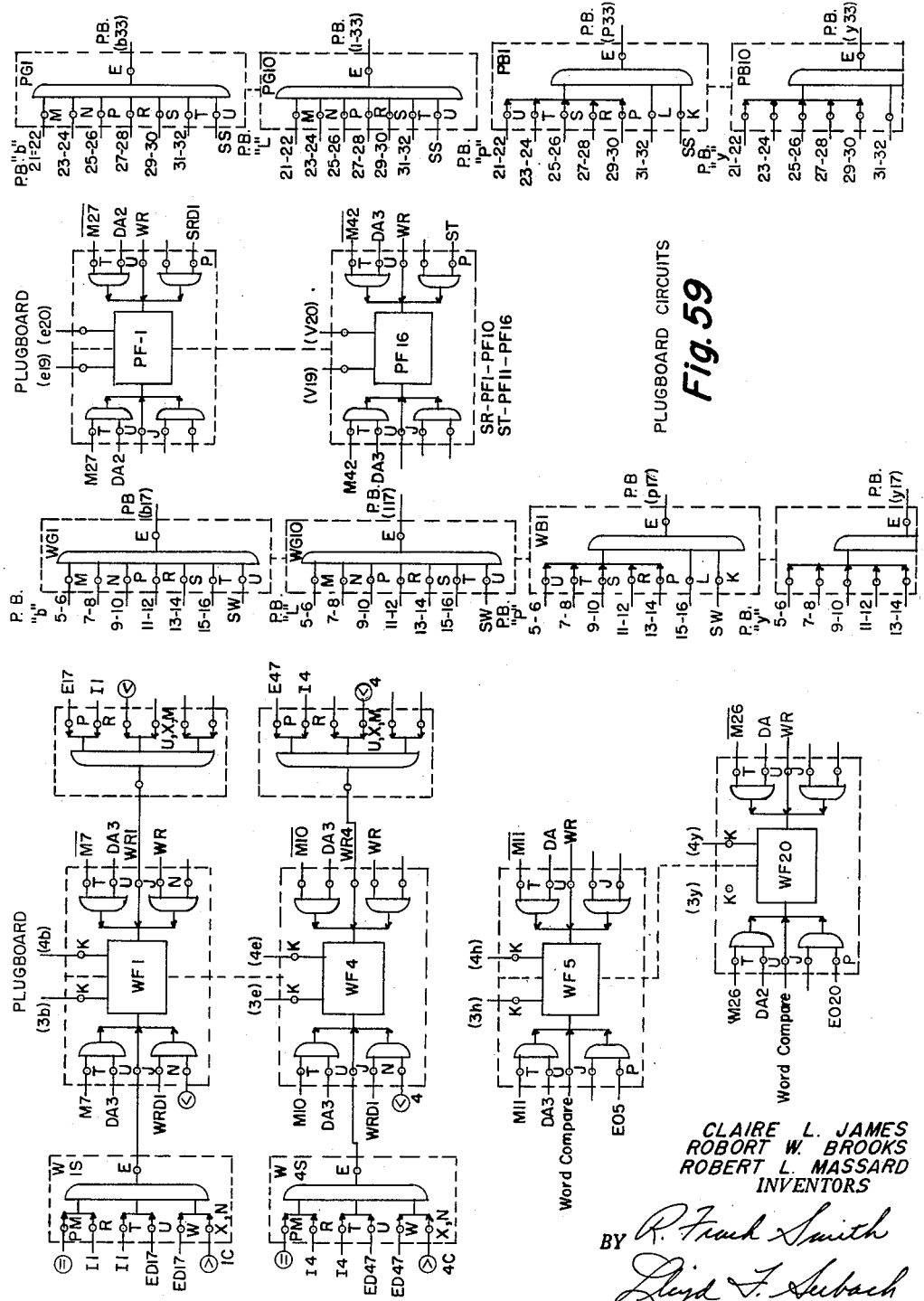
FIG. 59 is an electrical schematic view of the circuitry associated with the plugboard.

Returning to the act of inserting the information from the paper tape into the crossbar, each of the correct select rods has now been moved into one of their two positions by energizing one or the other of their associated coils which cause the respective contacts in the inequality comparison circuits to close, see FIGS. 57 and 58. The next action that occurs is that the select interlock contacts associated with these select rods are closed. The closure of these contacts completes a path to ground for the proper hold coil thereby completing the transfer of information into its crossbar storage. This path is through the contacts of relay K110G, through the series connections of the select interlock contacts, through level No. 1 of stepping switch SS44 and through level 2, 4, or 6 of stepping switch SS45 to the desired hold coil. When the hold coil has been energized by this action, its own contacts can keep the hold coil energized by providing another path to ground through the manual insertion switches, the clear character push button and the clear storage push button, see FIG. 66.

After the information has been accepted by the crossbar storage system relay K110G is de-energized by its paper tape reader cam-operated switch. Its contacts release the select coils that have been energized removing the initial ground connection from the selected hold coil and removing the ground connection from the coil of stepping switch SS45. The latter action allows stepping switch SS45 to advance by spring action to its next position. It should be noted that the contacts of relay K11-0 that are included in the path of ground to the hold coil insure that this information which has been accepted by the crossbar cannot be erroneously placed into the next position of storage. Without these contacts, the slow release of the select coil could allow the select interlock contacts to provide a ground through the new position of the stepping switch SS45 to a new hold coil thereby creating an improper insertion. The crossbar input circuitry is used to transfer 140 frames (twenty 7-character words) from the paper tape into the crossbar storage. Stepping switch SS45 is used to sequentially select the proper select coils and hold coils for these 140 insertions. Inasmuch as it is impossible to secure a stepping switch with 140 positions around its periphery, stepping switch SS45 is used to choose which of three sets of 52 position levels of stepping switch SS45 should be used at a given time. This switching between levels of stepping switch SS45 is accomplished when the switch passes through its "home" position as it rotates under command of relay K110G. In summary, stepping switch SS45 steps once for every character to be inserted into the crossbar storage and stepping switch SS44 steps once more for every time stepping switch SS45 passes through its home position.

The circuitry for advancing stepping switch SS45 through its home position and advancing stepping switch SS44 one position occurs when the ground from the selector operation switch passes through the "off-normal" contacts of stepping switch SS45 which are closed when the switch has passed into its "home" position. This ground energizes the coil of stepping switch SS45 through its interrupter contacts. When the coil of stepping switch SS45 is fully energized, its interrupter contacts open to remove the voltage on the coil thereby causing the switch to self-stop to the position past its home position. While momentarily in the home position, stepping switch SS45 provides ground through a similar "off-normal" contact to the coil of stepping switch SS44 thus energizing its coil. After stepping switch SS45 has passed through its home position, these two off-normal contacts are opened and this causes stepping switch SS44 to advance only one position and prevents stepping switch SS45 from self-stepping more than one position beyond its home position, see FIG. 68.

The array of contacts of the tape reader relays K110A–F comprises a first group (Set I) which are self-holding contacts depending on a contact of relay K110G for release, a second group (Set II) which will be more fully described hereinafter under the Test operation, and a third group (Set III) which is responsible for detecting the presence of a "stop" code (010000) and/or an "end" code (010001) tag on the paper tape frame being read, see FIG. 40. During the transfer of question information into the crossbar storage, these two codes are used to stop the paper tape drive. This is accomplished by providing a circuit that breaks the ground to relay H, if either of these two codes are present in the frame being read by the tape reader. Once relay H is de-energized, the start tape push button S1107 must be depressed to start the tape reader again. The "stop" and the "end" code binary representations are 010001 and 010000, respectively. During the test operation the third group of contacts will stop the tape only on a "stop" code and not on an "end" code tag. A fifth set of contacts (Set V) is used to detect the presence of "improper" or unused codes including the "blank" code 000000 and the "delete" code 111111. The general expressions for these improper and unusual codes are XX1111 and XX000X. In the case of reading one of these codes, the paper tape continues to run but the code is ignored by not providing ground to the select coils and not advancing the stepping switches. The fourth set (Set IV) of the tape reader relay contacts serves to detect the presence of the "space" code (100000). The occurrence of this code results in skipping a storage position in the crossbar storage system, the tape continuing to run and the stepping switches being advanced, but the select coils are not energized. The sixth set (Set VI) of contacts determines the directions of actuation for the individual select rods when insertions are to be made into the crossbars.

*Manual Insertion of Data*

Figure 39:
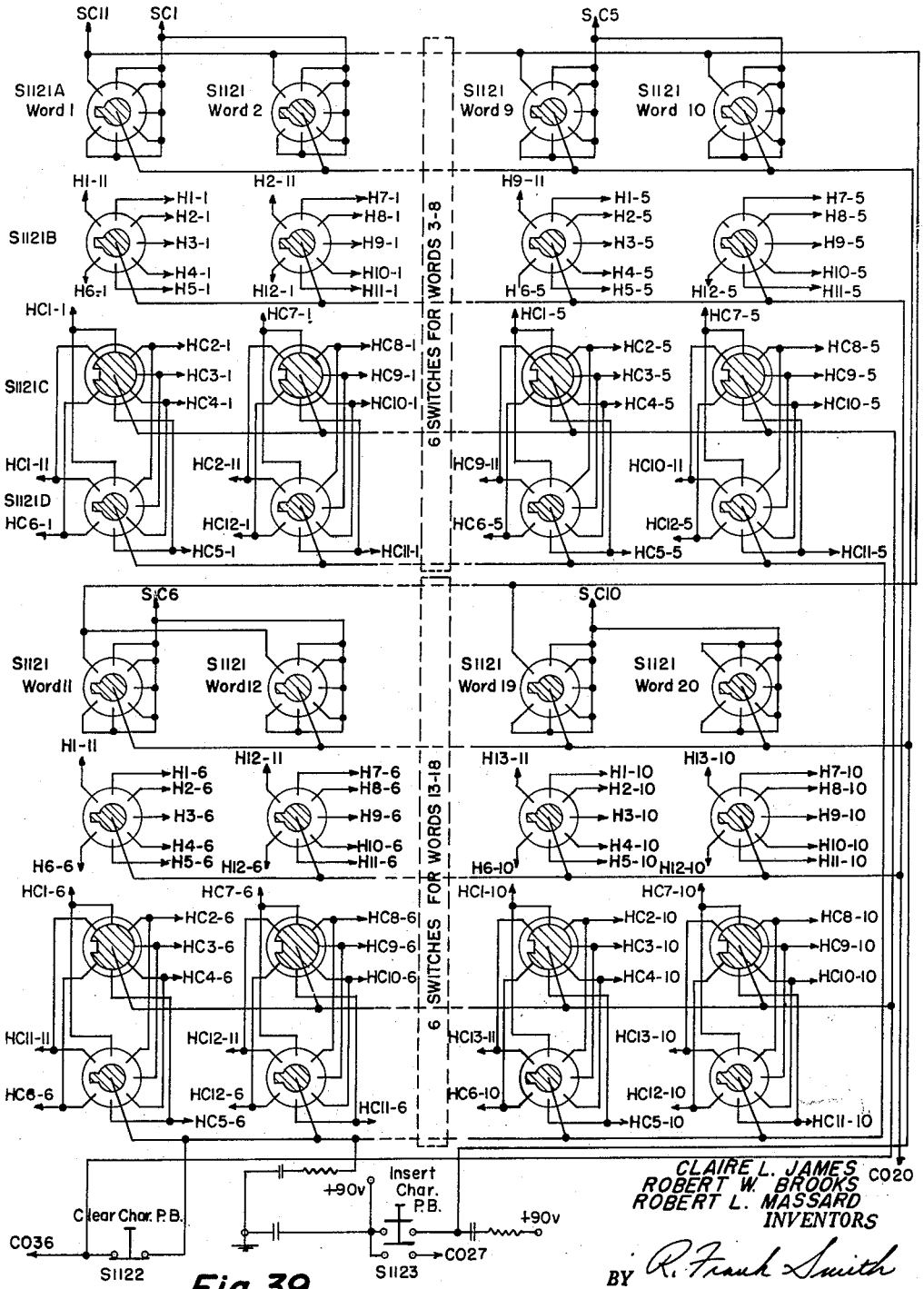
Figures 67, 68:
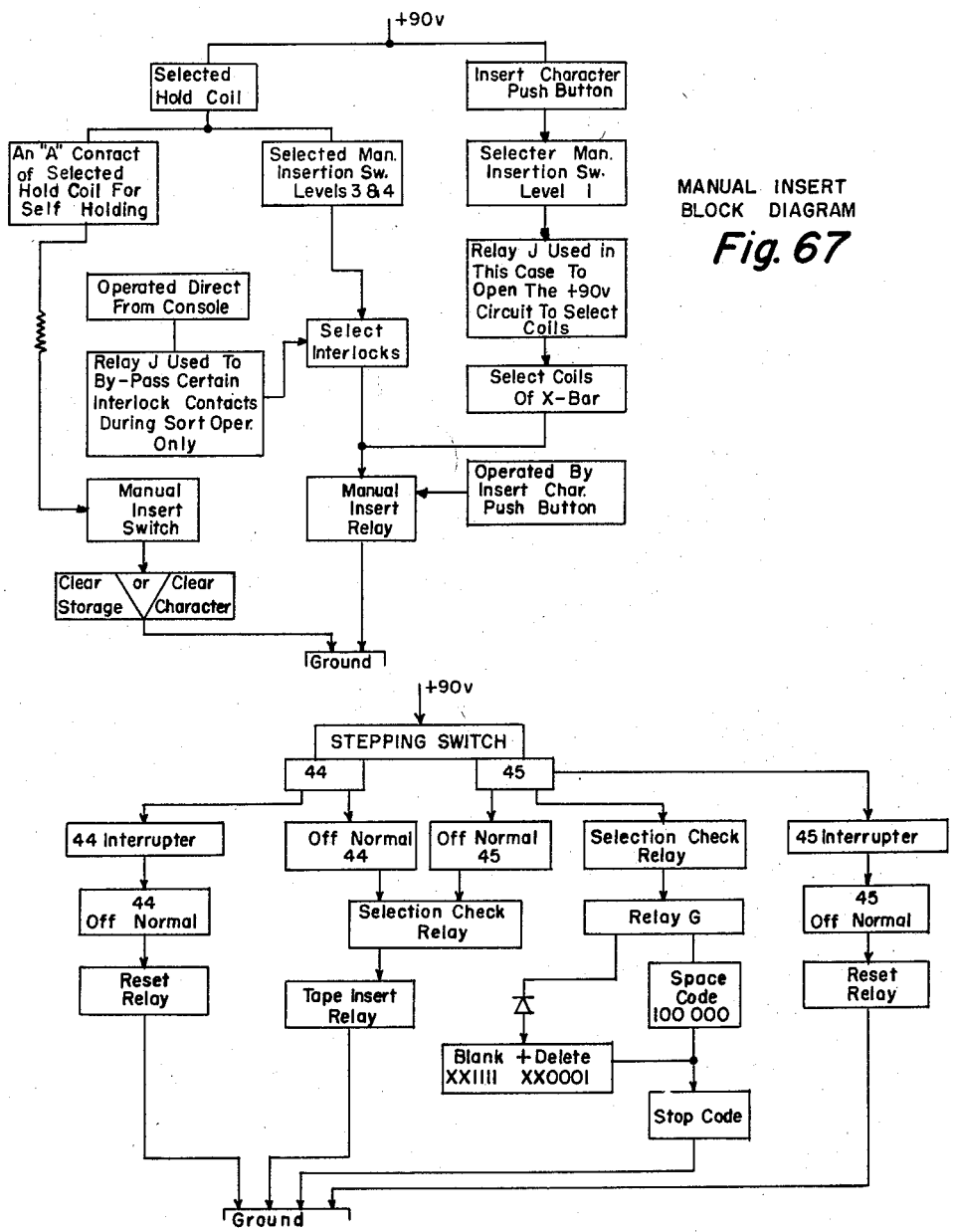
Figure 69:
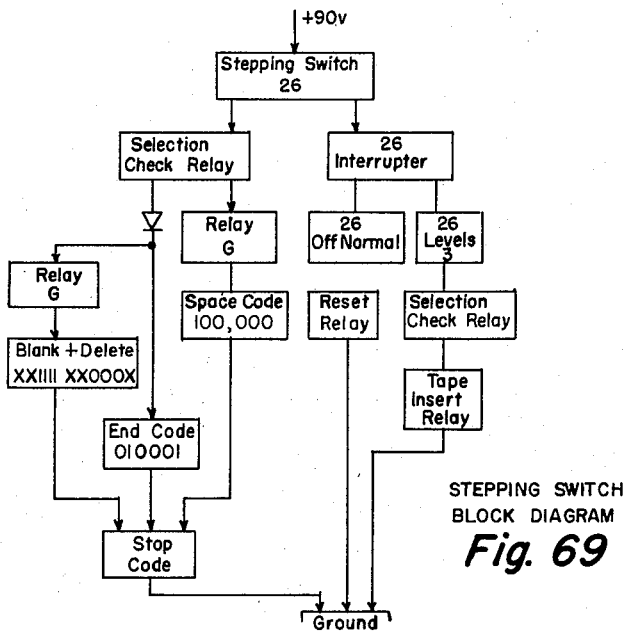
Figure 70:
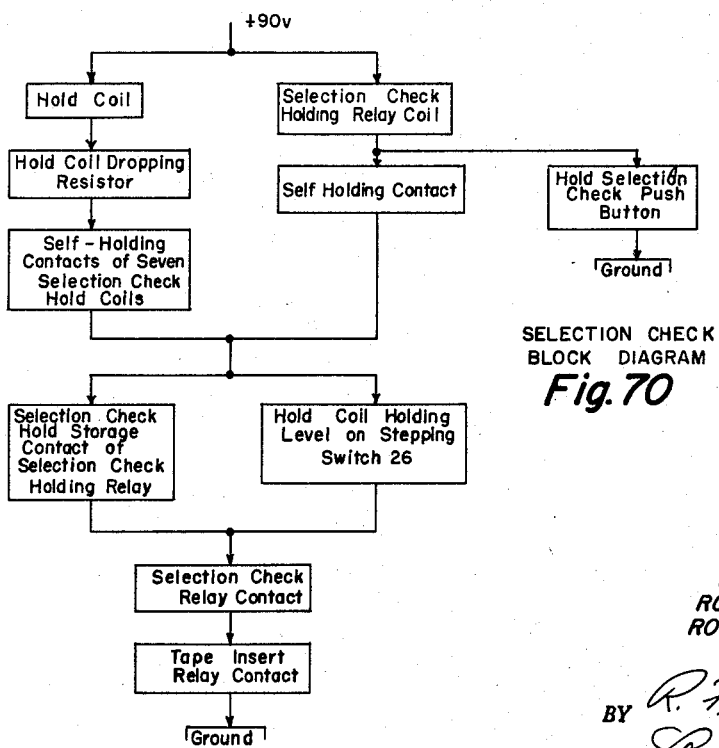

The philosophy employed in the design of the manual information insertion system for the crossbar storage system is that 20 switches S1121 are available for altering the contents of the 20 words stored in the crossbar storage system, see FIGS. 39 and 67. These switches serve in lieu of the stepping switch distribution system and provide a manual method of inserting or altering data in the crossbar storage. All manual insertion is accomplished by switches on the programmer only.

Manual insertion of data is preceded by first positioning the input switch S1105 on the console to the "reset" position to insure that all stepping switches are returned to their home position thereby avoiding any sneak circuits that might arise when the manual insertion switches are employed. Next, the input switch S1105 is set in the "normal" position.

The manual insertion toggle switches S1120A–F of the programmer are set up to represent the character that the operator desires to store in the crossbar system. The proper word-manual insetrion switch S1121 is positioned to the character that is to be replaced. The clear push button S1122 is then depressed to break the holding circuit for the appropriate hold coil and erase the former stored character. The insert character push button S1123 is depressed furnishing voltage to the desired select coils through the third level of the manual insert switch. After the select rods have been placed in the positions designated by the manual insertion toggle switches, the crossbar interlock contacts are closed to create a path from ground through level No. 3 of the appropriate manual insertion switch to the desired hold coil. The holding contacts associated with this coil operate and preserve the selection. It should be noted that one and only one character should be inserted at a time and after each manual insertion, all word switches must be returned to the zero positions.

*Transferring Information From Paper Tape*

Seven positions in crossbar No. 12 are used to accept (from punched paper tape) and to store seven characters which constitute a word and present them in parallel fashion to the programmer. In this way a full word of card information is simulated so that the plugboard connections and associated circuitry can be tested. The philosophy used is to read one character at a time from the paper tape, assemble these characters into a 7-character word and then present this word in parallel form to the phase inverters as if it had come from a card. After seven such characters have been transferred to the test crossbar they are sensed, discarded and replaced by the next seven characters appearing on the tape. At the conclusion of each transfer of seven characters, a timing pulse (test TC pulse) is generated which is used to instruct the programmer to sample this information. The end-of-phrase pulse is created during the test operation in the same manner as for selection by decoding the end-of-phrase identification character. This character must be accompanied by six other characters to make up a full word. The end-of-card signal is simulated in this operation by decoding the code and character in the paper tape relays K110A–F contacts set II and creating an end of card pulse for the programmer. When the character is encoumbered on the paper tape in the test operation, the paper tape is allowed to continue running but the stepping switch distribution system and the crossbar storage system do not respond to the presence of the character.

After the normal crossbar storage has been loaded from the paper tape for selection, the function switch S1111 on the console is then placed in its "test" position. The input switch S1105 is first placed in its "reset" position and then in its "load" position. The tape drive is started by depressing the start tape button S1107 and because of the test position of the function switch the signals which, during the selection operation, pass through the coil of stepping switch SS45, now pass through the coil of stepping switch SS26. Hence stepping switch SS45 and stepping switch SS44 are not advanced from their "home" position and thus play no role in the insertion of information into the test crossbar. On the other hand, stepping switch SS26 is advanced by the paper tape and used to insert the paper tape information into the first seven positions of crossbar 12 which is the test crossbar, see FIG. 69.

The function switch S1111 provides +90 v. to the select coil of crossbar No. 12 by energizing the selection check relay K101. These coils are grounded through the path which has been described for the ordinary insertion of information from the paper tape. When the select coils have fully moved into position, their interlocked contacts close and provide ground to level No. 1 of stepping switch SS26. Thus, the information on the paper tape is transferred to the first seven positions of crossbar No. 12.

When the seventh character is transferred to crossbar VB12, a contact associated with that particular hold coil closes and creates a test TC pulse, which simulates the card timing pulse. The pulse is used to sample the word in the crossbar and thus simulate the card word. At the conclusion of the transfer of the seventh character of each word, stepping switch SS26 steps itself through its unused positions, thereby clearing the seven storage positions and crossbar CB12 by breaking the path to ground from the proper hold coils. This action is necessary because it is desired to have a cleared test crossbar ready to accept more information. When it is desirable to simulate an end-of-phrase pulse, the character Q is added to the paper tape accompanied by six other characters to make up a full word. When it is desired to simulate an "end-of-card" pulse, the operator adds a single "end-of-code" character into the information on the paper tape. Ordinarily, this character halts the paper tape and does not step the stepping switch nor make a crossbar selection. However, in the test operation, the presence of an "end-of-code" character permits the tape to continue running but does not prevent the advancing of stepping switch SS26, and prevents the transfer of this character into crossbar CB12. This is accomplished by the function S1111 in the "test" position in conjunction with a diode in the set III contacts of the relays K110A–F to prevent ground from being presented to the coil of stepping switch SS26 or to the select coils of crossbar CB12. At the same time set II of the tape reader relay contacts provides a path from the negative voltage source to a pulse forming package that creates the simulated "end-of-card" pulse to the programmer. The test operation is concluded by a stop character on the paper tape, and this character halts the paper tape drive and prevents further advancing of stepping switch SS26. For testing purposes only, the test operation may be stopped on the last character of a word by energizing the selection check holding relay K120 on crossbar chassis CB13, the inserted word then remains stored in this crossbar. This relay K120 may be energized by pressing the hold selection check push button S1124 at any time the desired word is in the process of being stored. Having such a word stored makes it possible to compare this word with stored information of the crossbars at any desired time through the use of the TC push button (manual timing pulse). This condition may be released when the input switch S1105 is taken off the "load" position.

*Insertion of Data for Sort Operation*

For the sort operation the cards are scanned, a desired word in each card is interrogated, and as a result of this interrogation this card is placed in one of the ten hoppers. Each hopper accepts cards upon the receipt of the proper select pulse.

The particular word of interest on the card is specified by designating the identification character associated with it or by designating the first or second word in the fixed field. Sort word No. 1 or sort word No. 2 is chosen by placing the sort column switch C1102 on either of these two positions. When it is desired to designate the desired word with a particular identification character code, this character is manually inserted into the crossbar storage by means of a properly constituted paper tape. The stored information for the sort operation occupies 14 word positions in the storage. The first four word positions of the crossbar storage are not used because, as will be explained later, certain bit positions of each stored character are to be kept blank. These stored spaces render the first four word positions useless because of the nature of the comparison circuits; ten of the remaining sixteen word positions are used to store the digits 0 through 9. For example, one of these words, responsible for storing the digit 3 would be a proper identification character (except on sort 1 and sort 2) and six four-bit representations for the number 3.

Inasmuch as four bits are required to express any number 0 through 9, and since sorting may deal with alphabetical information as well as numerical, the philosophy is to store only the low-order four-bits of each character placed in these 10 words. Four other word-storage positions contain the four combinations of the high-order two-bits of each character. When it is desired to recognize a numerical character such as 4, the desired character is treated as a combination of the high-order bits "00" and the low-order bits of "0111." If an alphabetical character "A" were being sought, it would be the combination of high-order bits "01" and the low-order bits "0100." Thus, by the use of fourteen special characters on a standard tape, any one of forty characters can be created.

For sorting in columns 1 or 2 (sort 1 or sort 2), a paper tape is made up with a space character punched in each frame that corresponds to an identification character of the fourteen words being transferred into the crossbar storage. This allows recognition of words 1 or 2 on the card by counting, and the stored space provided the necessary agreement in the identification character position. If the operator desires to specify the location of the word on the card by means of identification characters (sort 3–10), a paper tape is made up for sorting on each separate column, each including the proper identification character for that column. The tape is then loaded into the crossbar storage as usual.

After designating, by sort column switch S1102 and by insertions of proper paper tape, which column on the card is of interest, the operator specifies which character of the word is to be interrogated during this run. This is accomplished by setting the sort character position switch S1103 to the appropriate character. This switch enables all the legs simulating successful comparisons on the word comparison gates except those associated with the desired character position and those associated with the identification character position. The sort character position switch S1103 therefore chooses which one of the six information character positions shall actually be compared with card data in the comparison circuits during this pass.

As noted before, it is necessary to create blank bit positions in the crossbar storage for this operation. This is accomplished by automatically disabling the proper select coils so that when the information is received from the paper tape some of it is deliberately omitted. The contacts of relay J accomplish this by breaking the path from +90 v. to specified select coils. With these select coils de-energized, their associated interlocked contacts will remain open and will prevent the hold coils from operating. This is circumvented by placing other contacts of relay J in the crossbar interlock contact array so that these open circuits are by-passed during this type of information insertion.

It shall now be explained how the unused word positions of the crossbar are kept from affecting the operation of the programmer. The strategy employed is to assume that during all operations, except Sort, an unused identification character storage position indicates an unused word position. It is also assumed that during all operations, except Sort, a "space" character would not be employed for an identification character. Hence, the identification character hold coils have contacts associated with them that serve to inhibit comparisons if the hold coil is not energized. In Sort, however, this inhibition is by-passed on fourteen of the word positions since it has been shown that advantage is taken of storing a "space" character in the identification character position of the crossbar.

Figure 41B:
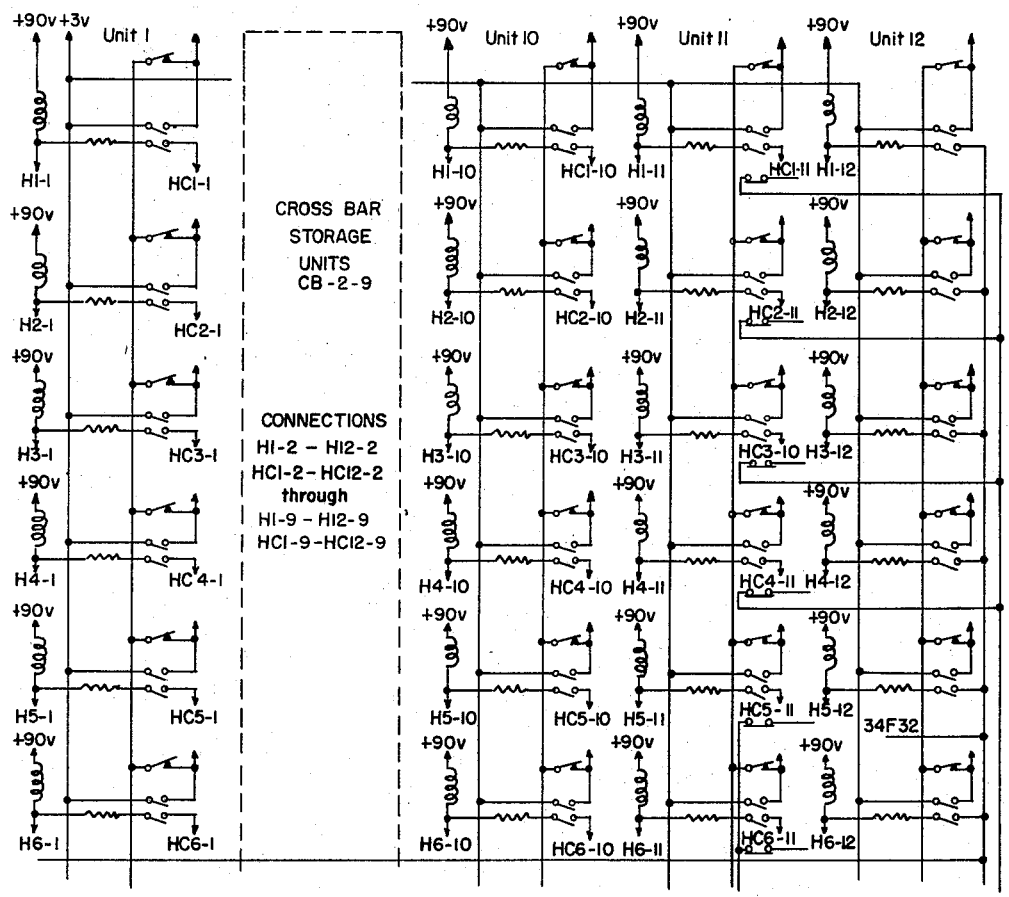
Figure 41C:
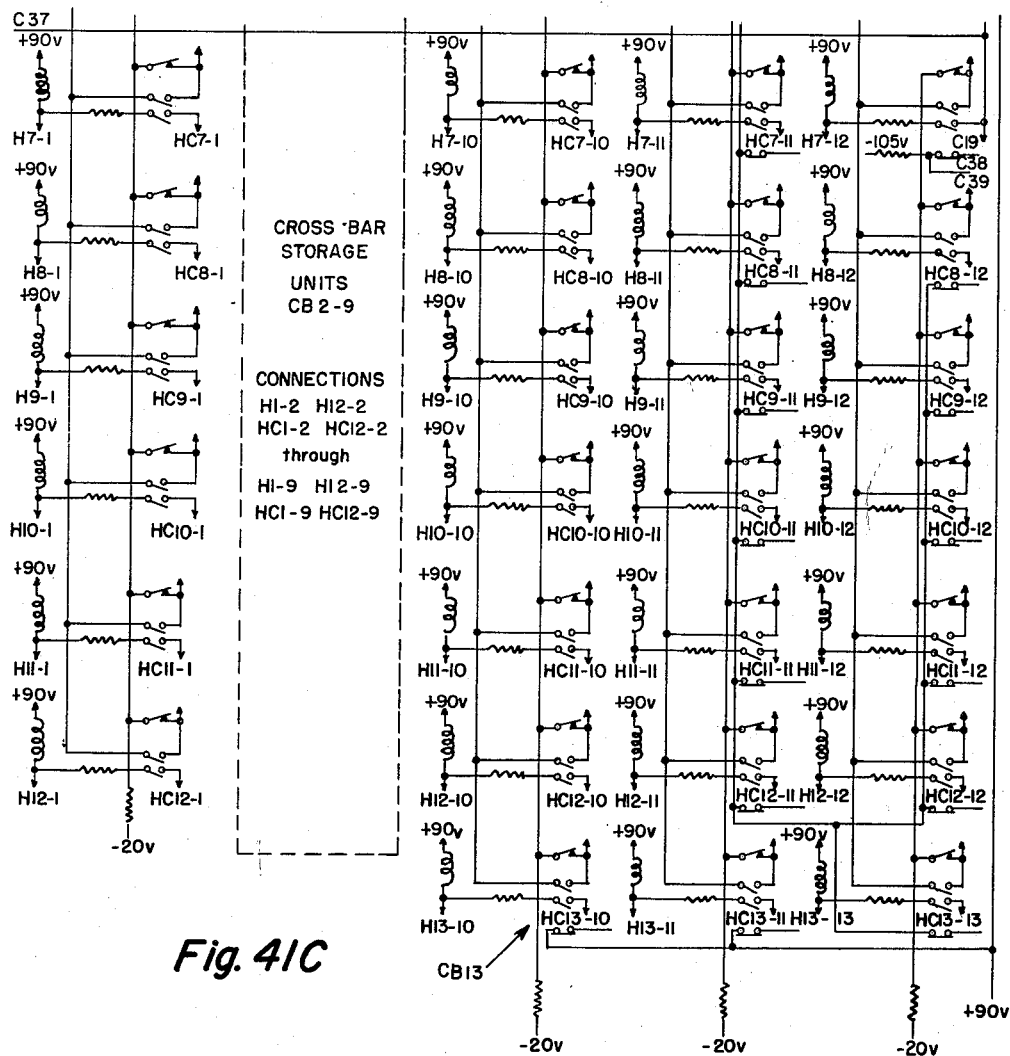

The crossbar hold contact connections will be explained with reference to FIGS. 41A–41C. The hold contacts associated with the first seven (test) positions of crossbar chassis CB13 are returned to ground via stepping switch SS26, so that the stepping switch has the ability to clear these positions by the insertion of test words. The seventh hold in crossbar chassis No. 13 also has a contact that closes to create a test TC pulse when that position is energized.

An identification character position that will play a role in sorting has its hold contacts returned to ground through the manual insertion switches S1121. It also has a normally closed contact that furnished one of two voltages to its associated comparison gate. If during the sort operation these contacts are closed, indicating a stored space in the identifictaion character position, then the associated comparison gates are enabled by the —20 v. If during the sort operation any of these contacts are open, then the associated gate is disabled by the lack of —20 v. If during a non-sort operation these contacts are closed, indicating an unused word position, then the associated comparison gates are disabled by the +3 v.

For identification character positions not used during sort, there is a normally closed contact which connects +3 v. to the associated comparison gate. If this position is not used, the voltage disables the gate and if this position is used, the absence of the +3 v. enables the gate.

The only remaining hold contacts requiring further explanation are the hold contacts associated with the information character positions of stored words 1 through 4. When one of these positions contains a space code, the gate associated with it is enabled by the application of —20 v. so as to by-pass a "serial" comparison chain. When one of these positions contains a valid character, the gate associated with it is disabled by the application of +3 v. The transfer contact formed by the "A" contact and "B" contact provide these voltages.

PAPER TAPE

The words for storage are punched on paper tape and the identification code and six remaining characters are normally immediately adjacent. The words are separated from each other either by a TAB character, a type space character, or a carriage return CR character. A character space CS character in any word will be reflected in the storage in such a way that a successful comparison will result for that character regardless of what data appears on the cards.

The words desired as a basis for selection are punched on the tape as described above. However, only 20 words are punched into the tape for a single run.

The special tape used for sorting has significant words in only 14 of the possible 20 positions. The ones used are positions 5-18 and the words on the tape are as follows:

| Word position: | Each character contains |
|---|---|
| 5 | 00XXXX |
| 6 | 01XXXX |
| 7 | 10XXXX |
| 8 | 11XXXX |
| 9 | XX0011 |
| 10 | XX0100 |
| 11 | XX0101 |
| 12 | XX0110 |
| 13 | XX0111 |
| 14 | XX1000 |
| 15 | XX1001 |
| 16 | XX1010 |
| 17 | XX1011 |
| 18 | XX1100 |

X indicates a successful comparison regardless of the value of that particular bit; that is, neither 0 nor 1 is scored. The particular character punched on the tape is arbitrary with respect to the bits marked X. Thus for word position 11, each character after the identification code could be any one of four characters, that is, 2, B, K, or S. The identification codes must be the same for each of words 5-18 on a given tape, except the tape for Columns 1 and 2. No identification code is punched for this tape, that is a character space (CS) is punched in its place. The tape is inserted in the tape reading station 31, see FIG. 1, and is read as described in the above patents, the information being stored in the crossbar storage system just described.

PLUGBOARD

Figure 43:
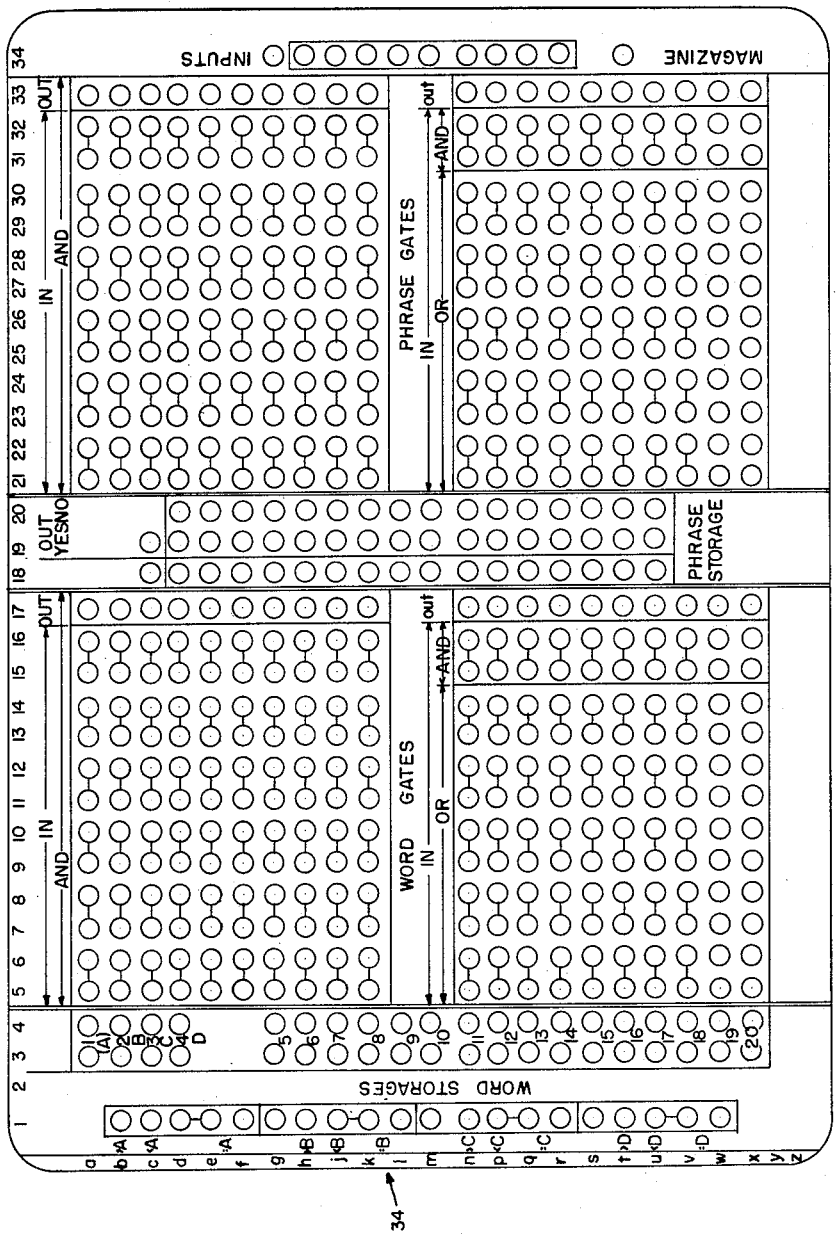
FIG. 43 is a detail view of the plugboard used in the programmer.
Figure 46:
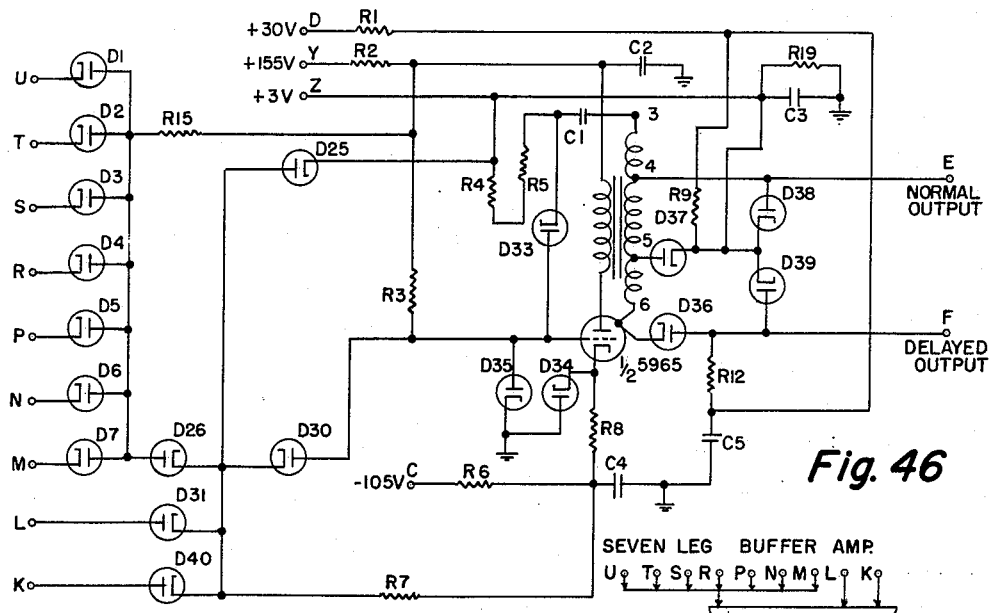
Figure 47:
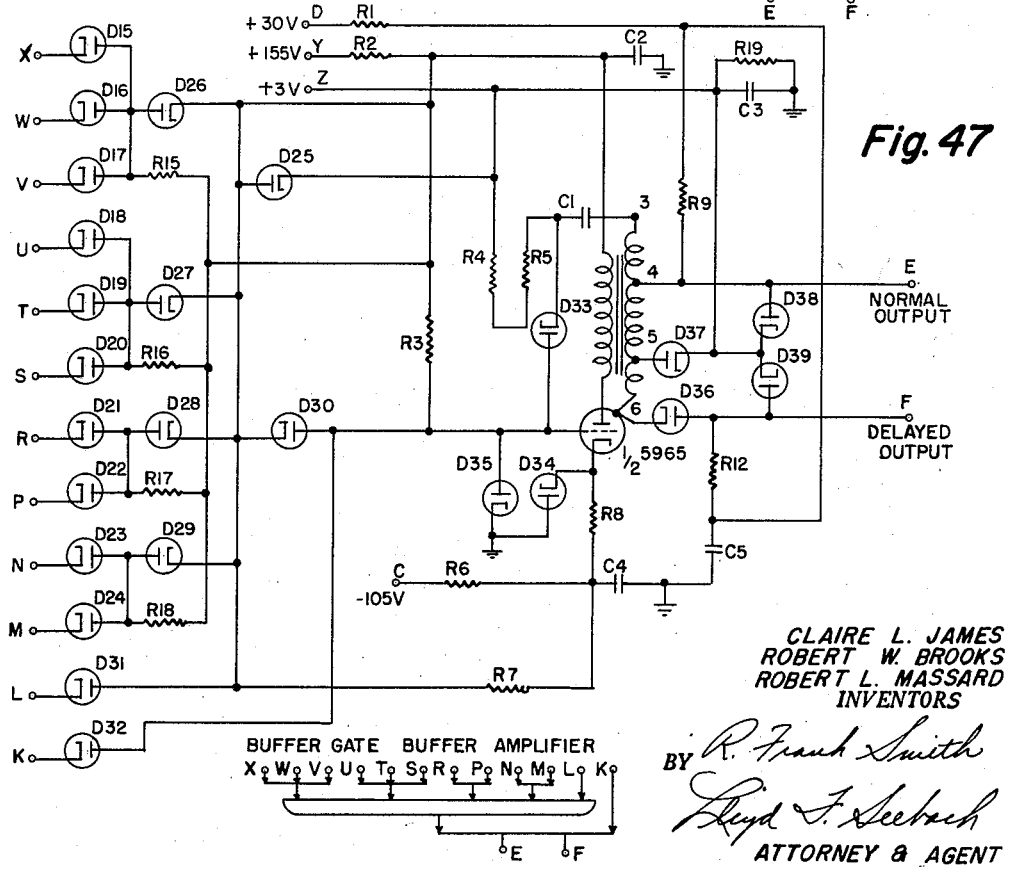

The plugboard 34 of the selector enables the operator to specify a large portion of the logical manipulations which the programmer performs in determining the proper disposition of a card or group of cards. These manipulations are specified by inserting wires into the various holes in the plugboard. In doing this, the operator effects electrical connections between the various circuits which are capable of performing the necessary operations. For the format of plugboard 34, reference should be made to FIG. 43.

Flip-flops are used for short-term storage of information on the selector. Generally speaking, these flip-flops have two inputs, a "set" and "reset" input, which are ordinarily pulses, and two outputs, designated as "1" and "0," respectively, which are continuous D.C. voltages. The flip-flop outputs can exist in either of two possible states, and it is convenient therefore to assign an algebraic variable to each flip-flop. WF1 will be used to represent word storage flip-flop No. 1, PF1 phrase storage flip-flop No. 1, etc. A further definition of these variables is that if WF1 equals "1," then the "1" output of word flip-flop No. 1 is energized and the "0" output unenergized. Similarly, if WF1 equals "0," the "1" output is unenergized and the "0" output is energized. Thus, WF1 equals "1" and WF1 equals "0" represents the two possible states of word flip-flop No. 1, and similarly WF2-WF20 and PF1-PF16. The relationship between the inputs and outputs of flip-flop may be stated as follows:

$$WF = S \ \overline{WF} + \overline{R} \ WF$$
$$WF = S \ WF(``0") + R \ WF(``1")$$

Wherein S is the "set" input and R the "reset" input. Thus, after a "set" input pulse, WF equals "1" until the next reset input, and after a "reset" input pulse, WF equals "0" until the next set input. To be strictly correct, there must be a slight delay between the specified state of WF on the left side of the equation and the appearance of its result in the outputs on the right.

For the 20 word flip-flops WF1-20, the "set" inputs are wired internally and consist of the outputs of the 20 word comparison circuits. The "reset" input to each word flip-flop is a pulse designated WR, which is wired internally in the programmer. The "1" and "0" outputs are brought out to the plugboard columns 3 and 4, where they are available for use elsewhere in the plugboard. The "set" inputs to the 16 phrase flip-flops PF1-16 are available on the plugboard column 18, and each of these flip-flops is reset by a SR pulse which is generated and wired internally. The "1" and "0" outputs of the phrase flip-flops are also available on the plugboard columns 19-20 for use in other circuits. PF1 connections are in row $e$, PF2 in row $f$, and so on, PF16 being in row $v$. The reset pulses WR and SR are described hereinafter.

There are 20 AND gates which have connections available on the plugboard, 10 word gates WG, and 10 phrase gates PG. The word AND gates are located in columns 5-17, rows $b$-$l$ and the phrase AND gates are in columns 21-33, rows $b$-$l$. Their inputs may be either pulses or continuous voltages, but their outputs are always pulses. The word AND gates are designated WG1, column $b$, WG2, column $c$, through WG10, column $l$ and the phrase AND gates PG1, column $b$, PG2, column $c$, through PG10, column $l$. The equation for an output from a word AND gate is:

$$WG = SW \ X1 \ X2 \ X3 \ X4 \ X5 \ X6$$

where X1, X2, X3, X4, X5, X6 are the six inputs which can be connected on the plugboard. X1 is in columns 5 and 6, X2 in columns 7 and 8, and so forth, X6 in columns 15 and 16. It is to be noted that a line between two holes on the plugboard overlay indicates that these two positions are connected together internally and are therefore equivalent. SW is a gate sensing pulse which is wired internally and is described hereinafter. It is significant that if one or more inputs are left disconnected, they are treated by the gate as though they were energized. Thus, if only the first three inputs were connected, the equation would become:

$$WG = SW \ X1 \ X2 \ X3 \ (1) \ (1) \ (1) \ \text{or}$$
$$WG = SW \ X1 \ X2 \ X3$$

The WG outputs are available on the pluboard column 17, rows $b$ through $l$.

The phrase AND gates are identical to the word AND gates with the exception that they are sensed by an SS pulse instead of SW. SS is also connected internally and the equation for the phrase AND gates is therefore: $PG = SS \ X1 \ X2 \ X3 \ X4 \ X5 \ X6$ where the X's again indicate plugboard inputs for the particular gate in question. X1 is in columns 21 and 22, X2 in columns 23 and 24, etc., X6 being in columns 31 and 32. Or, if the last three inputs were left unconnected: $PG = SS \ X1 \ X2 \ X3$. Note that if all inputs are left unconnected, an output will be produced whenever the gate is sensed. The PG outputs are available in column 33, rows $b$ through $l$.

There are also 10 word OR gates or buffers WB1, WB2, through WB10, and 10 phrase OR gates PB1, PB2, through PB10. The WB's are in columns 5-17, rows $p$ through $y$, and the PB's are in columns 21-33, rows $p$ through $y$.

For reference purposes, the inputs will be designated as X1 through X6, as in the case of WG's and PG's. These are not pure OR gates but have the following equation:

$$WB = SW\ (X1 + X3 + X4 + X5)X6$$

It is to be noted that the sixth input and SW are in the AND sense, and if any of the OR inputs are left unconnected, they are treated by the gate as being zero. Thus, if X2, X4 and X5 are not connected:

$$WB = SW\ (X1 + 0 + X3 + 0 + 0)X6$$
$$WB = SW\ (X1 + X3)X6$$

If all of the first five inputs are not connected, then:

$$WB = SW\ (0 + 0 + 0 + 0 + 0)X6$$
$$WB = SW\ (0)\ X6$$
$$WB = 0$$

Therefore, an output cannot occur. If X6 is left open, it is treated as a one so that in such a case:

$$WB = SW\ (X1 + X2 + X3 + X4 + X5)$$

If all the plugboard inputs are left open, no output can occur. The phrase OR gates are logically identical, with SS as the sensing pulse.

There are 20 word comparison circuits in the selector, one associated with each word position in the crossbar storage. The output of each comparison circuit is connected internally to the input of the corresponding word flip-flop. There are two types of word comparison circuits: inequality comparison circuits which are used for storage words Nos. 1, 2, 3, 4, and equality comparison circuits which are used with words No. 5 through 20; the latter, being simpler, will be described first. The equality word comparison circuits for words 5–20 compares every card word read with the word stored in that particular section of the crossbar. In order for the comparison circuit to produce an output pulse, a card word must agree with the stored word in all bit positions which are stored. Bit positions which are not stored will act as though a successful comparison has been made regardless of the value of the card word in those bit positions. The outputs of word comparison circuits 5 through 20 constitute the set inputs to word flip-flops WF5–20 respectively. These are wired inside the programmer so that the entire comparison circuits are internal.

Each of the inequality word comparison circuits for words 1–4, and its associated flip-flop WF1–4, is capable of performing five different types of comparison of the card words with the corresponding stored words. Which of these types is performed is determined by the plugboard connections in column 1. The connections in column 1, rows c through g, determine the type of comparison for word No. 1; rows h through m for word No. 2; rows n through s for word No. 3; and rows t through x for word No. 4. The connections on each of these sections of the plugboard affect both the comparison circuit and the word flip-flop. The result of the five types of comparison as reflected in the word flip-flop are described below. In all cases, the first tag character is compared in an equality sense. Wherever "greater than" or "less than" comparisons are performed, they apply only to the six characters following the tag. If a character space CS is stored in any character position, the comparison circuit will act as though exact equality with the card word existed for that character not "greater than" or "less than."

For equality 1f is connected to 1g and when W1 receives a "set" input, the card word is equal to the stored word for each character stored. W1 receives a "reset" input whenever WR is present. For "greater than," 1c is connected to 1g. In this case, W1 receives a "set" input when the card word tag is equal to the stored tag and card word characters 2–7 are greater than the stored word. W1 receives a "rest" input when WR is present. "Equal to" or "greater than" is obtained by plugging 1c to 1e to 1f to 1g. W1 receives a "set" input when the card word is equal to the stored word or the card word is greater than the stored word, the tags being equal. W1 receives a "reset" input when WR is present.

For "less than" 1d is plugged to 1g and WF1 receives a "set" input when WR is present. W1 receives a "reset" input when the card word is equal to the stored word or the card word is greater than the stored word in the same sense as in "greater than."

"Equal to" or "less than" is obtained by plugging 1d to 1e and 1f to 1g. WF1 then receives a "set" input when WR is present and receives a "reset" input when the card word is greater than the stored word in the same sense as in the case of "greater than." A sixth possible case which would be "greater than" or "less than" cannot be specified correctly but can be effected by specifying equality and using the W1 outputs as though they were interchanged, that is, the "0" output will be energized when the crossbar storage is utilized.

Another storage word with character spaces in all positions except the tag position should also be specified in the "and" sense to insure that at least one word in that category is present. If no connections are made in column 1 for one of these comparison circuits, its word flip-flop will be reset by WR but will never receive a set input.

In each of the above five cases, if a card word with the proper tag is not read, the word flip-flop will remain in the state in which WR leaves it, that is, "0" for "equality" "greater than and equal to" or "greater than." Similarly, the word flop will remain in the "1" state for "less than or equal to" or "less than." Thus, in the latter instance the absence of the tag produces the same result as presence of the tag and the "less-than" or "equal-to or less-than" relationship of the remaining characters. Inequality comparisons are always in the binary sense with the most significant bit of a column being that adjacent to the timing mark. The bits are in order of their significance, thus by referring to the code structure the following represents a case of inequality as indicated.

$$S\emptyset\emptyset\emptyset\emptyset 24 > S\emptyset\emptyset\emptyset\emptyset 19$$

or in binary code:

(110101) (000011) (000011) (000011) (000011)
(000101) (000111)>(110101) (000011) (000011)
  (000011) (000011) (000100) (001100)

The alphabetic characters have values greater than numerics because of their first two bits.

$$A > 4\ \text{since}\ 010100 > 000111.$$

Similarly:

$N > I$   (101000)>(011100)
$P > N$   (101010)>(101000)
$Z > R$   (111100)>(101100)
$/ > I$ etc.  (100011)>(011100)

The hopper inputs on the plugboard are connected to the inputs of the circuits which drive the ten receiving hopper plunger solenoids. These inputs are designated S9, S8, S7 through S0 and are located in column 34, rows h through s, respectively. They receive pulses as inputs and if an input pulse occurs at the time of an E pulse, it will cause the plunger of the corresponding hopper to be actuated at a time such that a card at the reading station 32 at the time of the input pulse will have been moved by the belt 36 to a position underneath that hopper. It is important to remember that any hopper input pulse affects only the card which is being moved by the belt at such time as to be at the reading station when the hopper input pulse is generated. A card fed from the feed hopper 45 satisfies this condition once it has reached the read station as well as a card which is retracted from the transitory hopper 47–9 one machine cycle after the hopper input pulse. Since there is a delay of one cycle between the signal RS to retract a card from the transitory hopper 47–9 and the signal S for the actual retraction of the card, these signals RS and S signal must be generated at the same time in order to retract a card from the transitory hopper 47–9 and deposit it in one of the other hoppers. The signals which affect the plunger solenoids L700–710 are not in all cases identically equal to the pulse appearing at the corresponding hopper inputs. Equations for the solenoid actuating signals are as follows:

| Plunger Solenoids: | Delay, cycles |
|---|---|
| 0=S0 | 10 |
| 1=S1 | 9 |
| 2=S2 | 8 |
| 3=S3 | 7 |
| 4=S4 | 6 |
| 5=S5 | 5 |
| 6=S6 | 4 |
| 7=S7 | 3 |
| 8=S8+Dcr+Dn | 2 |
| 9=S9+R+RS | 1 |

For retracting a card from the transitory hopper No. 9, vacuum must be ported to this plunger in addition to actuating it; that is, No. 9=RS (delayed 1 cycle).

The plugboard at column 34, row $u$ is the input to the GR indicator circuit. The equation for the input to this circuit is:

$$Gr = Sgr + (\text{Sel. Fn.})$$

where $Sgr$ is the plugboard input.

The sort pass outputs L0 and H0 are located in row $d$, columns 18 and 19, respectively. They are normally used in the sort function to distinguish between numeric and zone passes. L0 is energized continuously when the sort pass switch S1104 is turned to numeric and H0 is energized when this switch is returned to zone. The wiring of the sort plug board utilizes these switch outputs.

PACKAGE CIRCUITS

Several different types of logical (germanium diodes and twin triode tubes) circuits are used in the programmer. All of these circuits are on etched circuit cards which plug into sockets and have tubes external to the circuit. The first group includes packages I, II, III, and IV, FIGS. 44–47, which include half a dual triode for various logical inputs using germanium diodes and produces both a normal and a delayed output pulse, each of the output pulses being capable of driving several loads. The packages V and VI, FIGS. 48 and 49, have no amplifiers and consist of germanium diode logic. Package VII, FIG. 50, requires that two such packages be used to provide a bistable element consisting of two dual triodes making up an Eccles Jordan flip-flop and two cathode followers with direct-coupled outputs. Package VIII, FIG. 51, is a phase inverter comprising one dual triode which produces a normal and an inverted output from a square-wave type input. Packages IX and X, FIGS. 52 and 53, contain circuits for three cathode followers (no tube) and a circuit for a neon pulser unit, respectively, the latter circuits converting a bouncing, noisy relay closure to a single, clean pulse.

The types of signals used in the packages are negative going, +3 v. pulse being a "zero" or absence of a signal and a −10 v. or more pulse being a "one" or presence of a signal. The normal and delaying outputs from the regenerative pulse amplifiers are pulses with a +3 v. base line, a negative excursion to −12 v. or more, and a width of 15 to 25 microseconds. Negative pulses are used for compatability with the flip-flop input requirements. The flip-flop signals are direct-coupled outputs from cathode followers, one side being at +3 v. and the other side at −12 v. or more. The phase inverter signals are cathode outputs for both normal and inverted signals with a base line at +3 v. and a square-wave type output signal of a −10 v. or more. The neon pulse unit gives a single −10 v. pulse of 15 microseconds width. Packages V, VI, and IX are used exclusively with the crossbar storage for comparison of card and stored information.

The two basic types of logic used in the programmer are AND functions and OR functions. Additional system elements include time delays and storage or "remembering" devices. The AND function is also referred to as an AND gate or simply "gate" and specifies that signals must be present on all AND inputs at any particular moment in order to accomplish a desired result. For example, function D is accomplished only if signals of functions A, B, and C occur at the same time. The OR function is also referred to as an OR gate or "buffer" or "mixer" and specifies that any signal on any one of the OR inputs must be present at a particular moment to accomplish a desired result. For example, function X is accomplished if any of the signals S, Y, or Z occur. The physical implication of the AND function may be accomplished by the use of diode structures, tube structures, or relay contacts in series. Likewise, the OR function may be implemented with diode structures, tube structures or relay contacts in parallel. Obviously, combinations of contacts, tubes, and diodes may also be used to accomplish the same result.

Time delays in the programmer circuits are accomplished by having a delayed pulse available from packages I, II, III, and IV, as well as using flip-flop storage to remember that a pulse occurred, and then later sensing it for this information. Flip-flop sides are designated, set (1) and reset (0) sides, the set side being activated by pulsing with a negative pulse which causes the set D.C. output to be activated (negatively). The delayed output from the regenerative pulse amplifier packages is actually the inverted transformer overshoot which inherently occurs after the normal output pulse has occurred. This particular delay structure is described in detail in U.S. Patent 2,899,553.

Whenever the machine logic requires less than the full number of inputs available on a package, special rules have to be followed due to the way in which the logic is implemented. Unused OR inputs need not be connected to any signal source unless they, in turn, are followed by AND legs. In this case, each AND leg must be energized by one of the preceding OR legs. Unused AND inputs need not be connected if the AND gate involved has at least one leg with an OR leg preceding it, or if one of the unused AND legs is attached to a pulse source. Otherwise, at least one AND leg must be connected to +3 v. With respect to the inputs for the amplifier packages and flip-flop packages at least one input on each AND gate must be a pulse and pin K on packages I, II, II, and IV and pin J on package VII must be activated by a pulse.

With reference to FIGS. 44–47 which disclose packages I, II, III, and IV, a logical circuit description of package IV is considered to be representative of each of the four mentioned packages. The tube, one-half of a 5965 twin triode, is normally "on" and drawing current. The cathode return resistor limits the tube current and since the grid is at +.3 v. with respect to ground, the cathode biases itself somewhere between +0.8 v. and +2.5 v. with respect to ground. If the grid is pulsed with a negative input, the cathode follows the grid downward until diode D34 (which is normally reverse biased) prevents the tube cathode from going much below ground. The grid continues in a negative direction past the cut-off point of the tube and before the cathode is stopped at ground by diode D34, the tube current changes very little, thereby resulting in no output and, thus, obviating noise appearing on the grid in the manner of a tube biased beyond cut-off. The regeneration path is from the transformer secondary through C1 and through D33 to the grid. D33 is normally reverse biased by about 3 v. to cut out noise and the regeneration has three effects: less input power is required to trigger the amplifier, the rise times are enhanced and the regeneration determines the width of the output pulse. The latter effect comes about, if the input pulse is narrower than the output, because the capacitor C1 with resistors R4 and R5 form a peaking network giving a more rapid decay than the transformer. Thus, this network rather than the transformer determines the width of the output pulse. If the input pulse is wide (of greater duration) than the output, the regeneration does not determine the pulse width but the decay of the transformer does. The transformer is critically damped to prevent oscillations and extra overshoots on the output. The output circuit is a form of a "full wave" distribution wherein the normal (negative going) pulse is distributed to the normal output (pin E) and the transformer overshoot is distributed to the delayed output (pin F). The diodes in series with the outputs select the proper polarity and the normal pulse, therefore, appears at pin E with the inverted overshoot or delayed pulse appearing at pin F. The overshoot pulse cannot appear at pin E because of diode D38 and it appears positively at pin F, and negatively at pins 5 and 6. The ground or reference point for the normal pulse is pin 5 but the reference point for the delayed pulse is pin 4, thereby giving more delayed pulse voltage output between pins 4 and 6. Diode D36 permits passage of the negative going delayed pulse whereas diode D37 does not.

The AND circuit connected to the cathode of the OR diode D30 is as follows: with no signals present, the AND output (cathodes of D26, D27 and D31) is held at 3.2 v. due to current flowing through the AND diodes from a positive source and thence through the clamp diode D25, through R7 and through the reverse resistance of D30. If pin L is not connected to a source, it may be disregarded because its plate will be floating and, in any case, since OR circuits precede them, D26–D29 must be activated negatively at the same moment to cause a pulse output from the AND circuit on the cathode of D30. The OR circuit connected to the plate of D26 with no signals present causes a current flow through R15, D26, and R7, D25 preventing the cathode of D26 from rising above +3 v. As mentioned above, packages I, II, and III operate in a similar fashion.

Package V, FIG. 48, consists of several two-leg AND structures in which R1 and R2 are different in value because they drive different loads. R2, in addition to the leg output pin E, drives the OR diode D5 and out through pin F. In the programmer, pins F, N, and V of two separate packages are tied together to form an OR circuit for detecting "greater than" (card vs. storage) for one character. The two-leg AND outputs (pins A, E, H, and M) each drive a following AND leg through a crossbar contact. This creates a logic structure which has a different load or noise current for the different legs in the series string.

Package VI, FIGS. 49, 57 and 58, is used purely for equality sensing; that is, card signals vs. cross-bar storage. Pins A, C, E, H, K, L, and M are normal AND leg inputs. A card pulse M1 and a stored pulse S1 result in a pulse to one of the AND legs and a card pulse $\overline{M1}$ and a stored zero ($\overline{S1}$) result in a pulse to the same AND leg. The seventh AND leg (pin M) is connected to timing pulses which determine whether or not the AND gate is to be sensed. Pin U is a special AND leg, which is normally held energized (plate of D10 at −50 v.). When it is desired to disable the AND gate completely, pin U is returned to +3 v. This is the case when nothing is being stored in a particular crossbar character position. AND gate returns R2, R1 and R3 are used in two combinations, R2 being the normal return for the AND output pin N. If the output is to drive a cathode follower, R2 is connected to −100 v. and if the output is to be in combination with the other outputs to form a two-level 42-leg gate, then R1 and R3 are both returned to −100 v. (pin T). In this latter case, pin N is not used as the output but instead pin R is used via the second level and diode D9. This second level gate can be constructed by connecting several R pins together. The diodes D9 in the several packages form the AND legs of the composite gate and the resistors R3 in parallel form the return. The output of the second level is then the several R pins which have been tied together. In the programmer, recognition of the identification character of each stored word uses one of the packages VI with the N output. Recognition of card and stored equality of the last six characters for each of sixteen stored words is accomplished by using the two level AND structure.

The type VII packages, FIG. 50, are used in pairs and when so used, comprise a bistable, regenerative-feedback, direct-coupled circuit which, when properly distributed, will change state. If tube V1 is conducting and a negative pulse is introduced to the grid, the tube will then be cut off momentarily and its plate voltage will rise. This rising action is directly coupled to the grid of tube V2 by the voltage divider comprising R8 and R9 and causes tube V2 to conduct. This results in lowering the plate voltage of V2 which is directly coupled back to the grid of V1. V1 is then stably held cut off and the trigger pulse may be removed, thereby leaving the flip-flop circuit in its second stable state. A negative pulse applied to the grid of V2 will then reverse the action. The cross-coupling capacitors C1 serve the purpose of momentarily coupling changes in plate voltage to the opposite grid, thus enhancing the triggering action. This interval during which the changes in plate voltage occur serves as a short term memory which is useful when both grids are pulsed negatively at the same moment (binary pulsed). If the binary pulse is too wide; that is, of too great a duration, the memory capacitors discharge and the flip-flop settles into its favorite state since the two sides are never alike because of inherent tolerances. Any conduction path from the grids to ground decrease the voltage available at the grids and because of this, the diode D8 is inserted between the logic and the grid. In order not to burden the flip-flop with external loads, the cathode followers and input resistors R10 and R11 are used to direct-couple the outputs to loads. R7 and NE2 on each side of the flip-flop give an indication of the state of the flip-flop and a glowing indicator shows that a signal is available from that side of the flip-flop. The microswitch SW1 and R6 form a means of forcing the flip-flop into that particular state upon actuation of said switch. The cathode followers each have a peaking transformer in their plate circuits which derive a pulse from the proper D.C. voltage change from the flip-flop, thereby providing pulses for external loads in addition to the normal direct-coupled output. Pin Z is used as a normal pulse output and pin X is used as a special pulse output. Several of pins X can be connected together to form an OR circuit as in the duplicate card rejection operation to be described hereinafter. It must be remembered that if neither pin N nor pin P or if neither pin T nor pin U is connected to a pulse or flip-flop source, one of either of such pair must be connected to +3 v. Otherwise, the two-leg AND output will constantly energize the flip-flop on that particular side.

The phase inverter package VIII, FIG. 51, uses a single twin triode 5965 in which the first half is a combination inverter amplifier and cathode follower and the second half is a cathode follower output derived from the plate of the first stage. If no signal is present, input pin K is essentially at ground and the first stage gives an assertion output level (pin C) of +3 v. to +5 v. The second stage grid is biased down to −16 v. by the action of the diode D4 and resistor R11. Thus without an input signal, the second stage negation output (pin E) level is at about a −14 v. An input signal of at least −25 v. will cut off the first stage as the cathode output (pin C) is stopped at −16 v. by diode D1. The second stage grid is raised by the first stage plate action to +3 v. and limited by diode D3 and resistor R10. Thus, the second stage output level becomes about +5 v. during a signal and the outputs have essentially exchanged levels to give a normal and inverted output for a single input. During a signal, a discharge of capacitor C5 limits the allowable duration of the input signal. The resistors R15, R3 and R18 are returns for holding two or four OR legs on packages I stabilized at +3 v. The resistors R17, R2 and R4 provide a means for energizing OR legs on the amplifier packages I from various switches (POS. or NEG. card switch, SORT, etc.).

Package IX, FIG. 52, contains circuitry for three half-dual-triodes which are utilized as cathode followers. The output are capacity-coupled and the resistors R2, R3, and R8 are combined with diodes D1, D2, and D3 to stabilize the outputs at a +3 v.

Package X, FIG. 53, is a pulse forming a neon circuit whose normal output is +3 v. which does not permit the neon to fire. However, if −100 v. is placed (by a switch or relay contact) on pin H, the neon lamp NE2 fires and a single pulse of −15 v. appears at pin F. The circuit will not produce another pulse by this action until it has fully recovered. External to the package and preceding the neon bulb, an RC filter circuit is used to reduce relay bounce, noise, etc.

OPERATION—SELECTION

In the following detailed descriptions of each operation in connection with FIGS. 54–63, the circuits are traced through the programmer logic and certain actions which are common to two or more operations are explained in detail only for the first operation in which they occur and are merely summarized in any subsequent operation.

The Selection operation provides the means of selecting from a group or library of cards only those cards which contain information of a specified nature or category.

These words are punched into a paper tape and read into the 20-word programmer storage where they are combined into the required question statements by plugboard interconnections which also determine the nature of comparison; that is, equality or either type of inequality to be made between the card words and the words stored in the first four-word storage positions. Comparisons with the remaining sixteen word-storage positions are always for equality.

After the storage has been loaded with the required words from the paper tape, cards are fed past scanner 41 and an entire forty-two bit word comprising seven six-bit characters is delivered by the scanner at one time for comparison with each of the stored words simultaneously. If a successful comparison is made with any stored words, this fact is remembered by a word flip-flop associated with that word storage position until the end of the phrase in which the card word appeared. At this time, the plugboard word gates are sensed to determine whether all of the successful word comparisons required to satisfy a complete phrase of the question have been satisfied. If a successful phrase comparison has been made, this fact is remembered by a flip-flop and in any case, the word flip-flops are all reset in preparation for the words in the next card phrase.

When the end of the card or the last card in a multiple card group is reached, the phrase flip-flops are sensed to determine whether one of the desired combinations of successful phrase comparisons has been made and, therefore, whether a select pulse should be delivered to the card handling mechanism. The select signal, if produced, routes the card to the proper select hopper and if a select signal is not produced, a reject signal from the programmer routes the card to the transitory hopper. In the case of cards of a multiple group, the leading cards are always sent to the transitory hopper 47–9 for the purpose of temporary storage and will be left there if a selection for the group does not result after the last card is scanned. A detailed description of the operation for selection is traced through the programmer logic hereinbelow.

In preparation for a Selection run, the crossbar storage is loaded from the punch paper tape, as described herein with respect to the crossbar storage. The plugboard 34 is inserted into the programmer 26 with the connections designating the desired logical words and specifying the hoppers into which selected cards are to be placed.

During the Selection and Test operations the following steps are common to both of these functions. The sort column and sort character position switches S1102 and S1103 must be turned to their off positions. The function switch S1111 in the upper righthand corner of the console control panel is turned to the selection (SEL) position and the input switch S1105 is then turned first to the reset position and then back to the normal position. The clear storage push button S1106 is depressed and the proper plugboard is inserted in the programmer. The input switch is now turned to the "load" position and the proper paper tape is inserted into the paper tape reader on the left side of the console directly behind the control panel. The start tape push button switch S1107 on the console panel is depressed and the belt direction switch S1109 is turned to "normal" (left position), see FIG. 10.

At this point the Selection and Test functions differ. For the Selection function the stick of cards is inserted into the feed hopper 45, the keeper removed, and the stick withdrawn from the hopper. The magazine is then lowered into position. After the tape has been loaded, the reset push button switch S1112 is depressed and then the start push button switch S1113 to start selection. The belt will continue to run until all cards have been exhausted from the feed hopper or until one of the receiving hoppers 47–0–9 is filled.

If cards from one or more hoppers are to be returned to the feed hopper 45, the belt direction switch S1109 is turned to "return" (right position). The return switch S1110 is turned to the number of the selector hopper or to the ascending or descending position as required. The reset push button switch S1112 is then depressed and the start push button switch S1113 is depressed and operation will commence. The pass S1104, return S1110 and duplicate preparation pass S1101 switches may be left in any position.

The punched paper tape may contain a maximum of 20 requested words. The desired logical relations between words are designated by connections on the plugboard 34 and different plugboard connections are normally needed for every selection. The hoppers to which selected documents will go, are designated on the plugboard. A phrase gate without any inputs may be used to deposit rejected documents with proper sequence numbers in one of hoppers 47–0–8. The selection may be on the basis of any words on the cards and the paper tape data must be read into storage. The standard controls must be operated and the selection error light I1105 indicates when cards within a document are out of sequence. An entire word is read at one time, the machine scanning from word to word. Card data is compared to the stored data and each word is compared simultaneously to all 20 storage words. The end of a phrase and sensing of word gates is done when either a Z or Q tags is encountered. The phrase gates are sensed and the core memory inputs energized at the end of the document. The feed signals are originated by the programmer and are interrupted when the transitory hopper is being emptied, after the last card of a multiple card document pending a decision as to whether or not the document is to be selected, under full hopper conditions, and when the stop button S1114 is depressed. In the last two conditions, feed signals are sent until the end of the document is reached at which time they are stopped immediately completely. Hopper No. 9 is used as a transitory hopper pending the reading of the last card and the selection decision for the document.

Selected documents will be deposited in hoppers 47–0–8 as selected on the plugboard connections and rejected documents will be deposited in hopper 47–9 unless otherwise directed on the plugboard. Documents within which the cards are not in sequential order will be deposited in hopper 47–9 and no cards should reach the terminal reject hopper 48. If a document satisfies the conditions as specified for more than one hopper it will be deposited in the hopper nearest the reading station 32.

Once the machine is set, that is, the storage filled and the cards loaded, selection is begun by depressing the start button S1113. The machine stops automatically when 15 feed signals have been received from the programmer but no cards have passed from the reading station. This may be the result of one of the following conditions; that is, the feed hopper is emptied, one of the receiving hoppers is full or the stop button S1114 has been depressed. In none of these cases are the cards of a multiple-card document separated from each other when the machine has stopped. The machine will stop immediately when the emergency stop button S1115 is depressed regardless of the position of the cards within a document.

Figure 55:
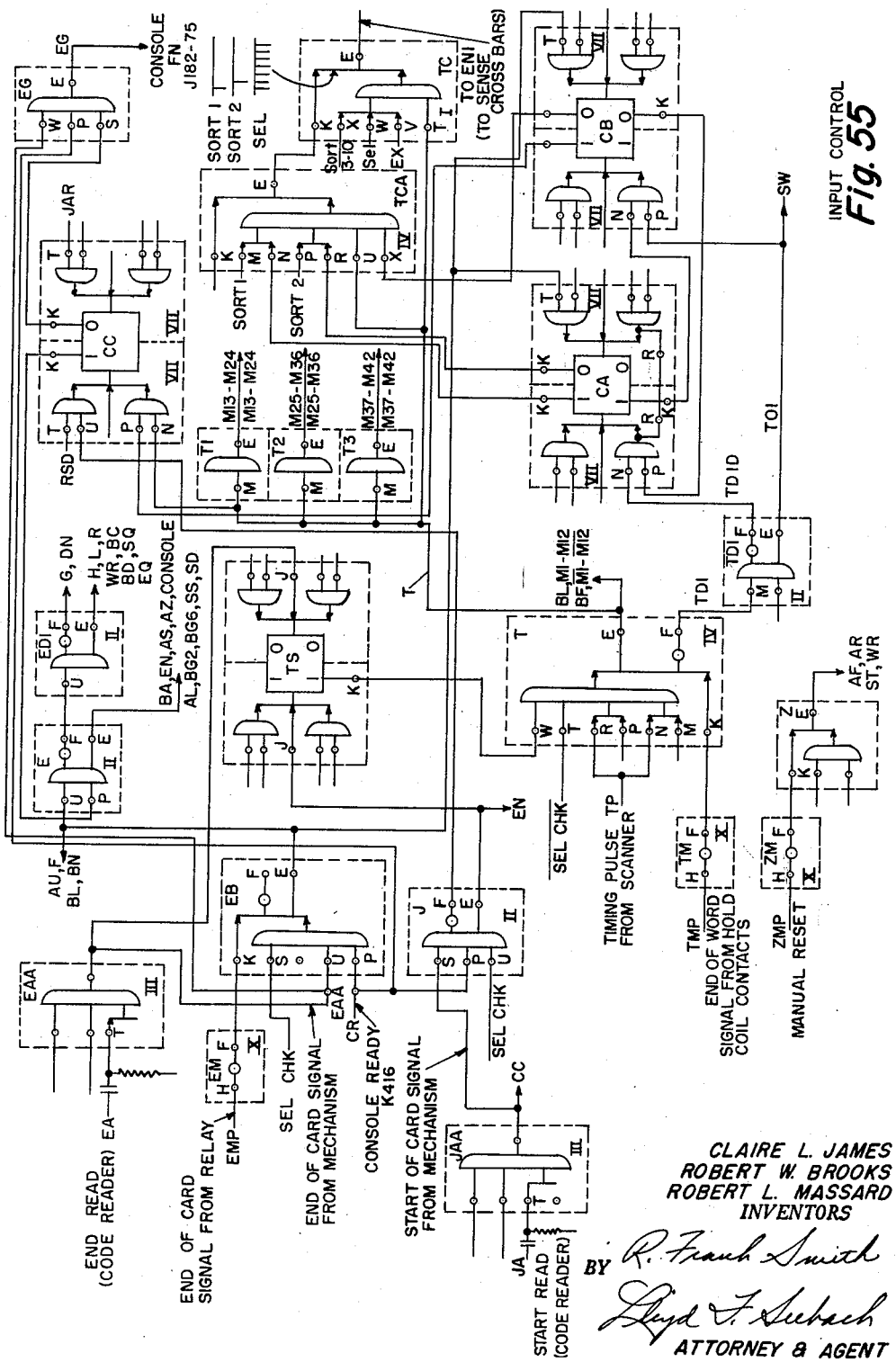
FIGS. 55 and 56 are electrical schematic views of the logic for the input control and card input circuits.

Actuation of the reset push button S1112 at the console creates the signal ZMP which is applied to a neon pulse generating circuit ZM to produce a single pulse ZM, see FIG. 55. This ZM signal is fed to a gate amplifier package to produce a standard pulse Z which feeds the functions AF, AR, ST, and WR to reset the programmer registers, plugboard circuits, and flip-flops. At the start of each card scan cycle, the programmer receives from the console a start-of-card scan signal JA, which is passed through a gate amplifier package JAA for pulse-shape standardization. JA is fed to the function J where it is gated against a console ready line which indicates when the belt mechanism is up to speed and card handling can start.

The J signal, indicating the start of a card scan cycle with proper conditions for card scan existing, is used to set flip-flop TS whose output enables the gate T. Each forty-two bit card word delivered by the console scanner to the programmer is accompanied by a sync or timing pulse which is designated TP as it enters the programmer. The signal TP is applied to a gate amplifier to produce the signal T if flip-flop TS is activated as described above. The signal T is amplified in functions T1, T2, and T3 to supply reshaping pulses to the card bit inputs, as described hereinafter. The output of T is also used directly in several other functions which will also be described hereinafter. The delayed output of T is amplified in the function TD1 for use both as a direct and a further delayed signal in other applications. The timing signal TP is, therefore, made available in three different phases or time relationships; namely, T, TD1, and TD1D, see FIG. 55.

The T pulses which accompany each card word entering the programmer for comparison with standard information will be used to sense the crossbar comparison circuits. However, the sensing is to take place only under the conditions applicable to the operation being performed. In this case for the Selection operation sensing is to take place for all card words and the T pulse, therefore, unconditionally generates the signal TC which is applied to the crossbar comparison circuits.

Figure 56:
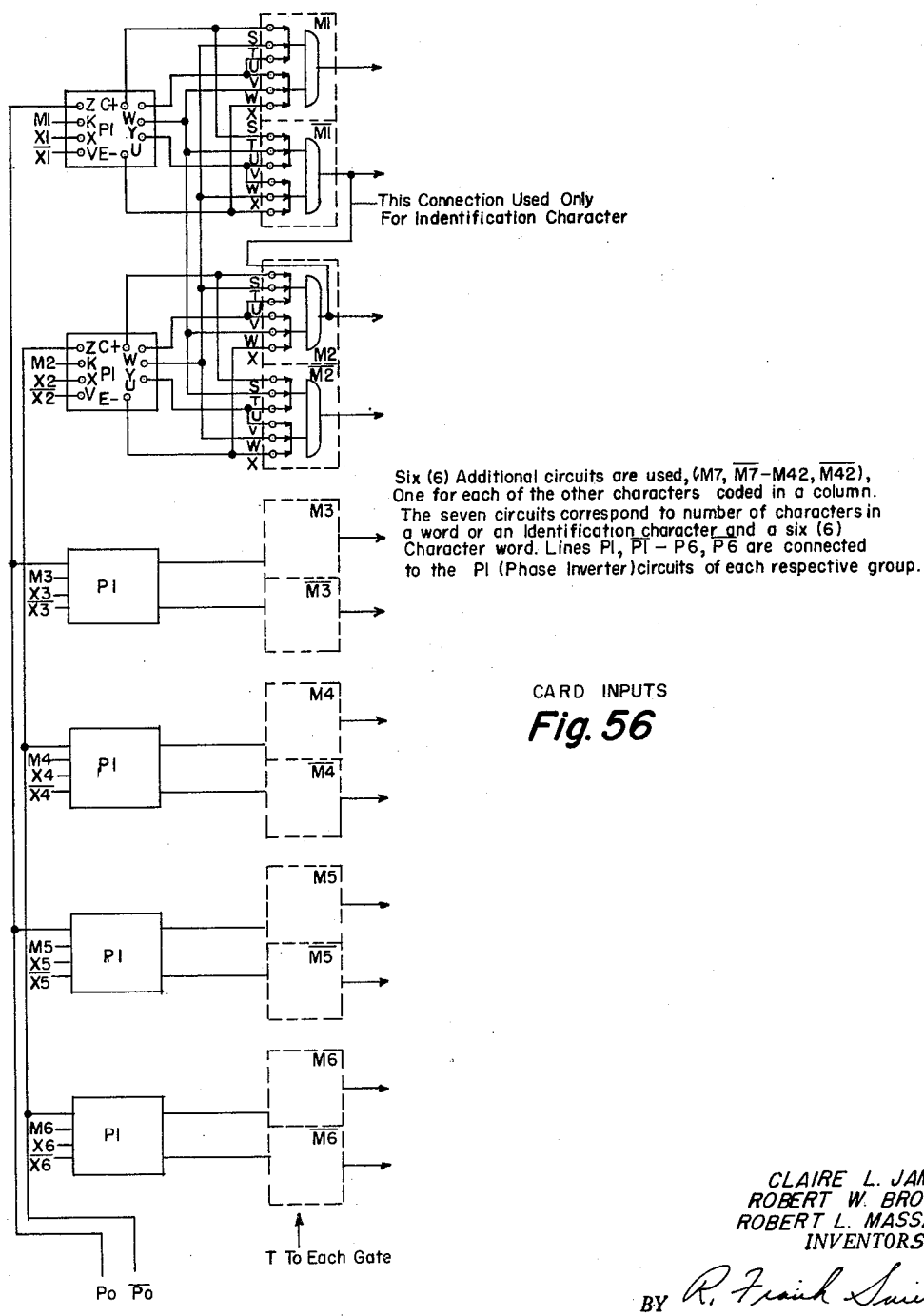

Each of the forty-two card information bit lines enters a phase inverter package in the programmer as a single assertion line, see FIG. 56. The phase inverter PI produces two outputs; namely, an assertion which follows the input and a negation which is the inverse of the input. These signals are made available for each bit to a pair of gate amplifiers Mn and $\overline{Mn}$, which are shown in FIG. 56 as M1, $\overline{M1}$ . . . M6, $\overline{M6}$. Only one of such phase inverter systems is disclosed and it is to be understood that six additional such circuits are used, one for each of the other characters coded in a column. In the case of positive cards the control line PO is active causing the assertion output of the phase inverter to activate the assertion gate, amplifier Mn or the negation output of the phase inverter to activate the negation amplifier $\overline{Mn}$. If negative cards are being read, the card information bits delivered to the programmer are negations and the control line $\overline{PO}$ will be active. In this case, an apparent assertion output of the phase inverter is properly made to activate the negation gate amplifier and an apparent negation output of the phase inverter properly activates the assertion gate amplifier. These actions are summarized in the following chart:

| Card | PO | $\overline{PO}$ | True Bit | Apparent Bit | PI Out | Mn | $\overline{Mn}$ |
|------|------|------|------|------|------|------|------|
| Pos | Active | | 1 | 1 | + | Active | |
| Pos | do | | 0 | 0 | | | Actiev. |
| Neg | | Active | 1 | 0 | | Active | |
| Neg | | do | 0 | 1 | + | | Do. |

In general, only the Mn or the $\overline{Mn}$ output will be active for a given bit position. The one exception to this rule is in the case of M2. It is required that the programmer comparison circuits treat numeric tags and the corresponding alphabetic tags identically in the comparison circuits. All numeric tags have 00 in the two highest order bit positions and the corresponding alphabetic tags have 01 in these two bit positions. These are both to be compared as 01 and, therefore, the presence of a 0 in the highest order position M1 is used to arbitrarily generate M2. In cases of a numeric tag, $\overline{M2}$ will be active due to the true second bit and M2 will be active due to $\overline{M1}$. This is the only case of a double-output for a single bit input.

Each incoming card word is presented by the outputs of the input circuits described above to the four inequality sensing circuits disclosed in FIG. 57. The bits of the tag (highest order character) of each card word are applied to an equality comparison gate E$n$. These incoming bits are compared with bits stored as crossbar switch positions. In the E$n$1 function a stored highest order bit would be indicated by the switch at A being in its upper position to route an incoming M1 into the gate, the switch having not been activated by its respective select rod in the crossbar storage. If the second stored bit is at zero the switch at C will be in its lower position and will successfully route an incoming $\overline{M2}$ to the gate, the switch being actuated to this position by its select rod upon storage of the characters derived from the tape. If all six incoming bits M1 through M6 correspond to all the first six switch positions, the sensing pulse TC will result in an output from E$n$1. This E$n$1 signal will then sense the circuits for the second character of the word. Considering the seventh bit M7 of the incoming word, it will be seen that M7 and $\overline{M7}$ are applied as inputs to a pair of gates which are both sensed by E$n$1. If the incoming seventh bit is actually $\overline{M7}$, the right gate will produce an output and if the stored bit is a zero corresponding to the incoming bit, the output of the right gate will pass through the storage switch contact at point A and be applied to the comparison circuits for the following bit position. If the incoming bit is M7 and the stored bit is one, the left gate will produce an output which will be routed through the switch to sense the next comparison circuit, these switches also being actuated to one position or the other by the select code upon read in of the characters on the tape. If, however, the incoming bit is M7 and the stored bit is zero, the output of the left gate will be routed through the buffer diode, point F, and the switch contact to the function IN$_2$ and thence through the buffer package I$n$ to produce an output which indicates that the incoming word is of a larger magnitude than the stored word. This is true because the incoming word has a one where the stored word has a zero in the highest order position in which the stored and incoming words differ. If the entire incoming second character is identical to the entire stored second character, the output of the twelfth bit comparison circuit will produce a signal which will directly generate E$n$2 to sense the comparison circuits for the bits of the third character. In some stations, it will be desirable to store a space in a character position indicating that any arbitrary incoming character should be considered acceptable as an equality. In the case of a stored space for the second character, the line S$n$2 will be activated by the crossbar storage and will allow E$n$1 to generate E$n$2 directly, in which case the comparison circuits are by-passed for the second character.

If all forty-two incoming bits are identical to all forty-two stored bits, or if identity exists for all characters not containing stored spaces, the output of the comparison circuits for the lowest order (42nd) bit will produce the signal E$n$7 indicating that the incoming word is equivalent to the stored word. If the highest order bit position in which the incoming word differs from the stored word contains a zero in the incoming word and a one in the stored word, the signal transmission through the comparison circuits will be broken and no output will result. Interpretation of the I$n$, E$n$7, or neither signal is made in the W$n$S "set" function and the W$n$R "reset" function connected with the word flip-flops WF$n$ associated with that word storage. Depending on the type of comparison being sought, plugboard connections will activate one or more set of gate inputs marked <=>. Assume at first that connection has been made to the = hub, indicating that an equality comparison is desired. This activates the right-hand leg of W$n$S and the other two legs of W$n$S will be activated by an E$n$7 signal setting WF$n$ to indicate a successful equality comparison. However, only an I$n$ signal, or no signal at all, will not produce an output from W$n$S and WF$n$ will remain reset. If a > comparison is sought, a plugboard jumper will activate the left-hand leg of W$n$S and the arrival of an I$n$ signal will cause W$n$S to produce a signal to set WF$n$. If the plugboard specifies > or = then both the right-hand and left-hand legs W$n$S will be active and the arrival of either I$n$ or E$n$7 will generate W$n$S to set WF$n$. When a < comparison is specified by a plugboard jumper, the WR signal which normally resets WF$n$ is then applied as a delayed signal to set WF$n$. The < line activates the upper leg of W$n$R and the arrival of either I$n$ or E$n$7 will produce W$n$R to reset WF$n$. If neither I$n$ nor E$n$7 are produced as a result of the comparison, then the incoming word must have been smaller than the stored word so WF$n$ properly stays set. If the plugboard specifies < or =, the arrival of E$n$7 will reset WF$n$ but E$n$7 should actually result in WF$n$ being set. Therefore, it will be seen that the delayed output of E$n$7 is used in W$n$S so that its effect will dominate that of W$n$R for the ≦ comparison requirement.

Each incoming card word is presented by the outputs of the input circuits to the sixteen equality sensing circuits of which only one is shown in FIG. 58. Equality sensing for the identification tag character in these circuits is identical to that described above with respect to inequality sensing. Equality sensing for the bits in positions 7 through 42 is accomplished in a 36-leg gate made up of six 6-leg gates joined together, each being smaller in logic and operation to the identification tag gate. This 36-leg gate is sensed by E$n$1 which is the output of the identification tag gate. An output E$n$0 from the large gating structure will set the associated word flip-flop WF$n$ to indicate that a card word has been scanned which is identical to the stored word.

As described hereinbefore, a document may comprise a number of cards in a particular group. Each card contains a fixed field multiplicity word with a Z identification tag. This word identifies the card as a card number X of a Y card group. For use in the system being described, X and Y can each have any value from one through ninety-nine. The format of the word is as follows:

| Bit | Tag, Z | Card Class, . &/∅ | V = No. of card in group | | ∅ | X = Card No. | |
|---|---|---|---|---|---|---|---|
| | | | $10^1$ | $10^0$ | | $10^1$ | $10^0$ |
| | 1–6 | 7–12 | 13–18 | 19–24 | 25–30 | 31–36 | 37–42 |

The multiplicity status character will contain a period (.) for single cards, an (&) mark for the lowest order (No. 1) card of a multiple group, a (/) for the highest order card in a multiple group and a zero (∅) for cards within a multiple group. This is summarized in the following chart:

| Symbol | Code | Meaning |
|---|---|---|
| . | 110011 | Single card. |
| & | 010011 | Lowest order card of group. |
| / | 100011 | Highest order card of group. |
| 0 | 000011 | Card within group. |

It will be noted that the last four bits are identical in all four symbols and, therefore, only the first two bits of the character (seventh and eighth bits of the field) need to be sensed to determine into which of the four classes a card belongs.

With the arrival of a multiplicity word, such a word is detected by recognition of the Z tag by the function MC in the A-Register, FIG. 61B. MC is applied to the series of functions LU, LV, and LW in the comparison and error circuit, FIG. 63B, to sense the card number characters of the multiplicity word in search of a card number of 01, which indicates the lowest order card of a group. Function LU senses the bits associated with the tens portion of the card number and the code for 0 will produce an output from LU which senses LV and LW for a 1 code in the units bit position. The Y and $\overline{DUP}$ inputs to the LV and LW functions are inactive during the Selection operation. When the card number is 01, an output from LW will set the flip-flop L which will remain set until the end of the card scan results in a reset by ED1. The signal MC is also applied to the function sequence HT, HU, HV, AND HW to search for a highest order card. For a highest order card, the card number will be the same as the total number of cards in the group. In other words, $X = Y$. Therefore, corresponding bits of X and Y are compared for identity, two bits each in the four H functions. Equality of X and Y results in an output from HW which sets the flip-flop H. H remains active until reset by ED1 at the end of the card scan.

The role of the A-Register is to keep track of the number of cards remaining to be processed in the group being handled. Whenever the leading card of a multiple group is encountered, the number of cards in the group is read from the multiplicity word of the card into the A-Register, see FIGS. 61A and 61B. At the end-of-scan of the leading card, the end-of-card signal reduces the count in A by one and the count is further reduced by one at the end of each successive card scan until it is reduced to zero at the completion of scan of the final card of the group. The presence of a leading card in the card reader station 32 is sensed by the function AD and when a leading card is detected, AD sets flip-flop MP which remains set until the final card of the group has been scanned. As a result, MP being active indicates that a multiple card group is being processed.

The function AD is sensed by the delayed multiplicity word recognition signal MCD after the H and L circuits have been sensed and the corresponding flip-flops have had time to be set providing the appropriate conditions existed. The conditions by which AD recognizes that a leading card is present during a selection operation are as follows: (1) $L \cdot H$ (a single card group since the card is a number 1 card but also card X of a Y card group; therefore, Y must be equal to X, which must be equal to 1); (2) $L \cdot \overline{MP}$ (indicating the arrival of a No. 1 card with a card group not in process whereas $L \cdot MP$ would indicate a No. 1 card as the trailing card of a multiple group); (3) $H \cdot \overline{MP}$ (indicating the arrival of a highest order card of a group leading the group whereas $H \cdot MP$ would indicate a highest order card at the end of a group); (4) $L \cdot \overline{G}$ (indicating the arrival of a No. 1 card following the detection of a misplaced card during the preceding card cycle as indicated by $\overline{G}$. It is assumed that a No. 1 card encountered under such circumstances is the leading card of a new ascending group. If the assumption is an error, another error detection will result on the following card cycle. Card groups containing misplaced cards are always left in the transitory hopper 47–9); and (5) $H \cdot \overline{G}$ (indicating the arrival of a highest order card following the detection of a misplaced card during the preceding card cycle. It is assumed that a highest order card encountered under such conditions is the leading card of a new descending group). In summary, an A-Register drop-in pulse AD will be created upon the arrival of a card which is known to be or justifiably assumed to be the leading card of a new group, either ascending or descending.

The drop-in pulse AD is applied to a "set" gate and to a "reset" gate in each stage of the A-Register. This pulse is gated with the card bit information specifying Y the number of cards in the group. For a typical stage, for example A6, it will be noted that a 1 in bit position 17 will result in a 1 drop-in to A6 while a 0 in bit 17 will result in a 0 in A6. When a misplaced card is detected and a leading card does not immediately follow to cause a new drop-in to A, the register must be reset to indicate that a valid group is no longer being handled. This is accomplished by the function AR which is created by MC when an interior card is present as indicated by $\overline{H} \cdot \overline{L}$ and either a multiple group is not being handled as indicated by $\overline{MP}$ or an error is detected as indicated by $\overline{G}$. The A-Register reset signal AR resets the register to binary-coded decimal zero which is 0011, 0011, this being accomplished by setting and resetting the appropriate A-Register flip-flop.

When an A-Register drop-in is created during the start of a new card group, it is necessary that the expected card sequence of the group be determined and remembered. This is accomplished by flip-flop PA which remembers the care sequence and when AD occurs with L set, a low order leading card is indicated and PA is set by $AD \cdot L$ to indicate an ascending group. When AD occurs with H set, PA is reset by $AD \cdot H$ to indicate a descending group. PA is always reset by AF at the time the last card scan of a group has been completed.

The card number of each non-leading card in a group is examined to determine whether the card is arriving in the proper sequence within the group. This is accomplished by comparing the card number with the contents of either the A- or the B-Register. For descending groups the contents of the A-Register at the time the multiplicity word is scanned should always be the same as the card number. Therefore, the card number and the A-Register are compared bit by bit in the series of functions AT, AU, AV, and AW, see FIG. 63A. If they are identical, an output will be derived from AW which will gate against $\overline{PA}$ (for descending group) to produce GE which will then set flip-flop G to indicate a valid comparison. The reset condition, $\overline{G}$, is interpreted as an error as described above with respect to functions AD and AR. For a typical bit M36, the comparison is as follows: In function AU it is seen that the lower two gates have as inputs $(M36 \vee \overline{A5}) \cdot (\overline{M36} \vee A5)$. Both legs will be activated for either $(M36 \cdot A5)$ or $(\overline{M36} \cdot \overline{A5})$. Similarly, all the other legs on the four functions will be activated to produce an output if each bit position provides an identity between the incoming bit and the corresponding A-Register stage.

For an ascending group the card number should always correspond to the contents of the B-Register and identity, as determined by BT, BU, BV, and BW, will result in BW being gated by PA (for an ascending group) to produce GE which will set flip-flop G. The suitability of the B-Register for this comparison is explained hereinafter.

As explained previously, an out-of-place card as detected by the comparison circuits results in the production of an A-Register reset or drop-in depending on the card number resulting in the error detection. The error also produces an error signal GR to activate console indicator light I1105. The GR function is activated during the Selection operation by an A-Register reset which is generated only as a result of an error or by an A-Register drop-in during the handling of a multiple group, as indicated by MP which also happens only as a result of an error, see FIG. 63A.

The purpose of the A-Register is to keep track of the number of cards remaining to be processed in a multiple card group. Therefore, the count in A must be reduced by 1 at the completion of each card scan. This is accomplished by the application of an E (end-of-card scan) signal to the functions AS and AZ. The AS signal, when generated, reduces by one the contents of the low order four stages A1, A2, A3, and A4. The AZ signal, when generated, reduces by one the high order four stages A5, A6, A7, and A8, and inserts 9 into the low order four stages, thus accomplishing a transition such as 30 to 29, 20 to 19, or, in general X0 to $(X-1)$ 9.

Assume that the A-Register contains twenty-one (0101 0100) at this particular time. This count may be the result of a previous partial count-down or it may have been dropped-in from a card multiplicity word. In either case, the following action takes place. The end of card pulse E is applied to AZ but is not accomplished because the register stage sensing inputs are (0100) instead of the required (0011). However, E does produce AS by gating against the second gate leg which is actuated by its A3, $\overline{A2}$, and $\overline{A1}$ inputs, any one of which is sufficient. The AS signal is applied to the borrow functions AG2, AG3, and AG4 and in each case a borrow is to be created if the borrow function has a 0 input from all preceding register stages. In this example, the register stage contents and the resultant borrows are as follows:

A1=0
      AG2=1
A2=0
      AG3=1
A3=1
      AG4=0
A4=0

The output of each borrow function and the original subtract signal AS are each used to complement the following register stage after being delivered to eliminate the possibility of changing a stage while it is being sensed on in a borrow function. Therefore, the resultant contents of the low order four stages will be (0011) which is the desired zero. Since AZ was not produced to change the high order stages, the total content of A will now be 20, which is one less than the preceding content of 21. Arrival of the next E pulse finds AS blocked since the low order A-Register content (0011) does not actuate any of the four alternative inputs of the second gate leg. However, the same (0011) does actuate AZ and in conjunction with MP, which is always active during a multiple group, E is permitted to generate AZ.

The AZ signal is applied to the high order four stages and their borrow functions in the same way that AS is applied to the low order stages and, in this case, will reduce the high order content from 2 (0101) to 1 (0100). At the same time, AZ is applied to the appropriate set and reset inputs of the low order stages to insert a 9 (1100) in this portion of the register. Thus, the overall content of the A-Register is changed from 20 to 19, as desired. At the arrival of the E pulse on the last card of a multiple group, the count in A will be 01 (0011 0100) to be reduced to 00 (0011 0011). This condition is recognized by the functions AL and AF which sense the appropriate A-Register contents to produce the signal AF. One of the uses of AF is to reset flip-flop MP which results in the activation of AZ so that the next E pulse after the completion of a multiple group cannot reduce the count of A below 00. The AS function will be blocked by the presence of 0 in the low order stages.

The criterion for selecting a multiple card group may be satisfied by information contained on any or all of the cards in the group. Generally, a decision cannot be made as to the disposition of the group until the last card in the group has been examined. For this reason, all cards of the group preceding the final card are temporarily stored in the transitory hopper 47–9 which is located between the scanner and the select hoppers. At the end of the final card scan, a decision is made either to send the final card and the earlier stored cards to a select hopper or to reject the group by placing the final card in the transitory hopper with the earlier cards and then leaving the entire group in that hopper. For the cases in which the group is selected, the earlier cards in the group must be retrieved from the transitory hopper. A means must therefore exist for retrieving just the proper number of cards and not withdrawing the rejected cards of a previous group. Such a means is provided by the B-Register and the associated control circuits.

Figure 62B:
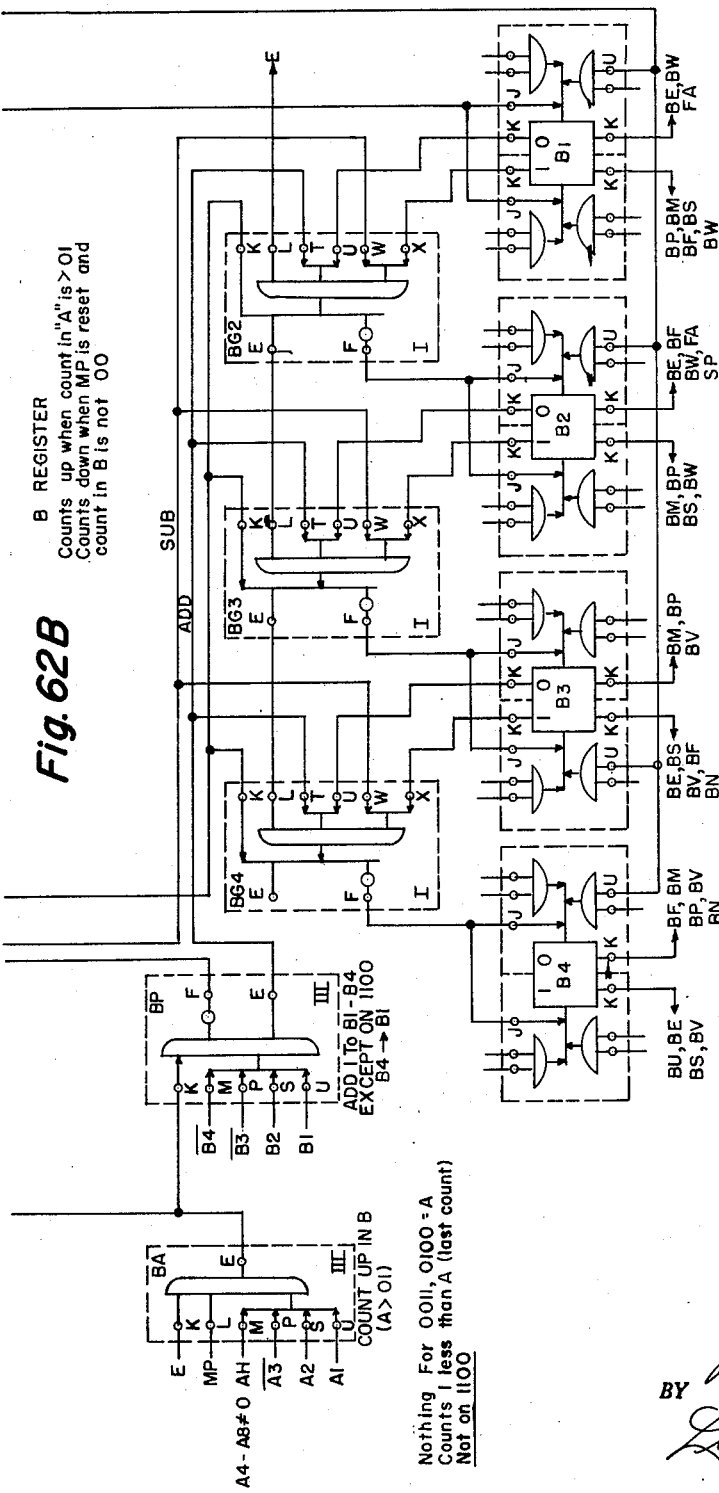
Figure 63A:
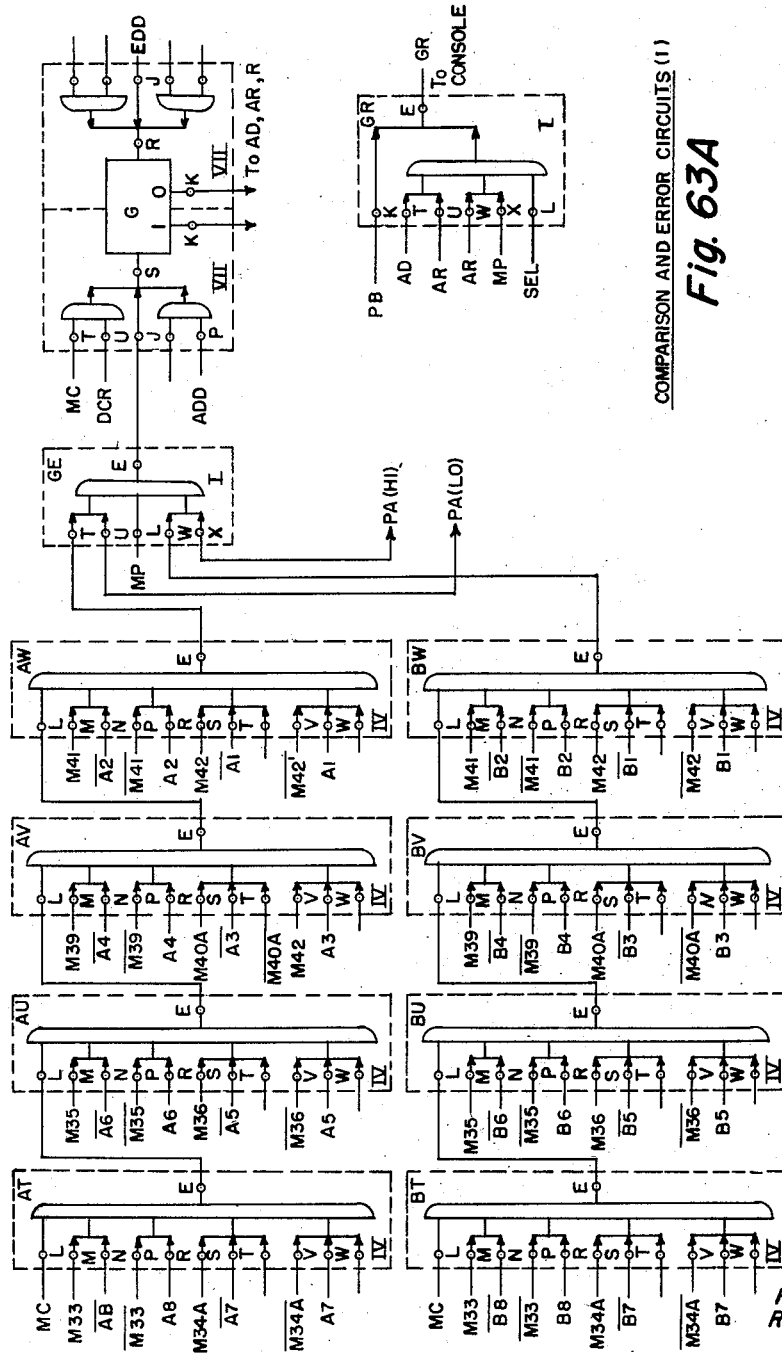

The B-Register, see FIGS. 62A and 62B, is present at the beginning of an operation to contain 01 (0011 0100) and the reason for presetting the 01 instead of the usual 00 is to facilitate the use of the B-Register in checking for proper card number sequence. Counting up in the B-Register in conjunction with the generation of transitory hopper actuation will take place at the end of each card scan except the last card of each group. The count-up is initiated by the function BA which recognizes the presence of a multiple group by MP being active and which is further activated only for counts in the A-Register other than 00 and 01 by the BA gate leg sensing on the A-Register outputs. The BA signal is applied to BP for adding to the low order four stages B1–4 and to BE for adding into the high order four stages B5–8. The BP signal will be created as a result of BA in all cases except when the low order stages contain 9 (1100). In this situation BE will be created to advance the high order count by one and reset the low order stages to 0 (0011) and this would, for example, advance an overall count from 19 to 20. When BP is created to advance the low order count by 1, it is applied to the first carry-borrow function BG2 where it will produce a carry to the second stage if the first stage contains a 1. The delayed BP signal produces a BC signal which complements the lowest order stage after BG2 has sensed on it. The BG2 carry signal, if created, is applied directly to the next carry-borrow function BG3 where it will create a carry if B2 contains a 1 and is applied with a delay to complement B2. Similarly, BG3 is applied to BG4 and B3 and BG4 is applied to B4, see FIG. 62B.

When the low order content of the B-Register reaches 9 (1100), the BP function is blocked by its B-Register sensing inputs but BE is activated by the next BA signal. BE causes the count in the high order B stages to be advanced by one in the same manner that BP advanced the low order stages. The BE signal generates BD to complement B5 in the same manner that BP generates BC to complement B1. The BD signal is also the means for resetting the low order stages to zero (0011). It does this by complementing the four stages B1–4; that is, by generating BC, BG2, BG3, and BG4 to complement each of the four register stages. The count-up in B will continue until the A-Register count has been reduced to 01 and at this time, BA will be blocked by its A-Register inputs. The next E pulse will reduce the contents of A to 00 and reset MP, thereby activating EN. However, MP is reset by a delayed result of E (AFD1) so that EN will not be activated in time to pass the E pulse which reduces A to 00. Therefore, for one card cycle time neither addition nor subtraction takes place in the B-Register. This corresponds to the time for processing the final card of the group during which neither a storage nor a retrieval takes place. When the next E pulse arrives it will generate EN.

The EN signal is the basic B-Register subtraction pulse and this is applied to BS for subtracting in the low order four stages B1–4 and to BH and BM for subtracting in the high order four stages. Subtraction takes place in the low order four stages as a result of EN when the high order stages contain something more than 0 (0011) and the low order stages also contain something other than 0 (0011). When the content of the low order stages is 0 but the high order stages contain some count other than 0, BP will be activated by the combination of high order non-zero and low order zero. The resulting BM signal will subtract one from the high order stages and reset the low order stages to 9 (1100). The reset takes place by complementing the low order stages in the same manner as for addition.

When the high order count has been reduced to 0, the low order count-down proceeds only until the low order content is 1 (0100), which was the original starting point for the register. At this time, all the stored cards will have been retrieved and the BS function will be blocked by its inputs from the B-Register stages. Each time a count-down signal is created, either low or high order, it produces an RS signal which is transmitted to the console to order that a stored card be released from the transitory hopper. If the scanning of the final card of a group results in the decision to reject rather than select the group a reject signal R will be produced as described hereinafter and will gate with the AFD signal resulting from the final A-Register count-down to produce BQ which directly creates BR to reset the B-Register to 01 (0011 0100). Therefore, for no selection, no B-Register count-down will take place and no cards will be retrieved from the transitory hopper. Coupled with placement of the final card in the transitory hopper, as described hereinafter, this accomplishes the desired rejection of the group. The B-Register reset signal BR will also be created by AD or AR which result from recognition of an error within a group so that the erroneous group will be left in the transitory hopper.

Figure 60A:
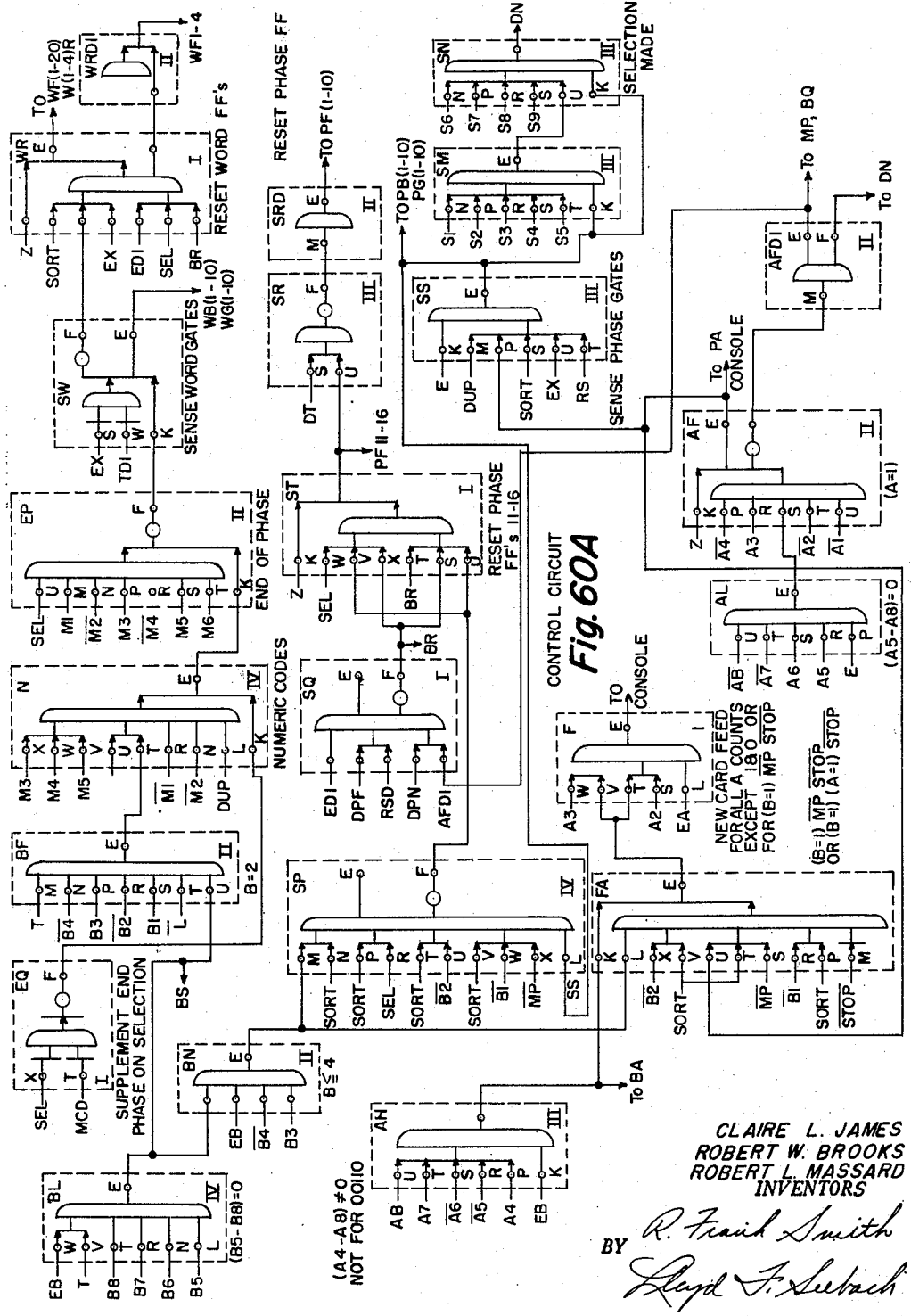
FIGS. 60A and 60B are electrical schematic views of the central circuitry for the programmer.
Figure 60B:
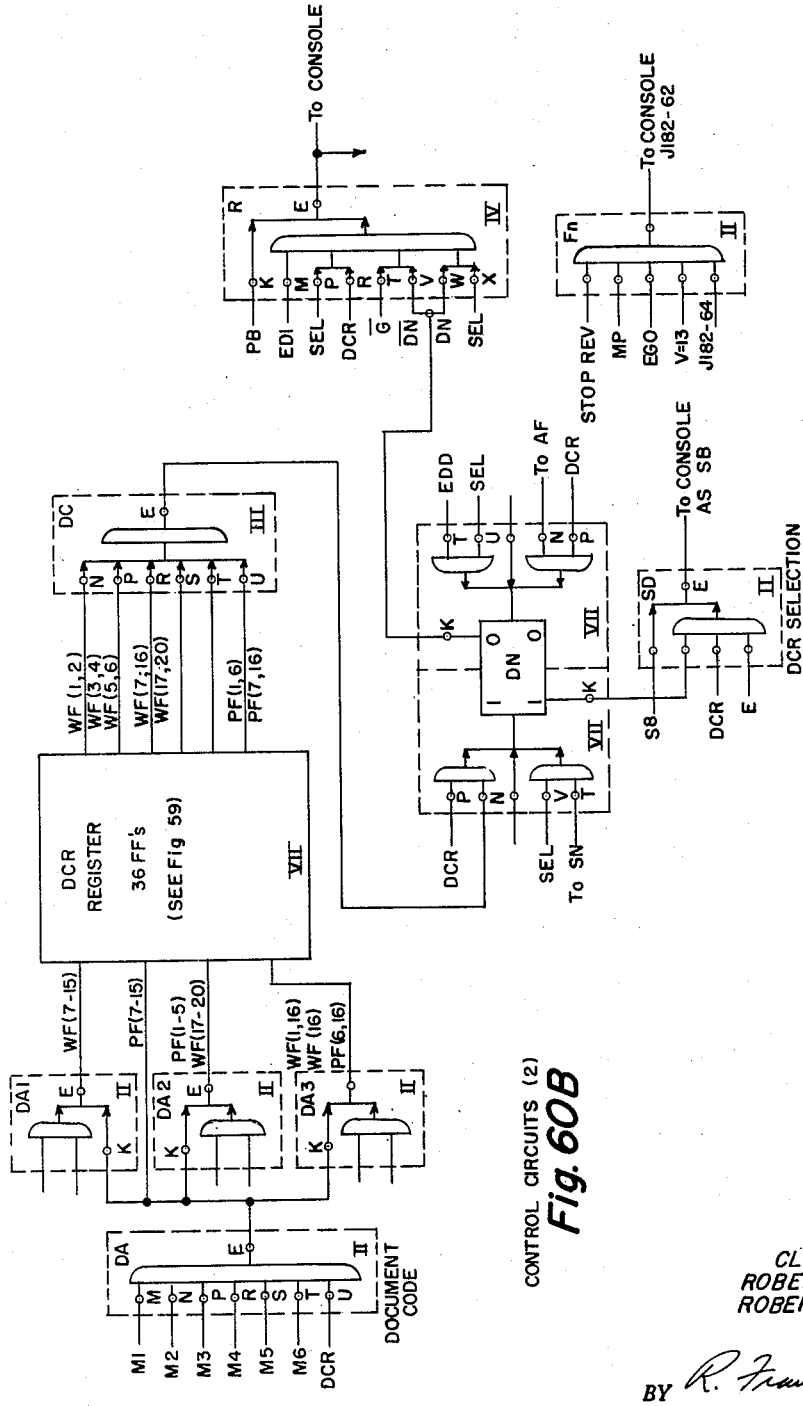
Figure 61A:
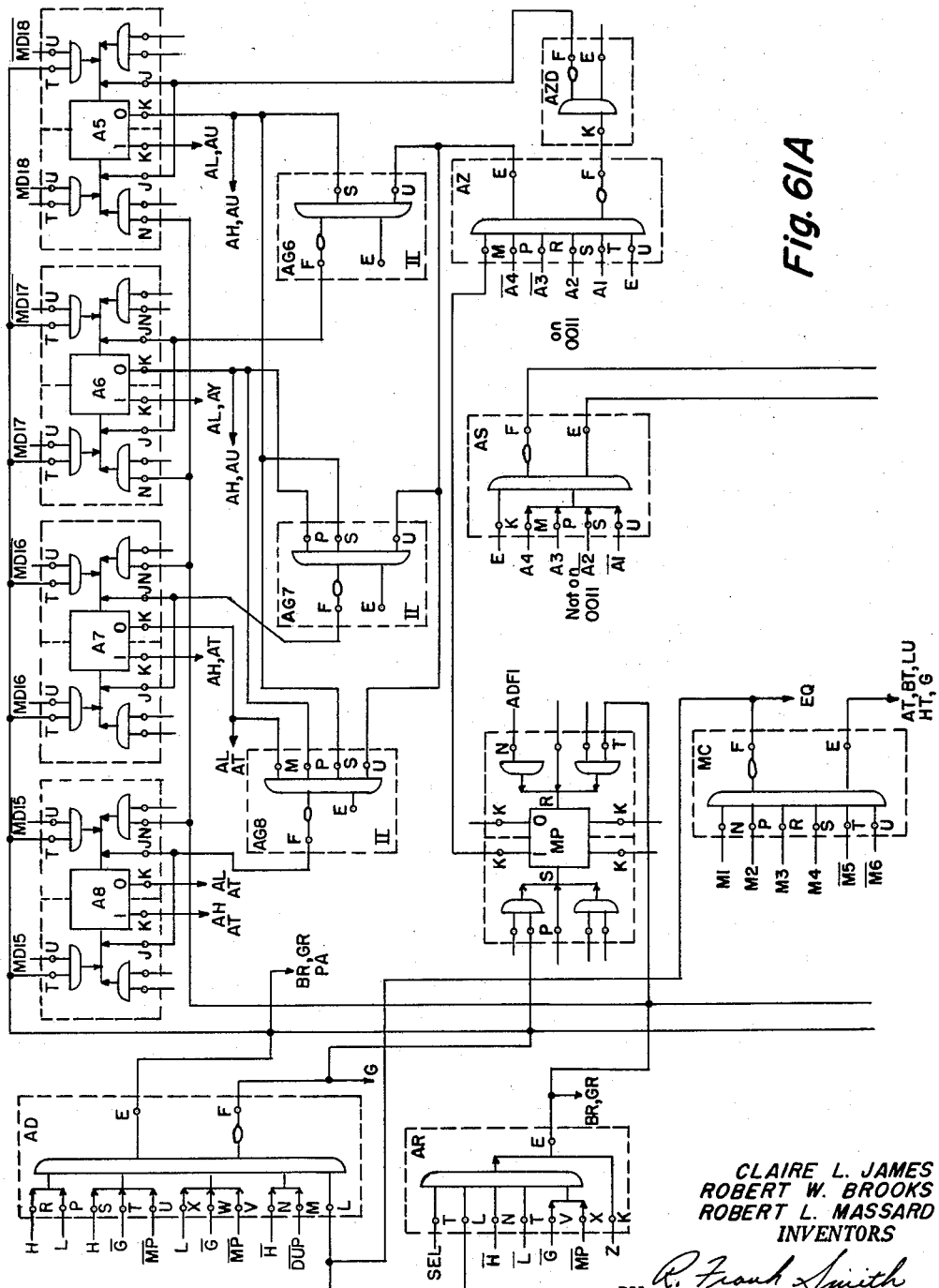

The control circuits, see FIGS. 60A and 60B, include several functions which sense for specific counts in the A- or B-Registers to regulate control actions. The AL and AF functions which detect an E pulse arriving when the A-Register contains 01 have already been described and the AH function senses for a certain range of counts in the A-Register. Specifically, AH will be generated by EB whenever the count in the low order four stages and the lowest of the four high order stages, is not equal to zero (0 0011). The function BL detects a high order B-Register content of zero (0011) and this feeds BN which further detects that the overall count in B is equal to or less than 04 (0011 0111).

It has been shown above that plugboard word flip-flops WF$n$ may be set as the result of card word comparisons with stored question words. When a phrase ending on the card is reached, these word flip-flops are to be sensed in word gates WG$n$ and buffers WB$n$ to set the phrase flip-flops PF1–16 and then the words flip-flops WF1–20 are to be reset. Detection of a card phrase ending is made by the EQ, N and EP set of functions. A phrase ending is indicated by the multiplicity word for the fixed field and by special end of phrase word tags in the open field. The EQ signal is generated by the multiplicity word signal MCD and is relayed through N to produce EP. The end-of-phrase tag Q (100011) is recognized by function EP sensing directly on card bits. When EP is produced, it generates the signal SW followed by WR and WRD. The SW signal senses all word gates WG and buffers WB for possible activation of the phrase flip-flops PF1–16. The WR signal activated by the delayed SW signal, which allows sensing of the flip-flops, resets the word flip-flops. The delayed WR signal WRD1 is used for the possible setting of the flip-flops required in "less than" comparisons.

The phrase flip-flops PF1–16 hold their contents, if any, until the completion of scanning of a card group and at that time the phrase flip-flops are to be sensed in the phrase gates PGn and buffers PBn for possible creation of a select signal. This is indicated by the AF signal which is created at the completion of the last card scan of a group. The AF signal produces the sensing signal SS which is applied to all phrase gates and buffers. The resulting select signal, if created, must be created again for each card from the transitory hopper. Therefore, SS is also created by the RS signal each time it is produced at the end of card time. Each time any one of the 9 possible select signals actually results from SS, either SM will be created by Sn (S0–S8) to produce SN, or SN will be generated directly by Sn. The SN signal will set flip-flop DN which will then inhibit the lower two legs of the gate R. If there is no selection and DN remains reset, thus enabling R, the end of card signal ED1 will generate R which is the signal which causes a card to be placed in the transitory hopper. This function is also the means of placing all earlier cards of a group into the transitory hopper since these cards produce no AF, no SS and, therefore, no selection to set DN. The SS signal is also applied to the function SP which initiates the resetting of the phrase flip-flops AF1–16. These must not be reset until all stored cards have been retrieved from the transitory hopper, as indicated by the status of the B-Register. When all cards have been retrieved, the B-Register count will be 01 (0011 0100) and this is determined by SP in conjunction with BL and BN. When SP is created, it generates ST which, in turn, produces SR followed by SRD. The ST and SRD signals reset the phrase flip-flops PF1–16.

The delivery of cards from the feed hopper 45 to the moving belt 36 must be recognized to prevent conflict of these cards with stored cards being retrieved from the transitory hopper 47–9. The new card feeds are controlled by the functions FA and F. When the cards of a group are being scanned, new card feeds must be stopped immediately after the final card of the group has been released from the feed hopper 45 to keep the belt free for transitory hopper retrievals. At this time the count in the A-Register will be 2 due to the transit time from the feed hopper to the scanner 41. Therefore, one condition for new card feeds, implemented by AH via FA and by the (A3–A2) input to F, is that the count in the A-Register be greater than 02 (0011 0101). Card feeds will remain inactive during the scanning of the last cards and during the retrieval of cards from the transitory hopper, if required. When either retrievals or a reset have restored the B-Register to 01, as detected in function FA, the new card feeds will resume. Actuation of the stop push button S1114 or hopper full contacts (I1104) will block FA by deactivating the lower gate leg. This will prevent the resumption of card feeds after a multiple group has been retrieved from the transitory hopper. This method of implementing a normal stop is used to prevent the card feeds from being stopped during the delivery of a multiple card group from the feed hopper.

At the completion of each card scan, an end of card scan signal EA is delivered to the input control circuits, see FIG. 55. The EA signal is reshaped and amplified by the EAA function which resets flip-flop TS, thereby deactivating the T function and closing the card sync pulse distribution channel into the programmer. The EAA signal is also applied to the EB function for gating with the console ready line. This input will activate EB when the card belt on the console has reached full operating speed and the EAA signal is then permitted to generate EB signals. The EB signal is used to reset certain flip-flops and sense various gating functions as well as being applied to the E function. The E signal will result from EB if a card was actually present during the scanning cycle, as indicated by CC being active (described below). The E signal and the delayed result ED1 are used throughout the programmer as a reset and sequencing signal. Most of these uses have been covered in the description hereinabove and the remainder are included in the operations about to be described.

The absence of cards on the belt 36 for a number of successive card cycles must be detected as this condition may be indicative of an empty feed hopper or malfunction of the equipment. The programmer provides a special signal EG to the console at the end of each card cycle period in which a card was not present in the scanner. The console also includes provisions for counting and interpreting these absent card signals. Absent cards are permissible and need not be counted only during the retrieval of stored cards from the transitory hopper. A card is known to be present if card sync pulses arrive during the card scanning cycle and under either of these conditions results in setting flip-flop CC.

The card present in the scanner is detected by the lower set-gate at the input to CC and the T signal is gated against CB which is the second stage of the CA, CB, and T-pulse binary counter. This requires that at least three sync pulses arrive during a card scan cycle before a card is considered to be present. The purpose of this requirement is to prevent false sync pulses from being derived from scanning past the ends of the scanned words whereby such false sync pulses can be interpreted as a card being present in the scanner. A card retrieval signal is detected by the upper set-gate at the input to CC but the actual retrieval signal cannot be used for this purpose because it results from the E pulse and is therefore too late to control it. The technique used here is to employ the start-of-card scan signal J to sense the B-Register subtraction circuits starting with the EN function. Creation of EN will result in the creation of BS or BM (low or high order B-Register subtraction signals) if card retrieval signals exist. The resultant RS retrieval signal will gate with JD to set CC, thereby indicating a valid card cycle. The BS or BM signal, at this time, will not change the contents of the B-Register because in all applications of these signals, other than RS, they are gated with the E signal so that they activate the register functions only when they are produced as a result of an E actuation of the subtraction circuits. If CC is set during a card cycle, by either T or RS, the EB at the end of these card cycles is permitted to generate the E signal. If, however, CC remains reset due to a true absent card, E is not generated but EG is produced for transmission to the console as an absent card signal.

OPERATION—SORT

The Sort operation is used to sort cards into several categories in a single run through the machine. These categories will ordinarily be based on numerical or alphabetical relationships. A typical sorting procedure will be described. The storage will be loaded from paper tape with 14 words into storage positions 5 through 18. Each character position of a given word storage, except the identification character, will contain identical information. Each character of word 5, for example, will store the bits 00XXXX, where X is a blank which is successively compared with either 0 or 1. The first four word positions in the memory must be supplied with "0" words. The contents of the next 14 word storage positions are:

| In position: | Each character contains |
|---|---|
| 5 | 00XXXX |
| 6 | 01XXXX |
| 7 | 10XXXX |
| 8 | 11XXXX |
| 9 | XX0011 |
| 10 | XX0100 |
| 11 | XX0101 |
| 12 | XX0110 |
| 13 | XX0111 |
| 14 | XX1000 |
| 15 | XX1001 |
| 16 | XX1010 |
| 17 | XX1011 |
| 18 | XX1100 |

The identification character position of each word storage position is loaded with the desired information tag unless sorting is to be done on the basis of one of the first two columns of each card. If sorting is to be on one of the first two columns, as selected by switch S1102 on the console, the identification characters in the storage are left blank. Console switch S1103 selects which one of the remaining six characters in the card words is to be sorted upon.

For the first sorting run, based on the last four bits of each character, word position 9 through 18 can result in ten categories. In the second run, based on the first two bits of each character, words 5 through 8 can result in four categories. If only numerical information is present, all cards will have been sorted at the end of the first run. In sorting, phrase groupings are not relevant. Word flip-flops WF*n* are therefore sensed by the word gates WG*n* and reset after every comparison. The word gates WG*n*, under control of the console switch, sense successful comparisons of one of the sets of the first two bits or last four bits and set up an appropriate phrase storage, which is sensed to yield a selection pulse at the end of each card.

The Sort operation is therefore a specialized form of selection in which each card is placed in one or another of the ten receiving hoppers depending on the content of a specified fixed field character position on each card. In this operation each card is treated individually and the multiple card circuits are not used. The transistory hopper 47-9 is used as one of the ten selection hoppers.

To commence the Sort operation, the function switch S1111 is turned to the "sort" position and then the input switch S1105 is turned to first the "reset" position and then back to the "normal" position. The clear storage push button switch S1106 is then depressed and the Sort plug board inserted in the programmer. The input switch S1105 is then turned to the "load" position and the sort column switch S1102 is turned to the proper position, Columns 1 and 2 being chosen by the switch and columns 3-10 being chosen by the proper punched paper tape. The proper punched paper tape is then inserted into the paper tape reader, columns 1 and 2 requiring a tape that is labeled "1 or 2" and columns 3-10 requiring a special tape that is labeled for the proper column. The start tape push button switch S1107 is then depressed and the belt direction switch S1109 is turned to normal (left position). The sort characterization switch S1103 is next turned to the proper character of the chosen word to be used as a basis for sorting which is usually character No. 6 which is the least significant character. The pass switch S1104 is turned to the numeric position and during any sorting pass the pilot light I1101 labeled Alphabetic data will be illuminated, if alphabetic data is detected in the chosen character on one or more cards. The numeric position enables one to sort on the basis of the four least significant bits of the chosen character. The zone position enables one to sort on the basis of the two most significant bits of the chosen character. The stick of cards is then inserted in the feed hopper 45, the keeper removed, the stick removed from the hopper and the magazine lowered into its operative position. After the tape has been loaded, the input switch S1105 is turned to the "reset" position and then back to the "normal" position and the reset push button S1112 is then depressed. The start push button switch S1113 is depressed and the belt will then run until stopped by an empty feed hopper or a full hopper. To return the cards to the feed hopper in ascending order after the sorting pass, the belt direction switch S1109 is turned to the "return" (right position), the return switch S1110 is turned to ascending position, the reset push buttton S1112 is depressed, the start push button S1113 is depressed and the belt will then run until all cards have been returned to the feed hopper 45.

The pass switch is manipulated as follows: If the alphabetic data light I1101 came on during the previous pass, the pass switch S1104 is turned to the "zone" position; and if the alphabetic data light did not come on during the previous pass, the pass switch is left in the "numeric" position. If the pass switch was left in the numeric position, then the sort character position switch S1103 is turned to the next character which would be No. 5 for the second pass. If the pass switch was turned to the zone position, as described above, the sort character postion switch is left unchanged, that is, on the No. 6 position. The reset push button switch S1112 is then depressed and following this the start push button switch S1113 is depressed so the belt will run until all cards have been exhausted from the feed hopper 45. The steps described above with respect to the belt direction switch, the reset push button, the start push button, and the pass switch are repeated for each pass until all characters have been sorted. The cards will then all be in the feed hopper 45 in the order specified, in this case, descending order. During the above operation, the duplicate preparation pass S1191 switch is not used and may be left in any position.

There are nine special paper tapes for use in the Sort operation, one of these being used when sorting is being carried out on either column 1 or column 2 of the fixed field and the remaining eight tapes being used when sorting is being carried out on one of the remaining columns of the fixed field. Each of these tapes is used for one particular column with columns 3-10 of the fixed field. These special tapes prepare the 20-word storage for sorting on the particular column selected and they also designate which column is being sorted upon. This designation is implemented by specifying the proper identification code for that column.

A standard plugboard is used for all sort operations and the connections in the Sort plugboard are such as to accomplish the proper channeling of the cards to the desired hoppers. Sorting can be accomplished on the basis of any character in the fixed field except the identification code. No data except the particular character being sorted, that is, the sort character is significant in determining the disposition of the card. The card data is compared to the stored data and multiplicity numbers and the sequence of cards within a document are ignored unless the sorting is done on one of these characters. Data comparison is performed both in the original Sort operation and in returning cards to the feed hopper. Feed signals are originated at the programmer and will normally be continuous since the final disposition of each card is determined immediately after its data is read. These feed signals are interrupted by the programmer when the hopper becomes full or the stop buttom S1114 is depressed. In returning cards to the feed hopper 45, the hoppers 47 are emptied as selected by the return switch S1110.

After a sort run for numeric data, cards are deposited according to the last four bits of the sort characters as follows:

| Character | Last 4 Bits | Hopper No. |
|---|---|---|
| 0 & 1 . | 0011 | 0 |
| 1 A V , | 0100 | 1 |
| 2 B K S | 0101 | 2 |
| 3 C L T | 0110 | 3 |
| 4 D M U | 0111 | 4 |
| 5 E N V | 1000 | 5 |
| 6 F O W | 1001 | 6 |
| 7 G P X | 1010 | 7 |
| 8 H Q Y | 1011 | 8 |
| 9 I R Z | 1100 | 9 |

For a sort run on zone data, the cards are deposited according to the first two bits of the sort character as follows:

| Character | First 2 Bits | Hopper No. |
|---|---|---|
| 0123456789 | 00 | 0 |
| &ABCDEFGHI | 01 | 1 |
| IJKLMNOPQR | 10 | 2 |
| .,STUVWXYZ | 11 | 3 |

Stopping the machine during a run may interrupt the handling of a multi-card document. The machine will stop automatically when all cards have been handled or when a hopper becomes full.

Cards may be returned to the feed hopper after sorting. When returning the cards in ascending order those cards in hopper 47–9 are returned to the feed hopper first and those in hopper 47–0 last. When returning cards in descending order, those cards in hopper 47–0 are returned to the feed hopper first and those in hopper 47–9 last. If a card has been incorrectly sorted it will be returned to the right-hand reject hopper 46 instead of the feed hopper when the return run is made. The order of documents and the order of cards within a document are inverted once during the sort run and once again during a return run. The order of cards within a document is not detected so that the check is made of this order.

The restriction of comparisons between card and stored words to just the desired card column is accomplished partially by the input control circuit. Sorting is specified to be on the basis of card column 1 or 2 or one of the columns 3 through 10. When one of the last eight columns is to be used, the specific column is chosen by means of the identification tag inserted into the memory from punched paper tape. However, the first two columns can contain any identification tag so specification is made by actual column count. The count is made by CA, CB and the actual selection is made in function CA. Counter CA, CB is always reset at the start of a card scan as a result of the preceding end of card scan signal. The first two sync pulses from a card cause the CA, CB count to advance from 00 to 10 to 01. With this advance, the flip-flop inputs become blocked and the count remains unchanged until the end-of-card reset, see FIG. 55.

If the Sort 1 input line from the console to TCA is active, it can be seen that the first T signal to arrive will generate TCA, since the second gate leg is activated by $\overline{CA}$ and the bottom leg is activated by $\overline{CB}$ when T arrives. It is to avoid timing problems here that the delayed T signal is used to change CA and CB. The TCA signal directly produces TC to sense the crossbar comparison circuits. Succeeding T pulses will not produce TCA signals, since the proper CA and CB input conditions will no longer exist.

If the Sort 2 input to TCA is active, the required CA, CB, inputs are seen to be 10. Arrival of the second sync pulse T will find TCA properly activated and will result in generation of TCA and TC. Succeeding T pulses will find TCA blocked by the altered content of CA, CB. If the Sort 3–10 line is active, TCA will not be produced at all but TC will be generated directly for all T pulses with choice of the proper card column determined by the stored identification tag which is then inserted into the storage from punched paper tape.

The restriction of comparison between card and stored words to just the desired character position of the word is accomplished by the sort character position switch S1103 in conjunction with the card bit amplifiers M1 through M42 and $\overline{M1}$ through $\overline{M42}$. In the description of the Selection operation, the role of the P$n$ and $\overline{Pn}$ control lines was described. It was explained that, for example, an active P1 pulse line results in production of M8 by a positive output from P18, while an active $\overline{P1}$ line would result in an M8 output as a consequence of a negative P18. If both P1 and $\overline{P1}$ are active, then both M8 and $\overline{M8}$ will produce outputs for either positive or negative P18 outputs.

In the Sort operation, only the tag (identification character) and the sort character are required to agree for selection. Therefore, the P$n$ and $\overline{Pn}$ lines corresponding to the other five characters of the words are all activated by the sort character position switch S1103 to simulate agreement for these characters. For example, if sorting is to be on the basis of character 3, lines P1, $\overline{P1}$, P2, $\overline{P2}$, P4, $\overline{P4}$, P5 and $\overline{P5}$, P6 and $\overline{P6}$ would all be activated so that all incoming information in characters 1, 2, 4, 5, and 6 would be considered acceptable. This would make the selection of a card dependent on a satisfactory tag and a proper character 3, since satisfactory comparisons in these character positions would depend on agreement of corresponding incoming and stored information.

The actions of the sort character position switch S1103 and film switch S1108, see FIG. 25, can be summarized as follows: With S1103 in the off position, P1–P6 are energized (level B) and $\overline{P1-P6}$ are de-energized with S1108 in the Pos position, while P1–P6 are de-energized and $\overline{P1-P6}$ are energized with S1108 in the Neg position. With S1103 in any position other than off, only the one line corresponding to that position and the inverse of the S1108 position is energized and all others are de-energized. For example, with S1103 in position 3, $\overline{P3}$ is de-energized with S1108 in the positive position, while P1–P6, $\overline{P1}$, $\overline{P2}$ and $\overline{P4-P6}$ are all energized under these conditions. This can further be summarized as follows:

| S1108 | S1103 | Engerized (—105v.) | De-energized |
|---|---|---|---|
| Pos | Off | P1–P6 | $\overline{P1-P6}$. |
| Neg | Off | $\overline{P1-P6}$ | P1–P6. |
| Pos | $n$ | P1–P6, $\overline{P1-P6}$, except $\overline{Pn}$ | $\overline{Pn}$. |
| Neg | $n$ | P1–P6, $\overline{P1-P6}$, except P$n$ | P$n$. |

The pass switch S1104 controls the portion of the sort character which is to be inspected. When the crossbar storage is loaded from punched paper tape for the sort operation, the last four bit positions of word storage positions 5, 6, 7 and 8 and the first two bit positions of word storage positions 9 through 18 are left blank. Thus, successful comparisons of incoming words with stored words 5 through 8 will be dependent on only the first two bits of the character selected by S1103. Similarly, comparisons with stored words 9 through 18 are dependent only on the last four bits of the selected character. The disregarded incoming bits in either case encounter upon crossbar switch contacts, and the corresponding equality comparison gate legs are thus automatically energized regardless of the incoming bits.

In the Sort operation a valid word comparison results in setting of a word flip-flop WF which remains set until the end of the card. At that time the word flip-flops WF$n$ are sensed by a phrase gate PG to activate output selection lines. In this operation the word gates WG$n$ and phrase flip-flops PF$n$ are not used. Therefore, word flip-flops WF$n$ must be reset by a WR signal and phrase gates PG$n$ must be sensed by an SS signal but SW and SR are not required to sense word gates WG$n$ and reset phrase flip-flops PF$n$. Because only one character of one word is actually examined on each card, it is only necessary to reset and sense the plugboard circiuts once for each card at the end-of-card time. Therefore, the word flip-flops WF$n$ are sensed in the phrase gates PG$n$ by an SS signal created by gating the end-of-card signal E against the sort operation line, and the word flip-flops WF$n$ are then reset by WR created by the delayed end-of-card signal ED1 (delayed to allow the sensing of the flip-flops to be completed by SS). The phrase flip-flop reset function SP includes provisions for resetting the phrase flip-flops PF$n$ immediately after the phrase gates PG$n$ are sensed, see FIGS. 59 and 60A.

OPERATION—DUPLICATE CARD REJECTION

The purpose of the Duplicate Card Rejection operation is to eliminate from a series of cards all but one single card or group of cards of each document number. The cards always arrive at the scanner with cards of the same document number placed adjacent to each other. The selector selects the first single card or group to arrive bearing a new document number and rejects all successive cards or groups until another new document number arrives. In this operation the 20-word crossbar storage is not used but the 20-word flip-flops WF$n$ and the 16 phrase flip-flops PF$n$ are combined into a 36-stage special register. As each card is scanned, the document number is entered into the 36-stage register. When an incoming document number is different from the stored document number, one or more flip-flops WF$n$, PF$n$ will change state. This is detected and interpreted as a new document number. Whenever an incoming document number does not differ from the stored one, the card or group is rejected as a duplicate. Provision is also made for keeping multiple card groups intact in this operation. The Duplicate Card Rejection operation requires neither paper tape input nor special plugboard. The only preparation for the operation is placing the function switch in the DCR position. However, it is also required that all cards and documents presented for processing in a DCR run be prearranged in such a manner that all cards in groups bearing a given document number are adjacent to each other.

In the Duplicate Card Rejection operation, the sort column S1102 and sort character position S1103 switches are turned to their "off" positions. The function switch S1111 is turned to the duplicate rejection (DUPL.REJ.) position and the input switch S1105 is turned to the "normal" position. A punched paper tape is not required for this function, nor is a plugboard required. For this reason, any plugboard in the programmer should be removed. The clear storage push-button switch S1106 is depressed and the cards are then inserted in the feed hopper. The cards on the stick must be arranged so that all documents having identical document numbers are immediately adjacent to each other. As in the other operations, the keeper and stick must be removed from the cards after positioning them in the hopper, and the magazine then lowered into its operative position. The reset push-button switch S1112 is depressed, and following this the start push-button switch S1113 is depressed. The belt will run until all cards have been exhausted from the hopper. The cards in magazine No. 8 are the desired cards. The surplus or duplicate card documents are deposited in the transitory hopper 47–9. In this operation, the return S1110, pass S1104 and duplicate preparation pass S1101 switches are not used and may be left in any position.

Since the word storage is not used in Duplicate Card Rejection, a paper tape and a plugboard is not needed in this operation. The document number is the only word which is significant in determining the location of a document. The multiplicity number of the first card of each document is read so that the size of the document can be determined. The function switch S1111 must be turned to duplicate rejection and the film S1108, belt direction S1109, start S1113 and stop S1114 switches have their normal significance. As noted below, the cards must be arranged in the feed hopper in such a way that documents are intact and duplicate documents are adjacent. This can be accomplished by sorting with respect to document numbers before rejecting duplicates.

The document number, line 3 of the fixed field of each document, is compared with that of the immediately preceding document. The selector detects whether or not two adjacent documents have the same number and each document with a number different from that of the preceding document is selected. On the other hand, each document whose document number is the same as the preceding one is rejected. Because of the means of rejecting duplicates, it is evident that the operator must insure beforehand that if duplicate documents are present, they will be adjacent to each other. The order of cards within a document must be sequential; that is, in ascending or descending order, but otherwise the order does not affect the handling or distribution of the document. Feed signals are continuous since each card is treated immediately after it is received.

Selected or non-duplicate documents are deposited in hopper 47–8, and rejected or duplicate documents are deposited in hopper 47–9. Hopper 47–9 is not used as a transitory hopper and no cards should reach the left-hand reject hopper 48. Starting and stopping the machine is done in the normal manner. Documents will be kept intact at all times unless the emergency stop push-button S1115 is depressed. The return controls operate normally and no check on the forward direction pass is performed.

The general philosophy of this operation is as follows: The document number on each scanned card is recognized and written into the 36-stage register. Whenever an incoming document number differs from the preceding number, one or more register stages will change state. This will be recognized as the basis for accepting the card or group. Otherwise it is a duplicate and is therefore rejected. The operation of the manual reset and start is the same as in the selection operation as well as the document number recognition. The tag of each incoming card word in the DCR operation is examined by the document code function DA. Recognition of the document number tag 110101 results in an output from DA which is used to insert the 36 nontag bits of the document number into a 36-stage register composed of the flip-flops WF$n$ and PF$n$ ordinarily associated with the plugboard circuits. The DA signal is fed to three auxiliary packages DA1, DA2 and DA3 to obtain adequate driving power to feed the inputs of all 36 register stages, see FIG. 60B.

Document code signals act as drop-in pulses for insertion of the document number card word bit into the word and phrase flip-flops used as the DCR register. Each of the word and phrase flip-flops has as one of its set inputs a DA signal gated with a card bit amplifier output M$n$, and as one of its reset inputs the same DA signal gated with the corresponding negation card bit amplifier output, see FIG. 59. Consider, for example, word flip-flop WF1. One set input condition is DA3 and M7 and one reset input condition is DA3 and $\overline{M7}$. Therefore, when a document number tag is recognized in a DCR operation, WF1 will receive a set input if M7 is an assertion and will receive a reset input if M7 is a negation. Action in the other flip-flops is identical but is, of course, based on the state of the other card word bits M8 through M42. The first six bits in M1 through M6 are not used here since they constitute the tag which is recognized by DA.

Each flip-flop has an output which is activated whenever the flip-flop changes state. Each of the outputs is delivered from the flip-flop package via a buffer diode, enabling several such outputs to be buffered together by wiring the output pins together. This is done in several groups which are then further buffered together in function DC to produce a single output signal DC for any one or more flip-flop changes. Therefore, whenever a new document number is inserted into the 36-stage register, DC is produced, see FIG. 60B.

The DC signal is used in the DCR operation only to set flip-flop DN which is reset by the AFD1 signal which comes at the end-of-card time of the last card of a multiple group, as explained for the Selection operation. Therefore, arrival of a single card bearing a new document number results in DN being set only while that single card is being scanned. Arrival of the leading card of a group bearing a new document number results in DN being set for the entire duration of the entire group. When the flip-flop DN is in the reset condition at end-of-card time, a reject signal R (transitory hopper actuation) is produced as a result of input conditions $$ED1 \cdot DCR \cdot \overline{DN}$$

Therefore, cards or groups not bearing a new document number will be rejected to the transitory hopper No. 9. When the flip-flop DN is in the set condition at end-of-card time, the DCR signal SD will be produced as a result of input condition $E \cdot DCR \cdot DN$. Therefore, remembering that DN once set remains set until the end of the group being scanned, a card or entire group bearing a new document number will be selected into hopper 47–8. The normal plugboard select 8 line is buffered into SD so that just one rather than two lines can be sent through the console to activate hopper 47–8.

The multiple card circuits are used in Duplicate Card Rejection to keep track of the cards of a multiple group by counting in the A-Register and production of AF. Because cards are never retrieved from the transitory hopper 47–9 in DCR, it is necessary that the B-Register be reset automatically at the end of each multiple group handling. This is accomplished by BQ generated by $AFD1 \cdot DCR$ which produces BR to reset the B-Register at the end-of-card time on the final card of each multiple group, see FIG. 62A. The DCR operation is made independent of the results of the comparison and error circuits, by arbitrarily setting flip-flop G when the multiple card code is recognized on each card scanned in DCR: $(MC \cdot DCR)$.

The circuits which normally activate the word WF$n$ and phrase PF$n$ flip-flops in other operations, are all activated in DCR to make the flip-flops fully available as register stages. This is accomplished by the operation line input to the various sensing functions. The crossbar sensing function TCA and TC are active only for Sort, Selection or Extraction. The word gate sense function SW and various functions feeding it are activated only for Selection, Duplication Preparation, and Extraction. The word flip-flop reset function WR is activated for the same operation as SW, plus Sort. The phrase reset function ST and the functions SP and SQ feeding it are activated only for Selection, Sort and Duplication Preparation. The new card feed signal F is produced in DCR in the same manner as for Selection.

OPERATION—EXTRACTION

The Extraction operation provides facilities for selecting a desired sequence of cards or groups from the card library under control of a specially prepared paper tape. The description of a typical application of the operation is as follows: A special prepared paper tape containing document numbers and sort numbers in alternate positions is read into the storage. The plugboard 34 is arranged to sense only those word storage positions which contain document numbers. When a card is scanned, a successful comparison with any of the stored document numbers will result in selection of the card or group and each of the ten possible successful comparisons results in a different selection. If all ten document numbers are found on a given stick of cards, each of the ten select hoppers will receive one card or group. If at the end of scanning a stick, one or more hoppers have not received a card, the next stick can be placed on the machine to attempt to satisfy the remaining stored numbers. If at the end of a stack, however, all hoppers have received cards, the rejected card should be run through the machine again after a new set of 20 words is inserted in the storage, as other desired cards may be available on the same stick.

In the Extraction operation, the sort column S1102 and sort character position S1103 switches are turned to their off position and the function switch S1111 is turned to the extraction (EXT) position. The input switch S1105 is turned to "reset" and then back to "normal," and the clear storage push-button switch S1106 is then depressed. The Extraction plugboard is inserted in the programmer and the input switch S1105 is turned to the "load" position. The paper tape is next inserted into the paper tape reader, and the first 20 words on the paper tape will be alternately a document number and then a file word. All odd-numbered words will be document numbers, and all even-numbered words will be file words. The start tape push-button switch S1107 is then depressed and the belt direction switch S1109 is turned to the "normall" (left) position. Cards are inserted into the feed hopper 45 removing the keeper and stick, and the magazine is then lowered into position. After the tape has been loaded, the reset push-button switch S1112 is depressed and then the start push-button switch S1113 is depressed. The belt will then run until all the cards have been exhausted from the feed hopper. If the extraction advance tape pilot light I1106 is lighted, the following steps must be followed:

(1) The cards in the reject hopper 48 should be returned to supply feed hopper 45.

(2) The input switch S1105 should be turned to the "reset" position and then back to the "normal" position.

(3) The clear storage push-button switch S1106 should be depressed.

(4) The input switch S1105 should be turned to the "load" position.

(5) The start tape push-button switch S1107 should be depressed.

(6) After the tape has been loaded, the reset push-button switch S1112 should be depressed.

(7) The start push-button switch S1113 should be depressed.

If the extraction advance tape pilot light is not lighted:

(1) Return rejected cards to the files.

(2) New cards should be inserted in the feed hopper 45, the keeper and stick being removed.

(3) Depress reset push-button switch S1112 and then depress start push-button switch S1113.

During the Extraction operation, the pass S1104, return S1110 and duplicate preparation pass S1101 switches are not used and may be left in any position.

The desired document numbers are punched on the paper tape, each being preceded by an S identification code. Desired document numbers are alternated with file words, starting with a document number. Thus, the first 20 words will contain 10 document numbers in positions 1, 3, 5 . . . 19. As many documents numbers as are desired may be punched on a single tape, and the tape must be advanced and cards recycled for each group of 10 document numbers. The file words on the tape have no significance as far as the selector is concerned, but enable the use of the same tape in other apparatus.

The standard plugboard is used for Extraction. If less than 10 documents are being extracted, the outputs of the remaining unused word storages must be disconnected. The first word after the sort word on each card, that is the document number, is the only one which is significant in determining the disposition of the card. The sequence number of cards within a document is not significant except when the machine is stopped either by the stop push-button S1114 or by the mechanism which detects a full hopper. In these cases, the machine will stop as soon as a complete document has been handled.

The standard controls for belt motion are used and the function switch S111 should be turned to the extract (EXT) position. The extraction advance tape light indicates that documents have been extracted according to all 10 of the stored numbers. The tape should then be advanced for storing up to 10 more numbers. The extracted documents may or may not be removed from the hopper, as desired. If less than 10 document numbers are requested, that is stored for a comparison, the extraction advance tape light I1106 will function when all desired documents have been extracted. Several sticks of cards can be scanned in looking for 10 document numbers without reloading the word storage.

The data on each card is compared to each storage word, and the only successful comparisons which affect the disposition of a document will be those involving a document number—that is, those words whose first character is an S. Each card is compared separately, but since all cards of a document have the same document number all documents will remain intact. The phrase storages are not reset to 0 at the end of a document, as they are in other functions. This enables the machine to remember which documents have been found and thus give the proper indication when all have been found. The feed signals are continuous in Extraction, except when the machine is to be stopped. When stopped by use of the stop push-button or by the full hopper detector, the feed signals become intermittent until the end of a document is reached. All the extracted documents are deposited in hopper 47–8, and rejected documents are deposited in hopper 47–9. The cards within all documents are inverted by the Extraction operation. Once started, the machine will continue to run until the feed hopper is emptied unless stopped manually or by the full hopper detector. The return controls are not normally used in Extraction.

The general philosophy of this operation is as follows: The memory words and plugboard connections limit word comparisons to document numbers only. The document number of each scanned card is compared to the ten stored document numbers. Each successful comparison results in a word flip-flop WF$n$ being set as in the Selection operation. At the end-of-card time for each card, the contents of the word flip-flops WF$n$ are sensed by phrase gates PG$n$ to result in a selection for any card which has been found to have a desired document number. The contents of the word flip-flops WF$n$ are also transferred to phrase flip-flops PF$n$ which maintain a running record of the number of successful comparisons which have been made throughout a complete Extraction run.

The operation and function of the manual reset and start are the same as in the Selection operation. Also the crossbar sensing signal TC is produced by each sync pulse T as in the Selection operation. Incoming card words are compared for equality with stored words in memory positions 1–19 (the odd memory positions). Any one card word should make a successful comparison with not more than one stored word and a successful comparison results in setting the appropriate word flip-flop WF$n$.

Immediately after each word comparison has been made in an Extraction operation, the delayed card sync signal TD1 generates a sense word gate signal SW. This SW signal senses the word gates WG$n$ which also are sensing the 10-word flip-flops WF$n$ in use. If a word flip-flop has been set as a result of the current word comparison, a corresponding phrase flip-flop PF$n$ will now be set. At the end-of-card time, a sense phrase gate signal SS is created by E-EX to sense the phrase gates or buffers which are also sensing the word flip-flops. If single-hopper extraction is being used, the outputs of the ten used word flip-flops will be buffered together in two phrase buffers to result in a single output signal when SS senses any word flip-flop that is the On condition. If ten-hopper extraction is being used, each word flip-flop output is connected to a different phrase gate and sensing by SS may result in one of ten select signals from a phrase gate sensing an active word flip-flop. The delayed end-of-card signal ED1 generates a reset word flip-flop signal WR to reset the word flip-flop WF$n$ in preparation for the next card word comparison, see FIGS. 59 and 60A.

Figure 26:
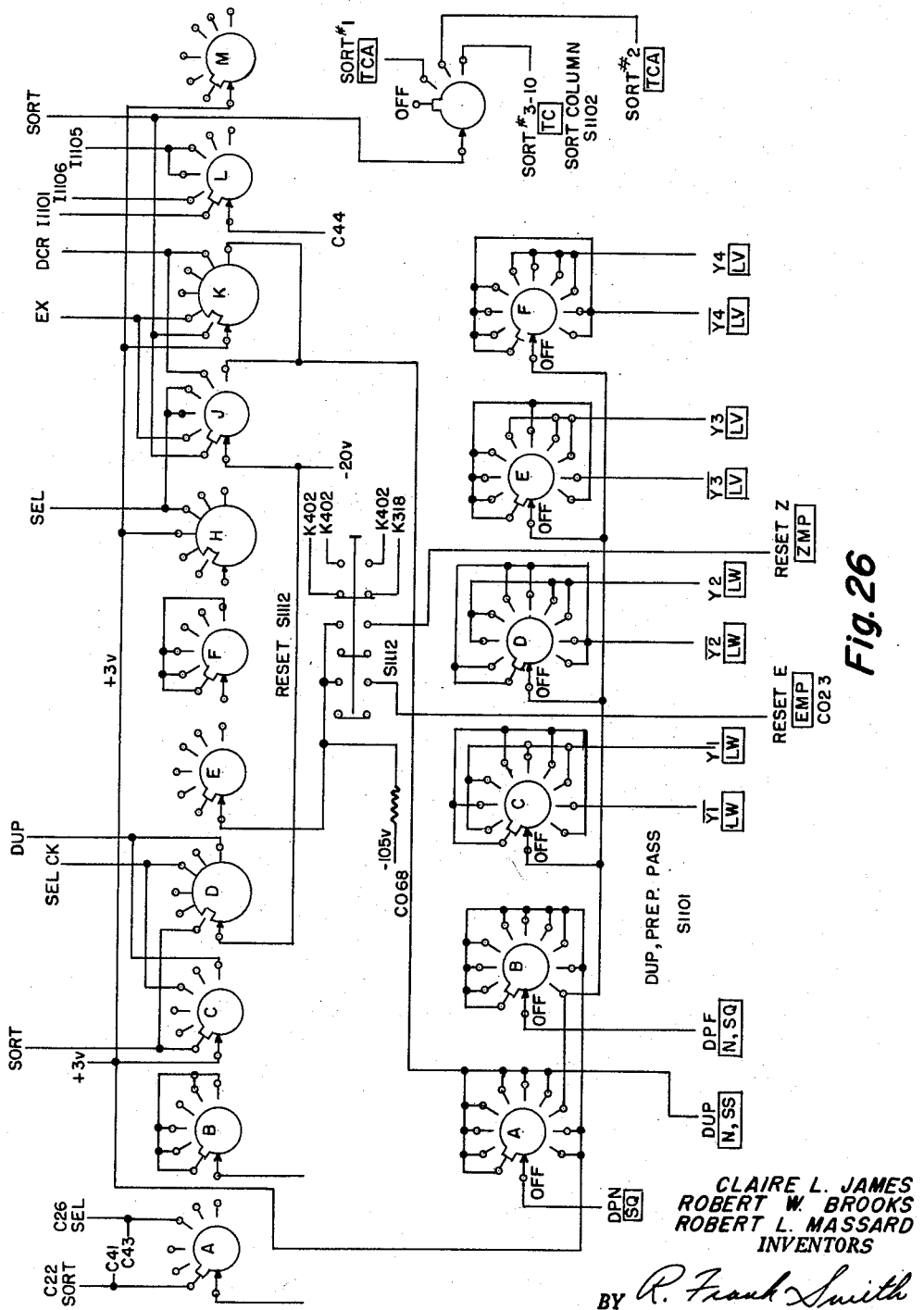

As selection of cards continues, select signals are created for all cards to be extracted and the phrase flip-flops PF$n$ remember which have been extracted. The outputs of the ten phrase flip-flops used for this purpose are gated together in two phrase gates and sensed by SS at each end of card1 time. When all ten desired extractions have been made, SS will produce an output from these phrase gates which is transmitted to the console as a signal that the documents sought in this run have all been extracted. The phrase flip-flops must not be reset automatically in Extraction as they have to retain their record of extracted documents during the scanning of several sticks of cards. Therefore, reset phrase flip-flop functions SP, SG, ST and SR contain no provisions for actuation in Extraction. Reset of the phrase flip-flops in Extraction is accomplished by the manual reset button S1112 on the console, see FIGS. 14, 26 and 60A.

In the Extraction operation each individual card is routed on the basis of its own document number. Since all cards of a multiple card group contain identical document numbers, groups are automatically kept intact due to the inherent nature of the operation. The multiple card circuits and the A- and B-Registers, although operative, are not involved in the Extraction operation with one exception. The only special provision made in these circuits for Extraction is in the case of the B-Register, which must be reset at the end of a multiple group handling to prevent cards from being retrieved from the transitory hopper. Therefore, the B-Register reset function is activated via BQ by (AFD1.EX) at the end-of-card time for the last card in each group.

OPERATION—DUPLICATION PREPARATION

The selector organizes a series of cards for photographic reproduction in the Duplication Preparation operation which is essentially a search for numeric identification codes on each card. Cards or groups are separated into categories defining whether or not they must be duplicated and each card or group is to be duplicated once for each file word on it. A file word is identified by a numeric identification code.

For the duplication preparation function, the sort column S1102 and sort character position S1103 switches must be in their off position. The function switch S1111 is turned to the duplicate preparation (DUPL.PREP.) position, and the proper plugboard is inserted in the programmer. The clear storage push-button switch S1106 is then depressed and the cards are inserted in the feed hopper, removing the keeper and the stick, and lowering the magazine into its operative position. The reset push-button switch S1112 is first depressed and then the start push-button switch S1113 is depressed. The belt will run until all cards have been exhausted from the feed hopper 45. The transitory hopper 47–9 contains cards which will not be returned since all file words have been used. The belt direction switch S1109 is turned to return, the return switch S1110 is turned to position 8 and the reset push-button switch S1112 is depressed. The start push-button switch S1113 is then depressed and the belt will run until all selected cards from hopper 47–8 have been returned to the feed hopper 45. Cards in the feed hopper have been selected, processed so that card No. 1 of a multiple card document is the trailing card, and restored to their original document number order. These cards are then ready for the second pass. In the Duplication Preparation operation, the pass switch S1104 is not used and may be left in any position.

In the Duplication Preparation function, the crossbar storage is not used so that no paper tape is needed. A standard plugboard is used, which may be permanently wired for this function. In Duplication Preparation, the selector notes the presence of numeric identification codes on one particular card of each document. Thus, the first two bits of each column are read. The multiplicity code is also read to determine the size of the document and to make certain that the proper card is being read. In the first pass, card No. 2 of each document is sensed for a numeric tag; and in the second pass, Card No. 3, etc.

The functional switch S1111 must be turned to duplication preparation and the film, belt direction, start and stop switches have their normal significance. The duplication preparation pass switch S1101 is used to indicate which pass is being performed. In the first pass, card No. 2 of each document is read, in the second pass card No. 3 is read, etc., and in each case the duplication preparation pass switch allows the machine to sense the proper leading card of every document so that the card immediately following may be sensed for numeric tags during each pass. As many as eight passes can be performed. At the beginning of each pass, the cards of every document must be in the proper sequence in the feed hopper. The proper sequence for the first pass is that the cards be fed in ascending order, both with respect to cards within a document and also with respect to document numbers. For the second pass, the documents should still be in ascending order but the leading card for each document must be card No. 2, followed by 3, 4, and so forth, card No. 1 being the last card. For each successive pass, one more card should be taken from the front and placed at the rear of the document. Thus for the fourth pass of a 10-card document, the cars should appear in the feed hopper 45 in the order 4, 5, 6, 7, 8, 9, 10, 1, 2, and 3. It is evident from the above that in each pass the card which follows the leading card of a document is the one which is sensed for numeric tags.

Cards are normally received in the inverted order from that described above. If such is the case, the correct order can be obtained by placing the stick of cards in one of the receiving hoppers and returning them to the feed hopper. Other apparatus which utilizes these same cards require that the documents be in ascending order with respect to document number and that cards within documents be in the inverted order from that which will result from a Duplication Preparation pass. This order can easily be effected by returning the cards to the feed hopper after the duplication preparation pass has been completed. An additional requirement of other apparatus is that the cards must be received with the emulsion side up. For negative cards, this will be taken care of automatically with the procedure outlined above. Positive cards have the emulsion on the opposite side, however, and could best be handled by eliminating the inversion described, removing the cards from the receiving hopper and then placing them on a new stick upside down. That is, the new stick would be passed through the group of cards in the opposite direction so that the cards are not only inverted but turned upside down also. Similarly, when positive cards are received from other apparatus, they must be turned upside down again before the selector can handle them. This can also be done by inserting a new stick in the group of cards in the opposite direction, which also provides the necessary inversion in the order of cards and documents.

The card number of the leading card of a document is compared with the desired card number as given by the duplication preparation pass switch. The purpose of this is to make certain that the proper card of the document is being sensed for numeric tags. It also allows the machine to reject all documents which have a number of cards equal to or less than the number of the pass being performed. No data comparison other than the above is performed. The only basis for the selection of a document is the presence of numeric tags on the card following the leading card.

The feed signals are continuous except on two occasions; when a card is found which needs duplication, its leading card must be retrieved from the transitory hopper and feed signals must be stopped while this is done; and when the stop push-button S1114 is depressed or a hopper becomes full, feed signals come on an intermittent basis until the end of a document has been reached and the last document has been completely treated.

If the card being sensed contains numeric identification codes, the entire document is deposited in hopper 47–8. As mentioned previously, the leading card is stored in transitory hopper 47–9, and if the document is selected, follows the remaining cards to hopper 47–8. Documents which do not need subsequent duplication, either because the significant cards have no numeric tags or because they have too few cards, are deposited in hopper 47–9. In this case, only a simple inversion takes place in the cards within a document. Single-card documents are rejected in pass No. 1, two card documents in pass No. 2, etc. No cards are deposited in any of the other hoppers.

Starting and stopping is done in the normal manner and documents are kept intact at all times unless the emergency stop push-button S1115 is depressed. The return controls function normally and, as indicated, can be used to invert the order of cards on a stick before and/or after a duplication preparation pass. If cards are returned, no check is made of the previous handling of cards; that is, the card data cannot affect the returning operation. The operation of the selector in Duplication Preparation assumes that any other apparatus has previously treated card No. 1 of each document. Thus, in duplication preparation pass No. 1, the second card is sensed for numeric tags and further passes treat subsequent cards. If in a particular pass the card of a document being sensed as the leading card does not actually appear as the leading card, the document may become split between hoppers 47–9 and 47–8. The succeeding document will not be handled incorrectly because of this. The order of cards in a document other than the leading card and immediately following card will not affect the disposition of the document.

The card number portion of the multiplicity word of each card scanned is compared with the duplication preparation pass switch setting in functions LU, LV and LW, see FIG. 63B. Arrival of a multiplicity word is detected by function MC (A-Register) in the same manner as for Selection. The MC signal senses function LU in search of card numbers with a zero in the higher order decimal digit position. An output from LU results in sensing LV and LW. An output will be obtained from LW only when the four bits corresponding to the low-order decimal digit of the card number are identical to the bits corresponding to the pass switch setting. These are as follows:

| Switch Position | Look for Leading Card Number | Look for Card No. Code | | | |
|---|---|---|---|---|---|
| | | M39 | M40 | M41 | M42 |
| 1 | 1 | 0 | 1 | 0 | 0 |
| 2 | 2 | 0 | 1 | 0 | 1 |
| 3 | 3 | 0 | 1 | 1 | 0 |
| 4 | 4 | 0 | 1 | 1 | 1 |
| 5 | 5 | 1 | 0 | 0 | 0 |
| 6 | 6 | 1 | 0 | 0 | 1 |
| 7 | 7 | 1 | 0 | 1 | 0 |
| 8 | 8 | 1 | 0 | 1 | 1 |

When a leading card is recognized, the resultant LW signal sets flip-flop L. This permits the delayed multiplicity number signal MCD to create an A-Register drop-in pulse AD to insert into the register the number of cards in the newly arrived group.

The leading card of each group is to be stored in the transitory hopper 47–9 for retrieval at the end of the group if the following card bears numeric codes, or for rejection along with the rest of the group if no numeric codes are detected. Transitory storage of the leading card is accomplished in the same manner as for an unselected card in a Selection operation. The duplication preparation plugboard requires that the word gates WG$n$ be sensed to set a phrase flip-flop PF$n$ in order to result in a select signal for a card. The logic of the sense word gate SW and the functions feeding it do not permit the word flip-flops to be sensed for the leading card of a Duplication Preparation run. Therefore, a reject signal R is always created to store the leading card in the transitory hopper 47–9.

When the second card of a group reaches the scanner, the count in the B-Register will have advanced to 01. This fact is sensed by each timing pulse T in function BL (for the higher order 0) and BF (for the lower order 1). The $\overline{L}$ input to BF is not used in the Duplication Preparation operation. The numeric codes function N senses each word on the second card of each group in search of numeric codes. The BF input restricts the search to second card. The $\overline{M1} \cdot \overline{M2}$ inputs restrict the accepted code to true numeric ones as differentiated from the complete absence of a code from the scanner. When a numeric code is recognized on a second card, the numeric code signal N is produced. This passes through the EP function to actuate the word sense gates function SW. The SW signal senses an unconditioned word gate, due to the Duplication Preparation plugboard connections, to set a phrase flip-flop PF$n$.

When the end-of-card time of each card is reached in a Duplication Preparation operation, the E pulse causes a sense phrase gate signal SS to be produced. It has already been shown that the leading card of each group is automatically rejected into the transitory hopper. If the second card bears one or more numeric codes, the SS signal will find a phrase flip-flop PF$n$ set and will therefore produce a select signal S to the console. The following cards in the group will be selected in the same manner and after the final card has been scanned, the new card feeds will stop and the leading card will be retrieved from the transitory hopper as in the Selection operation. As soon as the one card (the stored leading card) has been retrieved, the RS pulse which actuated the retrieval gates, gates after suitable time delay with the DPN control line, which is active during Duplication Preparation, to produce an SQ signal. Since only one card is supposed to be retrieved for each selected group, the SQ signal resulting from the retrieval is used to generate a B-Register reset signal BR, thereby terminating the retrievals which take place only until the count in B is reduced to the reset (01) condition. At this time, the phrase flip-flops PF$n$ must be reset in preparation for scanning of the leading card of a new group. Therefore, the SQ signal is used to generate the reset phrase flip-flop signals ST, SR and SRD. This must be done after the phrase gates have been sensed by SS to properly route the retrieved card. This is accomplished by the relative timing of SS and the AFD1 input to SQ, see FIG. 60A. This completes the handling of a multiple group for a typical run.

For a group containing a given number of cards, N, the run in which the $N+1$ card is to be scanned for numeric codes must be a terminal, unselected run. For example, for the run in which the No. 4 cards are to be examined, all three-card groups must be rejected automatically. However, based on procedures described so far, the No. 3 card would be recognized as a leading card and the following card would be scanned for numeric code. For a group containing four or more cards, the scanned card would be the No. 4 card, as desired. However, for a three-card group, the scanned card would be the No. 1 card which is not desired. Therefore, special provisions are made to prevent such undesired scanning.

The No. 3 card in the above example is the high-order card of the group. Therefore, when it is scanned, the high-order card present flip-flop H will be set, as explained for the Selection operation. This fact, as described hereinafter, is used to prevent action resulting from recognition of the card as the leading one and therefore results in rejection of the group due to the absence of numeric code detection for it. Prevention of leading card action takes place in the A-Register drop-in function AD, see FIGS. 61A and 61B. One of the AD input gate legs has the inputs $\overline{H} \vee \overline{DUP}$. For non-Duplication Preparation operation, this leg is always active and the conditions for AD are as detailed in the Selection operation, AD being created for either low-order or high-order leading cards. However, for Duplication Preparation, this leg is active only when $\overline{H}$ is present which is when a high-order card is not present. Therefore, an A-Register drop-in will not take place when the highest order card of a group has become the leading card of the group in Duplication Preparation. Thus, in the first run, single cards are ignored and rejected whereas in the second run this happens to two-card groups, and so on.

The multiple card circuits are fully active, as already described in controlling the storage and retrieval of leading cards in the Duplication Preparation operation. The error circuits are inapplicable to this operation since the card groups are inherently out of order in all but the first run. Normal comparison in error circuit operation takes place but the results are only partially used. The error flip-flop G feeds three other functions, namely, AD, AR and R. In AR and R, its use is conditioned by the Selection operation line and it is therefore unused in Duplication Preparation. In the AD function its use permits any card which is interpreted by the L function as a leading card to cause a drop-in to A and initiate a card group processing even though a previous incomplete group has not resulted in resetting MP. The new card feed functions FA and F operate as in Selection to provide continuous card feeds except during the leading card retrievals from the transitory hopper.

OPERATION—TEST

For the Test operation, the steps outlined above at the beginning of the description for the Selection function are followed. After this, the function switch S1111 is turned to the "test" position and the input switch S1105 is turned to the "reset" position and then back to the "normal" position. The proper Test punched paper tape is then inserted into the paper tape reader and the input switch S1105 turned to the "load" position. The reset push-button switch S1112 is next depressed, and then the start tape push-button switch S1107. The tape will stop each time a stop code is encountered on the paper tape. To start the tape again, the start tape push-button switch is again depressed. The tape reader can be stopped at any time by turning the input switch to the "normal" position. Ten of the electro-mechanical counters located at the console are associated with hoppers 47–0–9. Each counter registers the total number of cards entering its associated hopper. The 11th counter registers the total number of cards passing the reading station 32. The number of selections that should result from the tape prepared for the test function are predetermined and therefore the count in the various counters will reflect the accuracy of the operation.

The paper tape performs two functions in the Test operation. It provides the input data for the word storage, as in Selection, and also simulates the card data. The simulated card data is arranged on the tape in the same way as on the cards themselves, except that words may be spaced by using type space, TAB, or carriage return (CR) characters. The end of the card is designated by an EC (end-of-code) character. The last card of each document must be followed by as many EC characters as there are cards in the document. The wiring and use of the plugboard in the Test function are identical to that in the Selection function, because the operation of the programmer is basically the same in both operations. The simulated data as it appears on the paper tape is significant in the same way as the card data in Selection; that is, identification characters have their proper significance; the sequence of multiple card documents is checked; etc.

The word storage of the programmer is loaded in the same way that it is in Selection. The function switch must therefore be turned to selection in order to accomplish this. Once the word storage has been loaded, the function switch is turned to Test and the test data tape can be started in the normal manner with the input switch at "load" position. The tape reader will stop automatically at each stop code and may be restarted by depressing the start tape push-button. The mechanisms which actuate the belt and the plungers are inoperative during Test functions. The selection error light I1105 does not indicate errors in Test function. The simulated data which comes from the paper tape is compared with the stored data in the same way that the actual card data is compared in Selection. The operation of the word and phrase storages and gates is also the same as in Selection.

The manual reset is the same as in the Selection operation and a start of card scan signal J is not created in the Test operation. It is not required since there are no card word timing pulses to be gated in by TS, the flip-flop normally set by J. The other functions normally set by J are also not required in this operation.

The card word timing sync signals are simulated by the pulse TMP derived from the test word position of the crossbar storage system, as described in the crossbar storage system section. The TMP pulse arrives each time a complete word has been accumulated in the test word position. It then produces a T signal to initiate all the actions normally associated with a card word timing pulse. The normal TP input to T is inhibited by the $\overline{SEL\ CHK}$ input to the T function, see FIG. 55.

The end of card signal is simulated by the signal EMP derived from a relay as described in the crossbar storage system section. This appears whenever a stop code is encountered on the test punched paper tape. The normal EAA input to E is inhibited by a $\overline{SEL\ CHK}$ input to the gate. The E signal is generated, during Test, by the relay-derived EMP signal and initiates all actions which normally result from an E signal. Other programmer circuits perform as in the Selection operation and the multiple card circuits will function if simulated multiplicity numbers are included in the test tape. If desired, the test tape can be simplified to check only the storage and plugboard logic.

DETAILS OF THE FUNCTIONS

In this section the designs of the more complex logical functions are explained. The simpler functions, in which the design is obvious from the operation descriptions, are not included in this section. It should be mentioned that some functions, as wired into the machine, are not used and do not affect proper operation thereof.

For each function explained hereinabove there is first a statement of the requirements for each operation in which it is used followed by a statement of the implementation in the machine.

With respect to resetting of word flip flops WF$n$ by WR, the following are required:

$$SEL \cdot SW$$
$$SORT \cdot EDI$$
$$EX \cdot EDI$$

Implementation of the WR function is:

$$(EX \vee SORT \vee SW) \cdot (EDI \cdot SEL)$$

It is to be noted that the BR input to WR is not used.

Implementation of BL is straightforward. However, a word of explanation with regard to the sensing leg EB$\vee$T is in order. The output of BL is used in three places. In BF the output is used in conjunction with the sensing of every card word for numeric codes in N. In BS and BN the outputs of BL are needed only at end-of-card time. Therefore, BF is sensed by both T and EB and the output use is restricted to the proper time by use of T in BF, the use of EB in BN, and the use of EN in BS.

The SP function generates the phrase reset signal ST in Selection and Sort operations as explained in the above-named sections.

The requirements are:

$$SEL \cdot (B=01) \cdot SS$$
$$SEL \cdot (B=01 \vee 02) \cdot \overline{MP} \cdot SS$$
$$SORT \cdot SS$$

It is to be noted that:

$$B=01=\overline{B8} \cdot \overline{B7} \cdot B6 \cdot B5 \cdot \overline{B4} \cdot B3 \cdot \overline{B2} \cdot B1$$
$$B=02=\overline{B8} \cdot \overline{B7} \cdot B6 \cdot B5 \cdot \overline{B4} \cdot B3 \cdot \overline{B2} \cdot \overline{B1}$$

Therefore, $$B=01=BN \cdot \overline{B2} \cdot B1$$
$$B=01 \vee 02 = BN \cdot \overline{B2}$$

The implementation is:

$$SS \cdot (SEL \vee SORT) \cdot (SORT \vee BN)$$
$$\cdot (SORT \vee \overline{B2}) \cdot (SORT \vee \overline{MP} \vee B1)$$

In operations other than Sort, new card feeds are to be generated at the end of each card cycle time in which a new card will not conflict with one retrieved from the transitory hopper 47–9. This is assured by disabling the card feed whenever the count in the A-Register is less than 3, indicating that the approaching end of a card group may require transitory retrieval. When the transitory hopper has been emptied, as indicated by a B-Register content of 01 and $\overline{MP}$ or AF, card feeds are resumed. In the Sort operation, new card feeds are to be generated every card cycle time and advantage can be taken of the fact that the B-Register is constantly reset to zero. Because of the amount of logic required, two packages are needed to implement the new card feed signal requirements, which are:

$$[(B=1) \cdot (\overline{MP} \vee AF) \cdot \overline{STOP}] \vee (A>02) \vee [SORT \cdot \overline{STOP}]$$

The stop provision is associated specifically with the B-Register conditions to assure that a multiple card group will not be split in a stop. The stop will become effective only after the scanning and retrieval of a group have been completed. The implementation is as follows:

$$FA=[BN \cdot (\overline{B2} \vee SORT)$$
$$\cdot (SORT \vee AF \vee \overline{MP}) \cdot (\overline{B1} \vee SORT) \cdot \overline{STOP}] \vee AH$$

$$FA=(A3 \vee FA) \cdot (FA \vee A2) \cdot EB$$

The A-Register requirement for drop-in of AD is that AD is to be created whenever a single card arrives or whenever a leading card (high-order or low-order) arrives when a leading card is expected and indicated by MP being in the reset condition, or whenever a potential leading card arrives when the preceding card was out of sequence as indicated by $\overline{G}$, except that in Duplication Preparation only low-order leading cards are acceptable. This requirement is as follows:

$$H \cdot L \cdot \overline{DUP} \cdot MCD$$
$$H \cdot \overline{G} \cdot \overline{DUP} \cdot MCD$$
$$H \cdot MP \cdot \overline{DUP} \cdot MCD$$
$$L \cdot \overline{G} \cdot \overline{DUP} \cdot MCD$$
$$L \cdot \overline{G} \cdot \overline{H} \cdot MCD$$
$$L \cdot \overline{MP} \cdot \overline{DUP} \cdot MCD$$
$$L \cdot \overline{MP} \cdot \overline{H} \cdot MCD$$

The implementation is:

$$(H \lor L) \cdot (H \lor \overline{G} \lor \overline{MP}) \cdot (L \cdot \overline{G} \cdot \overline{MP}) \cdot (H \lor \overline{DUP}) \cdot MCD$$

The B-Register requirement for subtract B1–B4 and B5 is that B5 is to be created to subtract a one from the low-order B-Register at each end-of-card time when a card or group is not being scanned, so long as the contents of the B-Register are greater than 01 indicating that there are cards to be retrieved in the transitory hopper. The EN signal supplies the end-of-card timing signal when cards are not being scanned and is used to sense for the two conditions:

$$B5\text{–}8 > 0 \text{ and } B1\text{–}4 > 0$$
$$B5\text{–}8 > 0 \text{ and } B1\text{–}4 > 1$$

The implementation is:

$$(B1 \lor B2 \lor BH) \cdot (BL \lor B4 \lor B3) \cdot EN$$

The foregoing description sets forth the fundamental novel features of the invention as applied to a preferred embodiment. It will be understood that various omissions, substitutions and/or changes in the form and details of the illustrated embodiment may be made by those skilled in the art without departing from the spirit of the invention. Accordingly, the invention is not to be limited to the disclosed embodiment but is of a scope as defined by the appended claims.

Having now particularly described our invention, what we desire to secure by Letters Patent of the United States and what we claim is:

1. Data processing apparatus for selecting, sorting and rejecting discrete elements having information encoded thereon in accordance with information encoded on another medium, said apparatus comprising a supply receptacle, a group of receiving receptacles into which said elements can be inserted and from which said elements can be withdrawn, first scanning means for generating first signals representative of the encoded information on said medium in accordance with which said elements are to be selected and sorted, means for storing said first signals, second scanning means independent of said first scanning means for generating second signals from the encoded information on each element, means for transporting said elements individually from said supply receptacle past said second scanning means to any receptacle in said group of receptacles, respective transfer means for each of said receptacles, said transfer means associated with each of the receptacles in said group being selectively operative to insert an element into its respective receptacle, means responsive to said second signals derived from each of said elements for comparing said second signals with said stored first signals and with correspondence generating a select signal, means responsive to said select signal for rendering one of said transfer means operative when said element is aligned with the respective receptacle, means responsive to the absence of a select signal for rendering another of said transfer means operative when said element is aligned with the respective receptacle, means for selectively establishing a selecting, sorting or rejecting mode of operation, and means for interconnecting each of said transfer means associated with said group of receptacles to said signal comparing means in accordance with the selected mode of operation.

2. Apparatus for selectively providing any one of a plurality of modes of operation with respect to discrete photographic elements having encoded information in successive columns, each column on an element being indicative of a word comprising a number of characters with the highest order character designated as a recognition character and more than one column being indicative of a phrase and said plurality of elements including multi-element groups designated by a multiplicity word including a tag character for identifying a multi-element group, a number of identifying each element in the multi-element group, and a number for identifying the number of elements in the multi-element group, by which those elements having words and phrases corresponding to information encoded on and derived from another medium are selected from said plurality of elements, by which elements are numerically and alpha-numerically sorted on the basis of a character in a word designated by a predetermined recognition character as encoded and derived from another medium, and by which those elements having a word identified by the same recognition character whose characters are the same as the preceding element are rejected from the plurality of elements, the combination comprising a supply receptacle, a group of receiving receptacles, said receptacles being adapted to have said elements inserted into and withdrawn therefrom, first scanning means for generating first signals representative of each word encoded on an element, means for intermittently transporting said elements individually from said supply receptacle past said first scanning means to any receptacle in said group of receptacles, respective transfer means for each of said receptacles, said transfer means being operative to withdraw elements individually from the respective receptacle and position said elements on said transporting means and to move an element from said transporting means into the respective receptacle during the interval said transporting means is stationary, second scanning means for scanning said medium and generating second signals from the information encoded thereon, means responsive to said first and second signals and to said first signals, upon recognition of a tag character, for storing said second signals, means responsive to said first signals for comparing said first signals with said second signals stored in said storing means and with coincidence generating an output signal, means for selecting one of said modes of operation, means for selecting the column and the character in the selected column as the basis for the sorting operation, and means for interconnecting the output signals derived from said comparing means to said transfer means in accordance with the disposition of the elements for each mode of operation.

3. Apparatus in accordance with claim 2 and including means for detecting the absence of an element at said first scanning means therefor to render said transporting means inoperative after a predetermined interval of time.

4. Apparatus in accordance with claim 2 and including means responsive to said first signals corresponding to said tag character and to said number of elements in a group as derived from said multiplicity word for establishing a count in accordance with the number of elements in the group and counting down as each element of said group is moved past said first scanning means, and means responsive to said first signals corresponding to said tag character for controlling the operation of said transfer means in accordance with the selected mode of operation.

5. Apparatus for selecting from a plurality of discrete elements having information encoded thereon those of said elements whose encoded information corresponds to information encoded on a memory medium, the information being encoded on said elements and said medium as words and each word including at least two characters with the highest order character designated as a recognition character, the combination comprising; a supply receptacle, a group of receiving receptacles into which said elements can be inserted and from which said elements can be withdrawn; first scanning means for generating a first group of signals from each word encoded on said medium, register means for storing each of said first group of signals, second scanning means for generating a second group of signals from each word encoded on said elements, means for transporting said elements individually from said supply receptacle past said second scanning means to any receptacle in said group of receptacles, respective transfer means for each of said receptacles, said transfer means associated with each of the receptacles in said group being selectively operative to insert an element into its respective receptacle, means for comparing each second group of signals with all of said first group of signals stored in said register means simultaneously and generating an output signal with an equality, greater than and less than comparison, logic means corresponding to each word in said register means and including a plugboard for selectively interconnecting said logic means to effect equality, greater than and less than comparisons based on word comparisons and on grouping of word comparisons into phrase comparisons and for establishing the disposition of said elements in said receiving receptacles, said logic means being responsive to said output signal, upon establishment of any of said comparisons, for producing a select signal upon completion of the scanning of each element, and means responsive to said select signal for rendering one of said transfer means operative in accordance with the predetermined disposition of said element.

6. Apparatus in accordance with claim 5 and including means responsive to said select signal and to the absence of said select signal for selectively storing each of the selected and unselected elements.

7. Apparatus in accordance with claim 5 and including means for intermittently advancing individual elements into a position with respect to said second scanning means.

8. Apparatus in accordance with claim 5 and including means for storing the selected and nonselected elements and means responsive to said select signals and to the absence of said select signal for directing each element to its respective storing means.

9. Apparatus for selecting from a plurality of discrete elements having encoded information those of said elements whose encoded information corresponds to that derived from another medium, the combination comprising a supply receptacle, a group of receiving receptacles into which said elements can be inserted and from which said elements can be withdrawn, first scanning means for scanning each element for generating first signals representative of the information encoded thereon, means for transporting said elements individually from said supply receptacle past said first scanning means to any receptacle in said group of receptacles, respective transfer means for each of said receptacles, said transfer means associated with said supply receptacle being operative for withdrawing individual elements therefrom to position said elements on said transporting means and said transport means associated with each of the receptacles in said group being selectively operative to insert an element into its respective receptacle, second scanning means for scanning said medium and for generating second signals corresponding to the encoded information, register means for storing said second signals, means for serially comparing said first signals with said second signals stored in said register means and with correspondence generating a select signal, means responsive to said select signal for rendering the transfer means operative in accordance with the receptacle designated to receive corresponding elements when said corresponding element is aligned with said receptacle, and means responsive to the absence of a select signal for rendering the transfer means operative in accordance with the receptacle designated to receive noncorresponding elements when said noncorresponding element is aligned with said receptacle.

10. Apparatus in accordance with claim 9 including means for establishing the receptacle in the group of receptacles for receiving the corresponding and the noncorresponding elements.

11. Apparatus for selecting from a plurality of discrete elements having encoded information in successive columns, each column being indicative of a word and more than one column being indicative of a phrase, those of said elements whose encoded information corresponds to any one of several encoded words or phrases derived from another medium, the combination comprising a supply receptacle, a group of receiving receptacles, said receptacles being adapted to have said elements inserted into and withdrawn threfrom, first scanning means for scanning each element for generating first signals representative of each word encoded on an element, means for transporting said elements individually from said supply receptacle past said first scanning means to any receptacle in said group of receptacles, respective transfer means for each of said receptacles, said transfer means associated with said supply receptacle being operative for withdrawing individual elements from said supply receptacle to position said elements on said transporting means and said transfer means associated with each of the receptacles in said group being selectively operative to insert an element into its respective receptacle, second scanning means for scanning said medium and for generating second signals corresponding to the encoded information, register means for storing said second signals and retaining said second signals in storage unitil all of said elements have been moved past said first scanning means, means responsive to said first signals for serially comparing said first signals with said second signals stored in said register means and with correspondence of predetermined words and phrases generating a select signal, means responsive to said select signal for rendering the transfer means operative in accordance with the receptacle designated to receive corresponding elements when any one of said corresponding elements is aligned with said receptacle, means responsive to the absence of a select signal for rendering the transfer means operative in accordance with the receptacle designated to receive noncorresponding elements when any one of said noncorresponding element is aligned with said receptacle, and means for establishing the words on said elements to be compared with those on said medium and the receptacles in the group of receptacles for receiving the corresponding and non-corresponding elements.

12. Apparatus for selecting from a plurality of discrete elements having encoded information in successive columns those of said elements whose encoded information corresponds to any one of several encoded words or phrases derived from another medium, each column being indicative of a word and more than one column being indicative of a phrase, the combination comprising a supply receptacle, a group of receiving receptacles, said receptacles including a transitory receptacle and being adapted to have said elements inserted into and withdrawn therefrom, first scanning means for scanning each element for generating first signals representative of each word encoded on an element, means for intermittently transporting said elements individually from said supply receptacle past said first scanning means to any receptacle in said group of receptacles, respective transfer means for each of said receptacles, said transfer means being operative to withdraw elements individually from the respective receptacle and position said elements on said transporting means and to move an element from said transporting means into the respective receptacle during the interval said transporting means is stationary, second scanning means for scanning said medium for generating second signals corresponding to each of the predetermined selection words encoded on said medium, register means for storing said second signals, means responsive to said first signals for serially comparing said first signals with said second signals stored in said register means for equality, logic means corresponding to each word stored in said register means and interconnected to effect grouping of word comparisons into phrase comparisons and responsive to said comparing means for storing word and phrase equality and for establishing the receptacle into which the selected elements are to be inserted, means for initiating said logic means to provide a select signal, upon equality comparison of said first and second signals, for rendering the transfer means associated with the receptacle into which the selected element is to be inserted operative in timed relation to movement of the selected element into a position with respect to said selected receptacle and for rendering said transfer means associated with said transitory receptacle inoperative.

13. Apparatus in accordance with claim 12 and including means responsive to the absence of a select signal for rendering said transfer means associated with said transitory receptacle operative to insert a nonselected element into said transitory receptacle.

14. Apparatus in accordance with claim 12 and including means for detecting the absence of an element at said first scanning means and for rendering said transporting means inoperative after a predetermined interval of time.

15. Apparatus for selecting from a plurality of discrete elements having encoded information in successive columns those of said elements whose encoded information corresponds to any one of several words and phrases derived from another medium, each column on an element indicative of a word and more than one column being indicative of a phrase and said plurality of elements including multi-element groups designated by a multiplicity word including a tag character for identifying a multi-element group, a number for identifying each element in the multi-element group, and a number for identifying the number of elements in the multi-element group, the combination comprising a supply receptacle, a group of receiving receptacles, said receptacles including a transitory receptacle and being adapted to have said elements inserted into and withdrawn therefrom, first scanning means for scanning each element for generating first signals representative of each word encoded on an element, means for intermittently transporting said elements individually from said supply receptacle past said first scanning means to any receptacle in said group of receptacles, respective transfer means for each of said receptacles, said transfer means being operative to withdraw elements individually from the respective receptacle and position said elements on said transporting means and to move an element from said transporting means into the respective receptacle during the interval said transporting means is stationary, second scanning means for scanning said medium for generating second signals therefrom corresponding to each of the predetermined selection words encoded on said medium, register means for storing said second signals, means responsive to said first signals for comparing said first signals with said second electrical signals stored in said register means for equality, means corresponding to each word stored in said storing means and interconnected to effect grouping of word comparisons into phrase comparisons and responsive to said comparing means, upon fulfilling the logic of word and phrase interconnections, for providing a select signal and establishing the receptacle into which the selected element and elements of a selected group are to be inserted, means for rendering the transfer means associated with said supply receptacle operative to withdraw another element, means responsive to a select signal for rendering the transfer means associated with the receptacle for receiving selected elements operative to position the elements therein, means responsive to the absence of a select signal for rendering the transfer means associated with the transitory receptacle operative to position the nonselected elements therein, means responsive to said first signals corresponding to said tag character and to said number of elements in a group as derived from said multiplicity word for establishing a count in accordance with the number of elements in said group and counting down as each element of said group is moved past said first scanning means, means responsive to said first signals corresponding to said tag character for rendering said transfer means associated with said transitory receptacle operative to insert each element of a group in said transitory receptacle for temporary storage, means responsive to each actuation of the transfer means associated with said transitory receptacle for counting up as each element of a group is inserted therein and for counting down as each element of a group is withdrawn from said transitory receptacle, control means responsive to said select signal, upon completion of the scanning of the last element of a group, for rendering said transfer means associated with said supply receptacle inoperative for rendering said transfer means associated with said transitory receptacle operative to withdraw the elements of the selected group individually from said transitory receptacle after the last element of the group to be scanned has been moved past said transitory receptacle and for rendering operative the transfer means associated with the receptacle for receiving the selected elements for inserting said elements therein, and said means responsive to said counting means, upon reaching a zero count down, for rendering the transfer means associated with said transitory receptacle inoperative and the transfer means associated with said supply receptacle operative to withdraw an element therefrom.

16. Apparatus in accordance with claim 15 including means responsive to the absence of an element at said first scanning means for rendering said transporting means inoperative after a predetermined interval of time.

17. Apparatus in accordance with claim 15 including means responsive to the absence of an element at said first scanning means for rendering said transporting means inoperative after a predetermined interval, and means responsive to said counting means, during count down with retrieval of a selected group of elements from said transitory hopper, for inhibiting said last-mentioned means.

18. Apparatus for sorting a plurality of elements having encoded information, the combination comprising a supply receptacle, a group of receiving receptacles, said receptacles being adapted to have said elements inserted into and withdrawn therefrom, first scanning means for scanning each element and for generating first signals representative of said encoded information, means for transporting said elements individually from said supply receptacle past said first scanning means to any receptacle in said group of receptacles, respective transfer means for each of said receptacles, said transfer means associated with said supply receptacle being operative for withdrawing individual elements from said supply receptacle to position said elements on said transporting means and said respective transfer means being selectively operative to insert an element into its respective receptacle, means for selectively establishing a numeric sort on the least significant bits of a predetermined character and an alphabetic sort on the most significant bits of a predetermined character, second scanning means for scanning an encoded medium for generating second signals therefrom, register means for storing said second signals, means responsive to said first signals derived from the predetermined character, as determined by said establishing means, for comparing said first signals for equality with said second signals stored in said register means, means responsive to said comparing means upon establishment of an equality comparison for generating a select signal, and means for rendering said respective transfer means corresponding to said select signal operative in timed relation to movement of the element into relation with said respective transfer means for inserting said element into said receptacle.

19. Apparatus in accordance with claim 18 including means responsive to the absence of an element being moved past said first scanning means for stopping said transporting means after a predetermined interval of time.

20. Apparatus in accordance with claim 18 including means responsive to any one of said receptacles becoming full for rendering the transfer means associated with said supply receptacle inoperative.

21. Apparatus in accordance with claim 18 including means for reversing the direction of movement of said transporting means and for rendering said respective transfer means successively operative to return said elements to said supply receptacle.

22. Apparatus for numerically sorting a plurality of elements having encoded information in successive columns, each column being representative of a word comprising a number of characters with the highest order character designated as a recognition character and each character being represented by a six bit binary code including a field portion designated by the four least significant bits and common to differently assigned groups of numerical and alphabetical characters and a zone portion designated by the two most significant bits to distinguish among differently assigned groups of characters, the combination comprising a supply receptacle, a group of receiving receptacles, said receptacles being adapted to have said elements inserted into and withdrawn therefrom, first scanning means for scanning each element for generating first signals representative of the encoded information in each column, means for transporting said elements individually from said supply receptacle past said first scanning means to any receptacle in said group of receptacles, respective transfer means for each of said receptacles, said transfer means associated with each of the receptacles in said group being selectively operative to insert an element into its respective receptacle, means for establishing a numeric sort based on the least significant bits of a predetermined character in a word having a predetermined recognition character, second means for scanning a medium encoded with a group of words, the number of words corresponding to the number of differently assigned groups of numerals and characters with each word in said group being encoded with said predetermined recognition character and in each of the other character positions with only the field portion of one of the differently assigned groups of numerals and characters, and for generating second signals, register means for storing said second signals, means responsive to said first signals derived from the field portion of said predetermined character and from said recognition character of the established word on each element for comparing said first signals for equality with said second signals stored in said register means, means corresponding to each word stored in said register means and responsive to said comparing means, upon establishment of an equality comparison, for generating a select signal, and means for rendering said respective transfer means corresponding to said select signal operative in timed relation to movement of the element into relation with said respective transfer means for inserting said element into said receptacle.

23. Apparatus for making an alpha-numeric sorting of a plurality of elements having encoded information in successive columns, each column being representative of a word comprising a number of characters with the highest order character designated as a recognition character and each character being represented by a six bit binary code including a field portion designated by the four least significant bits and common to differently assigned groups of numerical and alphabetical characters and a zone portion designated by the two most significant bits to distinguish among differently assigned groups of characters, the combination comprising a supply receptacle, a group of receiving receptacles, said receptacles being adapted to have said elements inserted into and withdrawn therefrom, first scanning means for scanning each element for generating first signals representative of the encoded information, means for transporting said elements individually from said supply receptacle past said first scanning means to any receptacle in said group of receptacles, respective transfer means for each of said receptacles, said transfer means associated with said supply receptacle being operative for withdrawing individual elements from said supply receptacle to position said elements on said transporting means and said transfer means associated with each of the receptacles in said group being selectively operative to insert an element into its respective receptacle, means for establishing an alpha-numeric sorting based on the most significant bits of one of the characters in a word having a predetermined recognition character, second scanning means for scanning a medium encoded with a group of words, the number of words corresponding to the number of differently assigned groups of characters with each word in said group being encoded with said predetermined recognition character and in each of the other character positions with only the zone portion of one of the differently assigned groups of characters, and for generating second signals therefrom, register means for storing said second signals, means responsive to said first signals derived from the zone portion of said one character and from said recognition character of the established word on each element for comparing said first electrical signals for equality with said second electrical signals stored in said register means, means corresponding to each word in said register means and responsive to said comparing means, upon establishment of an equality comparison, for generating a select signal upon completion of the scanning of each element, each of said select signals being associated with one of the receptacles in said group, and means responsive to said select signal in accordance with the signal producing means from which the select signal is derived for rendering the transfer means associated with the corresponding receptacle operative in timed relation to movement of the element into relation with the respective transfer means for inserting the element into the receptacle.

24. Apparatus for numerically sorting a plurality of elements having encoded information in successive columns, each column being representative of a word comprising a number of characters with the highest order character designated as a recognition character, the combination comprising a supply receptacle, a group of receiving receptacles, said receptacles being adapted to have said elements inserted into and withdrawn therefrom, first scanning means for scanning each element for generating first signals representative of the encoded information, means for transporting said elements individually from said supply receptacle past said first scanning means to any receptacle in said group of receptacles, respective transfer means for each of said receptacles, said transfer means associated with said supply receptacle being operative for withdrawing individual elements from said supply receptacle to position said elements on said transporting means and said transfer means associated with each of the receptacles in said group being selectively operative to insert an element into its respective receptacle, means for establishing the column and the character in said established column on the basis of which the sorting is to be made, second means for scanning a medium encoded with a plurality of words, each word having the same digit encoded in each character position and the digits in each word being different from the digit in any other word, and generating second signals therefrom, register means for storing said second signals, means responsive to said first signals derived from said selected character in said selected column of each of said elements for comparing said first signals for equality with said second signals stored in said register means corresponding to the same character position in a word, means responsive to said comparing means, upon establishment of an equality comparison, for generating a select signal indicative of the receptacle in said group which is to receive said element, and means responsive to said select signal for rendering said respective transfer means operative in timed relation to movement of the element into relation with said respective transfer means for inserting the element into said selected receptacle.

25. Apparatus for rejecting duplicates of any one of a plurality of elements having encoded information, each of said elements being encoded with a word comprising a recognition character and a number of characters representative of a multiple-digit number, the combination comprising means for scanning each of said elements for generating first signals from said recognition character and second signals from said number of characters, register means for storing said second signals, means responsive to said first signals for initiating said register means to store said second signals, means responsive to a change of state of said register means for generating a select signal, means responsive to the absence of a change of state of said register means for producing a reject signal, and means responsive to said select signal and said reject signal for selectively storing each of said elements.

26. Apparatus in accordance with claim 25 and including means for intermittently advancing individual elements into a position with respect to said scanning means.

27. Apparatus in accordance with claim 25 and including means for storing the selected and rejected elements and means selectively responsive to said select signal and said reject signal for inserting each of said elements into its respective storing means.

28. Apparatus for rejecting duplicates of any one of a plurality of elements having encoded information, each of said elements being encoded with a word comprising a recognition character and a number of characters represensative of a multiple-digit number, the combination comprising a supply receptacle, a group of at least two receptacles for receiving the selected and rejected elements, said receptacles being adapted to have said elements inserted into and withdrawn therefrom, means for scanning each element for generating first signals from said recognition character and second signals from said number of characters, means for transporting said elements individually from said supply receptacle past said scanning means to any receptacle in said group of receptacles, respective transfer means for each of said receptacles, said transfer means associated with said supply receptacle being operative for withdrawing elements from said supply receptacle to position said elements on said transporting means and said transfer means associated with each of the receptacles in said group being selectively operative to insert an element into its respective receptacle, register means initiated by said first signals for storing only said second signals, means responsive to a change of state of said register means, upon completion of the scanning of each element, for generating a select signal to render the transfer means associated with the receptacle designated to receive selected elements operative in timed relation to movement of the element into a position with respect to the receptacle for inserting the element therein, and means responsive to the absence of change in state of said register means, upon completion of the scanning of each element, for generating a reject signal to render the transfer means associated with the receptacle designated to receive rejected elements operative in timed relation to movement of the element into a position with respect to the receptacle for inserting the element therein.

29. Apparatus for rejecting duplicates of any one of a plurality of elements having encoded information, each of said elements in a group being encoded with a word comprising a recognition character and a number of characters representative of a multiple-digit number, the combination comprising a supply receptacle, a group of at least two receptacles for receiving the selected and rejected elements, said receptacles being adapted to have said elements inserted into and withdrawn therefrom, means for scanning each element for generating first signals representative of said recognition character and second signals representative of said number of characters, means for transporting said elements individually from said supply receptacle past said scanning means to any receptacle in said group of receptacles, respective transfer means for each of said receptacles, said transfer means associated with said supply receptacle being operative for withdrawing elements from said supply receptacle to position said elements on said transporting means and said transfer means associated with each of the receptacles in said group being selectively operative to insert an element into its respective receptacle, register means initiated by said first signals for storing only said second signals producing a change of state of said register means, means responsive to a change of state of said register means, upon completion of the scanning of each element, for generating a select signal to render said transfer means associated with the receptacle designated to receive selected elements operative in timed relation to movement of the element into a position with respect to the receptacle for inserting the element therein, means responsive to the absence of change of state of said register means, upon completion of the scanning of each element, for generating a reject signal to render said transfer means associated with the receptacle designated to receive rejected elements operative in timed relation to movement of the element into a position with respect to the receptacle for inserting the element therein, means responsive to said second signals for establishing a count corresponding to said multiple-digit number and counting down as each element of said group is moved past said scanning means, means responsive to said first signals derived from the first element in a group for inhibiting said register means and rendering the transfer means associated with the receptacle, as designated by said select and reject signals, operative for inserting each element in said group in the same designated receptacle, and means responsive to said counting means upon reaching a zero count for conditioning said register means to receive said signals derived from the next element to be moved past said scanning means.

30. Apparatus in accordance with claim 29 and including means for detecting the absence of an element at said scanning means to render said transporting means inoperative after a predetermined interval of time.

References Cited in the file of this patent

UNITED STATES PATENTS

| | | |
|---|---|---|
| 2,492,664 | Seipos | Dec. 27, 1949 |
| 2,987,181 | Branscomb | June 6, 1961 |
| 3,023,399 | Dickinson | Feb. 27, 1962 |